(12) United States Patent
Ijichi et al.

(10) Patent No.: US 8,335,578 B2
(45) Date of Patent: Dec. 18, 2012

(54) REPRODUCING APPARATUS, REPRODUCING METHOD, AND REPRODUCING PROGRAM

(75) Inventors: Susumu Ijichi, Kanagawa (JP); Satoshi Araki, Kanagawa (JP); Ryo Mukaiyama, Tokyo (JP); Takaomi Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 1323 days.

(21) Appl. No.: 11/776,873

(22) Filed: Jul. 12, 2007

(65) Prior Publication Data

US 2008/0021577 A1    Jan. 24, 2008

(30) Foreign Application Priority Data

Jul. 21, 2006 (JP) ................................. 2006-200043
Aug. 22, 2006 (JP) ................................. 2006-225462

(51) Int. Cl.
*G06F 17/00* (2006.01)
(52) U.S. Cl. ....... 700/94; 715/716; 715/727; 369/30.01; 369/30.03; 369/30.04; 369/30.05; 369/30.07; 369/30.08; 369/30.09; 707/620; 707/621; 707/623; 707/609; 707/610; 707/804; 707/805; 707/808; 707/722; 707/733; 707/734; 707/769
(58) Field of Classification Search ..................... 700/94
See application file for complete search history.

(56) References Cited

U.S. PATENT DOCUMENTS

| | | | | |
|---|---|---|---|---|
| 6,477,704 B1* | 11/2002 | Cremia | ........................... | 725/35 |
| 2003/0221541 A1* | 12/2003 | Platt | ............................... | 84/609 |
| 2005/0108319 A1 | 5/2005 | Kohno et al. | | |
| 2006/0167576 A1* | 7/2006 | Rosenberg | ...................... | 700/94 |
| 2006/0195789 A1* | 8/2006 | Rogers et al. | ................. | 715/727 |
| 2006/0267995 A1* | 11/2006 | Radloff et al. | ................ | 345/530 |
| 2007/0025196 A1* | 2/2007 | Nagao et al. | ............... | 369/30.04 |
| 2008/0021577 A1* | 1/2008 | Ijichi et al. | ...................... | 700/94 |
| 2008/0215172 A1* | 9/2008 | Digon | ............................. | 700/94 |

FOREIGN PATENT DOCUMENTS

| | | |
|---|---|---|
| JP | 2003-132085 | 5/2003 |
| JP | 2003-162285 | 6/2003 |
| JP | 2004-005832 | 1/2004 |
| JP | 2004-032503 | 1/2004 |
| JP | 2004-326840 | 11/2004 |
| JP | 2005-166206 | 6/2005 |
| JP | 2005-293713 | 10/2005 |

* cited by examiner

*Primary Examiner* — Paul McCord
(74) *Attorney, Agent, or Firm* — Oblon, Spivak, McClelland, Maier & Neustadt, L.L.P.

(57) ABSTRACT

The present invention provides a reproducing apparatus for reproducing a plurality of pieces of content data stored in a content data storage unit according to a play list defining reproduction order of the content data. The apparatus includes a play list storage unit, a request information generating unit, and a play list reconstructing unit. The play list storage unit stores the play list having a play list generating rule and identifying information for identifying the content data matching the play list generating rule. The request information generating unit generates reconstruction requesting information for requesting reconstruction of the play list. The play list reconstructing unit reconstructs at least a part of the play list stored in the play list storage unit into a play list having the play list generating rule corresponding to an apparatus use condition in response to the reconstruction requesting information generated by the request information generating unit.

23 Claims, 50 Drawing Sheets

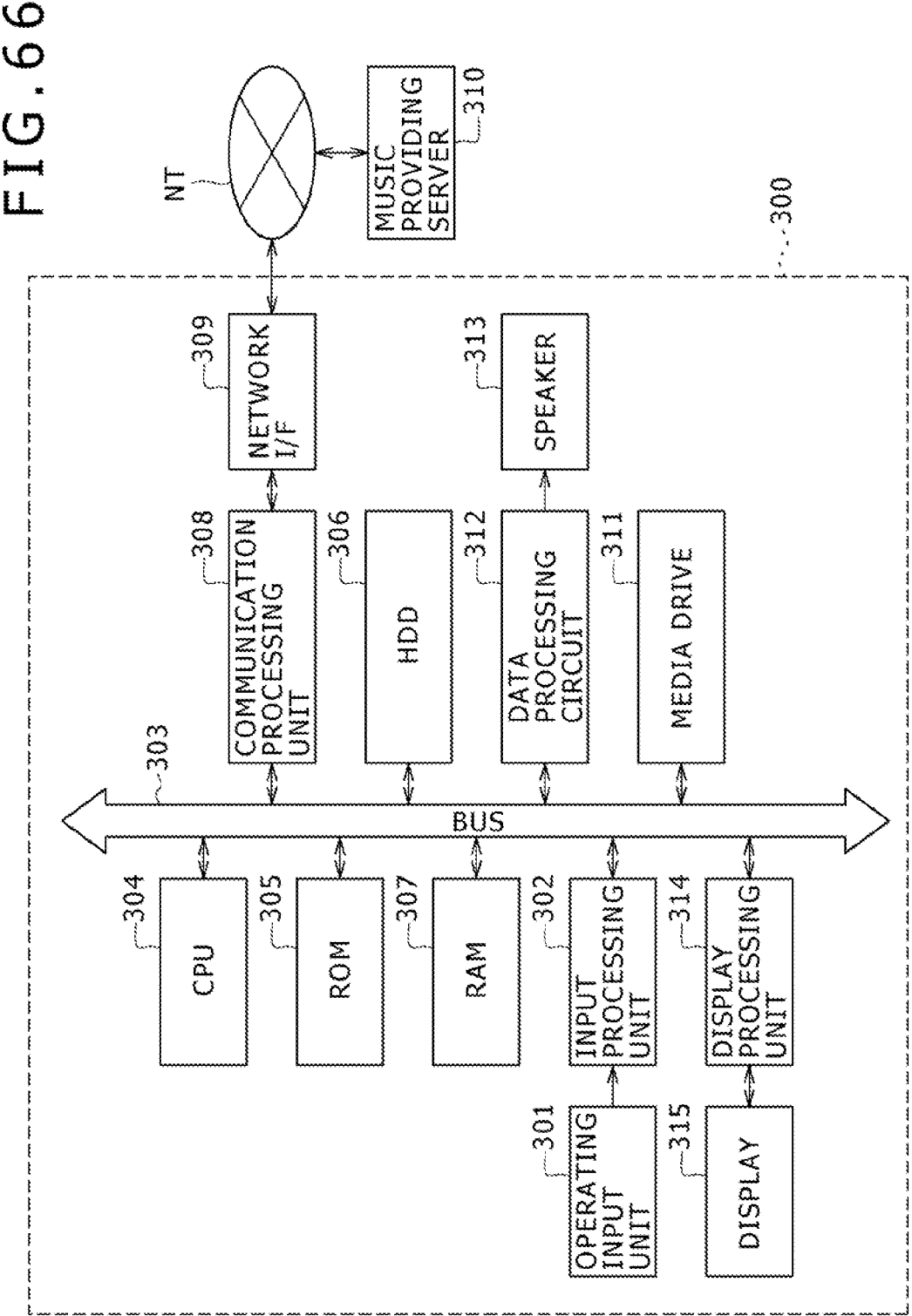

REPRODUCING APPARATUS, REPRODUCING METHOD, AND REPRODUCING PROGRAM

CROSS REFERENCES TO RELATED APPLICATIONS

The present invention contains subject matter related to Japanese Patent Applications JP 2006-200043 and JP 2006-225462 filed in the Japan Patent Office on Jul. 21 and Aug. 22, 2006, respectively, the entire contents of which being incorporated herein by reference.

BACKGROUND OF THE INVENTION

1. Field of the Invention

The present invention relates to a reproducing apparatus, a reproducing method, and a reproducing program, and is suitable for application to a reproducing apparatus that reproduces music data according to a play list defining the reproduction order of music data as content data, for example.

2. Description of the Related Art

A server in related art retains a plurality of play lists, and makes these play lists also retained in a client. When the client requests music data for reproduction according to a play list, the server transmits the music data requested for reproduction to the client to make the client output the music data as music and thereby allow a user to listen to the music. In addition, when the server externally obtains new music data, the server generates a new play list and registers the obtained music data in the new play list. Thereafter, each time the server externally obtains new music data, the server additionally registers the new music data in the new play list, and thereby allows the client to request the new music data for reproduction according to the new play list (see Japanese Patent Laid-open No. 2003-162285 [page 21, page 26, page 32, FIG. 50], for example).

SUMMARY OF THE INVENTION

The server of such a configuration changes the reproduction order of music data already defined in a play list to reproduction order in which music data requested for reproduction a larger number of times has a higher ranking according to the number of reproduction requests made for each piece of music data, for example. In addition, when there is music data requested for reproduction a predetermined number of times or more in a predetermined time period, for example, the server generates a new play list, and registers the music data requested for reproduction the predetermined number of times or more in the new play list. Thereafter, when there is music data requested for reproduction the predetermined number of times or more in the predetermined time period, for example, the server additionally registers the music data in the new play list. The server thus updates the contents of the play list as appropriate.

However, according to the number of reproduction requests made for music data, the server simply changes the reproduction order defined in the play list, or simply additionally registers the music data in the new play list. Thus, when there is music data that is not requested for reproduction very often among a plurality of pieces of music data registered in these play lists, the server allows the music data that is not requested for reproduction very often to remain registered in the play lists. Therefore, when reproducing music data according to a play list, the server reproduces the music data of music that a user has not listened to very often, and it is thus difficult to say that the server provides music that the user desires to listen to.

The embodiment of the present invention has been made in view of the above. It is desirable to propose a reproducing apparatus, a reproducing method, and a reproducing program that can provide contents desired by a user according to a play list.

According to an embodiment of the present invention, reconstruction requesting information for requesting reconstruction of a play list defining reproduction order of a plurality of pieces of content data is generated, and at least a part of the play list having a play list generating rule and identifying information for identifying the content data matching the play list generating rule is reconstructed into a play list having a play list generating rule corresponding to an apparatus use condition in response to the generated reconstruction requesting information.

Thus, the embodiment of the present invention can prepare a play list in which the content data of contents desired by a user is registered according to the play list generating rule reflecting the apparatus use condition.

According to the above-described embodiment of the present invention, reconstruction requesting information for requesting reconstruction of a play list defining reproduction order of a plurality of pieces of content data is generated, and at least a part of the play list having a play list generating rule and identifying information for identifying the content data matching the play list generating rule is reconstructed into a play list having a play list generating rule corresponding to an apparatus use condition in response to the generated reconstruction requesting information. It is thereby possible to prepare a play list in which the content data of contents desired by a user is registered according to the play list generating rule reflecting the apparatus use condition. It is thus possible to realize a reproducing apparatus, a reproducing method, and a reproducing program that can provide contents desired by a user according to a play list.

BRIEF DESCRIPTION OF THE DRAWINGS

FIG. 66 is a block diagram showing a configuration of a reproducing apparatus according to a third embodiment.

DETAILED DESCRIPTION OF THE PREFERRED EMBODIMENTS

One embodiment of the present invention will hereinafter be described in detail with reference to the drawings.

Figure 1:
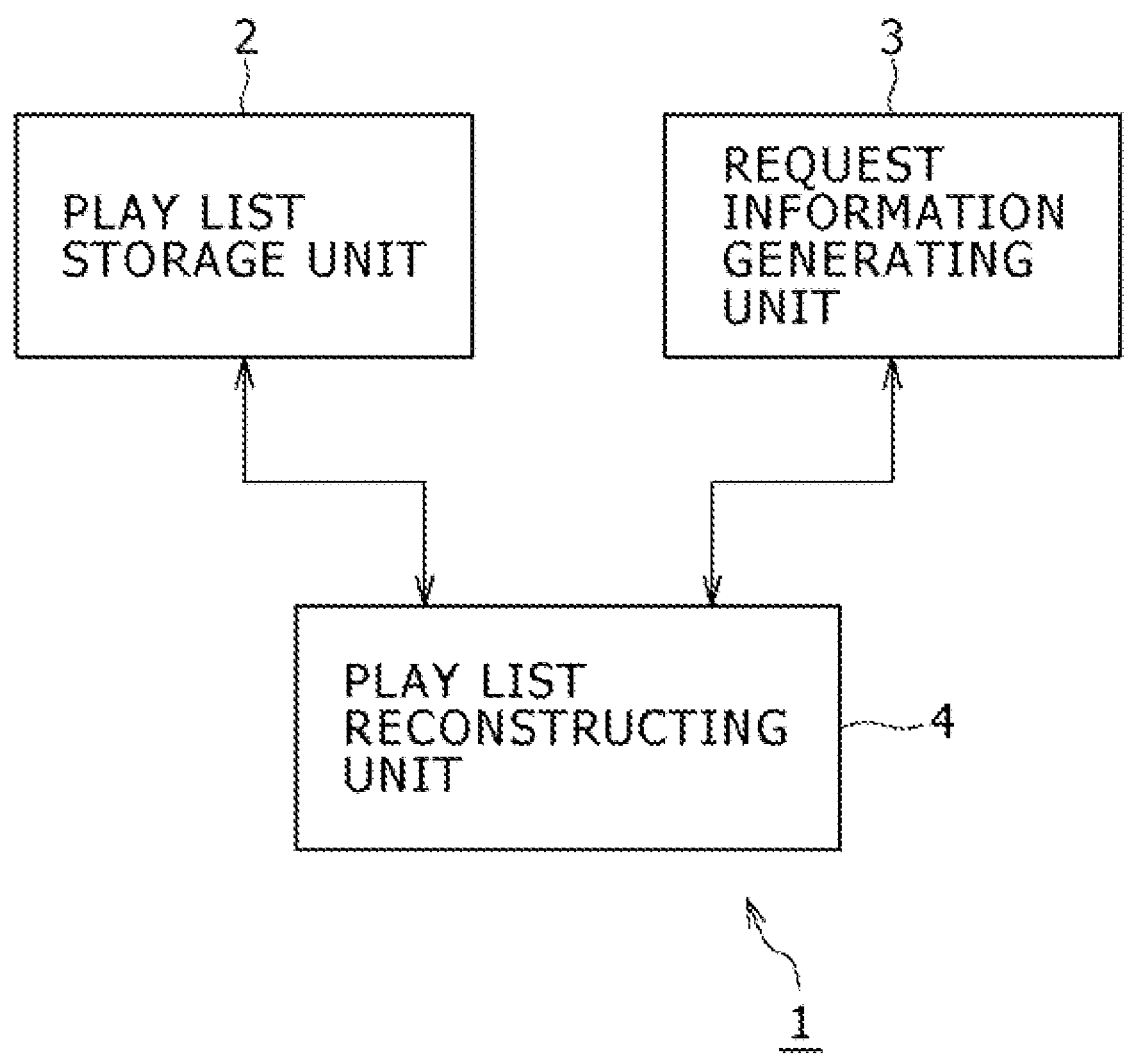
FIG. 1 is a block diagram showing an outline of a configuration of a reproducing apparatus according to a first embodiment.

(1) First Embodiment
(1-1) Outline of Reproducing Apparatus According to First Embodiment FIG. 1 shows an outline of a configuration of a reproducing apparatus 1 according to a first embodiment as a whole. The reproducing apparatus 1 can reproduce a plurality of pieces of content data stored in a content data storage unit not shown in the figure according to a play list that defines the order of reproduction of the content data. In such a reproducing apparatus 1, a play list storage unit 2 stores a play list having a play list generating rule and identifying information of content data matching the play list generating rule. A request information generating unit 3 in the reproducing apparatus 1 generates reconstruction requesting information for requesting the reconstruction of the play list. According to the reconstruction requesting information generated by the request information generating unit 3, a play list reconstructing unit 4 in the reproducing apparatus 1 reconstructs at least a part of the play list stored in the play list storage unit 2 into a play list having a play list generating rule corresponding to conditions of use of the apparatus. With such a configuration, the reproducing apparatus 1 can prepare a play list in which content data presumed to be desired by a user is registered according to the play list generating rule reflecting the conditions of use of the apparatus, and thus provide the content data presumed to be desired by the user according to the play list.

(1-2) Detailed Configuration of Reproducing Apparatus According to First Embodiment A detailed hardware configuration based on functional circuit blocks of a reproducing apparatus 10 will next be described with reference to FIG. 2. The reproducing apparatus 10 is configured to be able to implement various functions such as a medium reproducing function of reproducing music data from a recording medium such as a CD (Compact Disk) by a reproducing unit 11, a recording function of recording music data recorded on the recording medium, a function of reproducing music data using a play list (which function will hereinafter be referred to as a list use reproducing function), and the like.

Figure 3:
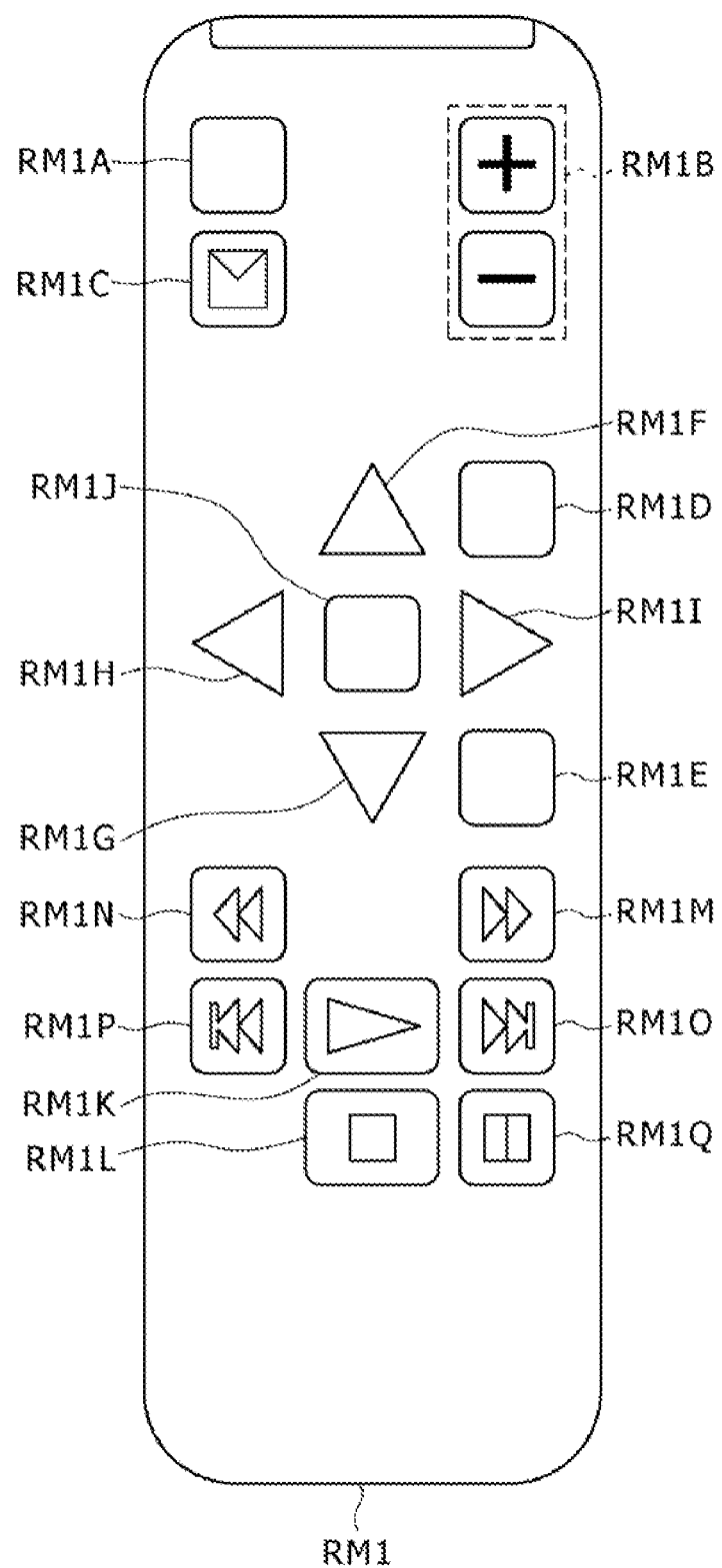
FIG. 3 is a schematic diagram showing a configuration of a remote control.

An operating unit 12 of the reproducing apparatus 10 in this case has a remote control RM1 having the shape of a rectangular parallelepiped as shown in FIG. 3, for example. Arranged on a side of one end of a front surface of the remote control RM1 are a toggle type power button RM1A for turning on/off power to the reproducing apparatus 10, sound volume adjusting buttons RM1B for adjusting the sound volume of music being reproduced, and a reconstruction requesting button RM1C for requesting the reconstruction of a play list to be described later. In addition, arranged in a central part of the front surface of the remote control RM1 are a toggle type function selecting button RM1D for changing and selecting the various functions described above and a setting button RM1E for calling up various setting items. In addition to this, arranged in the central part of the front surface of the remote control RM1 are an upward direction selecting button RM1F and a downward direction selecting button RM1G, a left direction selecting button RM1H and a right direction selecting button RM1I, and a decision button RM1J. The upward direction selecting button RM1F and the downward direction selecting button RM1G are for selecting an upward direction and a downward direction on a display screen, and have triangular shapes with vertexes thereof pointing to the side of one end and the side of another end, respectively. The left direction selecting button RM1H and the right direction selecting button RM1I are for selecting a left direction and a right direction on the display screen, and have triangular shapes with vertexes thereof pointing to a left side and a right side, respectively. The decision button RM1J is for deciding on various selections on the display screen, for example.

Further, arranged in the vicinity of the other end of the front surface of the remote control RM1 are a reproduction start button RM1K, a reproduction stop button RM1L, a fast forward button RM1M, a fast reverse button RM1N, a forward skip button RM1O, a reverse skip button RM1P, and a pause button RM1Q for controlling the reproduction of music data. Thus, the reproducing apparatus 10 allows the user to easily select the various functions described above by a simple operation of pressing the function selecting button RM1D on the remote control RM of the operating unit 12.

Specifically, when the reproducing unit 11 in the reproducing apparatus 10 is supplied with a medium reproducing function selecting instruction to select the medium reproducing function according to an operation of the operating unit 12 by the user, the reproducing unit 11 reproduces music data recorded on a recording medium loaded in the reproducing apparatus 10 from the recording medium, and outputs the music data as music. The reproducing unit 11 thereby allows the user to listen to the music.

When the reproducing unit 11 is supplied with a recording function selecting instruction to select the recording function according to an operation of the operating unit 12 by the user, the reproducing unit 11 reads music data from the recording medium, compression-codes the music data by a predetermined compression coding system, and then sends the result to a content data storage unit 13. The content data storage unit 13 thus stores music data supplied from the reproducing unit 11 in for example a format of ATRAC3 (Adaptive Transform Acoustic Coding 3) AAC (Advanced Audio Coding), WMA (Windows® Media Audio), RealAUDIO G2 Music Codec, or MP3 (MPEG Audio Layer-3).

In addition, a communicating unit 14 can communicate with an external apparatus 15 on a network NT. The external apparatus 15 can transmit various data such as music data and the like, various information and the like to the reproducing apparatus 10 in either of a first transmission mode or a second transmission mode. The first transmission mode complies with TCP/IP (Transmission Control Protocol/Internet Protocol) for transmitting various data such as music data and the like, various information and the like more surely. The second transmission mode complies with UDP/IP (User Datagram Protocol/Internet Protocol) for transmitting various data such as music data and the like, various information and the like more quickly. The external apparatus 15 transmits various data and various information in the first transmission mode when the various data and the various information are requested by the reproducing apparatus 10 for a purpose of being stored temporarily or permanently. The external apparatus 15 transmits music data in the second transmission mode when the music data is requested by the reproducing apparatus 10 for a purpose of being subjected to a reproduction process while received without being stored (such a reproduction process performed while receiving music data without storing the music data will hereinafter be referred to as a streaming reproduction).

Thus, when the communicating unit 14 is supplied with a download request requesting reception of music data using the network NT for a purpose of storing the music data in the content data storage unit 13 (such reception for a purpose of storing music data will be referred to as download) according to an operation of the operating unit 12 by the user, the communicating unit 14 transmits a download requesting signal requesting the download of desired music data to the external apparatus 15 on the network NT. When the music data in a predetermined format is returned as a result from the external apparatus 15 in the first transmission mode, the communicating unit 14 downloads the music data, and sends the music data to the content data storage unit 13. Thus the content data storage unit 13 stores the music data downloaded from the external apparatus 15.

Incidentally, when the communicating unit 14 is supplied with a streaming reproduction request requesting streaming reproduction of music data using the network NT according to an operation of the operating unit 12 by the user as will be described later, the communicating unit 14 transmits a streaming requesting signal to the external apparatus 15 on the network NT. When the music data in a predetermined format is returned as a result from the external apparatus 15 in the second transmission mode, the communicating unit 14 sends the music data to the reproducing unit 11 while receiving the music data. Thus the reproducing unit 11 reproduces the music data supplied from the communicating unit 14 by streaming reproduction.

Figure 4:
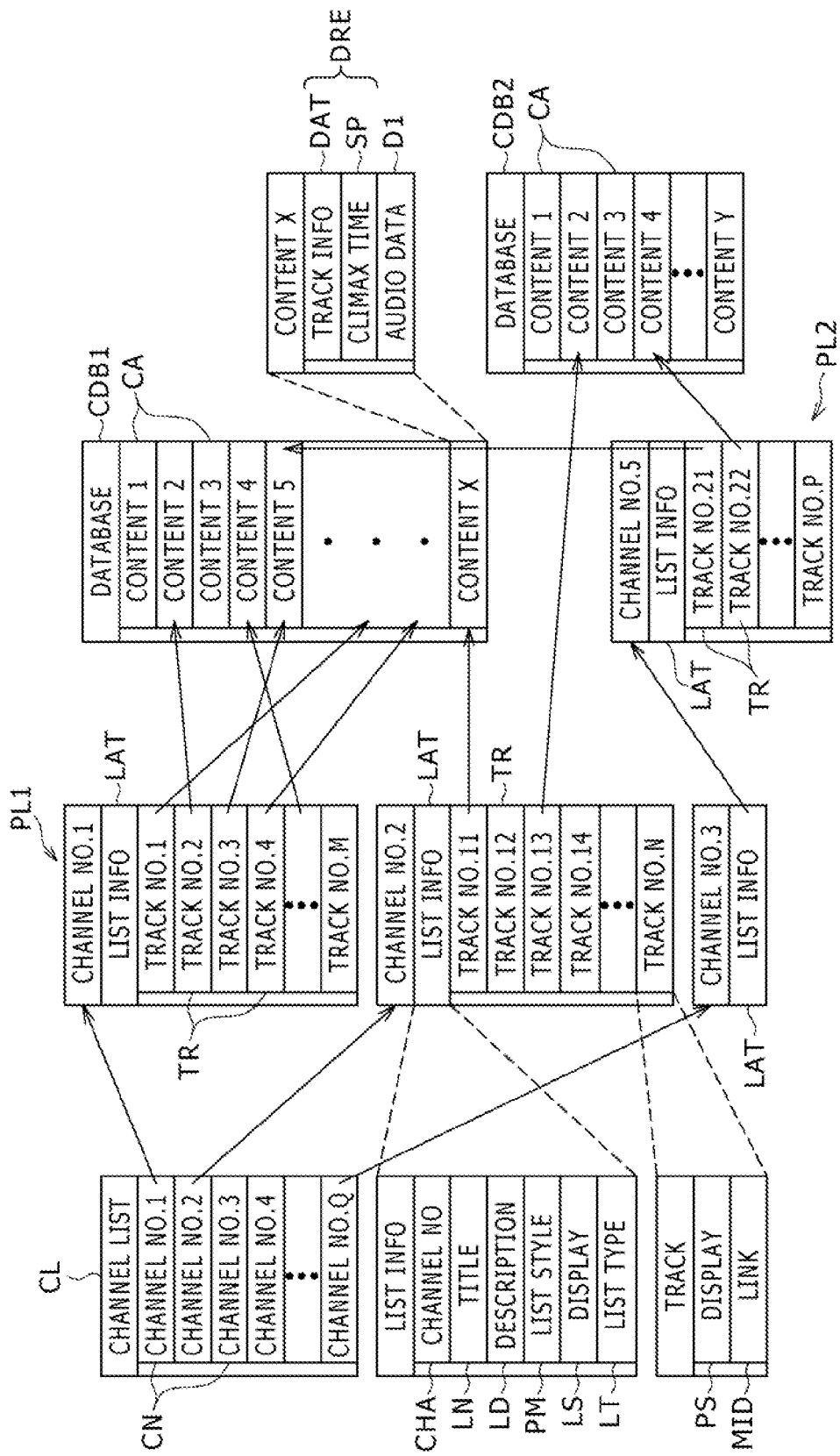
FIG. 4 is a schematic diagram showing configurations of content databases and play lists.

As shown in FIG. 4, a database CDB1 for managing music data (this database will hereinafter be referred to as a content database) is constructed in the content data storage unit 13. Then the content data storage unit 13 stores a plurality of pieces of music data managing information CA for managing a plurality of pieces of music data D1 in the content database CDB1.

In this case, each piece of music data managing information CA has one piece of music data D1 stored by recording or a download from the external apparatus 15 as described above and related information DRE related to the one piece of music data D1 (this information will hereinafter be referred to as data-related information). The data-related information DRE has attribute information DAT of the corresponding music data D1 (this attribute information will hereinafter be referred to as data attribute information) and characteristic position information SP. The characteristic position information SP indicates a position corresponding to a characteristic part referred to as a "bridge", for example, of music based on the music data D1 (which position corresponds to a start of the "bridge", for example, and will hereinafter be referred to as a characteristic position).

The data attribute information DAT includes various information indicating an ID (IDentification) unique to the corresponding music data D1, a title of the music (this title will hereinafter be referred to as a music title), a name of an artist (this name will hereinafter be referred to as an artist name), a name of a genre to which the music belongs (this name will hereinafter be referred to as a genre name), a date and time of recording of the music data D1, a reproduction time of the whole of the music data D1, and the like, as well as image data of a jacket photograph of an album including the music data D1 (this image data will hereinafter be referred to as jacket photograph image data). The data attribute information DAT further includes various information such as impression value information, a characteristic word included in lyrics of the music, and the like. The impression value information is obtained by converting an impression of the music based on the music data D1 (such as a tempo, tone quality or the like of the music) into a numerical value by analyzing the corresponding music data D1 by frequency analysis or the like. (The impression value information is obtained by converting an impression of the whole of the music or an impression of one part or each of a plurality of parts such as the "bridge" part and the like into a numerical value).

Incidentally, the data attribute information DAT is downloaded from an external information providing apparatus (not shown) at the time of reading the music data D1 from the recording medium, and downloaded from the external apparatus 15 together with the music data D1. However, the impression value information may be downloaded from the external apparatus 15 together with the music data D1, or may be generated by analyzing the music data D1 by for example the reproducing unit 11 in the reproducing apparatus 10.

In addition, a play list storage unit 16 stores a channel list CL showing a list of a plurality of channels to which play lists PL1 can be assigned for selection of the play lists PL1, as with channels for selecting radio broadcasting stations, for example. Incidentally, channel numbers CN as identifying information enabling each of the plurality of channels to be identified individually are arranged and stored in predetermined order (sequentially increasing order of a plurality of channel numbers CN, for example) in the channel list CL.

The play list storage unit 16 also stores a plurality of kinds of play lists PL1 each defining the order of reproduction of a plurality of pieces of music data D1. It is specified that each of the plurality of channels be assigned one play list PL1. However, the number of play lists PL1 to be stored by the play list storage unit 16 is not specifically limited. The play list storage unit 16 can therefore store play lists PL1 assigned to the channels and store play lists PL1 not assigned to the channels.

A play list PL1 has attribute information LAT of the play list PL1 (this attribute information will hereinafter be referred to as list attribute information). In addition, music registration information TR for registering a plurality of pieces of music data D1 reproducible according to the play list PL1 is arranged and stored in the play list PL1 according to the order of reproduction selected in advance for the plurality of pieces of music data D1.

While the reproducing apparatus 10 can reproduce music data D1 using a play list PL1 stored in the play list storage unit 16, the reproducing apparatus 10 can also use a play list PL2 stored in a play list storage unit (not shown) provided in the external apparatus 15 on the network NT, for example, for reproduction of music data D1. Using such play lists PL1 and PL2, the reproducing apparatus 10 can reproduce music data D1 stored in the content data storage unit 13 and reproduce music data D1 stored in a content database CDB2 within a content data storage unit (not shown) provided in the external apparatus 15. Thus, among the play lists PL1 stored in the play list storage unit 16, there are play lists PL1 that include list attribute information LAT and specify a play list PL2 stored and retained in the external apparatus 15 by the list attribute information LAT.

The list attribute information LAT includes channel assignment information CHA indicating whether the corresponding play list PL1 is assigned to a channel. When the corresponding play list PL1 is assigned to a channel, the list attribute information LAT includes the channel assignment information CHA that also indicates the channel number CN of the channel. The list attribute information LAT also includes list name information LN indicating the name of the corresponding play list PL1 (the name will hereinafter be referred to as a list name). Incidentally, when the play list PL1 is assigned to a channel, the list name is also the name of the channel.

The list attribute information LAT further includes list detailed information LD formed by text data or the like of a concrete description for the composition of the corresponding play list PL1. The list attribute information LAT further includes reproduction mode information PM indicating a reproduction mode in which to perform reproduction, that is, a normal reproduction mode in which a plurality of pieces of music data D1 registered in the corresponding play list PL1 are reproduced according to reproduction order defined in advance, or a shuffle reproduction mode in which the plurality of pieces of music data D1 are reproduced in another order obtained by randomly changing the reproduction order defined in advance. Incidentally, such a reproduction mode can be selected by the user as appropriate, for example.

The list attribute information LAT further includes reproduction use setting information LS indicating whether or not to use the corresponding play list PL1 for the reproduction of the music data D1. Incidentally, whether or not to use the corresponding play list PL1 for the reproduction of the music data D1 can be arbitrarily selected by the user, for example.

In addition, the list attribute information LAT includes form information LT indicating a form of the corresponding play list PL1. Specifically, when the corresponding play list PL1 has music registration information TR and is stored in the play list storage unit 16 of the reproducing apparatus 10, the list attribute information LAT includes the form information LT indicating that the corresponding play list PL1 has music registration information TR and is stored in the play list storage unit 16 of the reproducing apparatus 10. When the corresponding play list PL1 is formed by the list attribute information LAT, the list attribute information LAT includes the form information LT indicating that the corresponding play list PL1 is formed by the list attribute information LAT and specifying another play list PL2 stored in the external apparatus 15 (for example including a network address of the other play list PL2). That is, even when the play list PL1 is formed by the list attribute information LAT, the play list PL1 is basically without music registration information, and the list attribute information LAT of the play list PL1 is formed in substantially the same manner as the list attribute information LAT of other play lists PL1.

The music registration information TR stored in the play list PL1 is generated for each piece of music data D1 registered in the play list PL1. The music registration information TR includes reproduction setting information PS indicating whether or not to reproduce the registered music data D1. Incidentally, the user is allowed to select arbitrarily whether or not to reproduce each piece of music data D1 registered in the play list PL1, for example. The music registration information TR also includes information MID identifying and indicating the music data D1 (this information will hereinafter be referred to as content indicating information). The music data D1 can be reproduced, such as a location where the registered music data D1 is stored (a memory address indicating a location where the music data D1 is stored in the content data storage unit 13 or a network address indicating a location where the music data D1 is stored in the external apparatus 15).

Incidentally, a play list PL2 stored in the play list storage unit of the external apparatus 15 includes list attribute information LAT and a plurality of pieces of music registration information TR, and is thus formed in a similar manner to that of the play lists PL1 stored in the play list storage unit 16 of the reproducing apparatus 10. The list attribute information LAT of the play list PL2 stored in the play list storage unit of the external apparatus 15 includes substantially the same information as the list attribute information LAT of a play list PL1 for specifying the play list PL2 from the reproducing apparatus 10 side except that the list attribute information LAT includes form information LT indicating that the play list PL2 is stored in the play list storage unit of the external apparatus 15.

Some play lists PL1 and PL2 having such a composition have contents registered therein updated as necessary each time new music data D1 is stored in the content databases CDB1 and CDB2 of the content data storage unit 13 and the external apparatus 15 so that the music data D1 is automatically registered in the play lists PL1 and PL2. In addition, some play lists PL1 and PL2 are generated by automatically registering a plurality of pieces of music data D1 matching a play list generating rule for collecting music data D1 by an impression of music, an image, an artist, a genre or the like of music selected arbitrarily, according to the play list generating rule. Further, some play lists PL1 and PL2 have contents registered therein updated as necessary so as to automatically register, in the play lists PL1 and PL2, a predetermined number of pieces of music data D1, which number is selected in advance, for example from a piece of music data D1 reproduced a largest number of times to a piece of music data D1 reproduced a small number of times in order on the basis of a data reproduction history indicating the number of times of reproduction for each piece of music data D1 among all the pieces of music data D1 stored in the content databases CDB1 and CDB2.

Thus, the reproducing unit 11 allows the user to select a desired play list PL1 or PL2 as a channel from among these various play lists PL1 and PL2. Then the reproducing unit 11 sequentially reproduces music data D1 stored in the content data storage unit 13 or the external apparatus 15 according to the play list PL1 or PL2 selected by the user. The reproducing unit 11 thereby enables the user to listen continuously to a plurality of pieces of music close to a desired impression or a desired image, or a plurality of pieces of music of a favorite artist, a favorite genre or the like.

Specifically, when the user selects the list use reproducing function via the operating unit 12, the reproducing unit 11 starts the list use reproducing function. Incidentally, when the list use reproducing function is selected via the operating unit 12 in an operation stop state of the reproducing apparatus 10 (that is, power is in an off state), the reproducing apparatus 10 is started in response to the selection of the list use reproducing function (that is, the power is turned on), and thereby the reproducing unit 11 starts the list use reproducing function concurrently with the starting of the reproducing apparatus 10. When the list use reproducing function is selected via the operating unit 12 in a state in which another function is being performed, the reproducing unit 11 switches from the other function to start the list use reproducing function in response to the selection of the list use reproducing function.

Each time the list use reproducing function is ended, the reproducing unit 11 sequentially updates and retains the channel number CN of the channel selected by the user at the time of ending the list use reproducing function (that is, at an end). The reproducing unit 11 also retains the channel number CN of a channel selected in advance for selection at a starting initial time of the list use reproducing function (that is, at a start). The reproducing unit 11 is set to automatically select one of the channel selected at the time of ending the list use reproducing function last time and the channel selected in advance at the starting initial time of the list use reproducing function. That is, according to such a setting, the reproducing unit 11 retains one of the channel number CN of the channel selected at the time of ending the list use reproducing function last time and the channel number CN of the channel selected in advance as the channel number CN of a channel to be automatically selected each time the list use reproducing function is started (this channel number CN will hereinafter be referred to as a starting initial use channel number).

Thus, when the list use reproducing function is started, the reproducing unit 11 automatically selects the channel of the starting initial use channel number, and reads the play list PL1 assigned to the automatically selected channel together with the channel list CL from the play list storage unit 16. Incidentally, when the play list PL1 assigned to the automatically selected channel specifies another play list PL2 stored and retained in the external apparatus 15, the reproducing unit 11 requests the other play list PL2 from the external apparatus 15 via the communicating unit 14 according to the specification. The reproducing unit 11 thereby takes in the other play list PL2 returned from the external apparatus 15 and downloaded by the communicating unit 14.

When music data D1 to be reproduced which music data D1 is registered in the play list PL1 or PL2 is stored in the content data storage unit 13, the reproducing unit 11 reads the music data D1 and corresponding data-related information DRE from the content data storage unit 13 according to content indicating information MID within music registration information TR stored in the play list PL1 or PL2. Thereby the reproducing unit 11 starts reproduction of the music data D1 from a characteristic position according to characteristic position information SP included in the data-related information DRE to allow the user to listen to the music from a start of a characteristic part on trial.

Incidentally, when music data D1 to be reproduced which music data D1 is registered in the play list PL1 or PL2 is stored and retained in the external apparatus 15, the reproducing unit 11 requests the music data D1 and corresponding data-related information DRE from the external apparatus 15 via the communicating unit 14 according to content indicating information MID within music registration information TR stored in the play list PL1 or PL2. Thereby the reproducing unit 11 starts streaming reproduction of the music data D1 from a characteristic position according to characteristic position information SP included in the data-related information DRE while taking in the music data D1 and the data-related information DRE returned from the external apparatus 15 and received by the communicating unit 14, to allow the user to listen to the music from a start of a characteristic part on trial.

When the reproducing unit 11 is supplied with a channel changing instruction to change the channel according to an operation of the operating unit 12 by the user during the reproduction of the music data D1 from the characteristic position, the reproducing unit 11 changes the channel according to the list of channel numbers CN stored in the channel list CL. The reproducing unit 11 thus reads a play list PL1 or PL2 assigned to a new channel from the play list storage unit 16 or the external apparatus 15 in the same manner as described above. Then the reproducing unit 11 reads music data D1 and data-related information DRE from the content data storage unit 13 or the external apparatus 15 according to the new play list PL1 or PL2. The reproducing unit 11 stops the reproduction of the music data D1 at this point in time, and starts reproduction of the read music data D1 from a characteristic position of the read music data D1.

Thus, each time the user requests a channel change (that is, each time the channel changing instruction is input), the reproducing unit 11 reproduces music data D1 registered in a play list PL1 or PL2 assigned to a channel after the channel change from a characteristic position of the music data D1 according to the play list PL1 or PL2. The reproducing unit 11 thereby allows the user to actually listen on trial to the music based on the music data D1 from a start of a characteristic part according to the play list PL1 or PL2, and select the play list PL1 or PL2 used for the reproduction of the music data D1.

When the reproducing unit 11 is supplied with a reproduced music changing instruction to change the music data D1 being reproduced according to an operation of the operating unit 12 by the user during the reproduction of the music data D1 from the characteristic position of the music data D1, the reproducing unit 11 reads new music data D1 and new data-related information DRE from the content data storage unit 13 or the external apparatus 15 in the same manner as described above according to the play list PL1 or PL2 selected at this point in time. The reproducing unit 11 stops the reproduction of the music data D1 at this point in time, and starts reproduction of the newly read music data D1 from a characteristic position of the newly read music data D1. Thus, each time the user requests a change of the music data D1 (that is, each time the reproduced music changing instruction is input), the reproducing unit 11 reproduces music data D1 after the change from a characteristic position of the music data D1. The reproducing unit 11 thereby allows the user to actually listen on trial to the music based on the music data D1 from a start of a characteristic part according to the play list PL1 or PL2, and select (that is, search for) desired music data D1 from among a plurality of pieces of reproducible music data D1 according to the play list PL1 or PL2.

When the reproducing unit 11 is supplied with a music selecting and determining instruction to select and determine the music data D1 being reproduced now as desired music data D1 according to an operation of the operating unit 12 by the user during the reproduction of the music data D1 from the characteristic position of the music data D1, the reproducing unit 11 temporarily stops reproducing the music data D1 and starts reproducing the music data D1 again from a start position of the music data D1. Thus, when the user selects and determines the desired music data D1, the reproducing unit 11 allows the user to listen to the whole of music based on the desired music data D1 according to the selection and determination of the desired music data D1. Incidentally, when the reproduction of the music data D1 from the start position of the music data D1 is ended (that is, when the music data D1 is reproduced from the start position to a tail end position), the reproducing unit 11 read new music data D1 and new data-related information DRE from the content data storage unit 13 or the external apparatus 15 in the same manner as described above according to the play list PL1 or PL2 selected at this point in time, and starts reproducing the read new music data D1 from a start position of the music data D1.

When the user makes no request to change the channel or change the music data D1 during the reproduction of the music data D1 from the characteristic position of the music data D1, and the music data D1 is reproduced from the characteristic position to the tail end position of the music data D1, the reproducing unit 11 read new music data D1 and new data-related information DRE from the content data storage unit 13 or the external apparatus 15 in the same manner as described above according to the play list PL1 or PL2 selected at this point in time. The reproducing unit 11 then starts reproducing the new music data D1 from a start position of the music data D1.

Thus, when the music data D1 the reproduction of which has been started from the characteristic position is reproduced to the tail end position, and thus the reproduction of the music data D1 is ended, the reproducing unit 11 assumes that the user has made a request to listen to a plurality of pieces of music based on a plurality of pieces of music data D1 registered in the play list PL1 or PL2. Then the reproducing unit 11 sequentially reproduces all of the plurality of pieces of music data D1 according to the play list PL1 or PL2 selected now so that the user can continuously listen to all of the plurality of pieces of music. Incidentally, when the reproducing unit 11 sequentially reproduces the music data D1 from characteristic positions or start positions according to one play list PL1 or PL2, the reproducing unit 11 sets a plurality of pieces of music registration information TR stored in the play list PL1 or PL2 in an annular form as if a start and a tail end of the music data D1 were connected to each other according to a list corresponding to the normal reproduction mode or the shuffle reproduction mode applied to the plurality of pieces of music registration information TR. Thereby the reproducing unit 11 can cyclically reproduce the plurality of pieces of music data D1 registered in one play list PL1 or PL2.

When the reproducing unit 11 is supplied with the channel changing instruction to change the channel according to an operation of the operating unit 12 by the user during the reproduction of the music data D1 from the start position of the music data D1, the reproducing unit 11 changes the channel according to the list of channel numbers CN stored in the channel list CL. The reproducing unit 11 thus reads a play list PL1 or PL2 assigned to a new channel from the play list storage unit 16 or the external apparatus 15. Then, in the same manner as described above, the reproducing unit 11 reads music data D1 and data-related information DRE from the content data storage unit 13 or the external apparatus 15 according to the new play list PL1 or PL2. The reproducing unit 11 stops the reproduction of the music data D1 at this point in time, and starts reproduction of the read music data D1 from a characteristic position of the read music data D1.

Thus, when a plurality of pieces of music data D1 are reproduced according to the play list PL1 or PL2 selected by the user, and a request is made to change the play list PL1 or PL2 used for the reproduction of the music data D1, the reproducing unit 11 stops the reproduction in response to the request. Then, in the same manner as described above, the reproducing unit 11 allows the user to actually listen on trial to music from a start of a characteristic part according to another play list PL1 or PL2 different from the play list PL1 or PL2 that has been used for the reproduction of the music data D1 up to this point in time, and select the new play list PL1 or PL2 to be used for the reproduction of music data D1.

When the reproducing unit 11 is supplied with a reproduced music changing instruction to change the music data D1 being reproduced according to an operation of the operating unit 12 by the user during the reproduction of the music data D1 from the start position of the music data D1, the reproducing unit 11 reads new music data D1 and new data-related information DRE from the content data storage unit 13 or the external apparatus 15 in the same manner as described above according to the play list PL1 or PL2 selected at this point in time. The reproducing unit 11 stops the reproduction of the music data D1 at this point in time, and starts reproduction of the newly read music data D1 from a characteristic position of the newly read music data D1. The reproducing unit 11 thereby changes the music data D1 being reproduced according to the play list PL1 or PL2 in response to a request from the user.

Thus, when a request is made to change the music data D1 while the music data D1 is reproduced from the start position, the reproducing unit 11 stops the reproduction in response to the request. Then, in the same manner as described above, the reproducing unit 11 allows the user to actually listen on trial to new music from a start of a characteristic part according to the play list PL1 or PL2 selected at this point in time, and select (that is, search for) desired music data D1 again.

When starting the list use reproducing function, the reproducing unit 11 sends the channel list CL read from the play list storage unit 16 to a display controlling unit 17. In addition, each time the reproducing unit 11 reads a play list PL1 or PL2 from the play list storage unit 16 or the external apparatus 15, the reproducing unit 11 sends the read play list PL1 or PL2 to the display controlling unit 17. Further, each time the reproducing unit 11 reads data-related information DRE together with music data D1 from the content data storage unit 13 or the external apparatus 15, the reproducing unit 11 sends data attribute information DAT included in the data-related information DRE to the display controlling unit 17.

Figure 5:
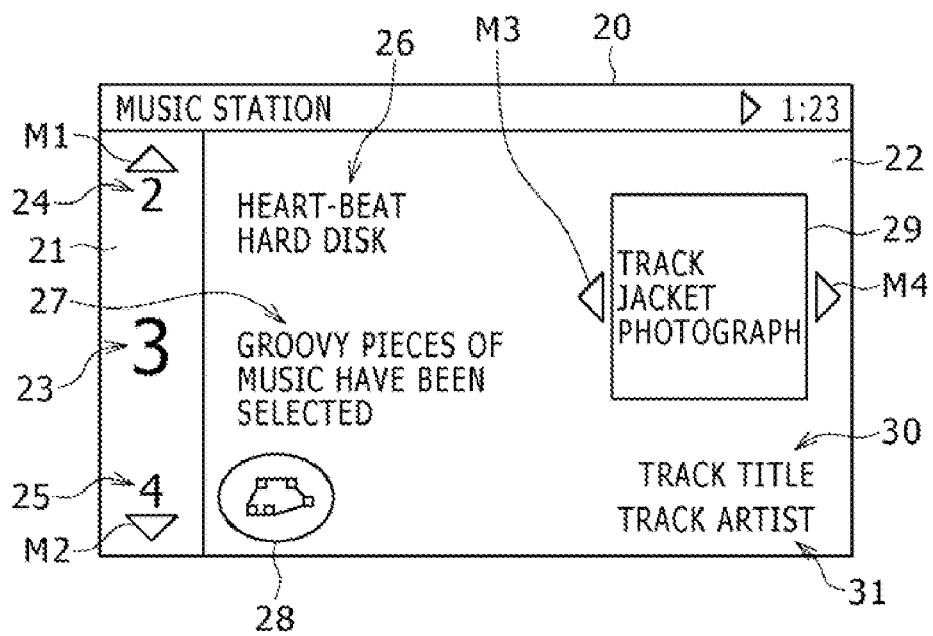
FIG. 5 is a schematic diagram showing a configuration of a selection screen.

Thereby, concurrently with the starting of the list use reproducing function, the display controlling unit 17 generates selection screen data for selecting a channel and music data D1 on the basis of the channel list CL, the play list PL1 or PL2, and the data attribute information DAT. The display controlling unit 17 then sends the selection screen data to a display unit 18 to thereby display a selection screen 20 as shown in FIG. 5, which screen is based on the selection screen data, on the display unit 18.

The selection screen 20 in this case has a vertically long channel selecting area 21 on a left side of the screen and a music selecting area 22 in a remaining part on the left side of the screen. A selected channel notifying indicator (this indicator will hereinafter be referred to as an icon) 23 for notifying a channel being selected now by channel number CN is displayed in a central part of the channel selecting area 21. In addition, selectable channel notifying icons 24 and 25 for notifying, by channel number CN, different channels selectable by changing from the channel being selected now according to the list of channel numbers CN stored in the channel list CL are displayed on an upper side and a lower side of the channel selecting area 21.

A first mark M1 in a triangular shape having a vertex facing upward, for example, is displayed on an upper side of the selectable channel notifying icon 24 displayed on the upper side of the channel selecting area 21. Thereby the selection screen 20 allows the user to intuitively recognize that when pressing the upward direction selecting button RM1F having the same shape and orientation as the first mark M1 on the remote control RM1, for example, the channel number CN indicated by the selected channel notifying icon 23 displayed in the central part of the channel selecting area 21 is changed to a channel number CN smaller by one according to the list of channel numbers CN stored in the channel list CL, and thus the desired channel can be selected.

A second mark M2 in a triangular shape having a vertex facing downward, for example, is displayed on a lower side of the selectable channel notifying icon 25 displayed on the lower side of the channel selecting area 21. Thereby the selection screen 20 allows the user to intuitively recognize that when pressing the downward direction selecting button RM1G having the same shape and orientation as the second mark M2 on the remote control RM1, for example, the channel number CN indicated by the selected channel notifying icon 23 displayed in the central part of the channel selecting area 21 is changed to a channel number CN larger by one according to the list of channel numbers CN stored in the channel list CL, and thus the desired channel can be selected.

Displayed on the left side of the music selecting area 22 are a list name 26 of the play list PL1 or PL2 assigned to the channel being selected now and a concrete description 27 (that is, a description based on text data as the above-described list detailed information LD) for the composition of the play list PL1 or PL2. Incidentally, when music data D1 being reproduced according to the play list PL1 or PL2 being selected now is provided from the external apparatus 15, a network distribution notifying icon 28 for notifying the user that the music data D1 is provided via the network NT is displayed on a lower side of the description 27 in the music selecting area 22.

In addition, a jacket photograph image 29 corresponding to the music data D1 being reproduced according to the play list PL1 or PL2 being selected now is displayed on the right side of the music selecting area 22, and a music title 30 and an artist name 31 corresponding to the music data D1 being reproduced are displayed on a lower side of the jacket photograph image 29.

In addition, a third mark M3 in a triangular shape having a vertex facing to the left, for example, is displayed on the left side of the jacket photograph image 29 in the music selecting area 22. Thereby the selection screen 20 allows the user to intuitively recognize that when pressing the left direction selecting button RM1H having the same shape and orientation as the third mark M3 on the remote control RM1, for example, the music data D1 being reproduced is changed so as to return to an immediately preceding piece of music data D1 according to the play list PL1 or PL2 being selected now and thus the immediately preceding piece of music data D1 can be selected in the music selecting area 22.

In addition, a fourth mark M4 in a triangular shape having a vertex facing to the right, for example, is displayed on the right side of the jacket photograph image 29 in the music selecting area 22. Thereby the selection screen 20 allows the user to intuitively recognize that when pressing the right direction selecting button RM1I having the same shape and orientation as the fourth mark M4 on the remote control RM1, for example, the music data D1 being reproduced is changed so as to advance to an immediately succeeding piece of music data D1 according to the play list PL1 or PL2 being selected now and thus the immediately succeeding piece of music data D1 can be selected in the music selecting area 22.

The changing of channels has a changing direction along the list of channel numbers CN stored in the channel list CL. Thus, when the channel changing instruction is input by pressing the upward direction selecting button RM1F or the downward direction selecting button RM1G on the remote control RM1 in a state of the selection screen 20 being displayed on the display unit 18 by the display controlling unit 17, the reproducing unit 11 determines a newly selected channel on the basis of the channel list CL, the channel number CN of the channel being selected now, and a changing direction corresponding to the upward direction selecting button RM1F or the downward direction selecting button RM1G pressed at this time. Incidentally, at this time, the reproducing unit 11 cyclically changes channels by handling the plurality of channel numbers CN registered in the channel list CL as a ring formed by connecting a start and a tail end of the plurality of channel numbers CN to each other.

Then the reproducing unit 11 sends a new play list PL1 or PL2 obtained in correspondence with the determined channel and data attribute information DAT to the display controlling unit 17. The display controlling unit 17 thereby updates display contents of the channel selecting area 21 and the music selecting area 22 in the selection screen 20 displayed on the display unit 18 on the basis of the play list PL1 or PL2 and the data attribute information DAT supplied from the reproducing unit 11. The display controlling unit 17 thus allows the user to select a desired play list PL1 or PL2 while visually checking the selected channel notifying icon 23, the list name 26, and the like within the selection screen 20.

The changing of music data D1 also has a changing direction along the order of reproduction of music data D1 according to a play list PL1 or PL2. Thus, when the reproduced music changing instruction is input by pressing the left direction selecting button RM1H or the right direction selecting button RM1I on the remote control RM1 in a state of the selection screen 20 being displayed on the display unit 18 by the display controlling unit 17, the reproducing unit 11 determines new music data D1 to be reproduced on the basis of the left direction selecting button RM1H or the right direction selecting button RM1I pressed at this time. Incidentally, at this time, the reproducing unit 11 cyclically changes music data D1 by handling content indicating information MID corresponding to the plurality of pieces of music data D1 whose reproduction order is defined by the play list PL1 or PL2 as a ring formed by connecting a start and a tail end of the content indicating information MID to each other.

Then the reproducing unit 11 sends data attribute information DAT obtained in correspondence with the determined music data D1 to the display controlling unit 17. The display controlling unit 17 thereby updates display contents of the music selecting area 22 in the selection screen 20 displayed on the display unit 18 on the basis of the data attribute information DAT supplied from the reproducing unit 11. The display controlling unit 17 thus allows the user to select the music data D1 of desired music while checking the music title 30, the artist name 31, and the like within the selection screen 20.

Figure 6:
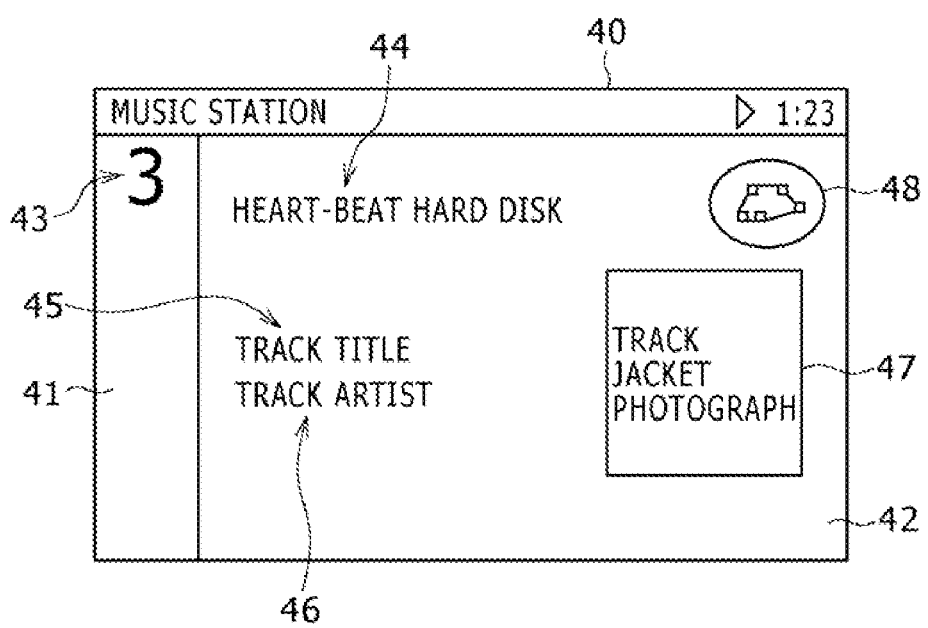
FIG. 6 is a schematic diagram showing a configuration of a reproduction screen.

When a music selecting and determining instruction is input to the reproducing unit 11 by pressing the decision button RM1J on the remote control RM1 in a state of the selection screen 20 being displayed on the display unit 18 by the display controlling unit 17, and accordingly the music data D1 being reproduced now is selected and determined as desired music data D1, the reproducing unit 11 notifies this to the display controlling unit 17. At this time, the display controlling unit 17 generates reproduction screen data for notifying the music data D1 being reproduced on the basis of the play list PL1 or PL2 supplied from the reproducing unit 11 at this point in time (that is, the play list PL1 or PL2 selected at this point in time) and data attribute information DAT (that is, data attribute information DAT corresponding to the music data D1 being reproduced at this point in time). The display controlling unit 17 then sends the reproduction screen data to the display unit 18 to thereby display a reproduction screen 40 as shown in FIG. 6, which screen is based on the reproduction screen data, on the display unit 18.

The reproduction screen 40 in this case has a selected channel notifying area 41 on a left side of the screen and a selected music notifying area 42 in a remaining part on the left side of the screen. A selected channel notifying icon 43 for notifying a channel being selected now as a channel number CN is displayed in the selected channel notifying area 41. A list name 46 of the play list PL1 or PL2 assigned to the channel being selected now and a music title 45 and an artist name 46 corresponding to the music data D1 being reproduced now are displayed on the left side of the selected music notifying area 42.

Further, a jacket photograph image 47 corresponding to the music data D1 being reproduced now is displayed on the right side of the selected music notifying area 42. Incidentally, when the music data D1 being reproduced now is provided from the external apparatus 15, a network distribution notifying icon 48 is displayed on an upper side of the jacket photograph image 47.

Then, when the music data D1 being reproduced according to the play list PL1 or PL2 is changed in a state of the reproduction screen 40 being displayed on the display unit 18, the display controlling unit 17 updates display contents of the selected music notifying area 42 on the reproduction screen 40 on the basis of data attribute information DAT supplied from the reproducing unit 11 at this time. The display controlling unit 17 thereby allows the user to check a music title 45, an artist name 46 and the like corresponding to the music data D1 being reproduced now and easily check the play list PL1 or PL2 being used for the reproduction of the music data D1 on the basis of the display contents of the reproduction screen 40.

Each time reproduction of music data D1 is started at a characteristic position of the music data D1, the reproducing unit 11 once resets an internal timer and measures a reproduction time. When no instruction is input via the operating unit 12 before the reproduction time of the reproduction of the music data D1 from the characteristic position reaches a predetermined time selected in advance (the predetermined time is shorter than a time necessary for reproduction from the characteristic position to a tail end position of the music data D1), the reproducing unit 11 notifies the display controlling unit 17 that the music data D1 has been reproduced for the predetermined time from the characteristic position at a point in time when the reproduction time has reached the predetermined time. When the display controlling unit 17 is notified by the reproducing unit 11 that the music data D1 has been reproduced for the predetermined time from the characteristic position, the display controlling unit 17 automatically changes the selection screen 20 displayed on the display unit 18 at this time to the reproduction screen 40.

When the display controlling unit 17 is supplied with data attribute information DAT together with a new play list PL1 or PL2 from the reproducing unit 11 in a state of the reproduction screen 40 being displayed on the display unit 18 (that is, when an instruction to change the channel is given by the user), the display controlling unit 17 generates selection screen data on the basis of the play list PL1 or PL2 and the data attribute information DAT. Thus the display controlling unit 17 changes the reproduction screen 40 being displayed on the display unit 18 to the selection screen 20 again. In addition, when the display controlling unit 17 is supplied with new data attribute information DAT from the reproducing unit 11 in a state of the reproduction screen 40 being displayed on the display unit 18 (that is, when an instruction to change the music data D1 is given by the user), the display controlling unit 17 generates selection screen data on the basis of the data attribute information DAT. Thus the display controlling unit 17 changes the reproduction screen 40 being displayed on the display unit 18 at this time to the selection screen 20 again.

Figure 7:
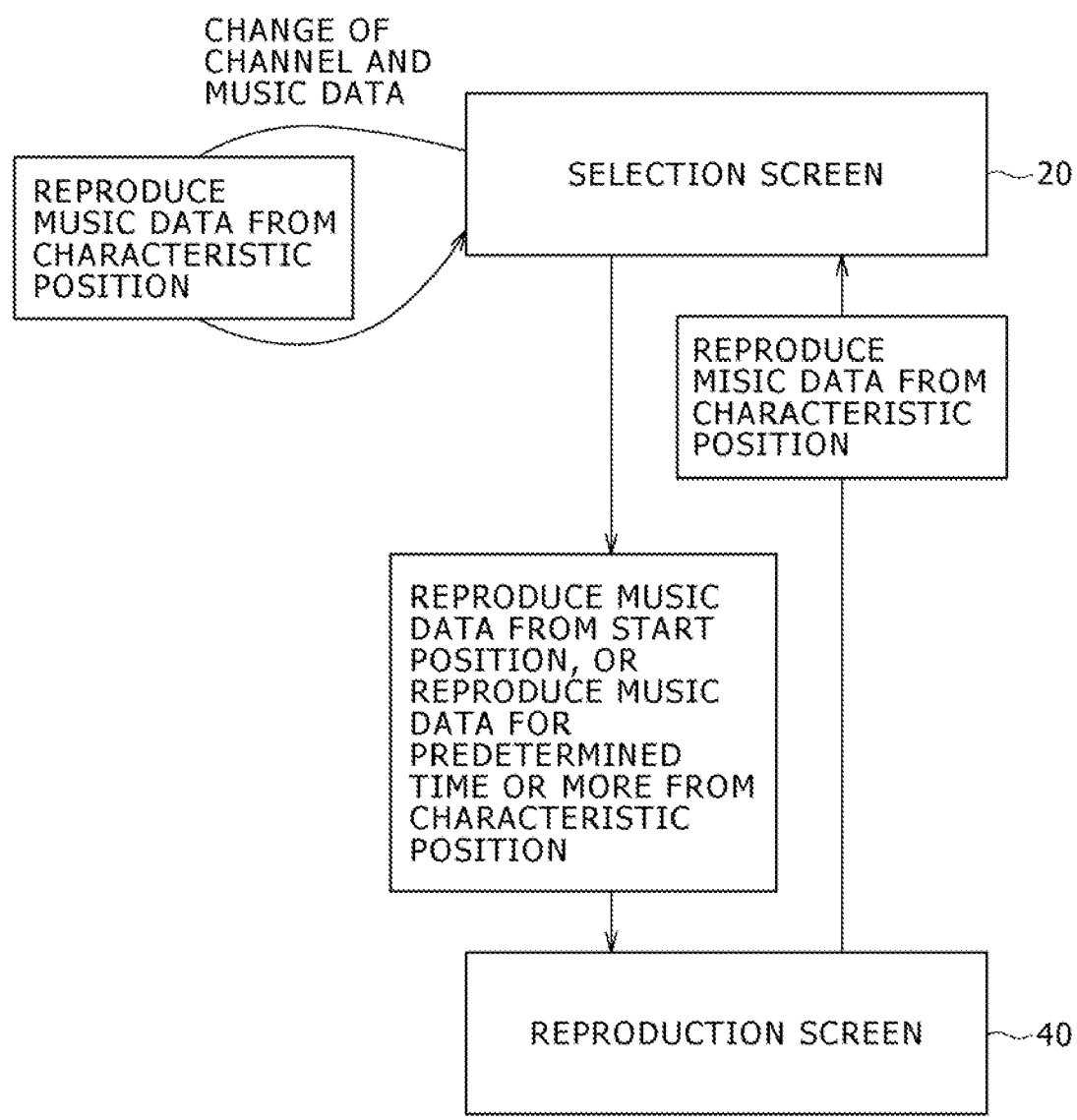
FIG. 7 is a schematic diagram of assistance in explaining display screen changes during the performance of a list use reproducing function.

That is, as shown in FIG. 7, when the list use reproducing function is started, the display controlling unit 17 displays the selection screen 20 on the display unit 18. When in this state, the reproducing unit 11 reproduces music data D1 from a characteristic position of the music data D1 in response to a request by the user to change a channel or change music data D1, the display controlling unit 17 updates the display contents of the selection screen 20 according to the music data D1 reproduced from the characteristic position. When in a state of the selection screen 20 being displayed on the display unit 18, the display controlling unit 17 is notified by the reproducing unit 11 that the music data D1 has been reproduced for the predetermined time from the characteristic position of the music data D1, or that the music data D1 being reproduced is selected and determined as desired music data D1, the display controlling unit 17 changes from the selection screen 20 to the reproduction screen 40 in response to the notification and displays the reproduction screen 40 on the display unit 18.

When the reproducing unit 11 reproduces music data D1 from a start position of the music data D1 in a state of the reproduction screen 40 being displayed on the display unit 18, the display controlling unit 17 updates the display contents of the reproduction screen 40 according to the music data D1 reproduced from the start position. When the reproducing unit 11 reproduces music data D1 from a characteristic position of the music data D1 in response to a request by the user to change the channel or change the music data D1 in the state of the reproduction screen 40 being displayed on the display unit 18, the display controlling unit 17 changes from the reproduction screen 40 to the selection screen 20 and displays the selection screen 20 on the display unit 18. Thus, in response to the changing of the channel and the music data D1 and the like, the display controlling unit 17 updates the display contents of the selection screen 20 and the reproduction screen 40 displayed on the display unit 18, and changes between the selection screen 20 and the reproduction screen 40 and then displays the selection screen 20 and the reproduction screen 40. The display controlling unit 17 can thereby notify the user of the selected channel, the selected play list PL1 or PL2, and the music data D1 being reproduced via the selection screen 20 and the reproduction screen 40.

Figure 8:
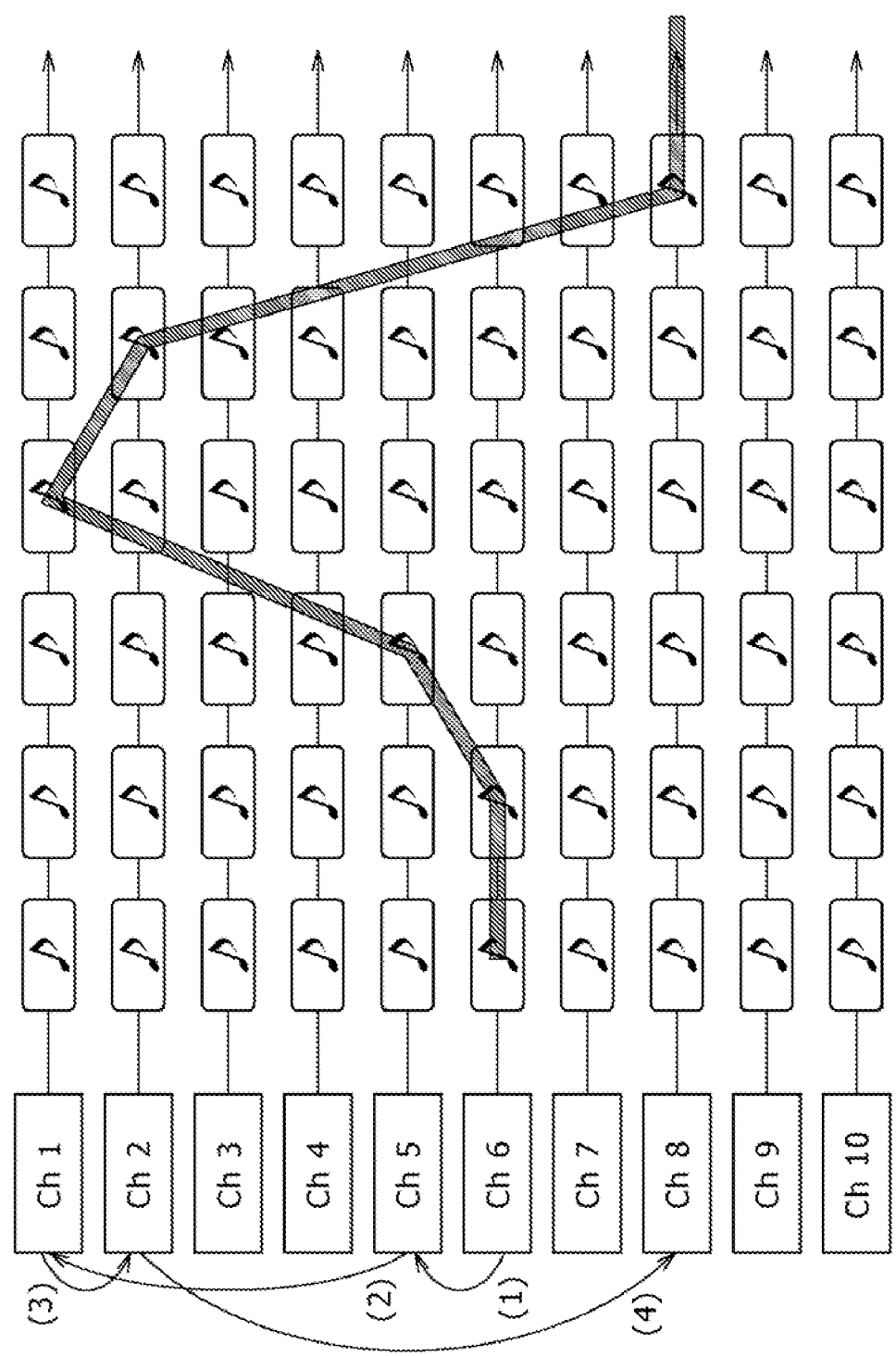
FIG. 8 is a schematic diagram of assistance in explaining changes in reproduction of music data according to channel changes.

Thus, as shown in FIG. 8, the reproducing unit 11 allows the user to easily select a desired play list PL1 or PL2 by changing the channel as appropriate as if to select a radio broadcasting station by changing a channel during reception of a radio broadcast while the list use reproducing function is performed. While the user thus changes the channel and thereby selects a desired play list PL1 or PL2, the reproducing unit 11 sequentially reproduces music data D1 from a characteristic position or a start position without an interruption so as to allow the user to listen to more music.

Incidentally, when the user consecutively presses the upward direction selecting button RM1F or the downward direction selecting button RM1G of the remote control RM1 relatively rapidly, the reproducing unit 11 ignores selection of other channels between a channel selected when the consecutive pressing operation is started and a channel selected when the speed of the consecutive pressing operation is somewhat decreased. The reproducing unit 11 thereby avoids sequentially reproducing each of different pieces of music data D1 for a little time according to play lists PL1 and PL2 assigned to a large number of channels between a point in time when the consecutive pressing operation is started and a point in time when the speed of the consecutive pressing operation is somewhat decreased, so that different pieces of music are heard as if the different pieces of music were a noise of a number of sounds.

Figure 9:
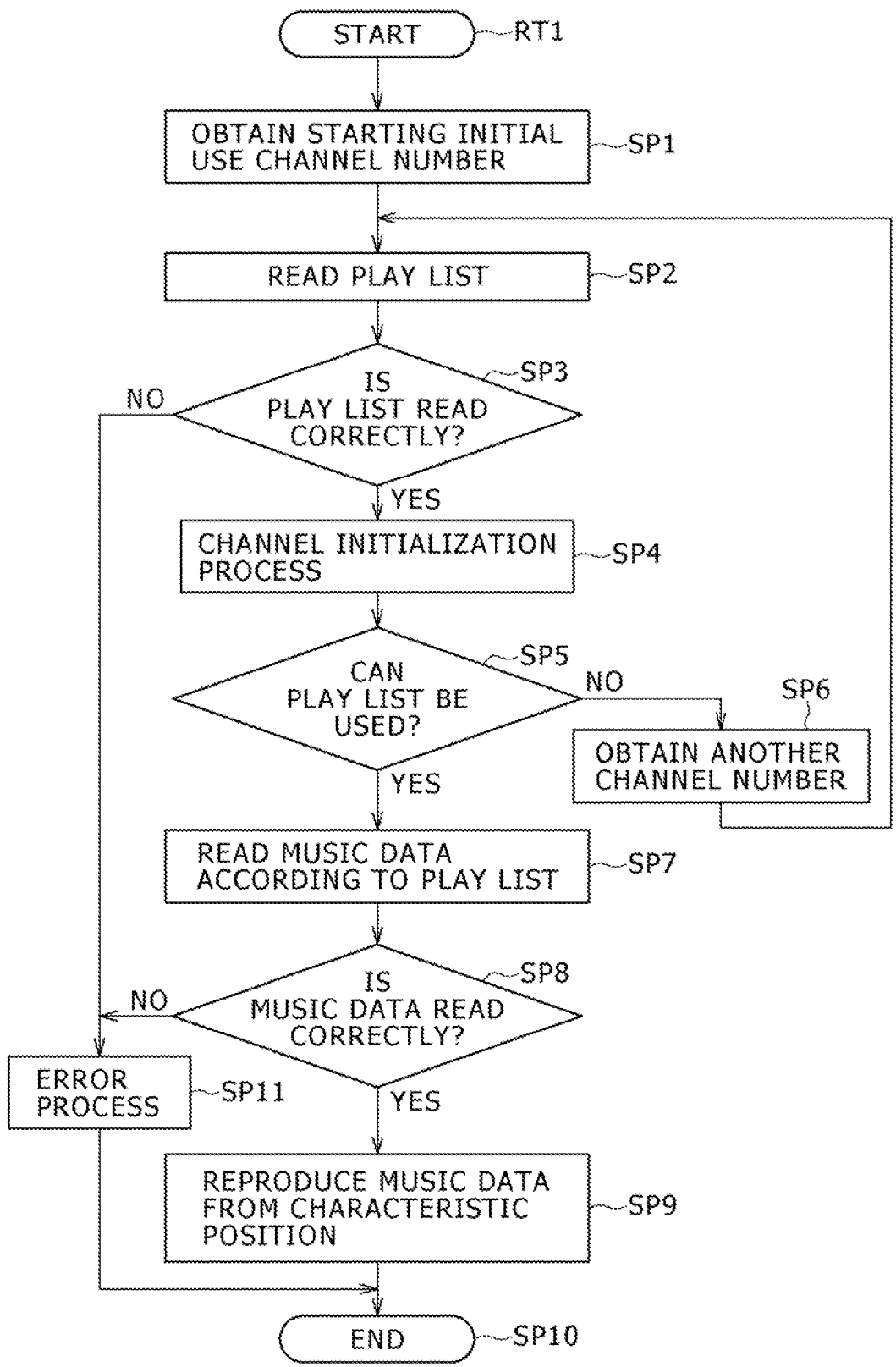
FIG. 9 is a flowchart of a list use reproducing function starting process procedure.

When the list use reproducing function is started in response to selection of the list use reproducing function by the user via the operating unit 12, the reproducing unit 11 actually starts a list use reproducing function starting process procedure RT1 represented in FIG. 9. Starting the list use reproducing function starting process procedure RT1, the reproducing unit 11 obtains a starting initial use channel number in step SP1, and then proceeds to step SP2. In step SP2, the reproducing unit 11 reads a channel list CL from the play list storage unit 16, and reads a play list PL1 or PL2 assigned to the channel of the starting initial use channel number from the play list storage unit 16 or the external apparatus 15. The reproducing unit 11 then proceeds to step SP3.

In step SP3, the reproducing unit 11 determines whether the play list PL1 or PL2 has been read correctly. When a positive result is obtained in step SP3, it indicates that the data of the play list PL1 or PL2 is not corrupt, for example. Thus, when the reproducing unit 11 obtains the positive result, the reproducing unit 11 proceeds to step SP4. Then, in step SP4, the reproducing unit 11 performs a channel initialization process using the play list PL1 or PL2. For example, when reproduction mode information PM included in the list attribute information LAT of the play list PL1 or PL2 indicates the shuffle reproduction mode, the reproducing unit 11 performs, as the channel initialization process, a process of changing the order of reproduction of music data D1 which order is defined in the play list PL1 or PL2 to another order obtained by randomly rearranging the music data D1. After performing such a channel initialization process, the reproducing unit 11 proceeds to next step SP5.

In step SP5, on the basis of reproduction use setting information LS included in the list attribute information LAT of the play list PL1 or PL2 after the channel initialization process, the reproducing unit 11 determines whether a setting is made to use the play list PL1 or PL2 for reproduction of the music data D1. When a negative result is obtained in step SP5, this indicates that the music data D1 are difficult to be reproduced using the play list PL1 or PL2. Thus, when the reproducing unit 11 obtains such a negative result, the reproducing unit 11 proceeds to step SP6.

Some channels among a plurality of channels are fixedly assigned particular play lists PL1 and PL2 whose setting is made such that the play lists PL1 and PL2 are to be used for reproduction of the music data D1 and whose setting is not allowed to be changed. Thus, the reproducing unit 11 in step SP6 obtains the channel number CN of a channel to which one of the particular play lists PL1 and PL2 is assigned. The reproducing unit 11 then returns to step SP2. Thus, the reproducing unit 11 reads one of the particular play lists PL1 and PL2 which play list is assigned to the channel of the channel number CN from the play list storage unit 16 or the external apparatus 15, and then performs the same process as described above again.

When a positive result is obtained in step SP5, this indicates that the music data D1 can be reproduced using the play list PL1 or PL2. Thus, when the reproducing unit 11 obtains such a positive result, the reproducing unit 11 proceeds to next step SP7. In step SP7, the reproducing unit 11 reads first music data D1 in the reproduction order according to the play list PL1 or PL2 from the content data storage unit 13 or the external apparatus 15. The reproducing unit 11 then proceeds to step SP8.

In step SP8, the reproducing unit 11 determines whether the music data D1 has been read correctly at this time. When a positive result is obtained in step SP8, it indicates that the music data D1 read at this time is not corrupt, for example. Thus, when the reproducing unit 11 obtains such a positive result, the reproducing unit 11 proceeds to next step SP9. Then, in step SP9, the reproducing unit 11 makes the display controlling unit 17 display the above-described selection screen 20 on the display unit 18, and starts reproducing the music data D1 from a characteristic position of the music data D1. The reproducing unit 11 then proceeds to step SP10 to end the list use reproducing function starting process procedure RT1.

Incidentally, when a negative result is obtained in the above-described step SP3, it indicates that the data of the play list PL1 or PL2 is corrupt, for example. Thus, when the reproducing unit 11 obtains such a negative result, the reproducing unit 11 proceeds to step SP11. In addition, when a negative result is obtained in step SP8, this indicates that the music data D1 read at this time is corrupt, for example. Thus, also when the reproducing unit 11 obtains such a negative result, the reproducing unit 11 proceeds to step SP11. Then, in step SP11, as an error process, the reproducing unit 11 notifies the user that the music data D1 are difficult to be reproduced, for example. The reproducing unit 11 thereafter proceeds to step SP10. The reproducing unit 11 thus starts the list use reproducing function.

Figure 10:
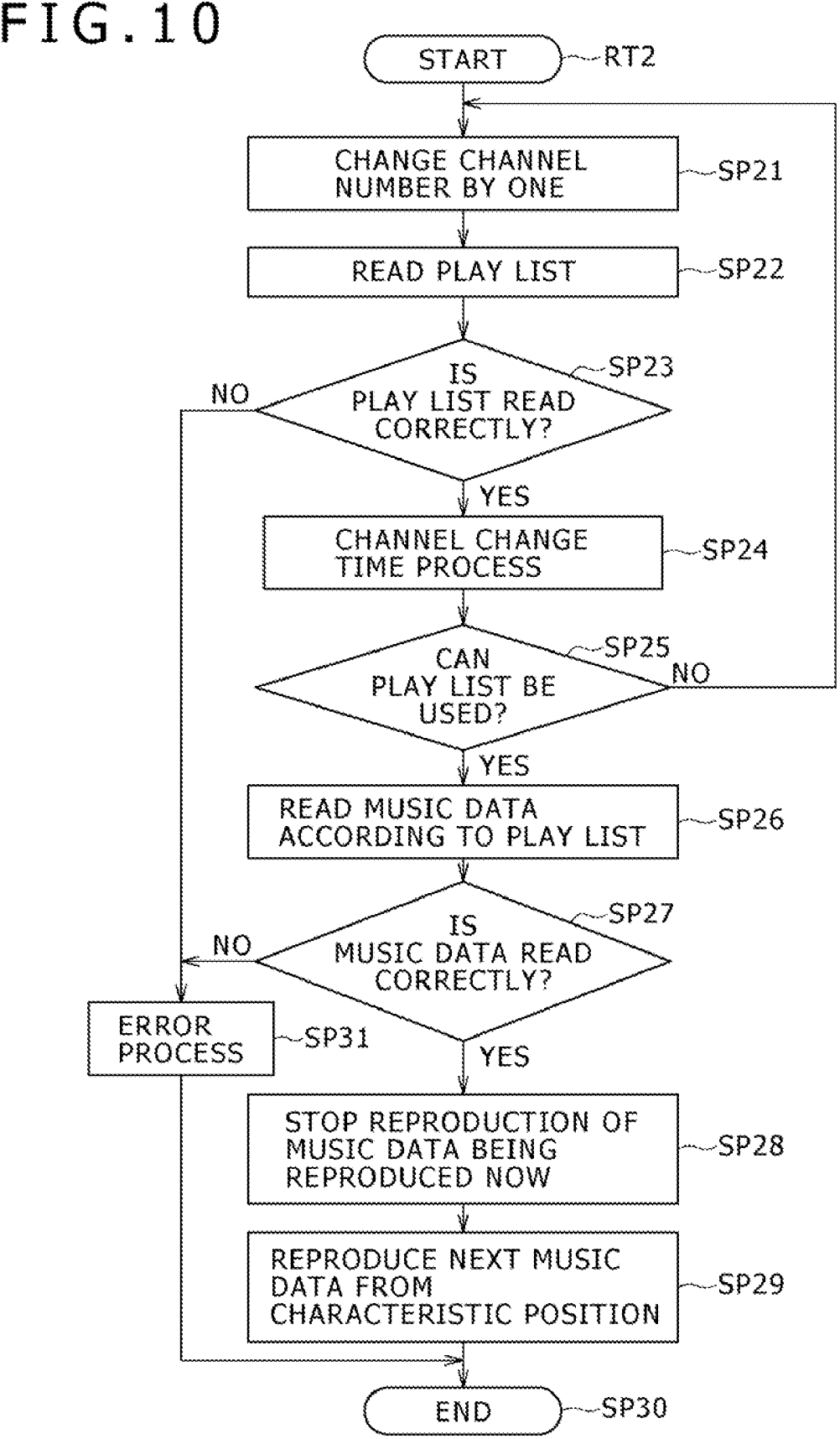
FIG. 10 is a flowchart of a channel changing process procedure.

A channel changing process during the performance of the list use reproducing function will next be described. When the reproducing unit 11 is supplied with a channel changing instruction according to an operation of the operating unit 12 by the user while performing the list use reproducing function, the reproducing unit 11 starts a channel changing process procedure RT2 represented in FIG. 10. Starting the channel changing process procedure RT2, the reproducing unit 11 in step SP21 sets a channel number CN obtained by incrementing a channel number CN of a channel being selected now by one or a channel number CN obtained by decrementing the channel number CN of the channel being selected now by one as a channel number CN after a change according to the list of channel numbers CN registered in the channel list CL and a changing direction in which to change the channel number CN, the changing direction being specified by the user. The reproducing unit 11 then proceeds to next step SP22. In step SP22, the reproducing unit 11 reads a play list PL1 or PL2 assigned to the channel of the channel number CN after the change from the play list storage unit 16 or the external apparatus 15. The reproducing unit 11 then proceeds to next step SP23.

In step SP23, the reproducing unit 11 determines whether the play list PL1 or PL2 has been read correctly. When a positive result is obtained in step SP23, this indicates that the data of the play list PL1 or PL2 is not corrupt, for example. Thus, when the reproducing unit 11 obtains such a positive result, the reproducing unit 11 proceeds to next step SP24. Then, in step SP24, the reproducing unit 11 performs a channel change time process.

For example, when reproduction mode information PM included in the list attribute information LAT of the play list PL1 or PL2 indicates the shuffle reproduction mode, the reproducing unit 11 in step SP24 performs, as the channel change time process, a process of changing the order of reproduction of music data D1 which order is defined in the play list PL1 or PL2 to another order obtained by randomly rearranging the music data D1. After performing such a channel change time process, the reproducing unit 11 proceeds to next step SP25.

Incidentally, of various play lists PL1 and PL2, there is a play list in which a predetermined number of pieces of music data D1, which number is selected in advance, for example from a piece of music data D1 reproduced a largest number of times to a piece of music data D1 reproduced a small number of times in order, are registered as described above (this play list will hereinafter be referred to as a ranking play list). Therefore, each time the reproducing unit 11 reproduces music data D1 stored in the content database CDB1 of the content data storage unit 13, the reproducing unit 11 updates the data reproduction history of the reproduced music data D1 such that the number of times of reproduction of the music data D1 is incremented by one. In addition, each time the reproducing apparatus 10 reproduces music data D1 stored in the content database CDB2 of the content data storage unit of the external apparatus 15, the external apparatus 15 updates the data reproduction history of the reproduced music data D1 such that the number of times of reproduction of the music data D1 is incremented by one.

The channel change time process includes a play list updating process that automatically determines a predetermined number of pieces of music data D1, which number is selected in advance, from a piece of music data D1 reproduced a largest number of times to a piece of music data D1 reproduced a small number of times in order among all the pieces of music data D1 stored in the content databases CDB1 and CDB2 on the basis of the data reproduction history of each piece of music data D1, and re-registers the predetermined number of pieces of music data D1 in the ranking play list (that is, updates contents of the ranking play list). Thus, the reproducing unit 11 in step SP24 also performs the play list updating process triggered by the input of the channel changing instruction as the channel change time process.

In step SP25, on the basis of reproduction use setting information LS included in the list attribute information LAT of the play list PL1 or PL2, the reproducing unit 11 determines whether a setting is made to use the play list PL1 or PL2 for reproduction of the music data D1. When a negative result is obtained in step SP25, this indicates that the music data D1 are difficult to be reproduced using the play list PL1 or PL2. Thus, when the reproducing unit 11 obtains such a negative result, the reproducing unit 11 returns to step SP21. The reproducing unit 11 sets a channel number CN obtained by further incrementing the channel number CN of the channel corresponding to the play list PL1 or PL2 by one or a channel number CN obtained by further decrementing the channel number CN of the channel corresponding to the play list PL1 or PL2 by one as a new channel number CN after a change. The reproducing unit 11 then performs the same process as described above again.

When a positive result is obtained in step SP25, this indicates that the music data D1 can be reproduced using the play list PL1 or PL2. Thus, when the reproducing unit 11 obtains such a positive result, the reproducing unit 11 proceeds to next step SP26. In step SP26, the reproducing unit 11 reads first music data D1 in the reproduction order according to the play list PL1 or PL2 assigned to the channel after the change from the content data storage unit 13 or the external apparatus 15. The reproducing unit 11 then proceeds to next step SP27. In step SP27, the reproducing unit 11 determines whether the music data D1 has been read correctly at this time. When a positive result is obtained in step SP27, this indicates that the music data D1 read at this time is not corrupt, for example. Thus, when the reproducing unit 11 obtains such a positive result, the reproducing unit 11 proceeds to next step SP28.

In step S28, the reproducing unit 11 stops the reproduction of music data D1 which reproduction has been performed according to the play list PL1 or PL2 assigned to the channel before the change. The reproducing unit 11 then proceeds to step SP29. Then, in step SP29, the reproducing unit 11 makes the display controlling unit 17 update the display contents of the selection screen 20 displayed on the display unit 18, and starts reproducing the music data D1 corresponding to the channel after the change from a characteristic position of the music data D1. The reproducing unit 11 then proceeds to next step SP30 to end the channel changing process procedure RT2.

Incidentally, when a negative result is obtained in the above-described step SP23, this indicates that the data of the play list PL1 or PL2 is corrupt, for example. Thus, when the reproducing unit 11 obtains such a negative result, the reproducing unit 11 proceeds to step SP31. In addition, when a negative result is obtained in step SP27, this indicates that the music data D1 is corrupt, for example. Thus, also when the reproducing unit 11 obtains such a negative result, the reproducing unit 11 proceeds to step SP31. Then, in step SP31, as an error process, the reproducing unit 11 notifies the user that the music data D1 are difficult to be reproduced, for example. The reproducing unit 11 thereafter proceeds to step SP30. The reproducing unit 11 thus changes the selected channel according to a request by the user during the performance of the list use reproducing function.

Figure 11:
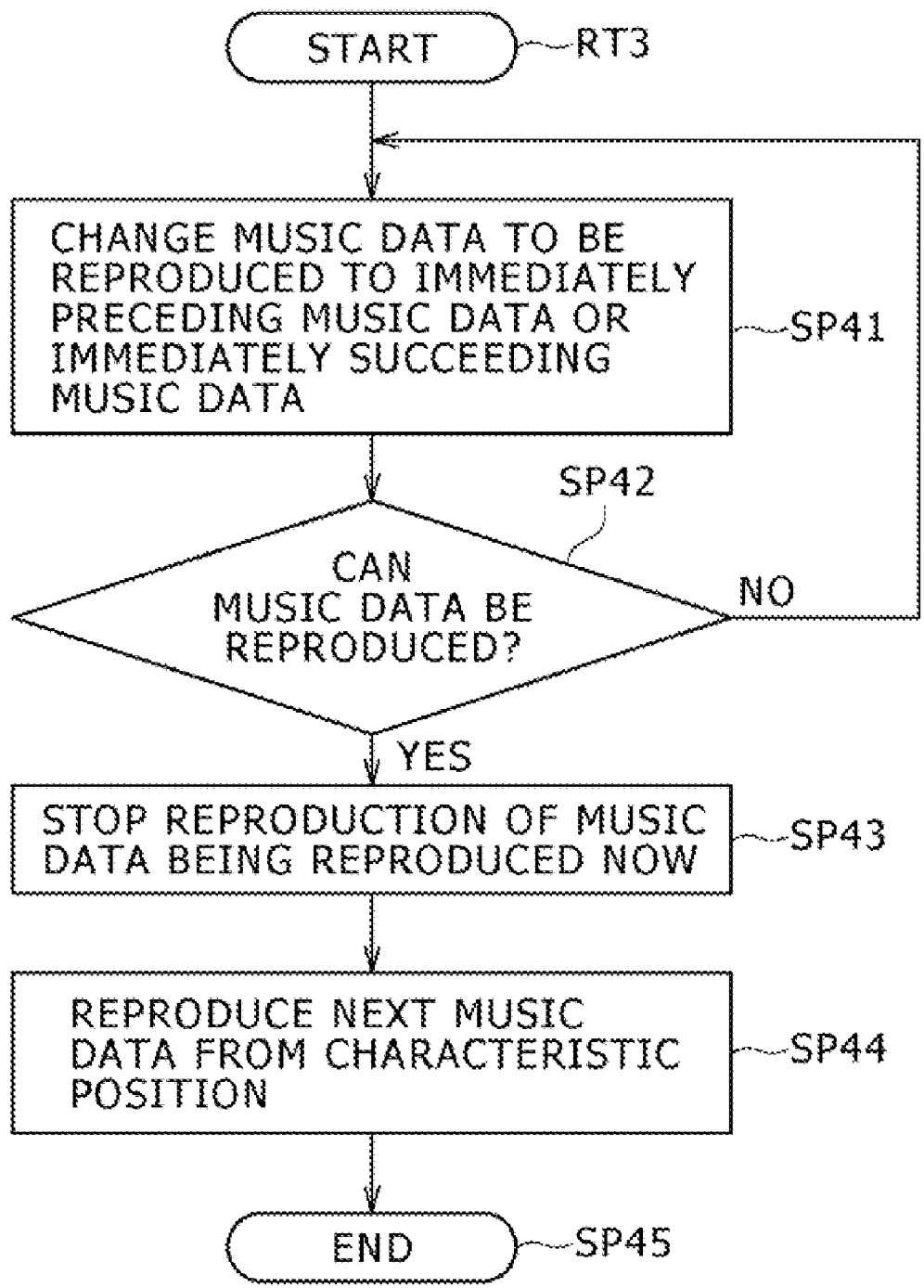
FIG. 11 is a flowchart of a reproduced music changing process procedure.

Description will next be made of a reproduced music changing process during the performance of the list use reproducing function. When the reproducing unit 11 is supplied with a reproduced music changing instruction according to an operation of the operating unit 12 by the user while performing the list use reproducing function, the reproducing unit 11 starts a reproduced music changing process procedure RT3 represented in FIG. 11. Starting the reproduced music changing process procedure RT3, the reproducing unit 11 in step SP41 sets music data D1 for reproduction immediately preceding music data D1 being selected now or music data D1 for reproduction immediately succeeding the music data D1 being selected now as music data D1 after a change according to a list of content identifying information MID registered in a play list PL1 or PL2 being selected now (a list after a change when the shuffle reproduction mode is specified) and a changing direction in which to change the music data D1, the changing direction being specified by the user. The reproducing unit 11 reads the music data D1 after the change from the content data storage unit 13 or the external apparatus 15. The reproducing unit 11 then proceeds to next step SP42.

In step SP42, the reproducing unit 11 determines whether the music data D1 after the change can be reproduced. When a negative result is obtained in step SP42, this for example indicates that the music data D1 after the change is corrupt, or that the music data D1 are difficult to be reproduced as it is because reproduction setting information PS of music registration information TR corresponding to the music data D1 after the change indicates that the music data D1 is not to be reproduced. Thus, when the reproducing unit 11 obtains such a negative result, the reproducing unit 11 returns to step SP41. The reproducing unit 11 sets music data D1 for reproduction immediately preceding the music data D1 after the change or music data D1 for reproduction immediately succeeding the music data D1 after the change as new music data D1 after a change. The reproducing unit 11 then performs the same process as described above again.

When a positive result is obtained in step SP42, on the other hand, this for example indicates that the music data D1 after the change is not corrupt and that the music data D1 can be reproduced without any problem because the reproduction setting information PS of the music registration information TR corresponding to the music data D1 after the change indicates that the music data D1 can be reproduced. Thus, when the reproducing unit 11 obtains such a positive result, the reproducing unit 11 proceeds to next step SP43. In step SP43, the reproducing unit 11 stops the reproduction of the music data D1 being reproduced now. The reproducing unit 11 then proceeds to next step SP44. Then, in step SP44, the reproducing unit 11 makes the display controlling unit 17 update the display contents of the selection screen 20 displayed on the display unit 18, and starts reproducing the music data D1 after the change from a characteristic position of the music data D1. The reproducing unit 11 then proceeds to next step SP45 to end the reproduced music changing process procedure RT3. The reproducing unit 11 thus changes the music data D1 being reproduced according to a request of the user during the performance of the list use reproducing function.

In addition to such a configuration, play list generating rules for generating the above-described plurality of play lists PL1 and PL2 include play list generating rules set to collect (that is, search for) music data D1 by a data search key formed by one or a plurality of words suggestive of a season of spring, summer, autumn, or winter selected arbitrarily (a sea in the summer, a sky in the autumn, a cherry tree, a rainy season, events such as Christmas, a graduation ceremony and the like that take place in seasons, seasonal sports and the like). In addition, some play list generating rules are set to collect music data D1 by a data search key formed by impression value information having a certain range indicating music impressions selected arbitrarily. Further, some play list generating rules are set to collect music data D1 by a data search key formed by an artist name, a genre name or the like selected arbitrarily.

Thus, the play lists PL1 and PL2 are generated so as to register therein music data D1 matching play list generating rules corresponding to the respective play lists (that is, music data D1 including a word matching a word as a data search key in a title or lyrics, music data D1 having impression value information matching impression value information as a data search key, and music data D1 associated with an artist name or a genre name matching an artist name, a genre name or the like as a data search key). Each of the play lists PL1 and PL2 includes information indicating the corresponding play list generating rule used when the play list is generated (the information is actually a data search key, and this information will hereinafter be referred to as play list generating rule information) in list detailed information LD, for example.

A play list reconstructing unit 50 in the reproducing apparatus 10 (FIG. 2) can reconstruct at least one of all play lists PL1 that are respectively assigned to a plurality of channels and are set to be used for reproduction of music data D1 among the play lists PL1 stored in the play list storage unit 16, for example, into a play list generated according to a play list generating rule corresponding to a condition of use of the reproducing apparatus 10 (for example a use of the reproducing apparatus 10 over a long period extending beyond a season, or a condition of use for reproduction of music data D1 using a play list PL1 or PL2, and this condition will hereinafter be referred to as a apparatus use condition). The play list reconstructing unit 50 thereby avoids fixed registration of a plurality of pieces of music data D1 in each play list PL1 assigned to a channel.

The play list reconstructing unit 50 is configured to be able to implement a play list reconstructing function in response to a request to reconstruct a play list PL1 when the request is made while the reproducing unit 11 is performing the list use reproducing function. The play list reconstructing unit 50 is configured to be able to reconstruct a play list PL1 with a change of seasons, for example. In addition, the play list reconstructing unit 50 is configured to be able to reconstruct a play list PL1 in response to a request for the reconstruction by the user. Further, the play list reconstructing unit 50 is configured to be able to reconstruct a play list PL1 in response to a request for the reconstruction from the external apparatus 15 on the network NT.

Description will first be made of the reconstruction of a play list PL1 with a change of seasons. A clocking unit 51 in the reproducing apparatus 10 clocks a date and time (that is, a month, a day, and time of the day), and sends date and time information indicating a result of the clocking to a request information generating unit 52. The request information generating unit 52 retains in advance months and days (which will hereinafter be referred to as months and days for change detection) serving as measures for changes of seasons of spring, summer, autumn, and winter, and information indicating seasons before and after the months and days. The request information generating unit 52 thus detects whether a season has changed by comparing a month and day indicated by the date and time information supplied from the clocking unit 51 with the months and days for change detection. When the request information generating unit 52 consequently detects a change from a first season such as summer to a second season such as autumn, for example, the request information generating unit 52 generates reconstruction requesting information requesting the reconstruction of a play list PL1 in response to the change of the seasons (this information will hereinafter be referred to as season-triggered reconstruction requesting information). The request information generating unit 52 then sends the season-triggered reconstruction requesting information to the play list reconstructing unit 50.

The play list reconstructing unit 50 retains in advance a plurality of data search keys related to each season such as summer, autumn or the like as list search keys. Thus, when supplied with the season-triggered reconstruction requesting information from the request information generating unit 52, the play list reconstructing unit 50 selects one or a plurality of list search keys related to the first season before the change and for example one list search key related to the second season after the change from among the list search keys related to these seasons.

Then the play list reconstructing unit 50 reads all play lists PL1 assigned to channels and set to be used for reproduction of music data D1 from the play list storage unit 16. The play list reconstructing unit 50 compares play list generating rule information (that is, data search keys) included in the plurality of play lists PL1 read from the play list storage unit 16 with the list search key related to the first season before the change. The play list reconstructing unit 50 thereby retrieves a play list PL1 related to the first season before the change (that is, a play list PL1 generated by collecting and registering therein music data D1 suggestive of the first season according to a play list generating rule using a data search key related to the first season before the change).

After retrieving the play list PL1 related to the first season, the play list reconstructing unit 50 reads all play lists PL1 not yet assigned to a channel from the play list storage unit 16, for example. The play list reconstructing unit 50 then compares play list generating rule information (that is, data search keys) included in the plurality of play lists PL1 read from the play list storage unit 16 at this time with the one list search key related to the second season after the change. The play list reconstructing unit 50 thereby retrieves a play list PL1 related to the second season after the change (that is, a play list PL1 generated by collecting and registering therein music data D1 suggestive of the second season according to a play list generating rule using a data search key related to the second season after the change).

When the reproducing unit 11 is performing the list use reproducing function (or starts the list use reproducing function) with the play list PL1 related to the first season and the play list PL1 related to the second season retrieved by the play list reconstructing unit 50, the play list reconstructing unit 50 notifies the play list PL1 related to the first season before the change to the display controlling unit 17 by a corresponding channel number CN, a list name and the like. At this time, the play list reconstructing unit 50 also notifies for example the list name of the play list PL1 related to the second season after the change to the display controlling unit 17.

Figure 12A:
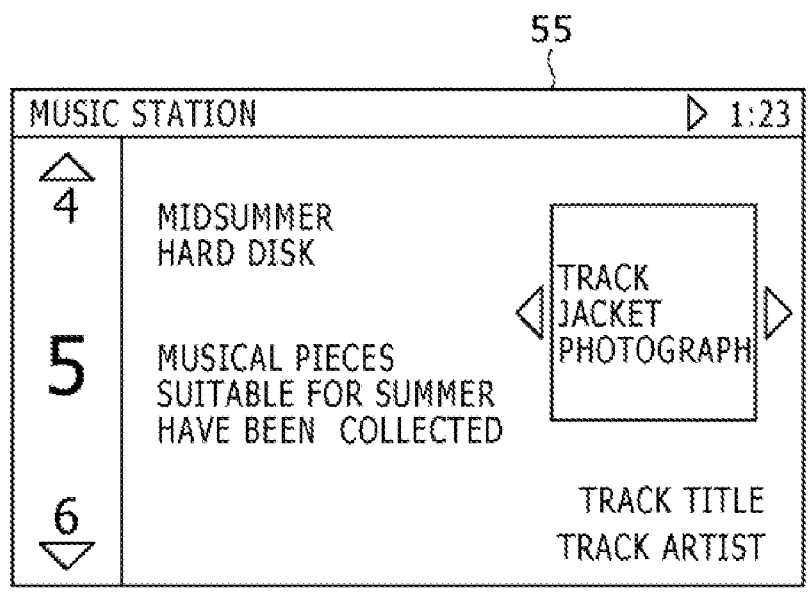
FIGS. 12A and 12B are schematic diagrams of assistance in explaining display of a reconstruction inquiry screen when one play list is reconstructed according to a change of seasons.
Figure 12B:
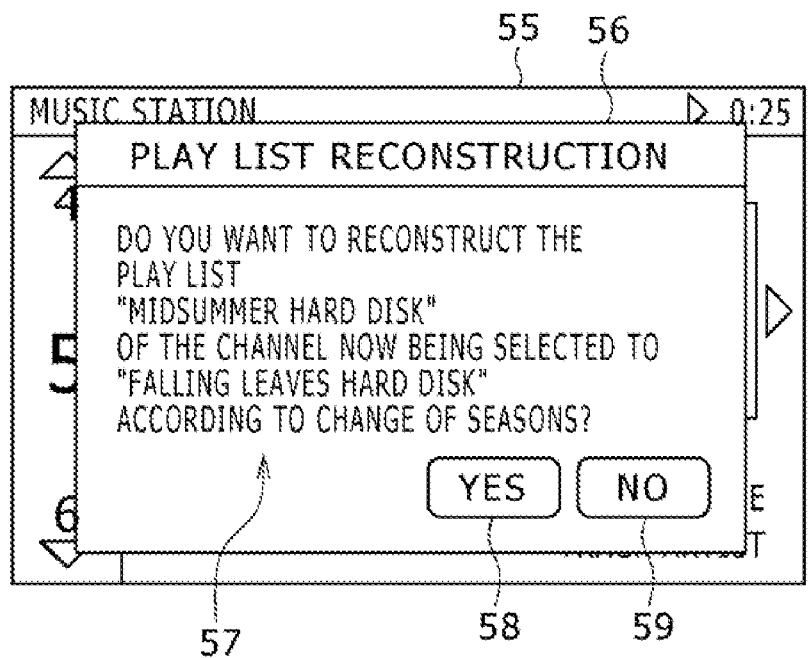

When as shown in FIGS. 12A and 12B, there is for example one play list PL1 related to the first season before the change and one play list PL1 related to the second season after the change, and a channel to which the play list PL1 related to the first season before the change is assigned is selected on a selection screen 55 displayed on the display unit 18, the display controlling unit 17 generates reconstruction inquiry screen data for inquiring about whether to reconstruct the play list PL1, using the list name of the play list PL1 related to the first season before the change and the list name of the play list PL1 related to the second season after the change. The display controlling unit 17 then sends the reconstruction inquiry screen data to the display unit 18 to thereby display a reconstruction inquiry screen 56 based on the reconstruction inquiry screen data on the selection screen 55 in the display unit 18 such that the reconstruction inquiry screen 56 is superimposed on the selection screen 55.

In this case, reconstruction inquiry text 57 inquiring about whether to reconstruct the play list PL1 assigned to the channel being selected now (that is, the play list PL1 related to the first season) into the play list PL1 related to the second season after the change is displayed in a central part of the reconstruction inquiry screen 56. In addition, the reconstruction inquiry screen 56 has a consent button 58 for selecting consent to the reconstruction and a refusal button 59 for selecting refusal of the reconstruction.

The display controlling unit 17 highlights one of the consent button 58 and the refusal button 59 on the reconstruction inquiry screen 56 displayed on the display unit 18 in a predetermined display state such that one of the consent button 58 and the refusal button 59 is solely conspicuous within the reconstruction inquiry screen 56, for example. The display controlling unit 17 alternately changes the highlight display state between the consent button 58 and the refusal button 59 on the reconstruction inquiry screen 56 according to an operation of the operating unit 12 by the user. The display controlling unit 17 thereby allows the user to select consent or refusal to reconstruct the play list PL1 on the reconstruction inquiry screen 56 displayed on the display unit 18.

When the user consents to reconstruct the play list PL1 on the reconstruction inquiry screen 56, the play list reconstructing unit 50 determines whether a predetermined number of pieces of music data D1 (for example a few pieces of music) or more, which number is selected in advance, are registered in the play list PL1 related to the second season after the change. When the play list reconstructing unit 50 determines as a result that fewer pieces of music data D1 than the predetermined number are registered in the play list PL1 related to the second season after the change, the play list reconstructing unit 50 adds a list search key related to the second season, and retrieves a play list PL1 related to the second season after the change again.

When pieces of music data D1 the number of which is equal to or larger than the predetermined number are registered in the play list PL1 related to the second season after the change, the play list reconstructing unit 50 changes contents of channel assignment information CHA included in the play list PL1 related to the first season before the change to contents indicating that no play list is assigned to the channel. The play list reconstructing unit 50 further changes contents of channel assignment information CHA included in the play list PL1 related to the second season after the change to contents indicating that the play list PL1 is newly assigned to the channel to which the play list PL1 related to the first season before the change has been assigned up to this point in time.

The play list reconstructing unit 50 then sends the play list PL1 related to the first season before the change and the play list PL1 related to the second season after the change, the contents of the channel assignment information CHA in the play lists PL1 having been changed, to the play list storage unit 16 to store the play list PL1 related to the first season before the change and the play list PL1 related to the second season after the change such that the contents of the channel assignment information CHA before being changed are overwritten. Thus the play list reconstructing unit 50 changes the assignment of the play list PL1 related to the first season before the change to the channel to which the play list PL1 related to the first season before the change has been assigned to the play list PL1 related to the second season after the change. Thereby the play list reconstructing unit 50 apparently registers the play list PL1 related to the second season after the change in the channel list CL.

The play list reconstructing unit 50 thereby reconstructs the play list PL1 related to the first season before the change into the play list PL1 related to the second season after the change having play list generating rule information (that is, having a data search key related to the second season) corresponding to the apparatus use condition of the reproducing apparatus 10 used after the change of the seasons. Because the play list reconstructing unit 50 uses, for the reconstruction, a play list in which a predetermined number of pieces of music data D1 or more are registered as the play list PL1 related to the second season after the change, the play list reconstructing unit 50 allows the user to listen to as much music as possible when the music data D1 is reproduced according to the play list PL1 (that is, the play list PL1 related to the second season) reconstructed according to the change of the seasons.

Figure 13:
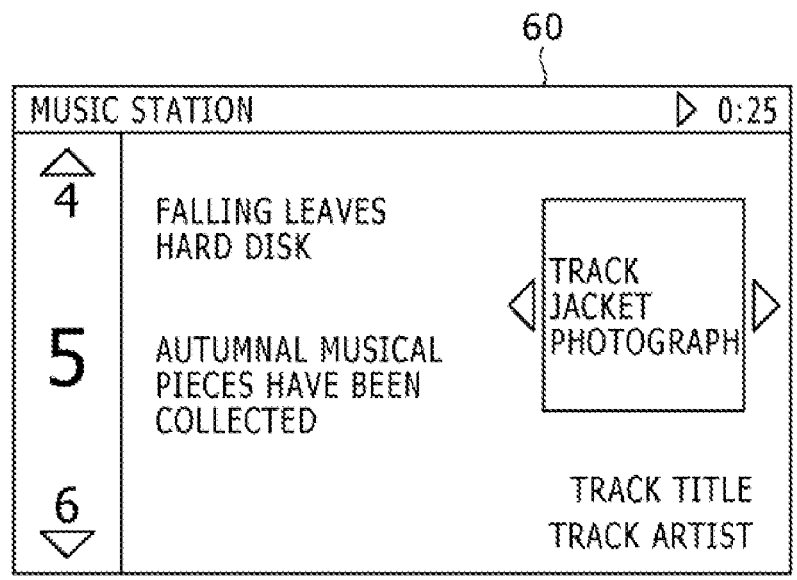
FIG. 13 is a schematic diagram of assistance in explaining a selection screen after the play list is reconstructed according to the change of seasons.

In addition, when completing the reconstruction of the play list PL1, the play list reconstructing unit 50 notifies the completion of the reconstruction to the display controlling unit 17. When the play list reconstructing unit 50 notifies the completion of the reconstruction to the display controlling unit 17, the display controlling unit 17 updates display contents of a selection screen 60 displayed on the display unit 18 according to the reconstructed play list PL1, as shown in FIG. 13. Thus, by the display contents of the selection screen 60, the display controlling unit 17 can notify the user of the play list PL1 related to the second season into which the play list PL1 related to the first season has been reconstructed according to the change of the seasons.

Figure 14:
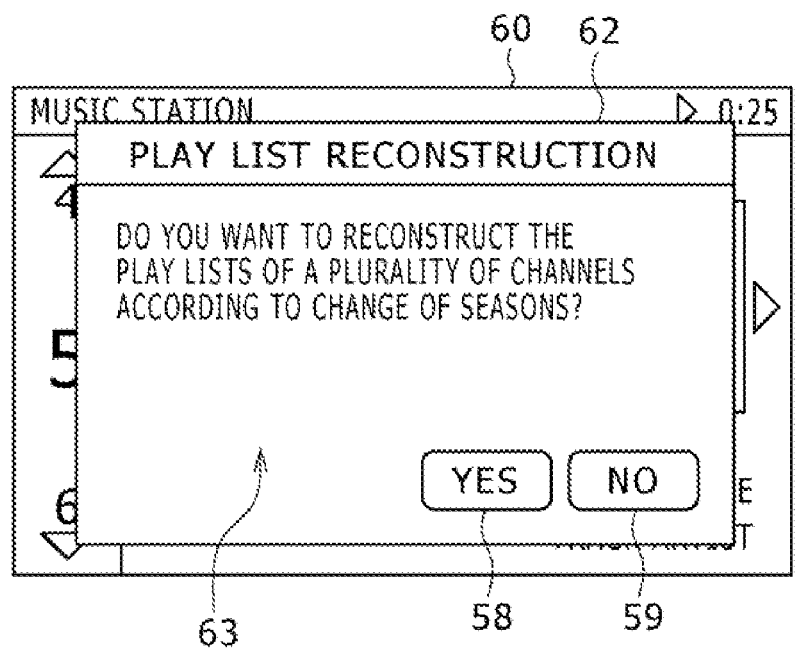
FIG. 14 is a schematic diagram showing a configuration of a reconstruction inquiry screen when a plurality of play lists are reconstructed according to a change of seasons.

When as shown in FIG. 14, there are a plurality of play lists PL1 related to the first season before the change and there are a plurality of play lists PL1 related to the second season after the change, the display controlling unit 17 sends reconstruction inquiry screen data prepared in advance to the display unit 18. The display controlling unit 17 thereby displays a reconstruction inquiry screen 62 based on the reconstruction inquiry screen data on a selection screen 61 in the display unit 18 such that the reconstruction inquiry screen 62 is superimposed on the selection screen 61.

In this case, reconstruction inquiry text 63 inquiring about whether to reconstruct a plurality of play lists PL1 assigned to a plurality of channels (that is, the play lists PL1 related to the first season) into the play lists PL1 related to the second season after the change is displayed in a central part of the reconstruction inquiry screen 62. In addition, as in the above-described case, the reconstruction inquiry screen 62 has a consent button 58 and a refusal button 59. Thus, the display controlling unit 17 allows the user to select consent or refusal to reconstruct the play lists PL1 also on the reconstruction inquiry screen 62 displayed on the display unit 18.

When the user consents to reconstruct the play lists PL1 on the reconstruction inquiry screen 62, the play list reconstructing unit 50 performs a process of reconstructing one play list PL1 related to the first season before the change into one play list PL1 related to the second season after the change in the same manner as described above a number of times sequentially, which number of times is equal to the number of play lists PL1 to be reconstructed. The play list reconstructing unit 50 thus reconstructs the plurality of play lists PL1 related to the first season before the change into the plurality of play lists PL1 related to the second season after the change one by one.

Description will next be made of the reconstruction of a play list PL1 in response to a request for the reconstruction from the user. Such reconstruction of a play list PL1 uses one of a data reproduction history indicating the number of times of reproduction for each piece of music data D1 and a list use history indicating the number of times of use of each play list PL1 for reproduction of music data D1. In addition, such reconstruction of a play list PL1 includes a case of reconstructing one play list PL1 selected arbitrarily by the user from among the play lists PL1 that are respectively assigned to a plurality of channels and are set to be used for reproduction of music data D1 and a case of reconstructing a plurality of play lists PL1 (that may be all the play lists PL1) selected in advance from among the play lists PL1 that are respectively assigned to the plurality of channels and are set to be used for reproduction of music data D1.

In such reconstruction of a play list PL1, a setting is made in advance as a reconstruction mode, indicating which of the data reproduction history and the list use history to use and which of play lists PL1 (that is, one play list PL1 selected arbitrarily by the user or a plurality of play lists PL1 selected in advance) to reconstruct. Description in the following will first be made of a case of reconstructing a play list PL1 using the data reproduction history in response to a request for the reconstruction by the user. Description will next be made of a case of reconstructing a play list PL1 using the list use history in response to a request for the reconstruction by the user.

A plurality of pieces of data attribute information DAT stored in the content database CDB1 of the content data storage unit 13 each include a data reproduction history indicating the number of times of reproduction of corresponding music data D1. Each time music data D1 in the content data storage unit 13 is reproduced according to a play list PL1 or PL2 (such reproduction includes both the reproduction of the music data D1 from a start position and the reproduction of the music data D1 from a characteristic position), the reproducing unit 11 updates the data reproduction history within the data attribute information DAT corresponding to the reproduced music data D1 such that the number of times of reproduction of the music data D1 is incremented by one.

In addition, a plurality of pieces of data attribute information DAT stored in the content database CDB2 of the external apparatus 15 each include a data reproduction history indicating the number of times of reproduction of corresponding music data D1. Each time music data D1 stored and retained in the external apparatus 15 is reproduced by streaming reproduction according to a play list PL1 or PL2 (such reproduction includes both the reproduction of the music data D1 from a start position and the reproduction of the music data D1 from a characteristic position), the reproducing unit 11 instructs the external apparatus 15 via the communicating unit 14 to update the data reproduction history within the data attribute information DAT corresponding to the music data D1 reproduced by the streaming reproduction such that the number of times of reproduction of the music data D1 is incremented by one. The reproducing unit 11 can thus detect the number of times of reproduction of each piece of music data D1 reproducible according to play lists PL1 and PL2 as data reproduction history.

In addition, pieces of list attribute information LAT (for example list detailed information LD) of the plurality of play lists PL1 stored in the play list storage unit 16 each include a list use history indicating the number of times of using the play list PL1 of the list attribute information LAT. Incidentally, as for a play list PL1 specifying another play list PL2 stored in the external apparatus 15 among the plurality of play lists PL1 stored in the play list storage unit 16, the other play list PL2 specified by the play list PL1 is directly used for reproduction of music data D1. However, because the play list PL1 is used for the reproduction of the music data D1 so as to specify the other play list PL2, the play list PL1 includes a list use history. Each time one of the play lists PL1 is used for reproduction of music data D1 (for example a period during which the play list PL1 is selected as a channel is counted as one use regardless of the number of pieces of music data D1 reproduced during the period), the reproducing unit 11 updates the list use history within the data attribute information DAT of the used play list PL1 such that the number of times of use of the play list PL1 is incremented by one.

When the request information generating unit 52 is supplied with a reconstruction requesting instruction from the operating unit 12 according to an operation of the operating unit 12 by the user (that is, an operation of pressing the reconstruction requesting button RM1C on the remote control RM1) in a state of the selection screen 20 being displayed on the display unit 18 by the display controlling unit 17, for example, the request information generating unit 52 generates reconstruction requesting information for requesting the reconstruction of a play list PL1 according to a reconstruction request from the user (this reconstruction requesting information will hereinafter be referred to as user-triggered reconstruction requesting information). The request information generating unit 52 then sends the user-triggered reconstruction requesting information to the play list reconstructing unit 50.

When the play list reconstructing unit 50 is supplied with the user-triggered reconstruction requesting information from the request information generating unit 52, the play list reconstructing unit 50 determines which of the data reproduction history and the list use history to use for the reconstruction of the play list PL1 on the basis of the already set reconstruction mode. When the play list reconstructing unit 50 determines as a result that the information to be used for the reconstruction of the play list PL1 is the data reproduction history, the play list reconstructing unit 50 notifies information on the determination to the display controlling unit 17.

In addition, at this time, the play list reconstructing unit 50 determines whether to reconstruct one play list PL1 or a plurality of play lists PL1 on the basis of the reconstruction mode. When the play list reconstructing unit 50 determines as a result that a setting is made to reconstruct the play list selected arbitrarily by the user, the play list reconstructing unit 50 notifies the display controlling unit 17 of the play list PL1 assigned to the channel being selected now by the user on the selection screen 20 (that is, the channel being selected when the user requests the reconstruction) as play list to be reconstructed.

Figure 15:
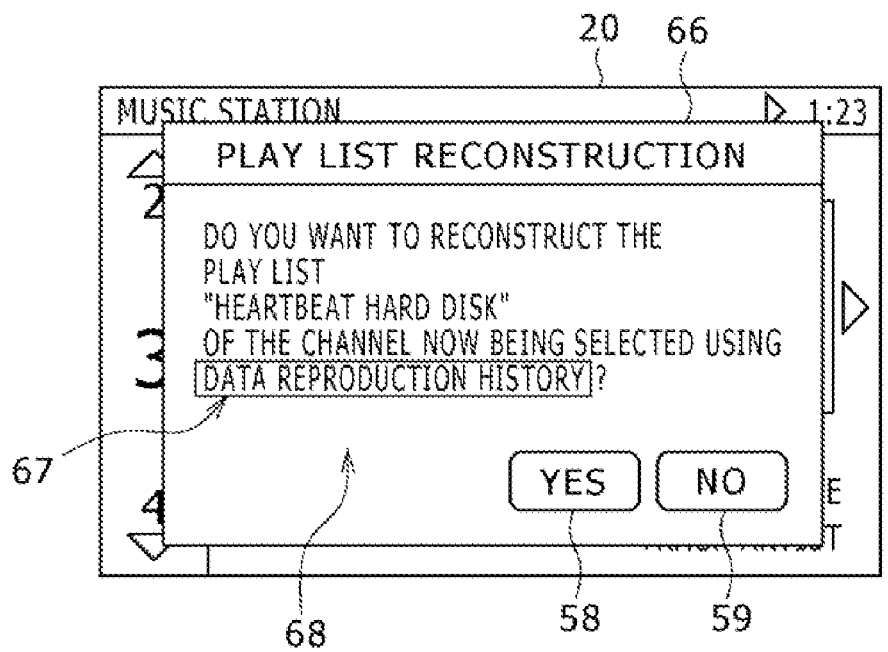
FIG. 15 is a schematic diagram showing a configuration of a reconstruction inquiry screen when one play list is reconstructed using a data reproduction history.

In this case, the display controlling unit 17 generates reconstruction inquiry screen data according to the notification from the play list reconstructing unit 50, and then sends the generated reconstruction inquiry screen data to the display unit 18. The display controlling unit 17 thereby displays a reconstruction inquiry screen 66 as shown in FIG. 15, the reconstruction inquiry screen 66 being based on the reconstruction inquiry screen data, on the selection screen 20 in the display unit 18 such that the reconstruction inquiry screen 66 is superimposed on the selection screen 20.

A notification section 67 for notifying the data reproduction history or the list use history to be used for the reconstruction of the play list PL1 is provided in substantially a central part of the reconstruction inquiry screen 66, and characters representing the data reproduction history or the list use history to be used for the reconstruction of the play list PL1 are displayed in the notification section 67. In addition, reconstruction inquiry text 68 for inquiring about whether to reconstruct the play list PL1 assigned to the channel being selected now using the data reproduction history is displayed in the reconstruction inquiry screen 66 with the characters within the notification section 67 as a part of the reconstruction inquiry text 68. Further, as with the above-described reconstruction inquiry screen 56 or the like, the reconstruction inquiry screen 66 has a consent button 58 and a refusal button 59.

When the user consents to reconstruct the play list PL1 on the reconstruction inquiry screen 66, the play list reconstructing unit 50 inquires of the reproducing unit 11 or the display controlling unit 17 about the play list PL1 to be reconstructed which play list is selected by the user. The play list reconstructing unit 50 then notifies a data reproduction history obtaining unit 70 and a data attribute weighting unit 71 of the one play list PL1 to be reconstructed by a corresponding channel number CN, a list name or the like.

The data reproduction history obtaining unit 70 reads the play list PL1 to be reconstructed which play list is selected by the user from the play list storage unit 16 on the basis of the notification from the play list reconstructing unit 50. Incidentally, when the play list PL1 to be reconstructed which play list is read from the play list storage unit 16 specifies a play list PL2 stored in the external apparatus 15, the data reproduction history obtaining unit 70 obtains the specified play list PL2 from the external apparatus 15 via the communicating unit 14.

In addition, according to music registration information TR (that is, content identifying information MID) in the play list PL1 or PL2, the data reproduction history obtaining unit 70 obtains each of pieces of data attribute information DAT corresponding to all the pieces of music data D1 registered in the play list PL1 or PL2 from the content data storage unit 13 or the external apparatus 15, and thus obtains the data reproduction histories of all the pieces of music data D1, the data reproduction histories being included in the data attribute information DAT. The data reproduction history obtaining unit 70 then sends the data attribute information DAT including the data reproduction history of each of the pieces of music data D1 to the data attribute weighting unit 71.

The data attribute weighting unit 71 extracts the data reproduction histories from the data attribute information DAT supplied from the data reproduction history obtaining unit 70. The data attribute weighting unit 71 then weights each of the pieces of data attribute information DAT of all the pieces of music data D1 registered in the play list PL1 (or the external play list PL2 specified by the play list PL1 to be reconstructed) according to the corresponding data reproduction history. The data attribute weighting unit 71 then sets data attribute information DAT given weighting points the number of which is equal to or larger than a predetermined threshold value set in advance as a new data search key. The data attribute weighting unit 71 sends the data search key to the play list reconstructing unit 50.

In practice, the data attribute weighting unit 71 for example uses the number of times of reproduction indicated by the data reproduction history as weighting points (for example one time of reproduction is one point), and adds the weighting points to an artist name, a genre name, impression value information and/or a characteristic word included in lyrics of the music, the artist name, the genre name, the impression value information and/or the characteristic word being included in the data attribute information DAT. As a result, the data attribute weighting unit 71 selects the artist name, the genre name, the impression value information and/or the word given weighting points the number of which is equal to or larger than the predetermined threshold value set in advance, sets the artist name, the genre name, the impression value information and/or the word as data search key, and then sends the data search key to the play list reconstructing unit 50. In other words, the data attribute weighting unit 71 selects data attribute information DAT to be used as a new data search key from among pieces of data attribute information DAT corresponding to the plurality of pieces of music data D1 according to the data reproduction histories corresponding to the plurality of pieces of music data D1.

Incidentally, when impression value information is weighted, for example, the data attribute weighting unit 71 can also use a weighting method that extends a "bridge" part of music to a start and an end of the music as the number of times of reproduction is increased according to a data reproduction history, for example, rather than simply adding points, and changes the impression value information of the "bridge" part to the impression value information of the extended part. At this time, as with the data reproduction history obtaining unit 70, the data attribute weighting unit 71 has obtained the play list PL1 to be reconstructed. Thus, on the basis of play list generating rule information included in the list attribute information LAT of the play list PL1 to be reconstructed, the data attribute weighting unit 71 selects a plurality of new data search keys of different kinds from the data search key used to generate the play list PL1.

When the play list reconstructing unit 50 is supplied with a new data search key from the data attribute weighting unit 71, the play list reconstructing unit 50 obtains the play list PL1 to be reconstructed from the play list storage unit 16. The play list reconstructing unit 50 adds the new data search key supplied from the data attribute weighting unit 71 to play list generating rule information included in the list attribute information LAT of the play list PL1 to be reconstructed. The play list reconstructing unit 50 thereby reconstructs the play list generating rule used to generate the play list PL1 to be reconstructed into a play list generating rule increased in the number of data search keys.

In addition, according to the reconstructed play list generating rule, the play list reconstructing unit 50 compares a plurality of data search keys (that is, original data search keys used before the reconstruction of the play list generating rule and the data search key added by the reconstruction, and these data search keys will hereinafter be referred to collectively as reconstructed data search keys) with all data attribute information DAT stored in the content database CDB1 of the content data storage unit 13, for example. The play list reconstructing unit 50 thereby retrieves music data D1 having data attribute information DAT matching the reconstructed play list generating rule. Incidentally, at this time, the play list reconstructing unit 50 obtains one set or a plurality of sets of reconstructed data search keys by combining the original data search keys and the added individual data search key with each other, and retrieves music data D1 having data attribute information DAT including at least one set of reconstructed data search keys.

When the number of pieces of retrieved music data D1 having data attribute information DAT matching the reconstructed play list generating rule is smaller than a predetermined number selected in advance, the play list reconstructing unit 50 makes the data attribute weighting unit 71 for example lower the threshold value, thereby increase data attribute information DAT as data search keys, and select a new data search key of a different kind from the reconstructed data search keys from the increase in the data attribute information DAT. The play list reconstructing unit 50 then adds the newly selected data search key to the already reconstructed play list generating rule, and thereby reconstructs the play list generating rule again. Thus, according to the play list generating rule reconstructed again, the play list reconstructing unit 50 retrieves music data D1 having data attribute information DAT matching the play list generating rule again in the same manner as described above.

When the play list reconstructing unit 50 retrieves a number of pieces of music data D1 which number is equal to or larger than the predetermined number according to the reconstructed play list generating rule, the play list reconstructing unit 50 generates a new play list in which all the pieces of music data D1 retrieved are registered and play list generating rule information indicating the reconstructed play list generating rule is also stored. Then, the play list reconstructing unit 50 generates channel assignment information CHA indicating that the newly generated play list is assigned to the channel to which the play list PL1 to be reconstructed has been assigned (that is, the channel assignment information CHA including the channel number CN of the channel), and stores the generated channel assignment information CHA in the newly generated play list. The play list reconstructing unit 50 then stores the new play list in the play list storage unit 16.

Further, when thus generating the new play list according to the reconstructed play list generating rule, the play list reconstructing unit 50 erases the play list PL1 that was the object for the reconstruction in this case according to an advance setting, or changes the contents of the channel assignment information CHA included in the play list PL1 as the object for the reconstruction to contents indicating that the play list PL1 is not assigned to any channel. The play list reconstructing unit 50 thereafter sends the play list PL1 to the play list storage unit 16 to store the play list PL1 in the play list storage unit 16 such that the contents of the channel assignment information CHA before being changed are overwritten.

Thus the play list reconstructing unit 50 changes the assignment of the play list PL1 as the object for the reconstruction to the channel to which the play list PL1 as the object for the reconstruction has been assigned to the newly generated play list. Thereby the play list reconstructing unit 50 apparently registers the newly generated play list in the channel list CL. The play list reconstructing unit 50 thus reconstructs the play list PL1 as the object for the reconstruction into the new play list having the play list generating rule corresponding to the apparatus use condition of the reproducing apparatus 10 (that is, the apparatus use condition of the reproducing apparatus 10 used for the reproduction of music data D1).

When the play list reconstructing unit 50 retrieves a predetermined number of pieces of music data D1 or more according to the reconstructed play list generating rule, the play list reconstructing unit 50 registers these pieces of music data D1 in the new play list. Thus, when the music data D1 is reproduced according to the reconstructed play list (that is, the new play list), the play list reconstructing unit 50 allows the user to listen to as much music as possible. Incidentally, when completing the reconstruction of the play list, the play list reconstructing unit 50 notifies the completion of the reconstruction to the display controlling unit 17. The display controlling unit 17 thus updates the display contents of the selection screen 20 displayed on the display unit 18 according to the reconstructed play list to notify the user of the play list into which the play list PL1 as the object for the reconstruction has been reconstructed.

Figure 16:
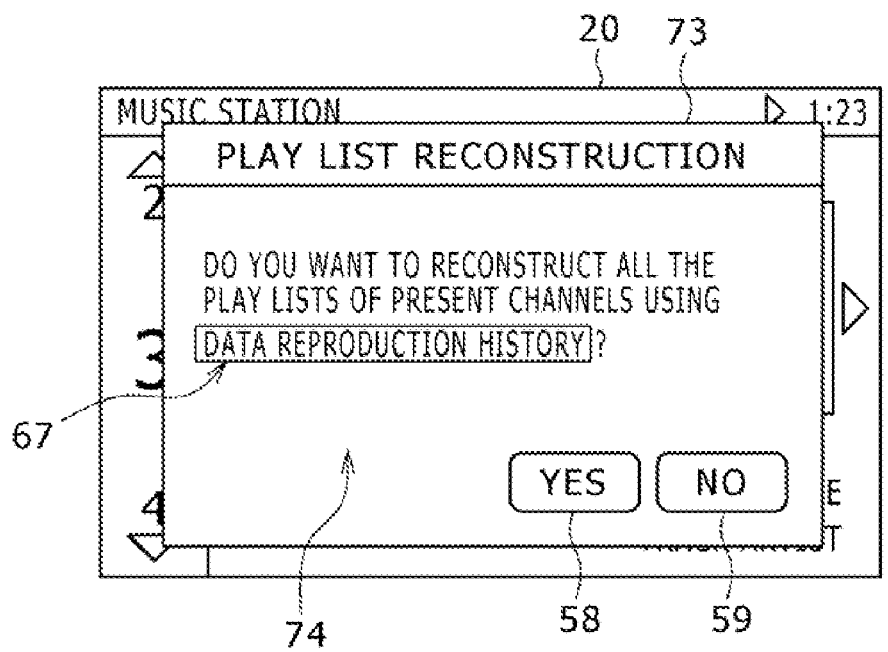
FIG. 16 is a schematic diagram showing a configuration of a reconstruction inquiry screen when play lists of all channels are reconstructed using a data reproduction history.

When the play list reconstructing unit 50 determines on the basis of the reconstruction mode that the data reproduction history is used for the reconstruction of play lists PL1 and a setting is made to reconstruct en bloc all the play lists PL1 that are respectively assigned to a plurality of channels and are set to be used for reproduction of music data D1, for example, the play list reconstructing unit 50 notifies the display controlling unit 17 that all the play lists PL1 are to be reconstructed. At this time, the display controlling unit 17 generates reconstruction inquiry screen data according to the notification from the play list reconstructing unit 50, and then sends the generated reconstruction inquiry screen data to the display unit 18. The display controlling unit 17 thereby displays a reconstruction inquiry screen 73 as shown in FIG. 16, the reconstruction inquiry screen 73 being based on the reconstruction inquiry screen data, on the selection screen 20 in the display unit 18 such that the reconstruction inquiry screen 73 is superimposed on the selection screen 20.

A notification section 67 is provided in substantially a central part of the reconstruction inquiry screen 73. In addition, reconstruction inquiry text 74 for inquiring about whether to reconstruct all the play lists PL1 now respectively assigned to a plurality of channels and set to be used for reproduction of music data D1 using the data reproduction history is displayed in the reconstruction inquiry screen 73 with characters within the notification section 67 as a part of the reconstruction inquiry text 74. Further, as with the above-described reconstruction inquiry screen 56 or the like, the reconstruction inquiry screen 73 has a consent button 58 and a refusal button 59.

When the user consents to reconstruct the play lists PL1 on the reconstruction inquiry screen 73, the play list reconstructing unit 50 detects all the play lists PL1 respectively assigned to a plurality of channels and set to be used for reproduction of music data D1 as play lists to be reconstructed among a plurality of play lists PL1 stored in the play list storage unit 16. The play list reconstructing unit 50 then notifies the data reproduction history obtaining unit 70 and the data attribute weighting unit 71 of these play lists PL1 to be reconstructed by corresponding channel numbers CN, list names or the like.

In this case, the play list reconstructing unit 50, the data reproduction history obtaining unit 70, and the data attribute weighting unit 71 perform the process of reconstructing one play list PL1 to be reconstructed into a new play list in the same manner as described above a number of times sequentially, which number of times is equal to the number of play lists PL1 to be reconstructed. The play list reconstructing unit 50 thereby reconstructs the plurality of play lists PL1 to be reconstructed into new play lists one by one, in conjunction with the data reproduction history obtaining unit 70 and the data attribute weighting unit 71.

When the play list reconstructing unit 50 determines that information to be used for the reconstruction of a play list PL1 is the list use history on the basis of the reconstruction mode in response to user-triggered reconstruction requesting information supplied from the request information generating unit 52, the play list reconstructing unit 50 notifies information on the determination to the display controlling unit 17. In addition, when a setting is made to reconstruct the play list selected arbitrarily by the user at this time, the play list reconstructing unit 50 notifies the display controlling unit 17 of the play list PL1 assigned to the channel being selected now by the user on the selection screen 20 (that is, the channel being selected when the user requests the reconstruction) as play list to be reconstructed.

In this case, the display controlling unit 17 generates reconstruction inquiry screen data according to the notification from the play list reconstructing unit 50, and then sends the generated reconstruction inquiry screen data to the display unit 18. The display controlling unit 17 thereby displays a reconstruction inquiry screen having substantially the same composition as the reconstruction inquiry screen 66 described above on the selection screen 20 in the display unit 18 on the basis of the reconstruction inquiry screen data such that the reconstruction inquiry screen is superimposed on the selection screen 20. Incidentally, characters representing the list use history to be used for the reconstruction of the play list PL1 are displayed in a notification section provided in substantially a central part of the reconstruction inquiry screen.

When the user consents to reconstruct the play list PL1 on the reconstruction inquiry screen, the play list reconstructing unit 50 inquires of the reproducing unit 11 or the display controlling unit 17 about the play list PL1 to be reconstructed which play list is selected by the user. The play list reconstructing unit 50 then notifies a list use history obtaining unit 77 of the one play list PL1 to be reconstructed by a corresponding channel number CN, a list name or the like.

The list use history obtaining unit 77 reads the play list PL1 to be reconstructed which play list is selected by the user from the play list storage unit 16 on the basis of the notification from the play list reconstructing unit 50. In addition, the list use history obtaining unit 77 obtains the list use history included in the list attribute information LAT of the play list PL1. The list use history obtaining unit 77 then sends the list use history to a list attribute updating unit 78 together with the list attribute information LAT of the play list PL1 to be reconstructed.

A list name, a description and the like included in the list attribute information LAT are generated such that words included in the list name, the description and the like are distinguishable in advance. Thus, the list attribute updating unit 78 extracts a number of words which number corresponds to a number of times of use indicated by the list use history (for example, the larger the number of times of use, the larger the number of words) as new data search keys from the list name, the description and the like included in the list attribute information LAT supplied from the list use history obtaining unit 77.

However, because the list attribute information LAT includes data search keys as play list generating rule information, the list attribute updating unit 78 extracts words that are of different kinds from the data search keys and usable as new data search keys. In other words, the list attribute updating unit 78 updates the original list attribute information LAT into list attribute information usable as data search keys. The list attribute updating unit 78 then sends one or a plurality of words thus extracted as a new data search key to the play list reconstructing unit 50.

When the play list reconstructing unit 50 is supplied with the new data search key from the list attribute updating unit 78, the play list reconstructing unit 50 obtains the play list PL1 to be reconstructed from the play list storage unit 16. In addition, the play list reconstructing unit 50 adds the new data search key supplied from the list attribute updating unit 78 to play list generating rule information included in the list attribute information LAT of the play list PL1 to be reconstructed. The play list reconstructing unit 50 thereby reconstructs the play list generating rule used to generate the play list PL1 to be reconstructed into a play list generating rule increased in the number of data search keys.

In addition, according to the reconstructed play list generating rule, the play list reconstructing unit 50 compares a plurality of reconstructed data search keys with all the data attribute information DAT stored in the content database CDB1 of the content data storage unit 13, for example. The play list reconstructing unit 50 thereby retrieves music data D1 having data attribute information DAT matching the reconstructed play list generating rule. Incidentally, also in this case, the play list reconstructing unit 50 obtains one set or a plurality of sets of reconstructed data search keys by combining the original data search keys and the added individual data search key with each other, and retrieves music data D1 having data attribute information DAT including at least one set of reconstructed data search keys.

When the number of pieces of retrieved music data D1 having data attribute information DAT matching the reconstructed play list generating rule is smaller than a predetermined number selected in advance, the play list reconstructing unit 50 makes the list attribute updating unit 78 extract at least one word as a new data search key of a different kind from the reconstructed data search keys from the list attribute information LAT. The play list reconstructing unit 50 then adds the newly extracted data search key to the already reconstructed play list generating rule, and thereby reconstructs the play list generating rule again. Thus, according to the play list generating rule reconstructed again, the play list reconstructing unit 50 retrieves music data D1 having data attribute information DAT matching the play list generating rule again in the same manner as described above.

As in the above, when the play list reconstructing unit 50 retrieves a number of pieces of music data D1 which number is equal to or larger than the predetermined number according to the reconstructed play list generating rule, the play list reconstructing unit 50 generates a new play list in which the retrieved music data D1 is registered and play list generating rule information indicating the reconstructed play list generating rule is also stored. Then, as in the above, the play list reconstructing unit 50 changes the assignment of the play list PL1 to be reconstructed to the channel to which the play list PL1 to be reconstructed has been assigned to the newly generated play list. Thereby the play list reconstructing unit 50 apparently registers the newly generated play list in the channel list CL. The play list reconstructing unit 50 also stores the new play list in the play list storage unit 16. The play list reconstructing unit 50 thus reconstructs the play list PL1 or PL2 to be reconstructed into the new play list having the play list generating rule corresponding to the apparatus use condition of the reproducing apparatus 10 (that is, the apparatus use condition of the reproducing apparatus 10 used for the reproduction of music data D1).

When the play list reconstructing unit 50 retrieves a predetermined number of pieces of music data D1 or more according to the reconstructed play list generating rule, the play list reconstructing unit 50 registers these pieces of music data D1 in the new play list. Thus, when the music data D1 is reproduced according to the reconstructed play list (that is, the new play list), the play list reconstructing unit 50 allows the user to listen to as much music as possible. Incidentally, when completing the reconstruction of the play list, as in the above, the play list reconstructing unit 50 makes the display controlling unit 17 update the display contents of the selection screen 20 displayed on the display unit 18 to notify the user of the play list into which the play list PL1 as the object for the reconstruction has been reconstructed.

When the play list reconstructing unit 50 determines on the basis of the reconstruction mode that the list use history is used for the reconstruction of play lists PL1 and a setting is made to reconstruct en bloc all the play lists PL1 that are respectively assigned to a plurality of channels and are set to be used for reproduction of music data D1, for example, the play list reconstructing unit 50 notifies the display controlling unit 17 of all the play lists PL1 as play lists to be reconstructed.

At this time, the display controlling unit 17 generates reconstruction inquiry screen data according to the notification from the play list reconstructing unit 50, and then sends the generated reconstruction inquiry screen data to the display unit 18. The display controlling unit 17 thereby displays a reconstruction inquiry screen having substantially the same composition as the reconstruction inquiry screen 73 described above on the selection screen 20 in the display unit 18 on the basis of the reconstruction inquiry screen data such that the reconstruction inquiry screen is superimposed on the selection screen 20. Incidentally, characters representing the list use history to be used for the reconstruction of the play lists PL1 are displayed in a notification section provided in substantially a central part of the reconstruction inquiry screen.

When the user consents to reconstruct the play lists PL1 on the reconstruction inquiry screen, the play list reconstructing unit 50 detects all the play lists PL1 respectively assigned to a plurality of channels and set to be used for reproduction of music data D1 as play lists to be reconstructed among a plurality of play lists PL1 stored in the play list storage unit 16. The play list reconstructing unit 50 then notifies the list use history obtaining unit 77 of these play lists PL1 to be reconstructed by corresponding channel numbers CN, list names or the like.

In this case, the play list reconstructing unit 50, the list use history obtaining unit 77, and the list attribute updating unit 78 perform the process of reconstructing one play list PL1 to be reconstructed into a new play list in the same manner as described above a number of times sequentially, which number of times is equal to the number of play lists PL1 to be reconstructed. The play list reconstructing unit 50 thereby reconstructs the plurality of play lists PL1 to be reconstructed into new play lists one by one, in conjunction with the list use history obtaining unit 77 and the list attribute updating unit 78.

Description will next be made of the reconstruction of a play list PL1 in response to a request for the reconstruction from the external apparatus 15 on the network NT. However, in such reconstruction of a play list PL1, there are a case of using a play list presented from the external apparatus 15 (this play list will hereinafter be referred to as a presented play list) and a case of using music data presented from the external apparatus 15 (this music data will hereinafter be referred to as presented music data). Thus, in the following, description will first be made of a case of reconstructing a play list PL1 using a presented play list. Description will next be made of a case of reconstructing a play list PL1 using presented music data. Incidentally, also in such reconstruction of a play list PL1, a setting is made in advance as a reconstruction mode as in the above, indicating which of the data reproduction history and the list use history to use and which of play lists PL1 (that is, one play list PL1 selected arbitrarily by the user or a plurality of play lists PL1 selected in advance) to reconstruct.

When the communicating unit 14 receives a reconstruction requesting signal for requesting the reconstruction of a play list PL1 using a presented play list, the reconstruction requesting signal being transmitted from the external apparatus 15, in a state of the selection screen 20 being displayed on the display unit 18 by the display controlling unit 17, for example, the request information generating unit 52 generates reconstruction requesting information for requesting the reconstruction of the play list PL1 according to the reconstruction requesting signal (this reconstruction requesting information will hereinafter be referred to as network-triggered reconstruction requesting information). The request information generating unit 52 then sends the network-triggered reconstruction requesting information to the play list reconstructing unit 50.

When the play list reconstructing unit 50 is supplied with the network-triggered reconstruction requesting information from the request information generating unit 52, the play list reconstructing unit 50 determines which of the data reproduction history and the list use history to use for the reconstruction of the play list PL1 on the basis of the already set reconstruction mode. The play list reconstructing unit 50 notifies information on the determination to the display controlling unit 17. When at this time, a setting is made as the reconstruction mode to reconstruct the play list PL1 selected arbitrarily by the user, the play list reconstructing unit 50 notifies the display controlling unit 17 of the play list PL1 assigned to the channel being selected now by the user on the selection screen 20 (that is, the channel being selected when the external apparatus 15 requests the reconstruction) as play list to be reconstructed.

Figure 17:
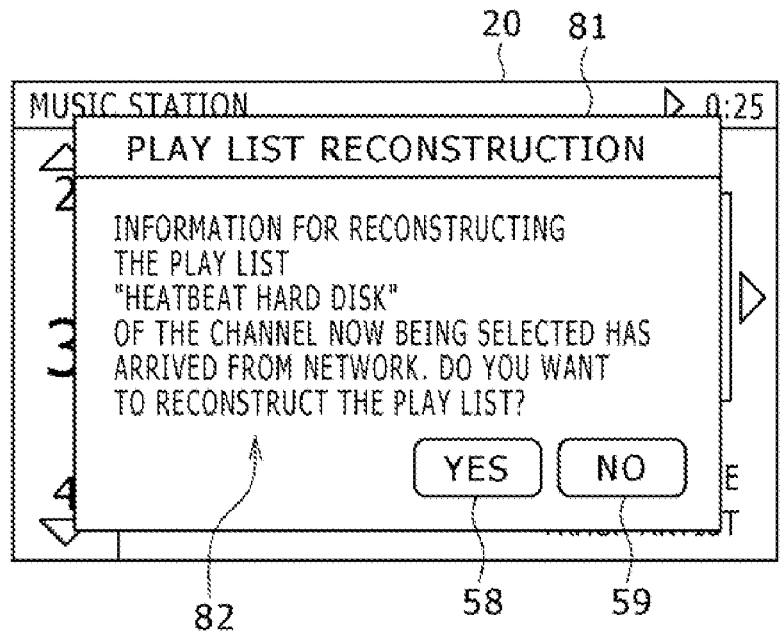
FIG. 17 is a schematic diagram showing a configuration of a reconstruction inquiry screen when one play list is reconstructed at a request from an external apparatus.

In this case, the display controlling unit 17 generates reconstruction inquiry screen data according to the notification from the play list reconstructing unit 50, and then sends the generated reconstruction inquiry screen data to the display unit 18. The display controlling unit 17 thereby displays a reconstruction inquiry screen 81 as shown in FIG. 17, the reconstruction inquiry screen 81 being based on the reconstruction inquiry screen data, on the selection screen 20 in the display unit 18 such that the reconstruction inquiry screen 81 is superimposed on the selection screen 20.

Reconstruction inquiry text 82 for inquiring about whether to reconstruct the play list PL1 assigned to the channel being selected now according to the request from the external apparatus 15 is displayed in a central part of the reconstruction inquiry screen 81. In addition, as with the above-described reconstruction inquiry screen 56 or the like, the reconstruction inquiry screen 81 has a consent button 58 and a refusal button 59.

When the user consents to reconstruct the play list PL1 on the reconstruction inquiry screen 81, the play list reconstructing unit 50 inquires of the reproducing unit 11 or the display controlling unit 17 about the play list PL1 to be reconstructed which play list is selected by the user. Then, according to the reconstruction mode set at this point in time, the play list reconstructing unit 50 notifies the data reproduction history obtaining unit 70 and the data attribute weighting unit 71, or the list use history obtaining unit 77 of the one play list PL1 to be reconstructed by a corresponding channel number CN, a list name or the like.

Thus, in the same manner as described above, the play list reconstructing unit 50 obtains a new data search key according to the data reproduction history from the data attribute weighting unit 71, or obtains a new data search key according to the list use history from the list attribute updating unit 78. The play list reconstructing unit 50 at this time reads the play list PL1 to be reconstructed from the play list storage unit 16, and reconstructs the play list generating rule of the read play list PL1 into a play list generating rule to which the new data search key is added.

In this state, the play list reconstructing unit 50 transmits a consent signal indicating consent to reconstruct the play list PL1 to the external apparatus 15 via the communicating unit 14. As a result, when the communicating unit 14 receives a plurality of presented play lists transmitted from the external apparatus 15, the play list reconstructing unit 50 takes in the plurality of presented play lists. Incidentally, the presented play lists presented by the external apparatus 15 are for example generated by collecting and registering therein music data D1 stored and retained in the external apparatus 15 according to a play list generating rule set arbitrarily on the external apparatus 15 side and also storing therein play list generating rule information indicating the play list generating rule.

Then, according to the reconstructed play list generating rule, the play list reconstructing unit 50 compares a plurality of reconstructed data search keys with play list generating rule information included as list attribute information LAT in the presented play lists. The play list reconstructing unit 50 thereby retrieves a presented play list having a play list generating rule matching the reconstructed play list generating rule (for example the play list generating rule including at least one of the reconstructed data search keys).

When the play list reconstructing unit 50 retrieves the presented play list matching the reconstructed play list generating rule, the play list reconstructing unit 50 obtains data attribute information DAT corresponding to all music data D1 registered in the presented play list from the external apparatus 15 via the communicating unit 14 according to music registration information TR (that is, content identifying information MID) within the presented play list. Then, on the basis of the data attribute information DAT, the play list reconstructing unit 50 determines whether pay music data D1 is registered in the presented play list and whether music data D1 that are difficult to be reproduced by streaming reproduction in a communication band used by the communicating unit 14 for communication is registered in the presented play list. When a result of the determination indicates that pay music data D1 or music data D1 that are difficult to be reproduced by streaming reproduction is registered in the presented play list, the play list reconstructing unit 50 adds a new data search key to the reconstructed play list generating rule in the same manner as described above, and thereby reconstructs the reconstructed play list generating rule again. Thus, the play list reconstructing unit 50 retrieves a presented play list again according to the play list generating rule reconstructed again.

The play list reconstructing unit 50 thus retrieves a presented play list in which music data D1 that is free of charge and can be reproduced by streaming reproduction is registered, according to the reconstructed play list generating rule. When the play list reconstructing unit 50 retrieves a presented play list in which music data D1 that is free of charge and can be reproduced by streaming reproduction is registered according to the reconstructed play list generating rule, the play list reconstructing unit 50 compares data attribute information DAT corresponding to all music data D1 registered in the presented play list with all data attribute information DAT stored in the content database CDB1 of the content data storage unit 13.

When a result of the comparison indicates that for example the same music data D1 as music data D1 registered in the presented play list is recorded in the content database CDB1 of the content data storage unit 13, the play list reconstructing unit 50 changes the content identifying information MID of the same music data D1 within music registration information TR included in the presented play list (that is, the content identifying information MID indicating a location where the music data D1 is stored on the network NT) to the content identifying information MID of the same music data D1 stored in the content database CDB1 (that is, the content identifying information MID indicating a location where the music data D1 is stored in the content database CDB1). Thereby, when the music data D1 registered in the presented play list is also present within the reproducing apparatus 10, the play list reconstructing unit 50 avoids imposing an unnecessary communication cost by reading the music data D1 from the content data storage unit 13 and reproducing the music data D1, without taking the trouble to perform streaming reproduction of the music data D1 via the network NT according to the presented play list.

Then, the play list reconstructing unit 50 sets the thus retrieved presented play list as a new play list. As in the above, the play list reconstructing unit 50 assigns the channel to which the play list PL1 to be reconstructed has been assigned the new play list in place of the play list PL1 to be reconstructed. Thereby the play list reconstructing unit 50 apparently registers the new play list in the channel list CL. The play list reconstructing unit 50 also stores the new play list in the play list storage unit 16. The play list reconstructing unit 50 thus reconstructs the play list PL1 to be reconstructed into the new play list (that is, the presented play list) having the play list generating rule corresponding to the apparatus use condition of the reproducing apparatus 10 (that is, the apparatus use condition of the reproducing apparatus 10 used for the reproduction of music data D1).

Because the play list reconstructing unit 50 retrieves a presented play list in which music data D1 that is free of charge and can be reproduced by streaming reproduction is registered for reconstruction according to the reconstructed play list generating rule, the play list reconstructing unit 50 allows the user to listen to music while preventing payment of change from being incurred by reproduction of the music data D1 according to the reconstructed play list or preventing a failure in streaming reproduction when the music data D1 is reproduced according to the reconstructed play list. Incidentally, also in this case, when completing the reconstruction of the play list, the play list reconstructing unit 50 updates the display contents of the selection screen 20 according to the reconstructed play list to notify the user of the play list into which the play list PL1 as the object for the reconstruction has been reconstructed.

Figure 18:
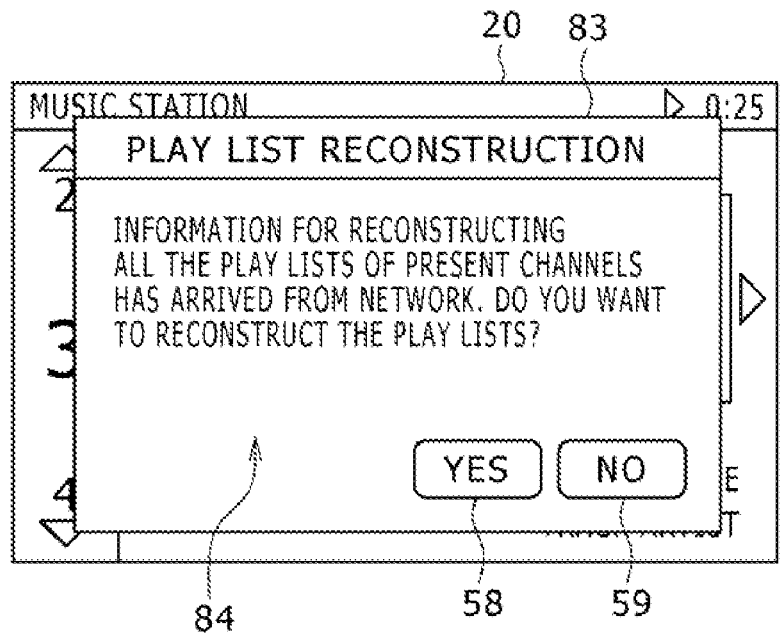
FIG. 18 is a schematic diagram showing a configuration of a reconstruction inquiry screen when play lists of all channels are reconstructed at a request from the external apparatus.

When the play list reconstructing unit 50 determines which of the data reproduction history and the list use history to use for the reconstruction of the play list PL1 on the basis of the reconstruction mode and a setting is made to reconstruct en bloc all the play lists PL1 that are respectively assigned to a plurality of channels and are set to be used for reproduction of music data D1, for example, the play list reconstructing unit 50 notifies the display controlling unit 17 of all the play lists PL1 as play lists to be reconstructed. At this time, the display controlling unit 17 generates reconstruction inquiry screen data according to the notification from the play list reconstructing unit 50, and then sends the generated reconstruction inquiry screen data to the display unit 18. The display controlling unit 17 thereby displays a reconstruction inquiry screen 83 as shown in FIG. 18, the reconstruction inquiry screen 83 being based on the reconstruction inquiry screen data, on the selection screen 20 in the display unit 18 such that the reconstruction inquiry screen 83 is superimposed on the selection screen 20.

Reconstruction inquiry text 84 for inquiring about whether to reconstruct all the play lists PL1 now assigned respectively to a plurality of channels and set to be used for reproduction of music data D1 according to the request from the external apparatus 15 is displayed in a central part of the reconstruction inquiry screen 83. In addition, as with the above-described reconstruction inquiry screen 56 or the like, the reconstruction inquiry screen 83 has a consent button 58 and a refusal button 59.

When the user consents to reconstruct the play lists PL1 on the reconstruction inquiry screen 83, the play list reconstructing unit 50 detects all the play lists PL1 respectively assigned to a plurality of channels and set to be used for reproduction of music data D1 as play lists to be reconstructed among the plurality of play lists PL1 stored in the play list storage unit 16. Then, according to the reconstruction mode set at this point in time, the play list reconstructing unit 50 notifies the data reproduction history obtaining unit 70 and the data attribute weighting unit 71, or the list use history obtaining unit 77 of these play lists PL1 to be reconstructed by corresponding channel numbers CN, list names or the like.

Thus, the play list reconstructing unit 50 performs the process of reconstructing one play list PL1 to be reconstructed into a new play list formed by a presented play list in the same manner as described above a number of times sequentially, which number of times is equal to the number of play lists PL1 to be reconstructed. The play list reconstructing unit 50 thereby reconstructs the plurality of play lists PL1 to be reconstructed into new play lists one by one.

When the communicating unit 14 receives a reconstruction requesting signal for requesting the reconstruction of a play list PL1 using presented music data, the reconstruction requesting signal being transmitted from the external apparatus 15, in a state of the selection screen 20 being displayed on the display unit 18 by the display controlling unit 17, for example, the request information generating unit 52 generates network-triggered reconstruction requesting information according to the reconstruction requesting signal. The request information generating unit 52 then sends the network-triggered reconstruction requesting information to the play list reconstructing unit 50.

When the play list reconstructing unit 50 is supplied with the network-triggered reconstruction requesting information from the request information generating unit 52, as in the above-described case, the play list reconstructing unit 50 determines which of the data reproduction history and the list use history to use for the reconstruction of the play list PL1 on the basis of the reconstruction mode. When at this time, a setting is made to reconstruct the play list PL1 selected arbitrarily by the user, the play list reconstructing unit 50 notifies the display controlling unit 17 of the play list PL1 assigned to the channel being selected now by the user on the selection screen 20 (that is, the channel being selected when the external apparatus 15 requests the reconstruction) as play list to be reconstructed.

In this case, according to the notification from the play list reconstructing unit 50, the display controlling unit 17 displays a reconstruction inquiry screen 81 as in the above on the selection screen 20 in the display unit 18 such that the reconstruction inquiry screen 81 is superimposed on the selection screen 20. When the user consents to reconstruct the play list PL1 on the reconstruction inquiry screen 81, the play list reconstructing unit 50 detects the play list PL1 to be reconstructed which play list is selected by the user. In addition, according to the reconstruction mode set at this point in time, the play list reconstructing unit 50 notifies the data reproduction history obtaining unit 70 and the data attribute weighting unit 71, or the list use history obtaining unit 77 of the one play list PL1 to be reconstructed by a corresponding channel number CN, a list name or the like.

Thus, in the same manner as described above, the play list reconstructing unit 50 obtains a new data search key according to the data reproduction history from the data attribute weighting unit 71, or obtains a new data search key according to the list use history from the list attribute updating unit 78. The play list reconstructing unit 50 at this time reads the play list PL1 to be reconstructed from the play list storage unit 16, and reconstructs the play list generating rule of the read play list PL1 into a play list generating rule to which the new data search key is added.

In this state, the play list reconstructing unit 50 transmits a consent signal indicating consent to reconstruct the play list PL1 to the external apparatus 15 via the communicating unit 14. As a result, when a presented music list listing a plurality of pieces of data attribute information DAT corresponding to a plurality of pieces of presented music data and content identifying information MID of the plurality of pieces of presented music data is transmitted from the external apparatus 15 and then received by the communicating unit 14, the play list reconstructing unit 50 takes in the presented music list. Then, according to the reconstructed play list generating rule, the play list reconstructing unit 50 compares a plurality of reconstructed data search keys with all the data attribute information DAT included in the presented music list. The play list reconstructing unit 50 thereby retrieves a plurality of pieces of data attribute information DAT matching the reconstructed play list generating rule (for example the plurality of pieces of data attribute information DAT including at least one of the reconstructed data search keys).

When the play list reconstructing unit 50 retrieves the plurality of pieces of data attribute information DAT matching the reconstructed play list generating rule, the play list reconstructing unit 50 determines on the basis of these pieces of data attribute information DAT whether corresponding presented music data is pay music data and whether the presented music data can be reproduced by streaming reproduction in a communication band used by the communicating unit 14 for communication. When a result of the determination indicates that the presented music data corresponding to the retrieved data attribute information DAT includes presented music data distributed as pay music data or presented music data that are difficult to be reproduced by streaming reproduction in the communication band, the play list reconstructing unit 50 determines whether the number of pieces of data attribute information DAT remaining when the data attribute information DAT corresponding to the presented music data is excluded is a predetermined number or larger. When a result of the determination indicates that the number of pieces of data attribute information DAT corresponding to presented music data that is free of charge and can be reproduced by streaming reproduction among the retrieved pieces of data attribute information DAT is smaller than the predetermined number, the play list reconstructing unit 50 adds a new data search key to the reconstructed play list generating rule in the same manner as described above, and thereby reconstructs the reconstructed play list generating rule again. Thus, the play list reconstructing unit 50 retrieves data attribute information DAT again according to the play list generating rule reconstructed again.

The play list reconstructing unit 50 thus retrieves a predetermined number of pieces or more of data attribute information DAT corresponding to presented music data that is free of charge and can be reproduced by streaming reproduction, according to the reconstructed play list generating rule. When the play list reconstructing unit 50 retrieves a predetermined number of pieces or more of data attribute information DAT corresponding to presented music data that is free of charge and can be reproduced by streaming reproduction according to the reconstructed play list generating rule, the play list reconstructing unit 50 generates a new play list in which the presented music data corresponding to the retrieved data attribute information DAT is registered (that is, corresponding content identifying information MID in the presented music list is stored) and play list generating rule information indicating the reconstructed play list generating rule is also stored.

When the play list reconstructing unit 50 generates the new play list matching the reconstructed play list generating rule, the play list reconstructing unit 50 compares the data attribute information DAT corresponding to all the presented music data registered in the new play list with all data attribute information DAT stored in the content database CDB1 of the content data storage unit 13. When a result of the comparison indicates that for example the same music data as presented music data registered in the new play list is recorded in the content database CDB1 of the content data storage unit 13, the play list reconstructing unit 50 changes the content identifying information MID of the same presented music data within music registration information TR included in the new play list (that is, the content identifying information MID indicating a location where the presented music data is stored on the network NT) to the content identifying information MID of the same music data D1 stored in the content database CDB1 (that is, the content identifying information MID indicating a location where the music data D1 is stored in the content database CDB1). Thereby, when the presented music data registered in the new play list is also present within the reproducing apparatus 10, the play list reconstructing unit 50 avoids imposing an unnecessary communication cost by reading the music data from the content data storage unit 13 and reproducing the music data, without taking the trouble to perform streaming reproduction of the presented music data via the network NT according to the new play list.

Then, as in the above, the play list reconstructing unit 50 changes the assignment of the play list PL1 to be reconstructed to the channel to which the play list PL1 to be reconstructed has been assigned to the new play list. Thereby the play list reconstructing unit 50 apparently registers the new play list in the channel list CL. The play list reconstructing unit 50 also stores the new play list in the play list storage unit 16. The play list reconstructing unit 50 thus reconstructs the play list PL1 to be reconstructed into the new play list having the play list generating rule corresponding to the apparatus use condition of the reproducing apparatus 10 (that is, the apparatus use condition of the reproducing apparatus 10 used for the reproduction of music data D1).

Because the play list reconstructing unit 50 retrieves the data attribute information DAT corresponding to the presented music data that is free of charge and can be reproduced by streaming reproduction according to the reconstructed play list generating rule, and generates the new play list for the reconstruction in which the presented music data corresponding to the retrieved data attribute information DAT is registered, the play list reconstructing unit 50 allows the user to listen to music while preventing payment of change from being incurred by reproduction of the presented music data according to the reconstructed play list or preventing a failure in streaming reproduction when the presented music data is reproduced according to the reconstructed play list. Incidentally, also in this case, when completing the reconstruction of the play list, the play list reconstructing unit 50 updates the display contents of the selection screen 20 according to the reconstructed play list to notify the user of the play list into which the play list PL1 as the object for the reconstruction has been reconstructed.

When the play list reconstructing unit 50 determines which of the data reproduction history and the list use history to use for the reconstruction of the play list PL1 on the basis of the reconstruction mode and a setting is made to reconstruct en bloc all the play lists PL1 that are respectively assigned to a plurality of channels and are set to be used for reproduction of music data D1, for example, the play list reconstructing unit 50 notifies the display controlling unit 17 of all the play lists PL1 as play lists to be reconstructed. At this time, as in the above, the display controlling unit 17 displays a reconstruction inquiry screen 83 on the selection screen 20 in the display unit 18 such that the reconstruction inquiry screen 83 is superimposed on the selection screen 20.

When the user consents to reconstruct the play lists PL1 on the reconstruction inquiry screen 83, the play list reconstructing unit 50 detects all the play lists PL1 respectively assigned to a plurality of channels and set to be used for reproduction of music data D1 as play lists to be reconstructed among the plurality of play lists PL1 stored in the play list storage unit 16. Then, according to the reconstruction mode set at this point in time, the play list reconstructing unit 50 notifies the data reproduction history obtaining unit 70 and the data attribute weighting unit 71, or the list use history obtaining unit 77 of the play lists PL1 to be reconstructed by corresponding channel numbers CN, list names or the like.

Thus, as in the above, the play list reconstructing unit 50 performs the process of reconstructing one play list PL1 to be reconstructed into a new play list using a presented music list a number of times sequentially, which number of times is equal to the number of play lists PL1 to be reconstructed. The play list reconstructing unit 50 thereby reconstructs the plurality of play lists PL1 to be reconstructed into new play lists one by one.

Figure 19:
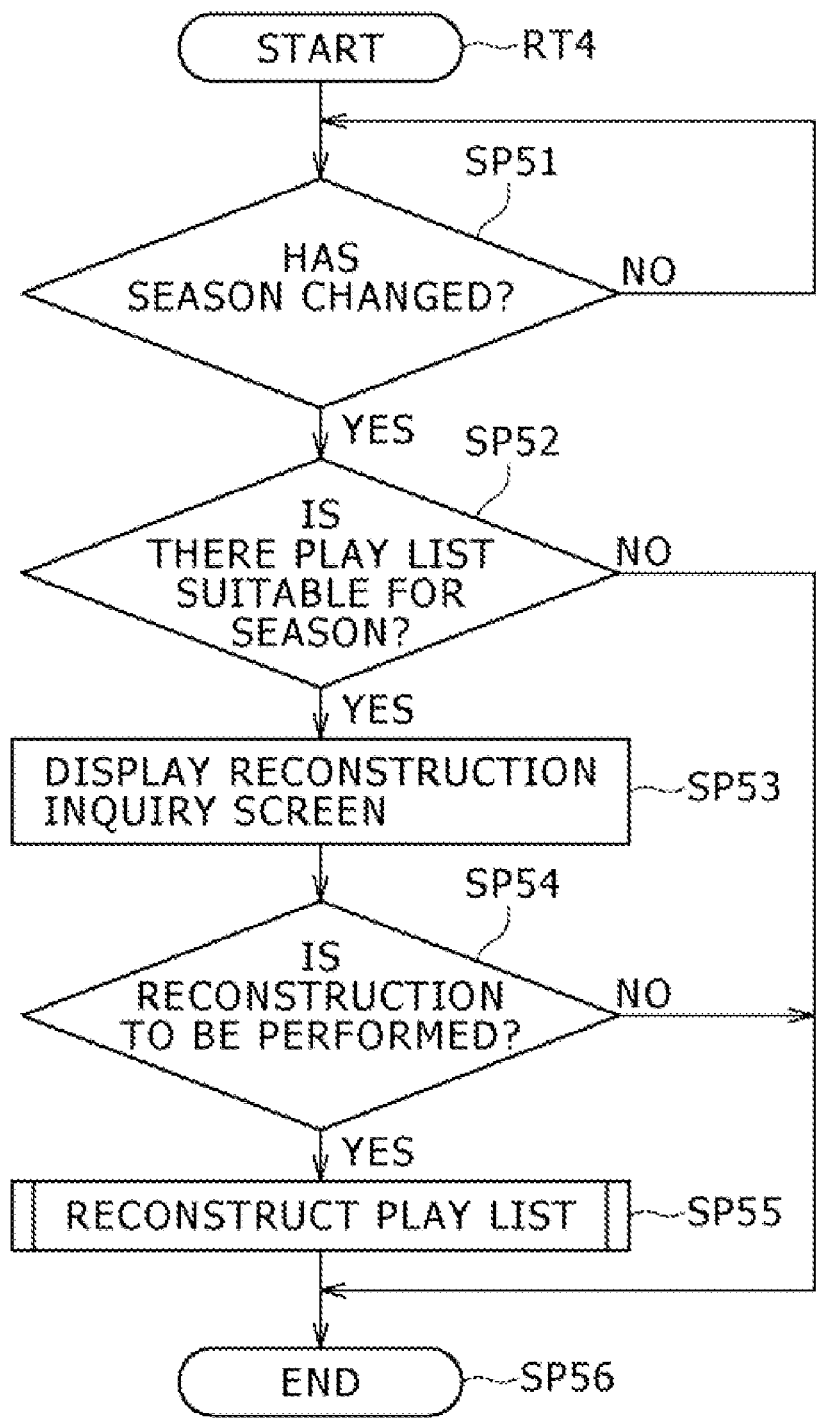
FIG. 19 is a flowchart of a season-triggered play list reconstruction process procedure.

A season-triggered play list reconstruction process procedure RT4 for reconstructing a play list PL1 with a change of seasons as described above will be described below with reference to a flowchart of FIG. 19. In this case, starting the season-triggered play list reconstruction process procedure RT4, the request information generating unit 52 in step SP51 compares a result of clocking a present month and day by the clocking unit 51 with months and days for change detection, and thus waits for a change of seasons. When the request information generating unit 52 detects a change from a first season to a second season, the request information generating unit 52 accordingly generates season-triggered reconstruction requesting information, and then sends the season-triggered reconstruction requesting information to the play list reconstructing unit 50.

In step SP52, the play list reconstructing unit 50 compares a list search key related to the first season with the play list generating rule information of all play lists PL1 assigned to channels and set to be used for the reproduction of music data D1. In addition, the play list reconstructing unit 50 compares one list search key related to the second season after the change with the play list generating rule information of all play lists PL1 not yet assigned to channels.

Then, on the basis of results of the comparison, the play list reconstructing unit 50 determines whether there is a play list PL1 related to the first season before the change and a play list PL1 related to the second season after the change. When a positive result is obtained in step SP52, this indicates that the play list storage unit 16 stores both a play list PL1 related to the first season before the change and a play list PL1 related to the second season after the change. Thus, when the play list reconstructing unit 50 obtains such a positive result, the play list reconstructing unit 50 notifies the play list PL1 related to the first season before the change and the play list PL1 related to the second season after the change to the display controlling unit 17.

In step SP53, the display controlling unit 17 displays the reconstruction inquiry screen 56 or 62 on the display unit 18. The display controlling unit 17 thereby inquires of the user about whether to reconstruct the play list PL1 according to the change of the seasons. As a result, the play list reconstructing unit 50 in step SP54 determines whether the user has consented to reconstruct the play list PL1. When the user has consented to reconstruct the play list PL1, the play list reconstructing unit 50 proceeds to next step SP55. In step SP55, the play list reconstructing unit 50 reconstructs the play list PL1 to be reconstructed related to the first season into the play list PL1 related to the second season (that is, the play list PL1 having a play list generating rule related to the second season). The play list reconstructing unit 50 proceeds to next step SP56 to end the season-triggered play list reconstruction process procedure RT4.

Incidentally, when a negative result is obtained in step SP52, this indicates that at least one of a play list PL1 related to the first season before the change and a play list PL1 related to the second season after the change is not stored in the play list storage unit 16 (that is, not present within the play list storage unit 16). Thus, when the play list reconstructing unit 50 obtains such a negative result, the play list reconstructing unit 50 proceeds to step SP56 to end the season-triggered play list reconstruction process procedure RT4. In addition, also when the user has refused to reconstruct the play list PL1 in step SP54, the play list reconstructing unit 50 proceeds to step SP56 to end the season-triggered play list reconstruction process procedure RT4.

Figure 20:
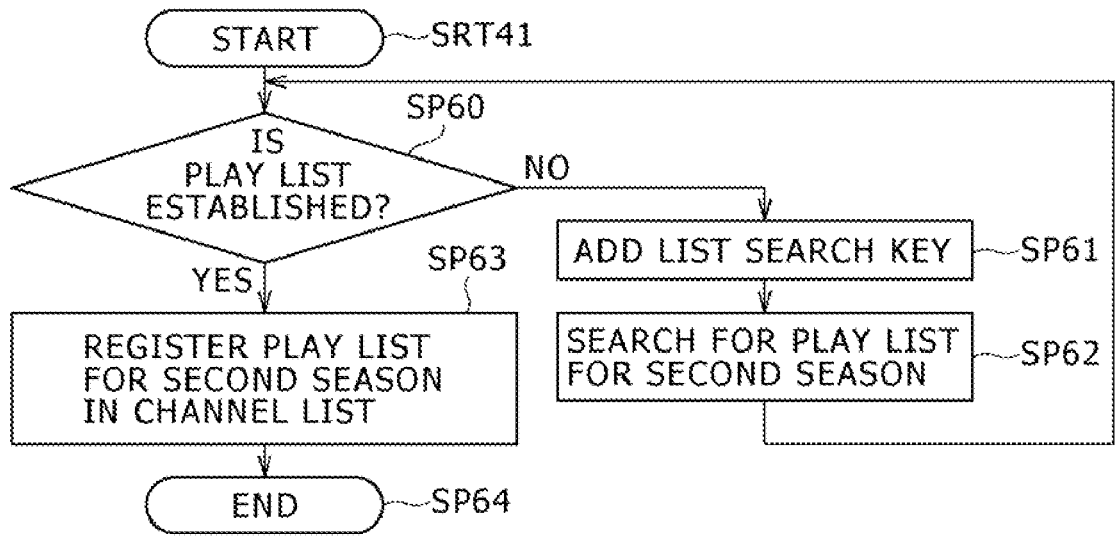
FIG. 20 is a flowchart of a first subroutine of the play list reconstruction process.

When the play list reconstructing unit 50 proceeds to step SP55, the play list reconstructing unit 50 actually starts a first subroutine SRT41 of the season-triggered play list reconstruction process procedure RT4 which subroutine is represented in FIG. 20. Starting the first subroutine SRT41, the play list reconstructing unit 50 in step SP60 determines whether the play list PL1 related to the second season after the change is established. When a negative result is obtained in step SP60, this indicates that the number of pieces of music data D1 registered in the play list PL1 related to the second season after the change is too small. Thus, when the play list reconstructing unit 50 obtains such a negative result, the play list reconstructing unit 50 proceeds to next step SP61.

In step SP61, the play list reconstructing unit 50 adds a list search key related to the second season for retrieving a play list PL1 related to the second season after the change. The play list reconstructing unit 50 then proceeds to next step SP62. In step SP62, the play list reconstructing unit 50 compares the previously used list search key related to the second season (that is, the list search key used in step SP52) and the added list search key related to the second season with the play list generating rule information of all the play lists PL1 not yet assigned to channels, and thereby retrieves a new play list PL1 related to the second season. The play list reconstructing unit 50 then returns to step SP60.

When a positive result is obtained in step SP60, this indicates that the number of pieces of music data D1 registered in the play list PL1 related to the second season after the change is relatively large and thus considered to be sufficient to entertain the user. Thus, when the play list reconstructing unit 50 obtains such a positive result, the play list reconstructing unit 50 proceeds to next step SP63. In step SP63, the play list reconstructing unit 50 registers the play list PL1 related to the second season in place of the play list PL1 related to the first season in the channel list CL. The play list reconstructing unit 50 thereafter proceeds to next step SP64. The play list reconstructing unit 50 thereby ends the first subroutine SRT41, and then proceeds to step SP56. Incidentally, when there are a plurality of play lists PL1 to be reconstructed, the play list reconstructing unit 50 repeatedly executes the first subroutine SRT41 a number of times which number is equal to the number of play lists PL1 to be reconstructed.

Figure 21:
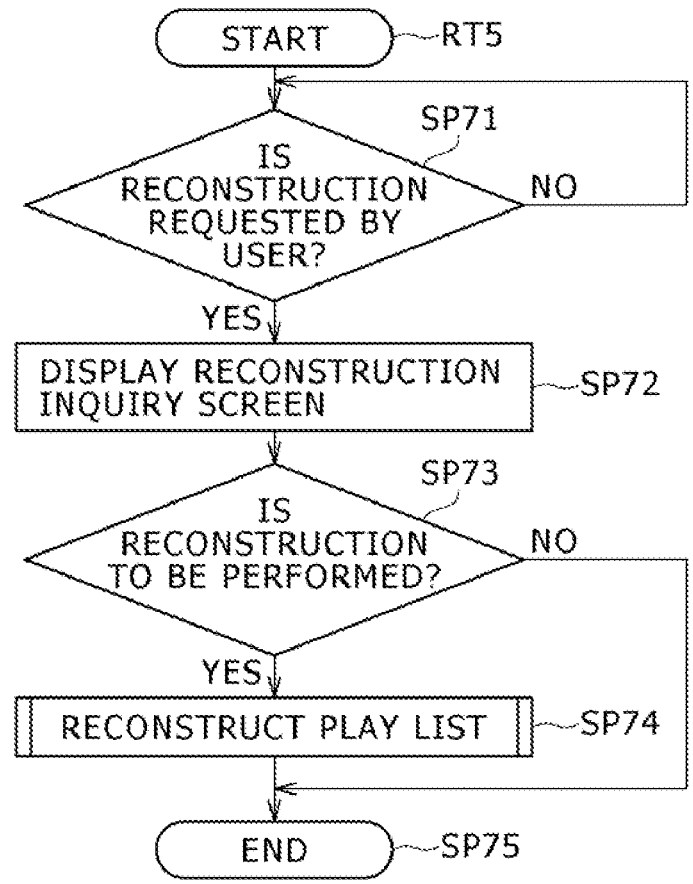
FIG. 21 is a flowchart of a user-triggered play list reconstruction process procedure.

A user-triggered play list reconstruction process procedure RT5 for reconstructing a play list PL1 in response to a request by the user as described above will next be described with reference to a flowchart of FIG. 21. In this case, starting the user-triggered play list reconstruction process procedure RT5, the request information generating unit 52 in step SP71 waits for the user to request the reconstruction of a play list PL1 via the operating unit 12. When the user requests the reconstruction of a play list PL1, the request information generating unit 52 accordingly generates user-triggered reconstruction requesting information, and then sends the user-triggered reconstruction requesting information to the play list reconstructing unit 50.

In step SP72, the play list reconstructing unit 50 determines which of the data reproduction history and the list use history to use for the reconstruction of the play list PL1, and determines the play list PL1 to be reconstructed. The play list reconstructing unit 50 notifies the determined play list PL1 to be reconstructed to the display controlling unit 17. The display controlling unit 17 thus displays the reconstruction inquiry screen 66 or 73 on the display unit 18 to inquire of the user whether to reconstruct the play list PL1.

As a result, the play list reconstructing unit 50 in step SP73 determines whether the user has consented to reconstruct the play list PL1. When the user has consented to reconstruct the play list PL1, the play list reconstructing unit 50 proceeds to next step SP74. Thus, in step SP74, the play list reconstructing unit 50 reconstructs the play list PL1 to be reconstructed into a play list having a play list generating rule corresponding to the apparatus use condition of the reproducing apparatus 10 which condition is indicated by the data reproduction history or the list use history. The play list reconstructing unit 50 then proceeds to next step SP75 to end the user-triggered play list reconstruction process procedure RT5. Incidentally, when the user has refused to reconstruct the play list PL1 in step SP74, the play list reconstructing unit 50 proceeds to step SP75 to end the user-triggered play list reconstruction process procedure RT5.

Figure 22:
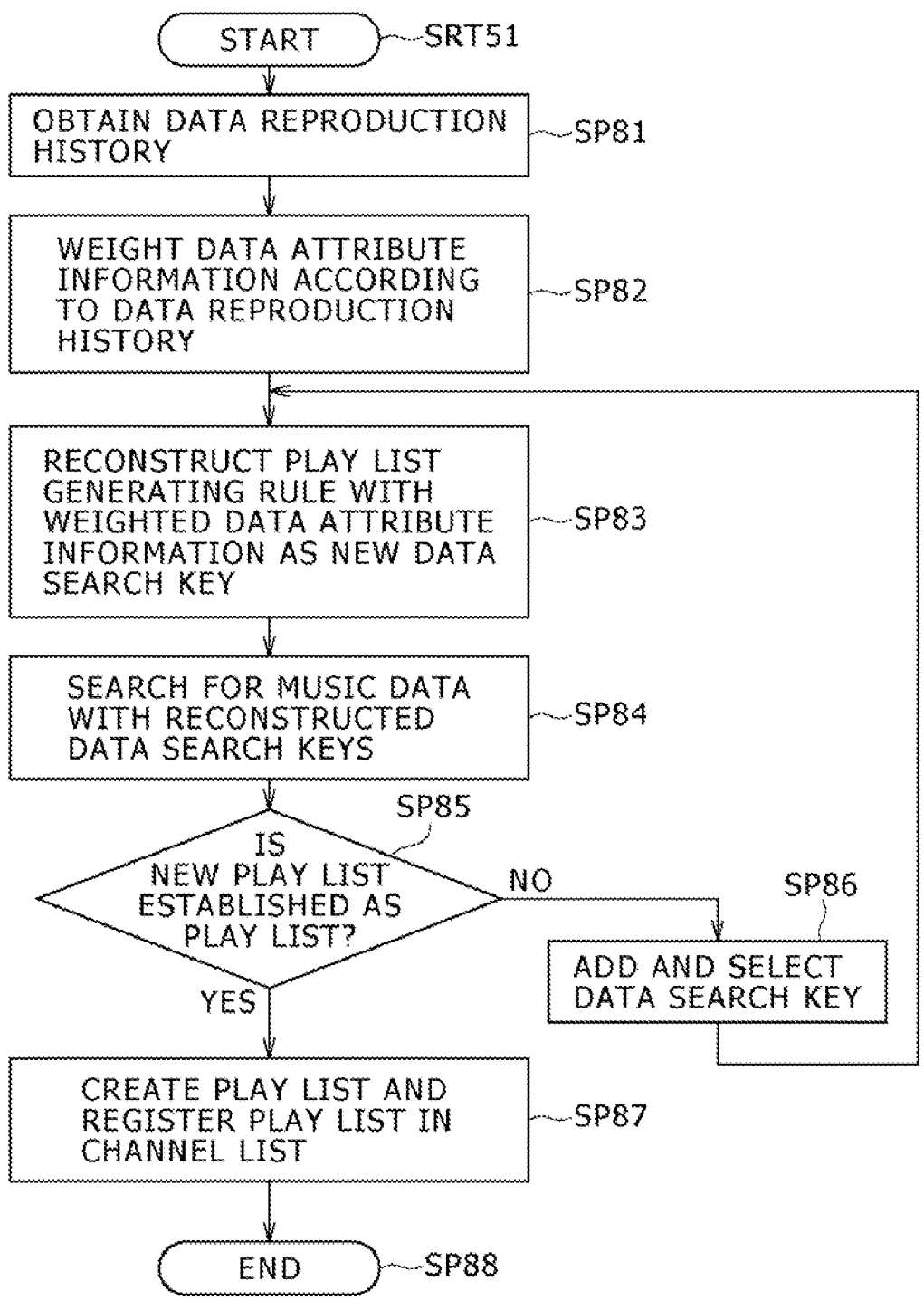
FIG. 22 is a flowchart of a second subroutine of the play list reconstruction process.
Figure 23:
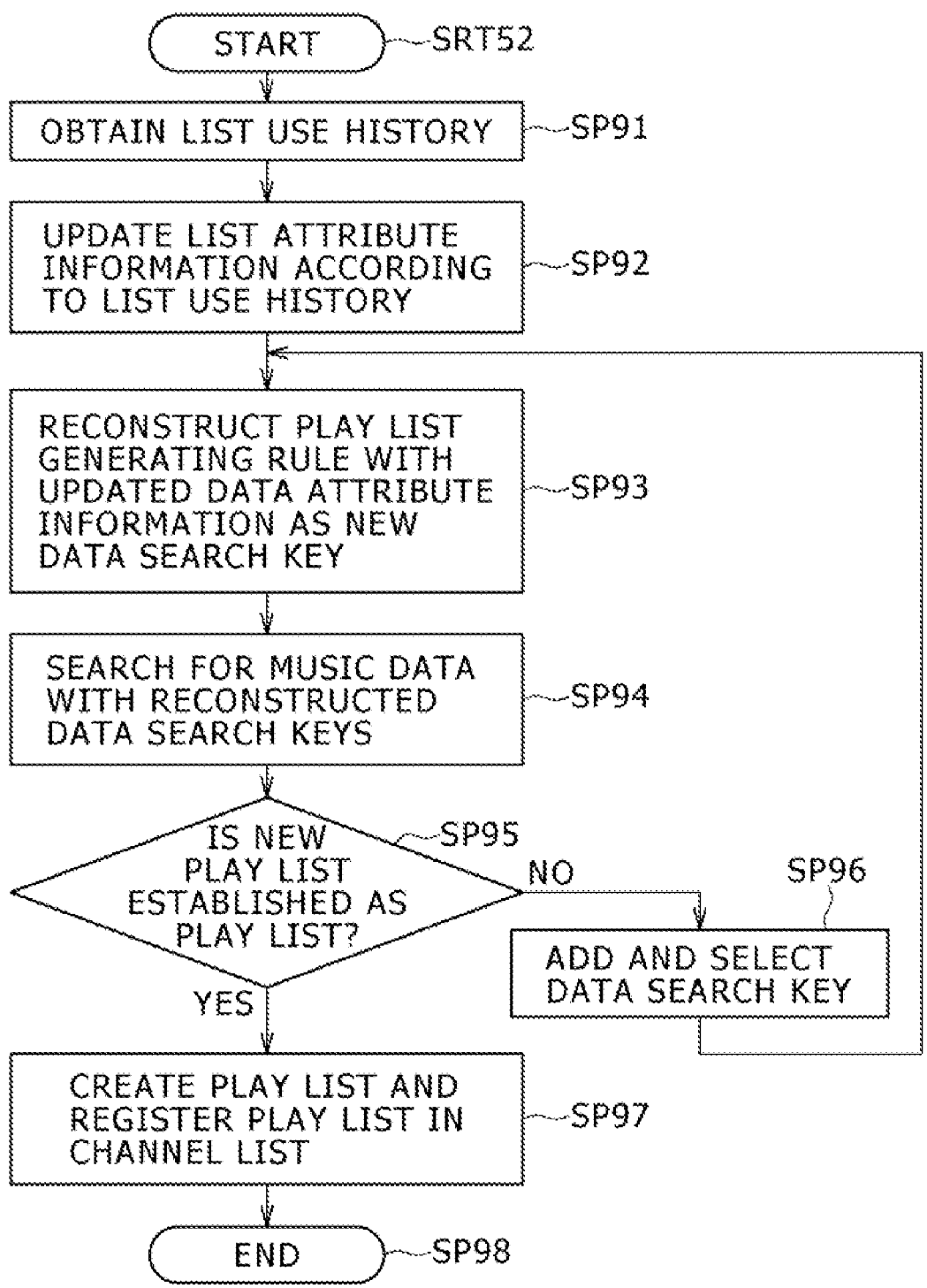
FIG. 23 is a flowchart of a third subroutine of the play list reconstruction process.

When the play list reconstructing unit 50 proceeds to step SP74, and actually reconstructs the play list PL1 using the data reproduction history, the play list reconstructing unit 50 accordingly starts a second subroutine SRT51 of the play list reconstruction process procedure RT5 which subroutine is represented in FIG. 22. When the play list reconstructing unit 50 reconstructs the play list PL1 using the list use history, the play list reconstructing unit 50 accordingly starts a third subroutine SRT52 of the play list reconstruction process procedure RT5 which subroutine is represented in FIG. 23.

Starting the second subroutine SRT51, the play list reconstructing unit 50 in step SP81 notifies the play list PL1 to be reconstructed to the data reproduction history obtaining unit 70 and the data attribute weighting unit 71. The data reproduction history obtaining unit 70 obtains the data attribute information DAT of all pieces of music data D1 registered in the play list PL1 (or play list PL2) to be reconstructed as the data reproduction histories of all the pieces of music data D1. The data reproduction history obtaining unit 70 then sends the obtained data attribute information DAT to the data attribute weighting unit 71.

In step SP82, the data attribute weighting unit 71 weights each piece of the data attribute information DAT of all the pieces of music data D1 registered in the play list PL1 (or the play list PL2) so as to add points to each piece of the data attribute information DAT according to the corresponding data reproduction history. The data attribute weighting unit 71 sets data attribute information DAT given weighting points the number of which is equal to or larger than a predetermined threshold value as a new data search key, and then sends the new data search key to the play list reconstructing unit 50. Thus, in step SP83, the play list reconstructing unit 50 reconstructs a play list generating rule used to generate the play list PL1 to be reconstructed into a play list generating rule to which the new data search key is added. The play list reconstructing unit 50 then proceeds to next step SP84.

In step SP84, the play list reconstructing unit 50 retrieves music data D1 matching the reconstructed play list generating rule from all the music data D1 stored in the content data storage unit 13. The play list reconstructing unit 50 then proceeds to next step SP85. In step SP85, the play list reconstructing unit 50 determines whether when a new play list is generated by registering therein the music data D1 retrieved according to the reconstructed play list generating rule, the new play list is established. When a negative result is obtained in step SP85, this for example indicates that a predetermined number of pieces or more of music data D1 are difficult to be retrieved according to the reconstructed play list generating rule. Thus, when the play list reconstructing unit 50 obtains such a negative result, the play list reconstructing unit 50 proceeds to next step SP86.

In step SP86, the play list reconstructing unit 50 requests a new data search key from the data attribute weighting unit 71. Consequently, the data attribute weighting unit 71 changes a criterion for adopting weighted data attribute information DAT as a data search key, selects a new data search key, and then sends the selected data search key to the play list reconstructing unit 50. Thus, in step SP83, the play list reconstructing unit 50 reconstructs the reconstructed play list generating rule again by adding the new data search key to the reconstructed play list generating rule. The play list reconstructing unit 50 thereafter performs the process of step SP84 again.

When a positive result is obtained in step SP85, this for example indicates that a predetermined number of pieces or more of music data D1 have been retrieved according to the reconstructed play list generating rule (or the play list generating rule reconstructed again). Thus, when the play list reconstructing unit 50 obtains such a positive result, the play list reconstructing unit 50 proceeds to next step SP87. In step SP87, the play list reconstructing unit 50 generates a new play list by registering therein the retrieved music data D1, and registers the generated play list in the channel list CL. The play list reconstructing unit 50 thereafter proceeds to step SP88. The play list reconstructing unit 50 thereby ends the second subroutine SRT51, and then proceeds to step SP75. Incidentally, when there are a plurality of play lists PL1 to be reconstructed, the play list reconstructing unit 50 in conjunction with the data reproduction history obtaining unit 70 and the data attribute weighting unit 71 repeatedly executes the second subroutine SRT51 a number of times which number is equal to the number of play lists PL1 to be reconstructed.

Starting the third subroutine SRT52, the play list reconstructing unit 50 in step SP91 notifies the play list PL1 to be reconstructed to the list use history obtaining unit 77. The list use history obtaining unit 77 thus reads the play list PL1 to be reconstructed from the play list storage unit 16 to obtain the list use history included in list attribute information LAT of the play list PL1, and sends the obtained list use history to the list attribute updating unit 78 together with the list attribute information LAT. Then, in step SP92, the list attribute updating unit 78 extracts, as new data search keys, words the number of which corresponds to the number of times of use indicated by the list use history from the list attribute information LAT. The list attribute updating unit 78 sends the extracted data search keys to the play list reconstructing unit 50.

In step SP93, the play list reconstructing unit 50 reconstructs a play list generating rule used to generate the play list PL1 to be reconstructed into a play list generating rule to which the new data search keys are added. The play list reconstructing unit 50 then proceeds to next step SP94. In step SP94, the play list reconstructing unit 50 retrieves music data D1 matching the reconstructed play list generating rule from all the music data D1 stored in the content data storage unit 13. The play list reconstructing unit 50 then proceeds to next step SP95.

In step SP95, the play list reconstructing unit 50 determines whether when a new play list is generated by registering therein the music data D1 retrieved according to the reconstructed play list generating rule, the new play list is established. When a negative result is obtained in step SP95, this for example indicates that a predetermined number of pieces or more of music data D1 are difficult to be retrieved according to the reconstructed play list generating rule. Thus, when the play list reconstructing unit 50 obtains such a negative result, the play list reconstructing unit 50 proceeds to next step SP96.

In step SP96, the play list reconstructing unit 50 requests a new data search key from the list attribute updating unit 78. Consequently, the list attribute updating unit 78 extracts a new word from the list attribute information LAT, and then sends the new word as a new data search key to the play list reconstructing unit 50. Thus, in step SP93, the play list reconstructing unit 50 reconstructs the reconstructed play list generating rule again by adding the new data search key to the reconstructed play list generating rule. The play list reconstructing unit 50 thereafter performs the process of step SP94 again.

When a positive result is obtained in step SP95, this for example indicates that a predetermined number of pieces or more of music data D1 have been retrieved according to the reconstructed play list generating rule (or the play list generating rule reconstructed again). Thus, when the play list reconstructing unit 50 obtains such a positive result, the play list reconstructing unit 50 proceeds to next step SP97. In step SP97, the play list reconstructing unit 50 generates a new play list by registering therein the retrieved music data D1, and registers the generated play list in the channel list CL. The play list reconstructing unit 50 thereafter proceeds to step SP98. The play list reconstructing unit 50 thereby ends the third subroutine SRT52, and then proceeds to step SP75. Incidentally, when there are a plurality of play lists PL1 to be reconstructed, the play list reconstructing unit 50 in conjunction with the list use history obtaining unit 77 and the list attribute updating unit 78 repeatedly executes the third subroutine SRT52 a number of times which number is equal to the number of play lists PL1 to be reconstructed.

Figure 24:
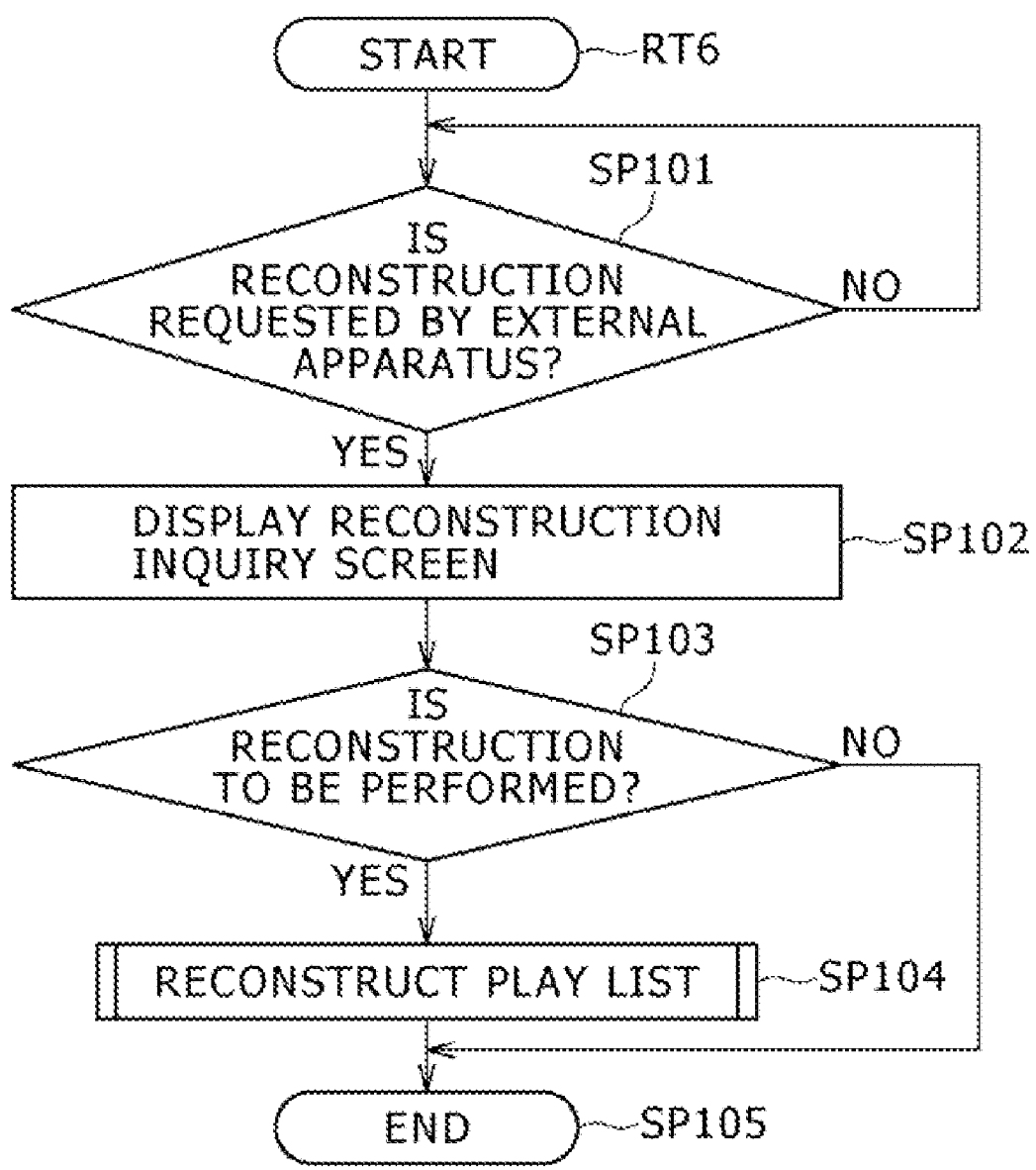
FIG. 24 is a flowchart of a network-triggered play list reconstruction process procedure.

A network-triggered play list reconstruction process procedure RT6 for reconstructing a play list PL1 in response to a request by the external apparatus 15 as described above will next be described with reference to a flowchart of FIG. 24. In this case, starting the network-triggered play list reconstruction process procedure RT6, the request information generating unit 52 in step SP101 waits for the external apparatus 15 on the network NT to request the reconstruction of a play list PL1. When the external apparatus 15 requests the reconstruction of a play list PL1, the request information generating unit 52 accordingly generates network-triggered reconstruction requesting information, and then sends the network-triggered reconstruction requesting information to the play list reconstructing unit 50.

In step SP102, the play list reconstructing unit 50 determines which of the data reproduction history and the list use history to use for the reconstruction of the play list PL1, and determines the play list PL1 to be reconstructed. The play list reconstructing unit 50 notifies the determined play list PL1 to be reconstructed to the display controlling unit 17. The display controlling unit 17 thus displays the reconstruction inquiry screen 81 or 83 on the display unit 18 to inquire of the user whether to reconstruct the play list PL1.

As a result, the play list reconstructing unit 50 in step SP103 determines whether the user has consented to reconstruct the play list PL1. When the user has consented to reconstruct the play list PL1, the play list reconstructing unit 50 proceeds to next step SP104. Thus, in step SP104, using a plurality of presented play lists or a presented music list indicating a plurality of pieces of presented music data presented by the external apparatus 15, the play list reconstructing unit 50 reconstructs the play list PL1 to be reconstructed into a play list having a play list generating rule corresponding to the apparatus use condition of the reproducing apparatus 10 which condition is indicated by the data reproduction history or the list use history. The play list reconstructing unit 50 then proceeds to next step SP105 to end the network-triggered play list reconstruction process procedure RT6. Incidentally, when the user has refused to reconstruct the play list PL1 in step SP104, the play list reconstructing unit 50 proceeds to step SP105 to end the network-triggered play list reconstruction process procedure RT6.

Figure 25:
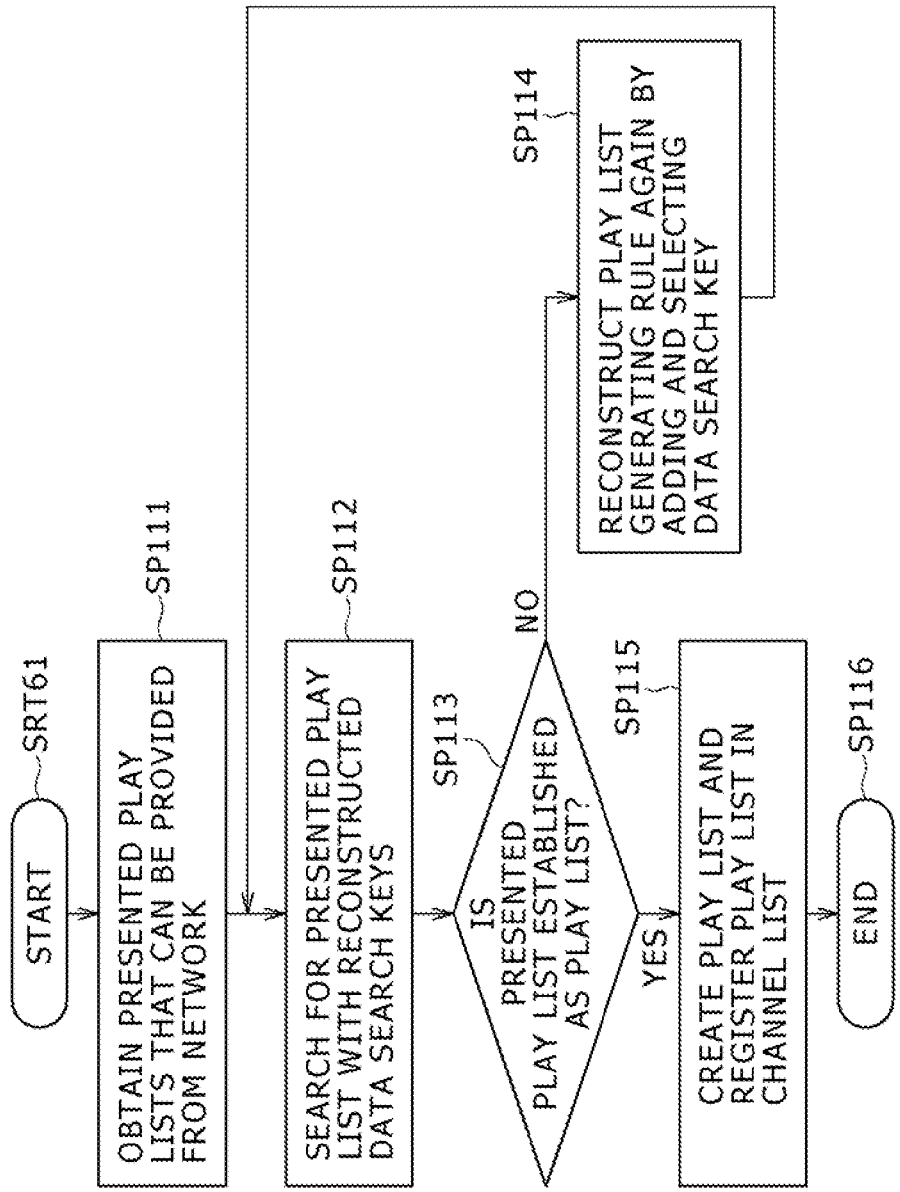
FIG. 25 is a flowchart of a fourth subroutine of the play list reconstruction process.
Figure 26:
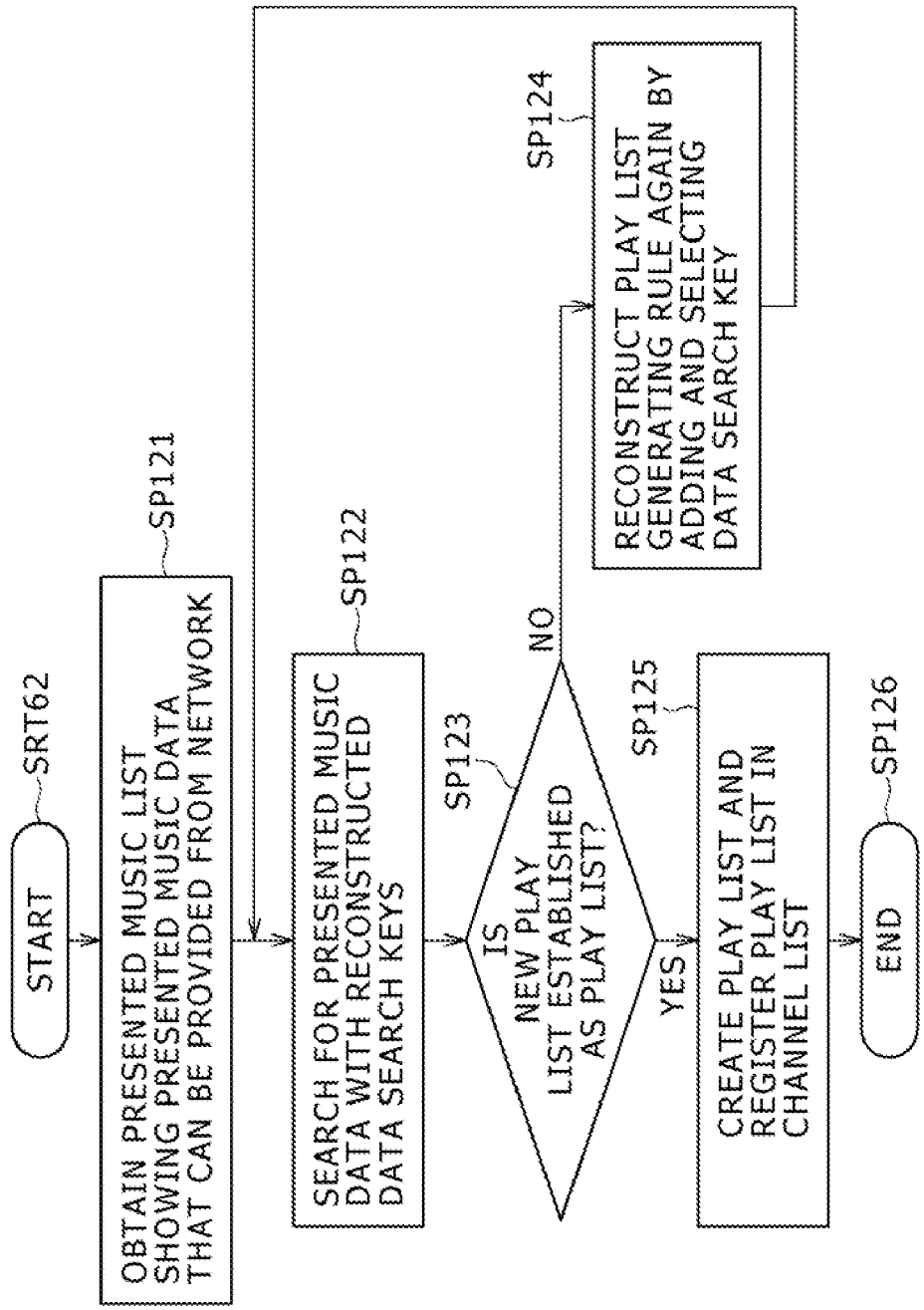
FIG. 26 is a flowchart of a fifth subroutine of the play list reconstruction process.

When the play list reconstructing unit 50 proceeds to step SP104, and actually reconstructs the play list PL1 using the plurality of play lists presented from the external apparatus 15, the play list reconstructing unit 50 accordingly starts a fourth subroutine SRT61 of the play list reconstruction process procedure RT6 which subroutine is represented in FIG. 25. When the play list reconstructing unit 50 reconstructs the play list PL1 using the presented music list presented from the external apparatus 15, the play list reconstructing unit 50 accordingly starts a fifth subroutine SRT62 of the play list reconstruction process procedure RT6 which subroutine is represented in FIG. 26.

Starting the fourth subroutine SRT61, the play list reconstructing unit 50 in step SP111 reconstructs a play list generating rule when the play list PL1 to be reconstructed was generated into a new play list generating rule reflecting the data reproduction history or the list use history, as in the above. In this state, the play list reconstructing unit 50 obtains the plurality of presented play lists from the external apparatus 15 on the network NT. The play list reconstructing unit 50 then proceeds to next step SP112. In step SP112, according to the reconstructed play list generating rule, the play list reconstructing unit 50 compares a plurality of reconstructed data search keys with list attribute information LAT included in the presented play lists. The play list reconstructing unit 50 thereby retrieves a presented play list having list attribute information LAT matching the reconstructed play list generating rule. The play list reconstructing unit 50 then proceeds to next step SP113.

In step SP113, the play list reconstructing unit 50 determines whether the presented play list retrieved according to the reconstructed play list generating rule is established as a new play list. When a negative result is obtained in step SP113, this for example indicates that music data D1 distributed as pay music data is registered in the retrieved presented play list, or that music data D1 that are difficult to be surely received in a communication band used by the communicating unit 14 (that is, music data D1 that is a large amount of data and whose music is highly likely to be interrupted during streaming reproduction) is registered in the retrieved presented play list. Thus, when the play list reconstructing unit 50 obtains such a negative result, the play list reconstructing unit 50 proceeds to step SP114.

In step SP114, the play list reconstructing unit 50 requests a new data search key from the data attribute weighting unit 71 or the list attribute updating unit 78. When the play list reconstructing unit 50 is consequently supplied with a newly selected data search key from the data attribute weighting unit 71 or the list attribute updating unit 78, the play list reconstructing unit 50 reconstructs the reconstructed play list generating rule again by adding the newly selected data search key to the reconstructed play list generating rule. The play list reconstructing unit 50 thereafter returns to step SP112. In step SP112, the play list reconstructing unit 50 retrieves a presented play list again according to the play list generating rule reconstructed again.

When a positive result is obtained in step SP113, this for example indicates that music data D1 that is distributed as free music data and which can be surely received even in the communication band used by the communicating unit 14 (that is, music data D1 that has an amount of data suitable for the communication band and whose music can be surely reproduced by streaming reproduction without being interrupted during the streaming reproduction) is registered in the presented play list retrieved according to the reconstructed play list generating rule (or the play list generating rule reconstructed again). Thus, when the play list reconstructing unit 50 obtains such a positive result, the play list reconstructing unit 50 proceeds to next step SP115.

In step SP115, when the same music data D1 as music data D1 stored in the content data storage unit 13 of the reproducing apparatus 10 is registered in the retrieved presented play list, the play list reconstructing unit 50 converts the presented play list into a new play list by registering the same music data D1 stored in the content data storage unit 13 in place of the registered music data D1. The play list reconstructing unit 50 registers the new play list in the channel list CL. When different music data D1 from the music data D1 stored in the content data storage unit 13 is registered in the retrieved presented play list, the play list reconstructing unit 50 sets the presented play list as a new play list as it is, and registers the new play list in the channel list CL.

After thus registering the new play list (that is, the presented play list) in the channel list CL, the play list reconstructing unit 50 proceeds to step SP116. The play list reconstructing unit 50 thereby ends the fourth subroutine SRT61, and then proceeds to step SP105. Incidentally, when there are a plurality of play lists PL1 to be reconstructed, the play list reconstructing unit 50 repeatedly executes the fourth subroutine SRT61 a number of times which number is equal to the number of play lists PL1 to be reconstructed.

Starting the fifth subroutine SRT62, the play list reconstructing unit 50 in step SP121 reconstructs a play list generating rule when the play list PL1 to be reconstructed was generated into a new play list generating rule reflecting the data reproduction history or the list use history, as in the above. In this state, the play list reconstructing unit 50 obtains the presented music list indicating a plurality of pieces of presented music data from the external apparatus 15 on the network NT. The play list reconstructing unit 50 then proceeds to next step SP122. In step SP122, according to the reconstructed play list generating rule, the play list reconstructing unit 50 compares a plurality of reconstructed data search keys with all data attribute information DAT in the presented music list. The play list reconstructing unit 50 thereby retrieves a plurality of pieces of presented music data having data attribute information DAT matching the reconstructed play list generating rule. The play list reconstructing unit 50 then proceeds to next step SP123.

In step SP123, the play list reconstructing unit 50 determines whether when a new play list is generated by registering therein the presented music data retrieved according to the reconstructed play list generating rule, the new play list is established. When a negative result is obtained in step SP123, this for example indicates that presented music data distributed as pay music data is retrieved according to the reconstructed play list generating rule, or that presented music data that are difficult to be surely received in a communication band used by the communicating unit 14 (that is, presented music data that is a large amount of data and whose music is highly likely to be interrupted during streaming reproduction) is retrieved according to the reconstructed play list generating rule, and that a predetermined number of pieces or more of presented music data that are distributed free of charge for streaming reproduction and can be surely received even in the communication band used by the communicating unit 14 are difficult to be retrieved. Thus, when the play list reconstructing unit 50 obtains such a negative result, the play list reconstructing unit 50 proceeds to step SP124.

In step SP124, the play list reconstructing unit 50 requests a new data search key from the data attribute weighting unit 71 or the list attribute updating unit 78. When the play list reconstructing unit 50 is consequently supplied with a newly selected data search key from the data attribute weighting unit 71 or the list attribute updating unit 78, the play list reconstructing unit 50 reconstructs the reconstructed play list generating rule again by adding the newly selected data search key to the reconstructed play list generating rule. The play list reconstructing unit 50 thereafter returns to step SP122. In step SP122, the play list reconstructing unit 50 retrieves presented music data again on the basis of the presented music list according to the play list generating rule reconstructed again.

When a positive result is obtained in step SP123, this for example indicates that a predetermined number of pieces or more of presented music data that are distributed free of charge for streaming reproduction and can be surely received even in the communication band used by the communicating unit 14 have been retrieved according to the reconstructed play list generating rule (or the play list generating rule reconstructed again). Thus, when the play list reconstructing unit 50 obtains such a positive result, the play list reconstructing unit 50 proceeds to next step SP125. In step SP125, when the retrieved presented music data includes the same presented music data as music data D1 stored in the content data storage unit 13 of the reproducing apparatus 10, the play list reconstructing unit 50 changes the same presented music data as the music data D1 stored in the content data storage unit 13 to the music data D1 stored in the content data storage unit 13. The play list reconstructing unit 50 generates a new play list by registering therein the music data D1 together with the other presented music data. When the retrieved presented music data does not include the same presented music data as music data D1 stored in the content data storage unit 13, the play list reconstructing unit 50 generates a new play list by registering therein the retrieved presented music data as it is.

After thus generating the new play list, the play list reconstructing unit 50 registers the generated new play list in the channel list CL. The play list reconstructing unit 50 then proceeds to step SP126. The play list reconstructing unit 50 thereby ends the fifth subroutine SRT62, and then proceeds to step SP105. Incidentally, when there are a plurality of play lists PL1 to be reconstructed, the play list reconstructing unit 50 repeatedly executes the fifth subroutine SRT62 a number of times which number is equal to the number of play lists PL1 to be reconstructed.

Incidentally, in the first embodiment, the play list reconstructing unit 50 inquires of the user about whether to reconstruct a play list PL1, and when the user desires the reconstruction (that is, consents to the reconstruction) as a result, the play list reconstructing unit 50 reconstructs the play list PL1 to be reconstructed. Thus, when the play list reconstructing unit 50 has reconstructed the play list PL1 being used for the reproduction of music data D1, the play list reconstructing unit 50 notifies the reproducing unit 11 that the play list reconstructing unit 50 has reconstructed the play list PL1 to make the reproducing unit 11 change the play list PL1 used for the reproduction of music data D1 from the play list PL1 before the reconstruction to the new play list PL1 after the reconstruction. Thus, when the play list reconstructing unit 50 has reconstructed the play list PL1 being used for the reproduction of music data D1, the play list PL1 used for the reproduction of music data D1 is promptly changed from the play list PL1 before the reconstruction to the play list PL1 after the reconstruction.

(1-3) Operation and Effect

In the above configuration, the reproducing apparatus 10 stores a plurality of pieces of music data D1 in the content data storage unit 13 and stores a plurality of play lists PL1 each having play list generating rule information and the content identifying information MID of a plurality of pieces of music data D1 in the play list storage unit 16, and assigns a part of the plurality of play lists PL1 to channels for play list selection. When starting the list use reproducing function, the reproducing apparatus 10 sequentially reproduces music data D1 according to a play list PL1 selected as a channel by the user in the same manner as the user selects a radio broadcasting station or a television broadcasting station, and thus allows the user to listen to the music.

When a season changes in a state of the reproducing apparatus 10 being thus used, the reproducing apparatus 10 retrieves a play list PL1 related to a first season before the change which play list has play list generating rule information corresponding to the first season before the change (that is, the play list PL1 generated according to a play list generating rule corresponding to the first season before the change), the play list PL1 being assigned to a channel, from among the plurality of play lists PL1 stored in the play list storage unit 16 according to the change in season. In addition, the reproducing apparatus 10 retrieves a play list PL1 related to a second season after the change which play list has play list generating rule information corresponding to the second season after the change (that is, the play list PL1 generated according to a play list generating rule corresponding to the second season after the change), the play list PL1 not being assigned to a channel, from among the plurality of play lists PL1 stored in the play list storage unit 16.

Then, the reproducing apparatus 10 assigns the channel to which the play list PL1 related to the first season before the change has been assigned the play list PL1 related to the second season after the change in place of the play list PL1 related to the first season before the change. The reproducing apparatus 10 thereby makes the play list PL1 related to the second season after the change selectable as the channel in place of the play list PL1 related to the first season before the change that has been selectable as the channel up to this point in time. Thus, according to the apparatus use condition indicating for example a use extending beyond a change of seasons, the reproducing apparatus 10 reconstructs the play list PL1 related to the first season before the change into the play list PL1 related to the second season after the change.

In addition, when the user requests the reconstruction of a play list PL1, the reproducing apparatus 10 reconstructs the play list generating rule of the play list PL1 to be reconstructed which play list PL1 has already been assigned to a channel according to a corresponding data reproduction history or a corresponding list use history. Then, the reproducing apparatus 10 retrieves a plurality of pieces of music data D1 matching the reconstructed play list generating rule from among the plurality of pieces of music data D1 stored in the content data storage unit 13, and generates a new play list by registering therein the plurality of pieces of music data D1 that have been retrieved.

Thus generating the new play list, the reproducing apparatus 10 assigns the channel to which the play list PL1 to be reconstructed has been assigned the newly generated play list in place of the play list PL1 to be reconstructed. The reproducing apparatus 10 thereby makes the newly generated play list selectable as the channel in place of the play list PL1 to be reconstructed that has been selectable as the channel up to this point in time. The reproducing apparatus 10 thus reconstructs the play list PL1 to be reconstructed into the new play list having the play list generating rule corresponding to the apparatus use condition indicated by the data reproduction history or the list use history (that is, the reconstructed play list generating rule).

Further, when the external apparatus 15 on the network NT requests the reconstruction of a play list PL1, the reproducing apparatus 10 reconstructs the play list generating rule of the play list PL1 to be reconstructed which play list PL1 has already been assigned to a channel according to a corresponding data reproduction history or a corresponding list use history. Then, the reproducing apparatus 10 retrieves one presented play list having a play list generating rule matching the reconstructed play list generating rule (that is, the presented play list generated according to a play list generating rule matching the reconstructed play list generating rule) from among a plurality of presented play lists presented from the external apparatus 15.

Thus retrieving the presented play list, the reproducing apparatus 10 assigns the channel to which the play list PL1 to be reconstructed has been assigned the retrieved presented play list in place of the play list PL1 to be reconstructed. The reproducing apparatus 10 thereby makes the retrieved presented play list selectable as the channel in place of the play list PL1 to be reconstructed that has been selectable as the channel up to this point in time. The reproducing apparatus 10 thus reconstructs the play list PL1 to be reconstructed into the presented play list having the play list generating rule corresponding to the apparatus use condition indicated by the data reproduction history or the list use history.

Further, when the external apparatus 15 on the network NT requests the reconstruction of a play list PL1, the reproducing apparatus 10 reconstructs the play list generating rule of the play list PL1 to be reconstructed which play list PL1 has already been assigned to a channel according to a corresponding data reproduction history or a corresponding list use history. Then, the reproducing apparatus 10 retrieves a plurality of pieces of presented music data having data attribute information DAT matching the reconstructed play list generating rule on the basis of a presented music list presented from the external apparatus 15, and generates a new play list by registering therein the retrieved presented music data.

Thus generating the new play list, the reproducing apparatus 10 assigns the channel to which the play list PL1 to be reconstructed has been assigned the newly generated play list in place of the play list PL1 to be reconstructed. The reproducing apparatus 10 thereby makes the newly generated play list selectable as the channel in place of the play list PL1 to be reconstructed that has been selectable as the channel up to this point in time. The reproducing apparatus 10 thus reconstructs the play list PL1 to be reconstructed into the new play list having the play list generating rule corresponding to the apparatus use condition indicated by the data reproduction history or the list use history (that is, the reconstructed play list generating rule).

Thus, when a season has changed, the reproducing apparatus 10 can prepare a play list PL1 in which music data D1 of a plurality of pieces of music matching a season to which music the user would desire to listen is registered according to the change in season. In addition, the reproducing apparatus 10 reconstructs the play list generating rule already used to generate a play list PL1 according to the apparatus use condition indicated by the data reproduction history or the list use history, and searches music data D1 (that is, the music data D1 stored and retained in the reproducing apparatus 10) according to the reconstructed play list generating rule. The reproducing apparatus 10 can thus prepare a new play list in which the music data D1 of music to which the user has not listened very often is excluded as much as possible and music data D1 of music that the user has listened to relatively often is registered more.

Further, the reproducing apparatus 10 reconstructs the play list generating rule already used to generate a play list PL1 according to the apparatus use condition indicated by the data reproduction history or the list use history, and searches presented play lists in which a plurality of pieces of music data D1 stored and retained by the external apparatus 15 are registered or a plurality of pieces of music data that are stored and retained by the external apparatus 15 and can be provided (that is, presented music data), according to the reconstructed play list generating rule. The reproducing apparatus 10 can thus prepare a new play list in which the music data D1 of music that is as close to preferences of the user as possible, an impression of the music being similar to that of the music to which the user has listened relatively often, is registered more from among pieces of music data D1 of music that the user has not listened to yet, for example.

According to the above constitution, in response to a request to reconstruct a play list PL1, the play list PL1 to be reconstructed is reconstructed into a play list having a play list generating rule corresponding to a apparatus use condition. Thereby the reproducing apparatus 10 can prepare a new play list in which a plurality of pieces of music data D1 considered to be desired by the user are registered according to the play list generating rule reflecting the apparatus use condition. The reproducing apparatus 10 can thus provide music data D1 considered to be desired by the user according to the new play list.

In addition, when the reproducing apparatus 10 reconstructs a play list PL1 related to a first season into a play list PL1 related to a second season, the reproducing apparatus 10 allows the user to listen to a plurality of pieces of music matching the present season according to the play list PL1 related to the second season, and can change the music to which the user is made to listen according to a change of the seasons. Further, the reproducing apparatus 10 can store music data D1 in the content data storage unit 13 as appropriate, and thus increase music data D1 stored and retained in the content data storage unit 13. Therefore, when the reproducing apparatus 10 reconstructs a play list PL1 into a new play list in response to a request of the user, the reproducing apparatus 10 allows the user to listen more to music whose impression is preferred by the user (or whose impression is close to preferences of the user) or music by a favorite artist, in a favorite genre and the like according to the new play list.

Further, when the reproducing apparatus 10 reconstructs a play list PL1 into a new play list in response to a request of the external apparatus 15, the reproducing apparatus 10 introduces the user to a plurality of pieces of music whose impression is preferred by the user (or whose impression is close to preferences of the user) or allows the user to listen to a plurality of pieces of music by a favorite artist, in a favorite genre and the like to which music the user has not listened up to this time, according to the new play list. Incidentally, when the reconstruction of a play list PL1 is requested, the reproducing apparatus 10 inquires of the user about whether to reconstruct the play list PL1. Thus, the reproducing apparatus 10 can prevent the play list PL1 from being reconstructed into a new play list by accident. As a result, the reproducing apparatus 10 can prevent play lists PL1 and PL2 of compositions preferred by the user from being unable to be used.

(1-4) Other Embodiments

Incidentally, in the first embodiment described above, when the external apparatus 15 on the network NT requests the reconstruction of a play list PL1, the play list reconstructing unit 50 reconstructs the play list PL1 to be reconstructed into a new play list using a plurality of presented play lists or a presented music list presented from the external apparatus 15. However, the embodiment of the present invention is not limited to this. When the external apparatus 15 on the network NT requests the reconstruction of a play list PL1, the play list reconstructing unit 50 may reconstruct the play list PL1 to be reconstructed into a new play list using a plurality of pieces of music data D1 stored in the content data storage unit 13 without using the plurality of presented play lists or the presented music list, as in the case where the user requests the reconstruction.

In addition, in the first embodiment described above, play lists PL1 assigned to channels and set to be usable for reproduction of music data D1 are set as objects for reconstruction. However, the embodiment of the present invention is not limited to this. Regardless of whether the play lists PL1 are set to be usable for reproduction of music data D1, all the play lists PL1 assigned to channels may be set as objects for reconstruction, and even play lists PL1 not assigned to channels may be set as objects for reconstruction. Further, among the play lists PL1 assigned to channels and set to be usable for reproduction of music data D1, play lists PL1 that are not to be reconstructed may be set. Thereby play lists PL1 desired to be used as fixed play lists can be used as they are without being reconstructed.

Further, in the first embodiment described above, when a change of seasons occurs, the play list reconstructing unit 50 retrieves a play list PL1 related to the first season before the change and a play list PL1 related to the second season after the change from among the plurality of play lists PL1 stored in the play list storage unit 16. However, the embodiment of the present invention is not limited to this. Play lists PL1 related to a plurality of seasons may be associated with one channel in advance so that the play list reconstructing unit 50 simply changes the play list PL1 assigned to the channel according to a change of seasons. Thus the play list reconstructing unit 50 does not need to perform a search using a list search key when reconstructing a play list PL1 to be reconstructed into a new play list PL1 according to a change of seasons. A processing load can therefore be reduced.

Further, in the first embodiment described above, the play list reconstructing unit 50 reconstructs a play list PL1 to be reconstructed into a new play list PL1 according to a change of seasons. However, the embodiment of the present invention is not limited to this. A plurality of pieces of music data D1 may be collected according to a play list generating rule using a data search key suggestive of each of time periods such as morning, midday, evening, night, midnight and the like (this data search key is impression value information having a certain range, a word suggestive of a time period, or the like) so as to generate a plurality of play lists PL1 related to these time periods. The play list reconstructing unit 50 may reconstruct one of the play lists PL1 into a play list PL1 related to a time period during which the reproducing apparatus 10 is used relatively often, for example, (that is, into the play list PL1 having a play list generating rule corresponding to a apparatus use time period as the apparatus use condition of the reproducing apparatus 10) by simply changing the play list PL1 assigned to a channel.

In addition, the play list reconstructing unit 50 may simply change the play list PL1 assigned to the channel when for example the apparatus use time period in which the reproducing apparatus 10 is used changes from a first apparatus use time period to a second apparatus use time period, and thus reconstruct a play list PL1 related to the first apparatus use time period (that is, the play list PL1 having a play list generating rule corresponding to the first apparatus use time period) into a play list PL1 related to the second apparatus use time period (that is, the play list PL1 having a play list generating rule corresponding to the second apparatus use time period).

Further, in the first embodiment described above, the play list reconstructing unit 50 reconstructs a play list PL1 to be reconstructed into a new play list PL1 according to a change of seasons. However, the embodiment of the present invention is not limited to this. A plurality of pieces of music data D1 may be collected according to a play list generating rule using a data search key suggestive of each of events such as Christmas, a New Year, graduation, an athletic meet and the like so as to generate a plurality of play lists PL1 related to these events. The play list reconstructing unit 50 may reconstruct one of the play lists PL1 into a play list PL1 related to a apparatus use period in which the reproducing apparatus 10 is used (that is, a season in which an event takes place), for example, (that is, into the play list PL1 having a play list generating rule corresponding to a apparatus use period as the apparatus use condition of the reproducing apparatus 10) by simply changing the play list PL1 assigned to a channel.

In addition, in the reproducing apparatus 10, the request information generating unit 52 may generate reconstruction requesting information when detecting that the apparatus use period in which the reproducing apparatus 10 is used has changed from a first apparatus use period to a second apparatus use period according to a result of clocking by the clocking unit 51, and the play list reconstructing unit 50 may simply change the play list PL1 assigned to the channel according to the reconstruction requesting information so as to reconstruct the play list PL1 related to the first apparatus use period (that is, the play list PL1 having a play list generating rule corresponding to the first apparatus use period) into a play list PL1 related to the second apparatus use period (that is, the play list PL1 having a play list generating rule corresponding to the second apparatus use period).

Further, in the first embodiment described above, the play list reconstructing unit 50 reconstructs a play list PL1 to be reconstructed into a new play list PL1 according to a change of seasons. However, the embodiment of the present invention is not limited to this. For example a reproducing apparatus according to the present invention may be applied to a reproducing apparatus 10 that can be carried such as a portable type reproducing apparatus 10, and a plurality of pieces of music data D1 may be collected according to a play list generating rule using a data search key suggestive of each of apparatus use places such as a living room, a bedroom, an office, the inside of a train car and the like so as to generate a plurality of play lists PL1 related to these apparatus use places. The play list reconstructing unit 50 may reconstruct one of the play lists PL1 into a play list PL1 related to a apparatus use place in which the reproducing apparatus 10 is used, for example, (that is, into the play list PL1 having a play list generating rule corresponding to a apparatus use place as the apparatus use condition of the reproducing apparatus 10) by simply changing the play list PL1 assigned to a channel.

The reproducing apparatus 10 of such a configuration may allow the user to specify and input the apparatus use place as the apparatus use condition via the operating unit 12, or may detect the apparatus use place as the apparatus use condition using a GPS (Global Positioning System) or a positioning system using base stations capable of communication. In the reproducing apparatus 10, the request information generating unit 52 may generate reconstruction requesting information when detecting that the apparatus use place in which the reproducing apparatus 10 is used has changed from a first apparatus use place to a second apparatus use place using the input from the operating unit 12 or the positioning system, and the play list reconstructing unit 50 may simply change the play list PL1 assigned to the channel according to the reconstruction requesting information so as to reconstruct the play list PL1 related to the first apparatus use place (that is, the play list PL1 having a play list generating rule corresponding to the first apparatus use place as the apparatus use condition of the reproducing apparatus 10) into a play list PL1 related to the second apparatus use place (that is, the play list PL1 having a play list generating rule corresponding to the second apparatus use place as the apparatus use condition of the reproducing apparatus 10).

In the reproducing apparatus 10, when the positioning system is used, for example, a moving speed of the reproducing apparatus 10 (that is, a moving speed when the user uses the reproducing apparatus 10 while carrying the reproducing apparatus 10), a surrounding environment in which the reproducing apparatus 10 is used (an event venue, a park, a beach or the like), or the like may be detected, and according to a result of the detection, the play list reconstructing unit 50 may reconstruct one of the play lists PL1 into a play list PL1 having a play list generating rule corresponding to the apparatus use condition of the reproducing apparatus 10 such as the moving speed, the surrounding environment or the like. That is, in the reproducing apparatus 10, the play list reconstructing unit 50 may reconstruct one of the play lists PL1 into for example a play list PL1 in which music data D1 of music at a relatively fast tempo is registered when the moving speed is relatively high or a play list PL1 in which music data D1 of music at a relatively slow tempo is registered when the moving speed is relatively slow, or into a play list PL1 in which music data D1 of relatively cheerful music is registered when the surrounding environment is relatively lively or a play list PL1 in which music data D1 of relatively quiet music is registered when the surrounding environment is relatively quiet.

Further, in the first embodiment described above, the play list reconstructing unit 50 reconstructs a play list PL1 to be reconstructed into a new play list PL1, the reconstruction being triggered by a change of seasons, a request from the user, and a request from the external apparatus 15 on the network NT. However, the embodiment of the present invention is not limited to this. The play list reconstructing unit 50 may reconstruct a play list PL1 with the reproduction of music data D1 by the reproducing apparatus 10 using the play list PL1 as a trigger. Referring to a flowchart of FIG. 27, description will be made of a reproduction-triggered play list reconstruction process procedure RT7 in which the play list reconstructing unit 50 reconstructs a play list PL1 with the reproduction of music data D1 using the play list PL1 as a trigger when the reproducing apparatus 10 retains a plurality of play lists PL1 in which pluralities of pieces of music data D1 suggestive of such as morning, midday, evening, night, midnight and the like, respectively, as described above are registered, for example.

In this case, the reproducing apparatus 10 stores, in the play list storage unit 16, a play list PL1 in which a plurality of pieces of music data D1 suggestive of a morning time period are registered (this play list PL1 will hereinafter be referred to as a play list for morning), a play list PL1 in which a plurality of pieces of music data D1 suggestive of a midday time period are registered (this play list PL1 will hereinafter be referred to as a play list for midday), a play list PL1 in which a plurality of pieces of music data D1 suggestive of an evening time period are registered (this play list PL1 will hereinafter be referred to as a play list for evening), a play list PL1 in which a plurality of pieces of music data D1 suggestive of a night time period are registered (this play list PL1 will hereinafter be referred to as a play list for night), and a play list PL1 in which a plurality of pieces of music data D1 suggestive of a midnight time period are registered (this play list PL1 will hereinafter be referred to as a play list for midnight).

In addition, the reproducing apparatus 10 stores, in the play list storage unit 16, time period information indicating time periods of morning, midday, evening, night, and midnight (for example time periods such as a morning time period from five o'clock to 10:59:59, a midday time period from 11 o'clock to 15:59:59, an evening time period from 16 o'clock to 18:59:59, a night time period from 19 o'clock to 20:59:59, and a midnight time period from 21 o'clock to 4:59:59) in correspondence with the play list PL1 for morning, the play list PL1 for midday, the play list PL1 for evening, the play list PL1 for night, and the play list PL1 for midnight.

Further, the reproducing apparatus 10 associates all of the play list PL1 for morning, the play list PL1 for midday, the play list PL1 for evening, the play list PL1 for night, and the play list PL1 for midnight to a specific channel. For example, when the list use reproducing function is stopped, the reproducing apparatus 10 does not assign the specific channel any of the play list PL1 for morning, the play list PL1 for midday, the play list PL1 for evening, the play list PL1 for night, and the play list PL1 for midnight. While the list use reproducing function is performed, the reproducing apparatus 10 performs switching as appropriate to assign the specific channel one of the play list PL1 for morning, the play list PL1 for midday, the play list PL1 for evening, the play list PL1 for night, and the play list PL1 for midnight.

Figure 27:
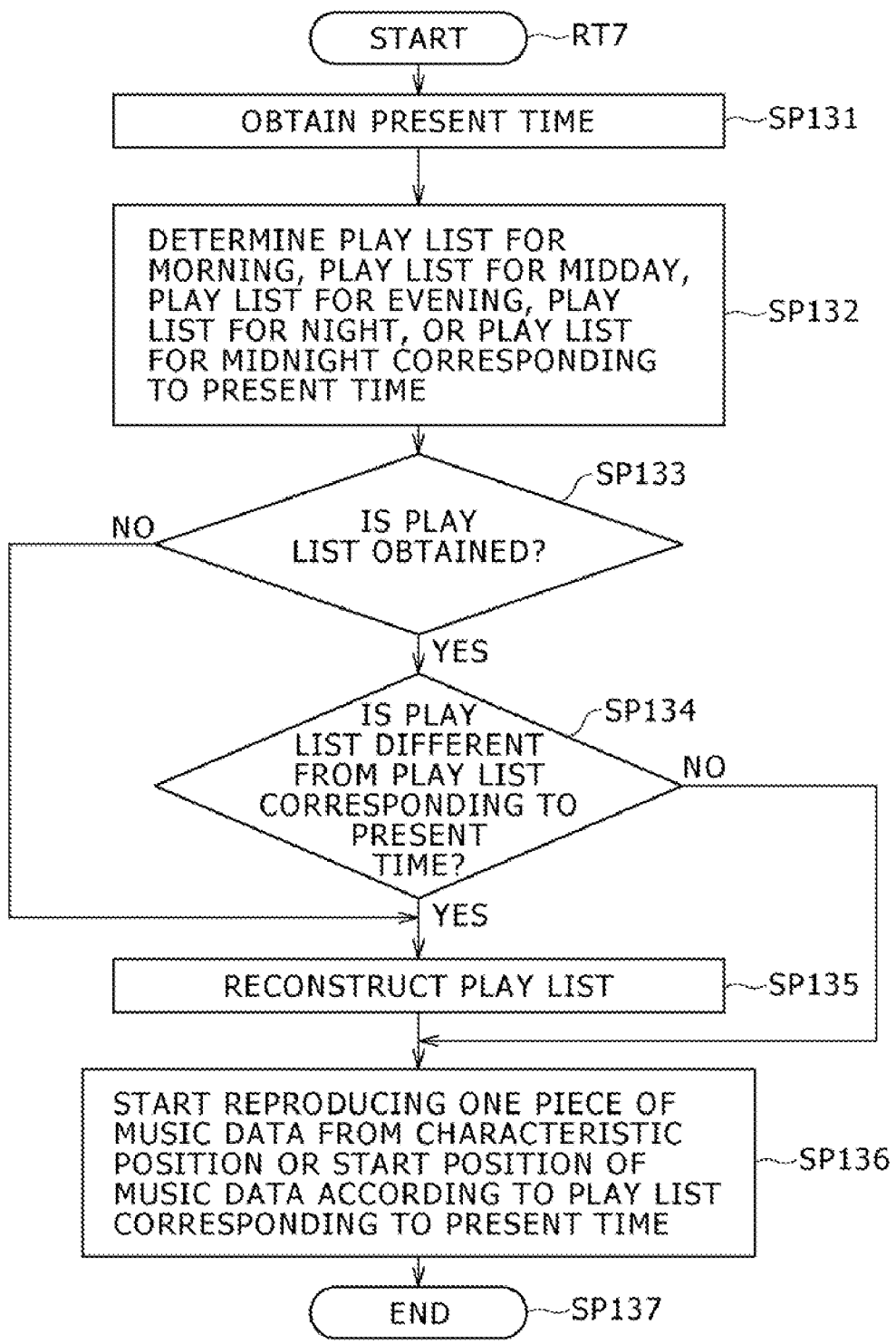
FIG. 27 is a flowchart of a reproduction-triggered play list reconstruction process procedure.

When the user selects the specific channel associated with the play list PL1 for morning, the play list PL1 for midday, the play list PL1 for evening, the play list PL1 for night, and the play list PL1 for midnight while the list use reproducing function is performed, the request information generating unit 52 starts the reproduction-triggered play list reconstruction process procedure RT7 represented in FIG. 27. Starting the reproduction-triggered play list reconstruction process procedure RT7, the request information generating unit 52 in step SP131 obtains a result of clocking a present time from the clocking unit 51. The request information generating unit 52 then proceeds to next step SP132.

In step SP132, the request information generating unit 52 compares the present time with the time periods indicated by the time period information within the play list storage unit 16, and determines a time period including the present time on the basis of a result of the comparison. Then, the play list reconstructing unit 50 determines the play list PL1 for morning, the play list PL1 for midday, the play list PL1 for evening, the play list PL1 for night, or the play list PL1 for midnight associated with the time period including the present time. The play list reconstructing unit 50 then proceeds to next step SP133.

In step SP133, the request information generating unit 52 determines whether one of the play list PL1 for morning, the play list PL1 for midday, the play list PL1 for evening, the play list PL1 for night, and the play list PL1 for midnight associated with the specific channel selected by the user is obtained by the reproducing unit 11. When a negative result is obtained in step SP133, this indicates that the present time is immediately after the user selected the specific channel, and that none of the play list PL1 for morning, the play list PL1 for midday, the play list PL1 for evening, the play list PL1 for night, and the play list PL1 for midnight is assigned to the specific channel. That is, such a negative result indicates that none of the play list PL1 for morning, the play list PL1 for midday, the play list PL1 for evening, the play list PL1 for night, and the play list PL1 for midnight associated with the specific channel is obtained by the reproducing unit 11. Thus, when the request information generating unit 52 obtains such a negative result, the request information generating unit 52 proceeds to step SP135.

In this case, the request information generating unit 52 in step SP135 notifies of the play list reconstructing unit 50 about the play list PL1 for morning, the play list PL1 for midday, the play list PL1 for evening, the play list PL1 for night, or the play list PL1 for midnight corresponding to the present time (that is, the time immediately after the user selected the specific channel) (that is, the play list PL1 determined in step SP132). According to the notification from the request information generating unit 52, the play list reconstructing unit 50 assigns the play list PL1 for morning, the play list PL1 for midday, the play list PL1 for evening, the play list PL1 for night, or the play list PL1 for midnight corresponding to the present time to the specific channel. Thereby the reproducing unit 11 reads and obtains the play list PL1 for morning, the play list PL1 for midday, the play list PL1 for evening, the play list PL1 for night, or the play list PL1 for midnight assigned to the specific channel from the play list storage unit 16. The reproducing unit 11 then proceeds to next step SP136.

In step SP136, the reproducing unit 11 starts reproducing one of a plurality of pieces of music data D1 registered in the play list PL1 for morning, the play list PL1 for midday, the play list PL1 for evening, the play list PL1 for night, or the play list PL1 for midnight obtained from the play list storage unit 16 from a characteristic position of the music data D1 according to the play list PL1. The reproducing unit 11 proceeds to next step SP137. The reproducing unit 11 thereby ends the reproduction-triggered play list reconstruction process procedure RT7.

The request information generating unit 52 starts the reproduction-triggered play list reconstruction process procedure RT7 each time the reproduction of one piece of music data D1 to a tail end position is ended (or each time reproduction is interrupted in response to the input of a reproduced music changing instruction) according to the play list PL1 for morning, the play list PL1 for midday, the play list PL1 for evening, the play list PL1 for night, or the play list PL1 for midnight while the specific channel is selected by the user during the performance of the list use reproducing function. When the request information generating unit 52 has started the reproduction-triggered play list reconstruction process procedure RT7 twice or more times in a state of the specific channel remaining selected during the performance of the list use reproducing function, the request information generating unit 52 sequentially performs the process of step SP131 and step SP132 in the same manner as described above, and then proceeds to next step SP133.

In this case, because the reproducing unit 11 has already obtained one of the play list PL1 for morning, the play list PL1 for midday, the play list PL1 for evening, the play list PL1 for night, and the play list PL1 for midnight which play list is assigned to the specific channel from the play list storage unit 16, the request information generating unit 52 in step SP133 accordingly obtains a positive result. When the request information generating unit 52 obtains such a positive result, the request information generating unit 52 proceeds to next step SP134. In step SP134, the request information generating unit 52 determines whether the play list PL1 obtained by the reproducing unit 11 at this point in time is different from the play list PL1 for morning, the play list PL1 for midday, the play list PL1 for evening, the play list PL1 for night, or the play list PL1 for midnight corresponding to the present time.

When a negative result is obtained in step SP134, this indicates that the present time is still included in the time period determined in step SP132 of the reproduction-triggered play list reconstruction process procedure RT7 performed immediately previously. That is, such a negative result indicates that the play list PL1 obtained by the reproducing unit 11 from the play list storage unit 16 at this point in time is the same as the play list PL1 for morning, the play list PL1 for midday, the play list PL1 for evening, the play list PL1 for night, or the play list PL1 for midnight associated with the time period including the present time. Thus, when the request information generating unit 52 obtains such a negative result, the request information generating unit 52 proceeds to step SP136.

When a positive result is obtained in step SP134, on the other hand, this indicates that the present time is not included in the time period determined in step SP132 of the reproduction-triggered play list reconstruction process procedure RT7 performed immediately previously. That is, such a positive result indicates that the play list PL1 obtained by the reproducing unit 11 from the play list storage unit 16 at this point in time is different from the play list PL1 for morning, the play list PL1 for midday, the play list PL1 for evening, the play list PL1 for night, or the play list PL1 for midnight associated with the time period including the present time. Thus, when the request information generating unit 52 obtains such a positive result, the request information generating unit 52 proceeds to next step SP135.

In this case, the request information generating unit 52 in step SP135 sends reconstruction requesting information that indicates the play list PL1 for morning, the play list PL1 for midday, the play list PL1 for evening, the play list PL1 for night, or the play list PL1 for midnight corresponding to the present time (that is, the play list PL1 determined in step SP132) and which information requests the reconstruction of the play list PL1 to the play list reconstructing unit 50. Thus, according to the reconstruction requesting information supplied from the request information generating unit 52, the play list reconstructing unit 50 changes the assignment of the play list PL1 for morning, the play list PL1 for midday, the play list PL1 for evening, the play list PL1 for night, or the play list PL1 for midnight to the specific channel.

That is, the play list reconstructing unit 50 reassigns the specific channel the play list PL1 for morning, the play list PL1 for midday, the play list PL1 for evening, the play list PL1 for night, or the play list PL1 for midnight corresponding to the time period including the present time in place of the play list PL1 for morning, the play list PL1 for midday, the play list PL1 for evening, the play list PL1 for night, or the play list PL1 for midnight already assigned to the specific channel. The play list reconstructing unit 50 thereby reconstructs the play list PL1 for morning, the play list PL1 for midday, the play list PL1 for evening, the play list PL1 for night, or the play list PL1 for midnight assigned to the specific channel according to the apparatus use condition (that is, the apparatus use time period). Then, the play list reconstructing unit 50 notifies the reconstruction of the play list PL1 to the reproducing unit 11.

Thus, the reproducing unit 11 reads and obtains the play list PL1 for morning, the play list PL1 for midday, the play list PL1 for evening, the play list PL1 for night, or the play list PL1 for midnight newly assigned to the specific channel from the play list storage unit 16. That is, the reproducing unit 11 changes the play list PL1 to be used for reproduction of music data D1. The reproducing unit 11 then proceeds to next step SP136.

Incidentally, when the user has input a reproduced music changing instruction while the reproduction-triggered play list reconstruction process procedure RT7 was performed last time, the reproducing unit 11 in step SP136 starts reproducing one of a plurality of pieces of music data D1 registered in the play list PL1 for morning, the play list PL1 for midday, the play list PL1 for evening, the play list PL1 for night, or the play list PL1 for midnight from a characteristic position of the music data D1 according to the play list PL1. In addition, when music data D1 has been reproduced to a tail end position while the reproduction-triggered play list reconstruction process procedure RT7 was performed last time, the reproducing unit 11 in step SP136 starts reproducing one of a plurality of pieces of music data D1 registered in the play list PL1 for morning, the play list PL1 for midday, the play list PL1 for evening, the play list PL1 for night, or the play list PL1 for midnight from a start position of the music data D1 according to the play list PL1.

Thus, when the specific channel is selected by the user, each time reproduction of music data D1 is started according to the play list PL1 for morning, the play list PL1 for midday, the play list PL1 for evening, the play list PL1 for night, or the play list PL1 for midnight associated with the specific channel, the request information generating unit 52 detects a apparatus use time period (that is, a time period including the present time) as the apparatus use condition of the reproducing apparatus 10. When the apparatus use time period has changed, the request information generating unit 52 generates reconstruction requesting information and sends the reconstruction requesting information to the play list reconstructing unit 50. Thus, the play list reconstructing unit 50 can reconstruct the play list PL1 assigned to the specific channel (that is, the play list PL1 for morning, the play list PL1 for midday, the play list PL1 for evening, the play list PL1 for night, and the play list PL1 for midnight) by simply changing the assignment of the play list PL1 to the channel according to the change of the apparatus use time period of the reproducing apparatus 10.

As a result, when the reproduction-triggered play list reconstruction process procedure RT7 can be performed, for example when the reproducing apparatus 10 is used continuously over a long period (that is, over a plurality of time periods), and the specific channel remains selected by the user during the period, the play list reconstructing unit 50 can automatically reconstruct (that is, change) the play list PL1 for morning, the play list PL1 for midday, the play list PL1 for evening, the play list PL1 for night, and the play list PL1 for midnight used for reproduction of music data D1 according to a change of the apparatus use time period of the reproducing apparatus 10. Therefore, in the case of such a constitution, the play list reconstructing unit 50 changes a plurality of the play list PL1 for morning, the play list PL1 for midday, the play list PL1 for evening, the play list PL1 for night, and the play list PL1 for midnight as appropriate according to the apparatus use condition of the reproducing apparatus 10, and allows the user to use the play list PL1 for morning, the play list PL1 for midday, the play list PL1 for evening, the play list PL1 for night, and the play list PL1 for midnight without making the user perform a special operation such as reselecting a play list PL1 to be used for reproduction of music data D1. The play list reconstructing unit 50 can thus make the user listen to and enjoy many pieces of music corresponding to the apparatus use time period.

Even when the reproducing apparatus 10 retains play lists PL1 in which a plurality of pieces of music data D1 each suggestive of a season or an event are registered, the play list reconstructing unit 50 can perform substantially the same process as the reproduction-triggered play list reconstruction process procedure RT7 described above, and detect the present time each time the reproduction of music data D1 is started. At this time, the play list reconstructing unit 50 can also reconstruct a play list PL1 into a play list PL1 having a play list generating rule corresponding to the apparatus use condition as a apparatus use season or a apparatus use period of the reproducing apparatus 10 according to a result of the detection of the request information generating unit 52. That is, in the case of such a configuration, the play list reconstructing unit 50 changes the play list PL1 as appropriate according to the apparatus use season or the apparatus use period of the reproducing apparatus 10, and allows the user to listen to and enjoy more music, without making the user perform a special operation such as reselecting a play list PL1 to be used for reproduction of music data D1.

When the reproducing apparatus 10 retains a plurality of play lists PL1 in which a plurality of pieces of music data D1 each suggestive of a apparatus use place such as a living room, a bedroom, an office, the inside of a train car or the like are registered, the play list reconstructing unit 50 performs basically the same process as the reproduction-triggered play list reconstruction process procedure RT7 described above, but detects the present apparatus use place of the reproducing apparatus 10 in place of the present time each time the reproduction of music data D1 is started. At this time, the play list reconstructing unit 50 can also reconstruct a play list PL1 into a play list PL1 having a play list generating rule corresponding to the apparatus use place of the reproducing apparatus 10 according to a result of the detection of the request information generating unit 52. Thus, when the reproducing apparatus 10 is used while carried as in the case of a portable type music reproducing apparatus, or when the installation place of the reproducing apparatus 10 is changed, the play list reconstructing unit 50 changes the play list PL1 as appropriate according to the apparatus use condition as the apparatus use place of the reproducing apparatus 10, and allows the user to listen to and enjoy more music, without making the user perform a special operation such as reselecting a play list PL1 to be used for reproduction of music data D1.

Further, in the first embodiment described above, a play list PL1 to be reconstructed is reconstructed into a new play list in response to a request from the user or the external apparatus 15. However, the embodiment of the present invention is not limited to this. A play list PL1 to be reconstructed may be reconstructed into a new play list in response to the passage of a time such as a unit of one month or a few months, for example.

Further, in the first embodiment described above, when music data D1 is reproduced from either of a start position and a characteristic position, the data reproduction history is updated by incrementing the number of times of reproduction of the music data D1 by one. However, the embodiment of the present invention is not limited to this. The data reproduction history may be updated by incrementing the number of times of reproduction of the music data D1 by one when the music data D1 has been reproduced for a predetermined time or more from the characteristic position, or when a part from a position preceding the characteristic position is reproduced. The reproducing apparatus 10 can thereby avoid updating the data reproduction history of music that actually the user hardly listens to while changing the reproductions of music data D1 relatively quickly to search for desired music. As a result, the reproducing apparatus 10 can reflect the number of times of reproduction for the user to listen to desired music in the data reproduction history substantially accurately.

Further, in the first embodiment described above, when music data D1 is reproduced according to a play list PL1 selected as a channel, the list use history is updated by incrementing the number of times of use of the play list PL1 by one regardless of the number of pieces of reproduced music data D1. However, the embodiment of the present invention is not limited to this. The list use history may be updated by incrementing the number of times of use of the play list PL1 by one when at least one piece of music data D1 has been reproduced for a predetermined time or more from the characteristic position, for example, according to the play list PL1 selected as channel, or when a part from a position preceding the characteristic position is reproduced. The reproducing apparatus 10 can thereby avoid updating the list use history even though actually the user hardly listens to reproduced music while changing play lists PL1 as channels relatively quickly to search for desired music. As a result, the reproducing apparatus 10 can reflect the number of times of use for the user to listen to desired music in the list use history substantially accurately.

Further, in the first embodiment described above, when a play list PL1 to be reconstructed is reconstructed into a new play list, a data search key is added to the play list generating rule of the play list PL1 to be reconstructed. However, the embodiment of the present invention is not limited to this. A relatively large number of data search keys may be used in each play list generating rule, and when a play list PL1 to be reconstructed is reconstructed into a new play list, a data search key may be subtracted from the play list generating rule of the play list PL1 to be reconstructed according to a data reproduction history or a list use history.

Further, in the first embodiment described above, when a request for reconstruction using a presented music list is made from the external apparatus 15, a plurality of pieces of presented music data matching a reconstructed play list generating rule are retrieved from among a plurality of pieces of presented music data stored and retained in the external apparatus 15 to generate a new play list. However, the embodiment of the present invention is not limited to this. When a request for reconstruction using a presented music list is made from the external apparatus 15, a plurality of pieces of presented music data and music data D1 matching a reconstructed play list generating rule may be retrieved from among the plurality of pieces of presented music data stored and retained in the external apparatus 15 and a plurality of pieces of music data D1 stored in the content data storage unit 13 of the reproducing apparatus 10 to generate a new play list.

Further, in the first embodiment described above, music data D1 is reproduced from a characteristic position to a tail end position according to a play list PL1 or PL2 in response to a request by the user to change a channel or music data D1. However, the embodiment of the present invention is not limited to this. For example, information indicating a section corresponding to a characteristic part of music of music data D1 may be retained, and the music data D1 may be reproduced from a characteristic position to an end position of the section corresponding to the characteristic part according to a play list PL1 or PL2 in response to a request by the user to change a channel or music data D1.

Figure 28:
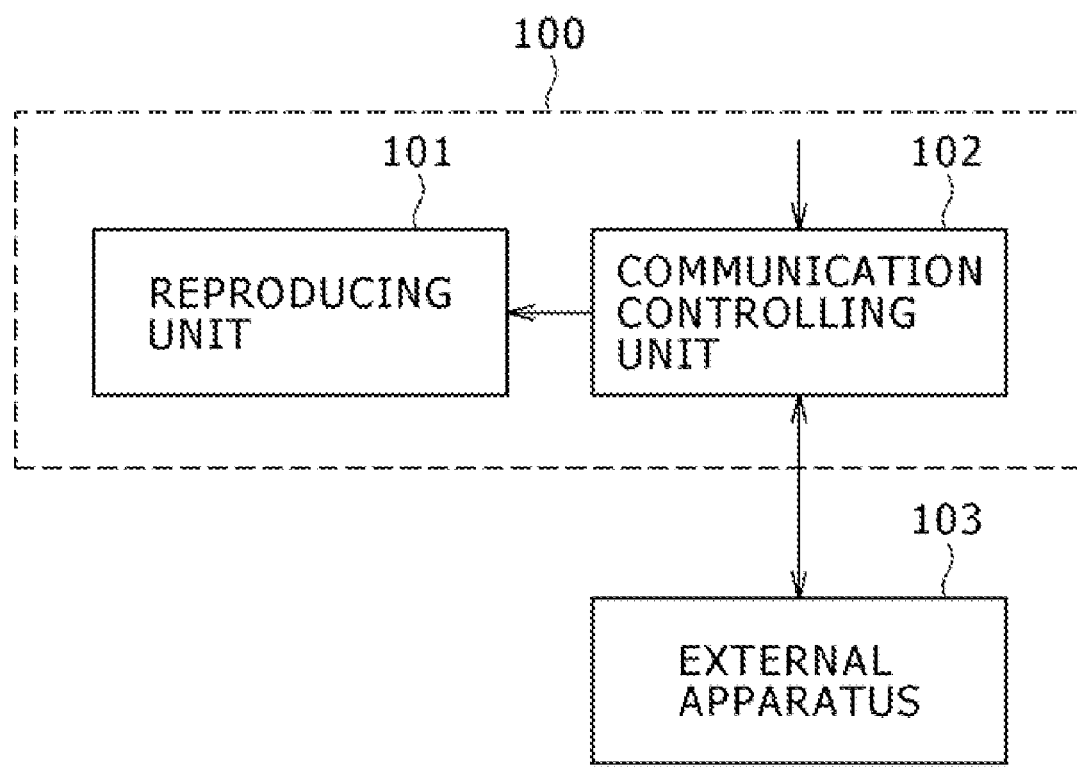
FIG. 28 is a block diagram showing an outline of a configuration of a reproducing apparatus according to a second embodiment.

(2) Second Embodiment (2-1) Outline of Reproducing Apparatus According to Second Embodiment In FIG. 28, reference numeral 100 denotes a reproducing apparatus according to a second embodiment. A reproducing unit 101 in the reproducing apparatus 100 reproduces received content data for trial listening. A communication controlling unit 102 in the reproducing apparatus 100 transmits obtainment requesting information for requesting the obtainment of content data corresponding to the content data for trial listening to an external apparatus 103 in response to an obtainment requesting input for requesting the obtainment of the content data, while the reproduction of the content data for trial listening by the reproducing unit 11 is maintained. The communication controlling unit 102 then downloads return information in response to the obtainment requesting information from the external apparatus 103. With such a configuration, even when a request to obtain content data corresponding to content data for trial listening is made during the reproduction of the content data for trial listening, the reproducing apparatus 100 allows trial listening to contents for trial listening based on the content data for trial listening to be continued until the reproduction of the content data for trial listening is finished. The reproducing apparatus 100 thus allows the trial listening to the contents for trial listening to be fully enjoyed.

(2-2) Detailed Configuration of Reproducing Apparatus According to Second Embodiment A detailed hardware configuration based on functional circuit blocks of a reproducing apparatus 110 will next be described with reference to FIG. 29. As shown in FIG. 30 in which parts corresponding to those of FIG. 3, for example, are identified by the same reference numerals, an operating unit 111 in the reproducing apparatus 110 has a remote control RM2 having a similar configuration to that of the remote control RM1 of the foregoing first embodiment except that the remote control RM2 has a favorite button RM2A in place of the reconstruction requesting button RM1C.

When a medium reproducing function selecting instruction is given according to an operation of the operating unit 111 (that is, the remote control RM2) by the user, a selecting unit 112 starts a medium reproducing function. When the medium reproducing function is started, a reproducing unit 113 reproduces, from a recording medium loaded in the reproducing apparatus 110, music data recorded on the recording medium in advance, and outputs the music data as music. The reproducing unit 113 thereby allows the user to listen to the music based on the reproduced music data. In addition, when a recording function selecting instruction is given according to an operation of the operating unit 111 (that is, the remote control RM2) by the user, the selecting unit 112 starts a recording function. When the recording function is started, the reproducing unit 113 reads the music data from the recording medium, compression-codes the music data by a predetermined compression-coding system, and then sends the result to a content data storage unit 114. Thus, the content data storage unit 114 stores the music data in a predetermined format which music data is supplied from the reproducing unit 113.

In addition, the communication controlling unit 115 is configured to be able to communicate with an external apparatus 116 on a network NT. The external apparatus 116 can transmit various data such as music data and the like, various information and the like to the reproducing apparatus 110 in either of a first transmission mode complying with TCP/IP (Transmission Control Protocol/Internet Protocol) for transmitting various data such as music data and the like, various information and the like more surely and a second transmission mode complying with UDP/IP (User Datagram Protocol/ Internet Protocol) for transmitting various data such as music data and the like, various information and the like more quickly. The external apparatus 116 transmits various data and various information in the first transmission mode when the various data and the various information are requested by the reproducing apparatus 110 for a purpose of being stored temporarily or permanently. The external apparatus 116 transmits music data in the second transmission mode when the music data is requested by the reproducing apparatus 110 for a purpose of being reproduced by streaming reproduction.

Thus, when the selecting unit 112 is supplied with a download request requesting downloading of music data according to an operation of the operating unit 111 (that is, the remote control RM2) by the user, the selecting unit 112 notifies the communication controlling unit 115 of the download request and the music data to be downloaded. The communication controlling unit 115 thereby generates download requesting information according to such a notification. The communication controlling unit 115 transmits the generated download requesting information to the external apparatus 116 on the network NT. As a result, when the music data to be downloaded in a predetermined format is transmitted from the external apparatus 116 in the first transmission mode, the communication controlling unit 115 downloads the music data and then sends the music data to the content data storage unit 114. The content data storage unit 114 thus stores the music data downloaded from the external apparatus 116.

In addition, when the selecting unit 112 is supplied with a streaming reproduction request requesting streaming reproduction of music data according to an operation of the operating unit 111 (that is, the remote control RM2) by the user, the selecting unit 112 notifies the communication controlling unit 115 of the streaming reproduction request and the music data to be reproduced by streaming reproduction. The communication controlling unit 115 thereby generates streaming requesting information according to such a notification. The communication controlling unit 115 transmits the generated streaming requesting information to the external apparatus 116 on the network NT. As a result, when the music data in a predetermined format is transmitted from the external apparatus 116 in the second transmission mode, the communication controlling unit 115 sends the music data to the reproducing unit 113 while receiving the music data. The reproducing unit 113 thus performs the streaming reproduction of the music data supplied from the communication controlling unit 115.

A content database CDB1 having the same configuration as described above with reference to FIG. 4 is constructed in the content data storage unit 114. The content database CDB1 stores a plurality of pieces of music data managing information CA including a plurality of pieces of music data D1 read from recording media by the recording function and a plurality of pieces of music data D1 downloaded from the external apparatus 116. The content data storage unit 114 also stores a channel list CL and a plurality of play lists PL1 having the same configurations as described above with reference to FIG. 4.

When the user selects a list use reproducing function via the operating unit 111 (that is, the remote control RM2), the selecting unit 112 accordingly starts the list use reproducing function. Incidentally, when the list use reproducing function is selected via the operating unit 111 in an operation stop state of the reproducing apparatus 110 (that is, power is in an off state), the reproducing apparatus 110 is started in response to the selection of the list use reproducing function (that is, the power is turned on), and thereby the selecting unit 112 starts the list use reproducing function concurrently with the starting of the reproducing apparatus 110. When the list use reproducing function is selected via the operating unit 111 in a state in which another function is being performed, the selecting unit 112 switches from the other function to start the list use reproducing function in response to the selection of the list use reproducing function.

Each time the list use reproducing function is ended, the selecting unit 112 updates and retains the channel number CN of the channel selected by the user at the time of ending the list use reproducing function (that is, at an end). The selecting unit 112 also retains the channel number CN of a channel selected in advance for selection at a starting initial time of the list use reproducing function (that is, at a start). The selecting unit 112 is set to automatically select one of the channel selected at the time of ending the list use reproducing function last time and the channel selected in advance at the starting initial time of the list use reproducing function. That is, according to such a setting, the selecting unit 112 sets one of the channel number CN of the channel selected at the time of ending the list use reproducing function last time and the channel number CN of the channel selected in advance as a starting initial use channel number to be automatically selected each time the list use reproducing function is started.

Thus, when the list use reproducing function is started, the selecting unit 112 reads the channel list CL from the content data storage unit 114, and automatically selects the channel of the starting initial use channel number. The selecting unit 112 notifies the reproducing unit 113 of the selected channel (that is, the starting initial use channel number). The reproducing unit 113 thereby reads a play list PL1 assigned to the channel selected by the selecting unit 112 from the content data storage unit 114. Incidentally, when the play list PL1 read from the content data storage unit 114 at this time specifies another play list PL2 stored and retained in the external apparatus 116, the reproducing unit 113 requests the other play list PL2 from the external apparatus 116 via the communication controlling unit 115 according to the specification (that is, according to form information LT in list attribute information LAT). The reproducing unit 113 thereby takes in the other play list PL2 returned from the external apparatus 116 and downloaded by the communication controlling unit 115.

When music data D1 to be reproduced which music data D1 is registered in the play list PL1 or PL2 is stored in the content data storage unit 114, the reproducing unit 113 reads the music data D1 and corresponding data-related information DRE from the content data storage unit 114 according to content identifying information (this content identifying information will be referred to as content indicating information because the content identifying information indicates a location where the music data D1 is stored and sets the music data D1 reproducible) MID within music registration information TR stored in the play list PL1 or PL2. Thereby the reproducing unit 113 starts reproduction of the music data D1 from a characteristic position according to characteristic position information SP included in the data-related information DRE. The reproducing unit 113 thus allows the user to listen on trial to the music based on the music data D1 from a start of a characteristic part of the music.

Incidentally, when music data D1 to be reproduced which music data D1 is registered in the play list PL1 or PL2 is stored and retained in the external apparatus 116, the reproducing unit 113 requests the music data D1 and corresponding data-related information DRE from the external apparatus 116 via the communication controlling unit 115 according to content indicating information MID within music registration information TR stored in the play list PL1 or PL2. Thereby, while taking in the music data D1 returned from the external apparatus 116 and received by the communication controlling unit 115, the reproducing unit 113 starts streaming reproduction of the music data D1 from a characteristic position according to characteristic position information SP included in the data-related information DRE received at this time to allow the user to listen on trial to the music from a start of a characteristic part.

When the selecting unit 112 is supplied with a channel changing instruction to change the channel according to an operation of the operating unit 111 by the user, the selecting unit 112 selects a new channel on the basis of the channel list CL and the channel number CN of the currently selected channel. The selecting unit 112 notifies the selected channel (that is, the channel number CN of the newly selected channel) to the reproducing unit 113. When the selecting unit 112 notifies the newly selected channel to the reproducing unit 113 while the reproducing unit 113 is in the process of reproducing music data D1 from a characteristic position, the reproducing unit 113 reads a new play list PL1 or PL2 from the content data storage unit 114 or the external apparatus 116 according to the selected channel in the same manner as described above. Then the reproducing unit 113 reads music data D1 and data-related information DRE from the content data storage unit 114 or the external apparatus 116 according to the new play list PL1 or PL2. The reproducing unit 113 stops the reproduction of the music data D1 at this point in time, and starts reproduction of the read music data D1 from a characteristic position of the read music data D1.

Thus, each time the user requests a channel change (that is, each time the channel changing instruction is input), the selecting unit 112 makes the reproducing unit 113 reproduce music data D1 registered in a play list PL1 or PL2 assigned to a channel after the change from a characteristic position of the music data D1 according to the play list PL1 or PL2. The selecting unit 112 thereby allows the user to actually listen on trial to the music based on the music data D1 from a start of a characteristic part according to the play list PL1 or PL2, and select the play list PL1 or PL2 used for the reproduction of the music data D1.

When the selecting unit 112 is supplied with a reproduced music changing instruction to change the music data D1 being reproduced according to an operation of the operating unit 111 by the user, the selecting unit 112 notifies this to the reproducing unit 113. In this case, when the selecting unit 112 notifies the reproducing unit 113 to change the music data D1 while the reproducing unit 113 is in the process of reproducing the music data D1 from the characteristic position, the reproducing unit 113 accordingly reads new music data D1 and new data-related information DRE from the content data storage unit 114 or the external apparatus 116 in the same manner as described above according to the play list PL1 or PL2 selected at this point in time. The reproducing unit 113 stops the reproduction of the music data D1 at this point in time, and starts reproduction of the newly read music data D1 from a characteristic position of the newly read music data D1. The reproducing unit 113 thus changes the music data D1 being reproduced according to the play list PL1 or PL2 in response to a request from the user.

Thus, each time the user requests a change of the music data D1 (that is, each time the reproduced music changing instruction is input), the selecting unit 112 makes the reproducing unit 113 reproduce music data D1 after the change from a characteristic position of the music data D1. The selecting unit 112 thereby allows the user to actually listen on trial to the music based on the music data D1 from a start of a characteristic part according to the play list PL1 or PL2, and select (that is, search for) desired music data D1 from among a plurality of pieces of reproducible music data D1 according to the play list PL1 or PL2.

When the selecting unit 112 is supplied with a music selecting and determining instruction to select and determine the music data D1 being reproduced now as desired music data D1 according to an operation of the operating unit 12 by the user, the selecting unit 112 notifies this to the reproducing unit 113. In this case, when the selecting unit 112 notifies the selection and determination of the music data D1 being reproduced now to the reproducing unit 113 while the reproducing unit 113 is in the process of reproducing the music data D1 from the characteristic position of the music data D1, the reproducing unit 113 accordingly stops reproducing the music data D1 temporarily and starts reproducing the music data D1 again from a start position of the music data D1. Thus, when the user selects and determines the desired music data D1, the selecting unit 112 accordingly allows the user to listen to the whole of music based on the desired music data D1. Incidentally, when the reproduction of the music data D1 from the start position of the music data D1 is ended, the reproducing unit 113 read new music data D1 and new data-related information DRE from the content data storage unit 114 or the external apparatus 116 in the same manner as described above according to the play list PL1 or PL2 selected at this point in time, and starts reproducing the read new music data D1 from a start position of the music data D1.

When the reproducing unit 113 receives no notification from the selecting unit 112 (that is, the user makes no request) during the reproduction of the music data D1 from the characteristic position of the music data D1, and finishes reproducing the music data D1 from the characteristic position to the tail end position of the music data D1, the reproducing unit 113 reads new music data D1 and new data-related information DRE from the content data storage unit 114 or the external apparatus 116 in the same manner as described above according to the play list PL1 or PL2 selected at this point in time. The reproducing unit 113 then starts reproducing the new music data D1 from a start position of the music data D1.

Thus, when the reproducing unit 113 reproduces the music data D1 to the tail end position, the reproduction of which has been started from the characteristic position, and thus finishes the reproduction of the music data D1, the selecting unit 112 assumes that the user has made a request to listen to a plurality of pieces of music based on a plurality of pieces of music data D1 registered in the play list PL1 or PL2. Then the selecting unit 112 makes the reproducing unit 113 sequentially reproduce all of the plurality of pieces of music data D1 according to the play list PL1 or PL2 selected now so that the user can continuously listen to all of the plurality of pieces of music. Incidentally, when the reproducing unit 113 sequentially reproduces the music data D1 from characteristic positions or start positions according to one play list PL1 or PL2, the reproducing unit 113 sets a plurality of pieces of music registration information TR stored in the play list PL1 or PL2 in an annular form as if a start and a tail end of the music data D1 were connected to each other according to a list corresponding to the normal reproduction mode or the shuffle reproduction mode applied to the plurality of pieces of music registration information TR. Thereby the reproducing unit 113 can cyclically reproduce the plurality of pieces of music data D1 registered in one play list PL1 or PL2.

When the selecting unit 112 notifies a newly selected channel to the reproducing unit 113 while the reproducing unit 113 is in the process of reproducing music data D1 from a start position, the reproducing unit 113 accordingly reads a new play list PL1 or PL2 from the content data storage unit 114 or the external apparatus 116 in the same manner as described above, and thereby changes a play list PL1 or PL2 used for reproduction of the music data D1. Then, in the same manner as described above, the reproducing unit 113 reads music data D1 and data-related information DRE from the content data storage unit 114 or the external apparatus 116 according to the new play list PL1 or PL2. The reproducing unit 113 stops the reproduction of the music data D1 at this point in time, and starts reproduction of the read music data D1 from a characteristic position of the read music data D1.

Thus, when the selecting unit 112 makes the reproducing unit 113 reproduce a plurality of pieces of music data D1 according to the play list PL1 or PL2 selected by the user, and a request is made to change the play list PL1 or PL2 used for the reproduction of the music data D1, the selecting unit 112 accordingly makes the reproducing unit 113 stop the reproduction and then reproduce music data D1 from a characteristic position according to a new play list PL1 or PL2. Thereby the selecting unit 112 allows the user to actually listen on trial to music from a start of a characteristic part according to another play list PL1 or PL2 different from the play list PL1 or PL2 that has been used for the reproduction of the music data D1 up to this point in time, and select the new play list PL1 or PL2 to be used for the reproduction of music data D1.

When the selecting unit 112 notifies the reproducing unit 113 to change the music data D1 while the reproducing unit 113 is in the process of reproducing the music data D1 from the start position of the music data D1, the reproducing unit 113 reads new music data D1 and new data-related information DRE from the content data storage unit 114 or the external apparatus 116 in the same manner as described above according to the play list PL1 or PL2 selected at this point in time. The reproducing unit 113 stops the reproduction of the music data D1 at this point in time, and starts reproduction of the newly read music data D1 from a characteristic position of the newly read music data D1.

Thus, when the user makes a request to change the music data D1 while the reproducing unit 113 is reproducing the music data D1 from the start position, the selecting unit 112 accordingly makes the reproducing unit 113 change the music data D1 being reproduced. Thus the selecting unit 112 allows the user to actually listen on trial to new music from a start of a characteristic part according to the play list PL1 or PL2 selected at this point in time, and select (that is, search for) desired music data D1 again.

One play list PL1 or PL2 stores content indicating information MID indicating locations where a plurality of pieces of music data D1 registered in the play list PL1 or PL2 are recorded irrespective of whether the plurality of pieces of music data D1 are stored and retained in the content data storage unit 114 of the reproducing apparatus 110 or in the external apparatus 116. Therefore, when the selecting unit 112 notifies the reproducing unit 113 to change music data D1 being reproduced, the reproducing unit 113 can promptly request new music data D1 for reproduction according to content indicating information MID within one play list PL1 or PL2. Thereby, even when the reproducing unit 113 changes for example from music data D1 read and reproduced from the content data storage unit 114 to music data D1 to be received from the external apparatus 116 and reproduced by streaming reproduction (or vice versa) according to one play list PL1 or PL2, the reproducing unit 113 can continuously (seamlessly) perform the streaming reproduction of the music data D1 received from the external apparatus 116 following the music data D1 read and reproduced from the content data storage unit 114 (or vice versa).

When starting the list use reproducing function, the selecting unit 112 notifies all channel numbers CN included in the channel list CL to a display controlling unit 117 together with the sequence of all the channel numbers CN. On the other hand, each time the reproducing unit 113 obtains a play list PL1 or PL2 from the content data storage unit 114 or the external apparatus 116, the reproducing unit 113 sends the obtained play list PL1 or PL2 to the display controlling unit 117. Further, each time the reproducing unit 113 obtains data-related information DRE together with music data D1 from the content data storage unit 114 or the external apparatus 116, the reproducing unit 113 sends data attribute information DAT included in the data-related information DRE to the display controlling unit 117.

Figure 31:
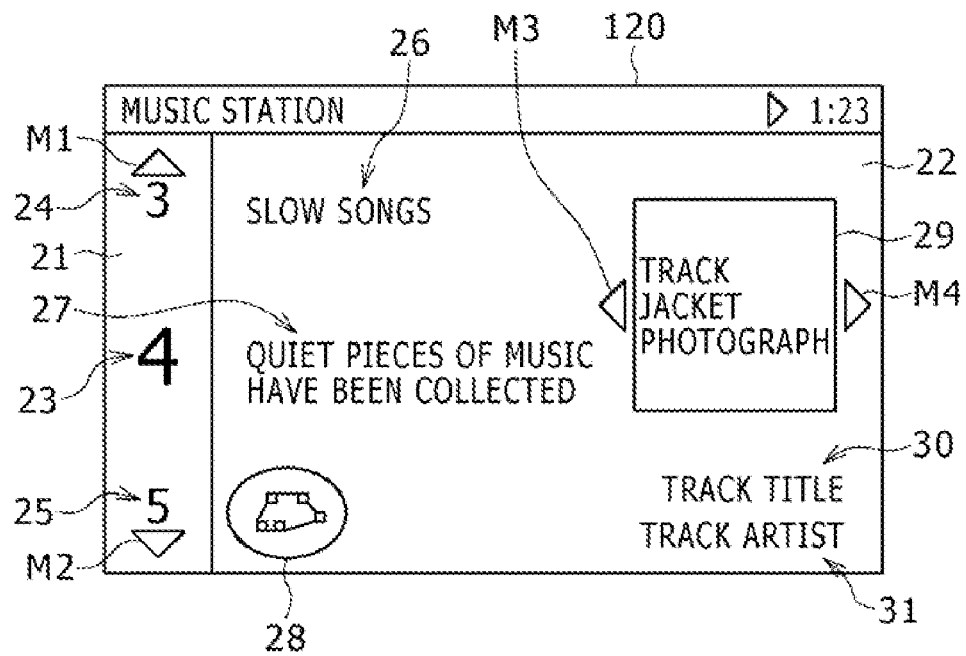
FIG. 31 is a schematic diagram showing a configuration of a selection screen.

Thereby, concurrently with the starting of the list use reproducing function, the display controlling unit 117 generates selection screen data for selecting a channel and music data D1 on the basis of a channel selected by the selecting unit 112 (that is, the starting initial use channel number), the channel numbers CN included in the channel list CL, and the sequence of the channel numbers CN, as well as the play list PL1 or PL2 and the data attribute information DAT supplied from the reproducing unit 113. The display controlling unit 117 then sends the selection screen data to a display unit 118 to thereby display a selection screen 120 as shown in FIG. 31, the selection screen 120 having a similar configuration to that of the selection screen 20 described above with reference to FIG. 5, on the basis of the selection screen data on the display unit 18.

Specifically, the selection screen 120 has a first mark M1 and a second mark M2 displayed in a channel selecting area 21 on a left side of the screen. Thus, the selection screen 120 allows the user to intuitively recognize that when pressing an upward direction selecting button RM1F having the same shape and orientation as the first mark M1 on the remote control RM2, for example, the channel number CN is changed to a channel number CN smaller by one according to the sequence of the channel numbers CN included in the channel list CL, and thus the desired channel can be selected. In addition, the selection screen 120 allows the user to intuitively recognize that when pressing a downward direction selecting button RM1G having the same shape and orientation as the second mark M2 on the remote control RM2, for example, the channel number CN is changed to a channel number CN larger by one according to the sequence of the channel numbers CN included in the channel list CL, and thus the desired channel can be selected.

Further, the selection screen 120 has a third mark M3 and a fourth mark M4 in a music selecting area 22 on a right side of the screen. Thereby the selection screen 120 allows the user to intuitively recognize that when pressing a left direction selecting button RM1H having the same shape and orientation as the third mark M3 on the remote control RM2, for example, the music data D1 being reproduced is changed so as to return to an immediately preceding piece of music data D1 according to the play list PL1 or PL2 being selected now and thus the immediately preceding piece of music data D1 can be selected. In addition, the selection screen 120 allows the user to intuitively recognize that when pressing a right direction selecting button RM1I having the same shape and orientation as the fourth mark M4 on the remote control RM2, for example, the music data D1 being reproduced is changed so as to advance to an immediately succeeding piece of music data D1 according to the play list PL1 or PL2 being selected now and thus the immediately succeeding piece of music data D1 can be selected.

Thus, the changing of channels has a changing direction along the sequence of the channel numbers CN stored in the channel list CL. Therefore, when the channel changing instruction is input by pressing the upward direction selecting button RM1F or the downward direction selecting button RM1G on the remote control RM2 in a state of the selection screen 120 being displayed on the display unit 118 by the display controlling unit 117, the selecting unit 112 selects a new channel on the basis of the channel list CL, the channel number CN of the channel being selected now, and a changing direction corresponding to the upward direction selecting button RM1F or the downward direction selecting button RM1G pressed at this time. Incidentally, at this time, the selecting unit 112 cyclically changes channels by handling the plurality of channel numbers CN registered in the channel list CL as a ring formed by connecting a start and a tail end of the plurality of channel numbers CN to each other.

Then the selecting unit 112 notifies the selected channel (that is, the channel number CN of the newly selected channel) to the reproducing unit 113. Accordingly, the reproducing unit 113 sends a play list PL1 or PL2 and data attribute information DAT obtained according to the notification of the selecting unit 112 at this time to the display controlling unit 117. The display controlling unit 117 thereby updates display contents of the channel selecting area 21 and the music selecting area 22 in the selection screen 120 displayed on the display unit 118 on the basis of the play list PL1 or PL2 and the data attribute information DAT supplied from the reproducing unit 113 according to the channel selected by the selecting unit 112. The display controlling unit 117 thus allows the user to select a desired play list PL1 or PL2 while visually checking channel numbers CN, a list name 26, and the like within the selection screen 120.

The changing of music data D1 also has a changing direction along the sequence of reproduction of music data D1 according to a play list PL1 or PL2. Thus, when the reproduced music changing instruction is input by pressing the left direction selecting button RM1H or the right direction selecting button RM1I on the remote control RM2 in a state of the selection screen 120 being displayed on the display unit 118 by the display controlling unit 117, the selecting unit 112 notifies the instruction to change music data D1 selected for reproduction and the changing direction to the reproducing unit 113 on the basis of the left direction selecting button RM1H or the right direction selecting button RM1I pressed at this time. Thus, the reproducing unit 113 determines the content indicating information MID of music data D1 selected for reproduction according to the notification of the selecting unit 112 at this time, and sends data attribute information DAT obtained according to the content indicating information MID to the display controlling unit 117.

The display controlling unit 117 thereby updates display contents of the music selecting area 22 in the selection screen 120 displayed on the display unit 118 on the basis of the data attribute information DAT supplied from the reproducing unit 113. The display controlling unit 117 thus allows the user to select the music data D1 while visually checking a music title 30, an artist name 31, and the like within the selection screen 120.

Figure 32:
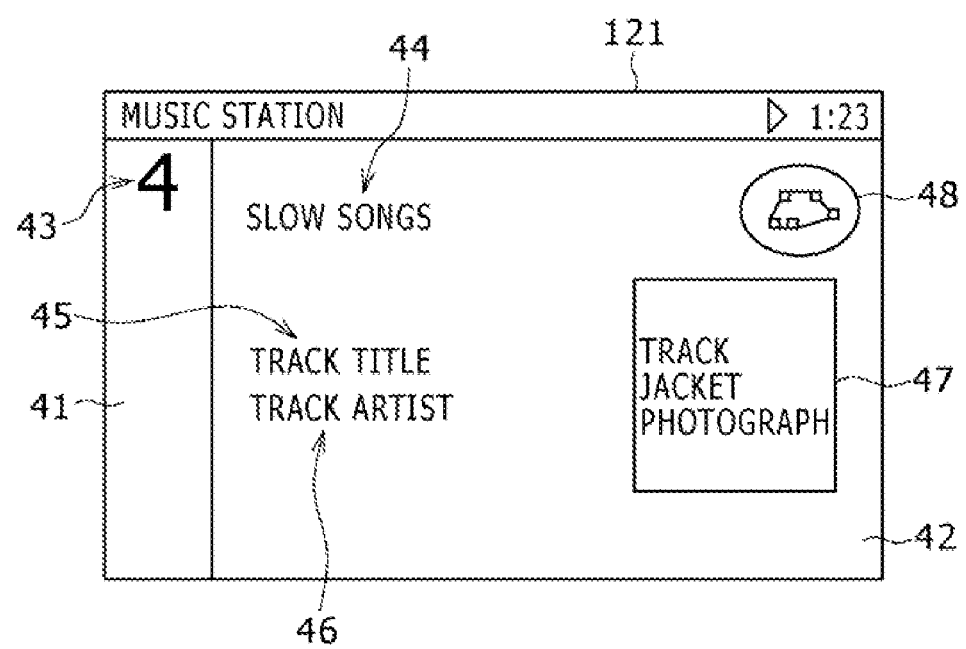
FIG. 32 is a schematic diagram showing a configuration of a reproduction screen.

When the user selects and determines the music data D1 being reproduced now, the selecting unit 112 notifies this to the display controlling unit 117. In this case, when the selecting unit 112 notifies the selection and determination of the music data D1 to the display controlling unit 117 in a state of the display controlling unit 117 displaying the selection screen 120 on the display unit 118, the display controlling unit 117 generates reproduction screen data for notifying the music data D1 being reproduced on the basis of the play list PL1 or PL2 supplied from the reproducing unit 113 at this time (that is, the play list PL1 or PL2 selected at this point in time) and data attribute information DAT (that is, data attribute information DAT corresponding to the music data D1 being reproduced now). The display controlling unit 117 then sends the reproduction screen data to the display unit 118 to thereby display a reproduction screen 121 as shown in FIG. 32, the reproduction screen 121 having a similar configuration to that of the reproduction screen 40 described above with reference to FIG. 6, on the basis of the reproduction screen data on the display unit 118.

Then, when the music data D1 being reproduced according to the play list PL1 or PL2 is changed in a state of the reproduction screen 121 being displayed on the display unit 118, the display controlling unit 117 updates display contents of a reproduced music notifying area 42 of the reproduction screen 121 on the basis of data attribute information DAT supplied from the reproducing unit 113 at this time. The display controlling unit 117 thereby allows the user to check a music title 45, an artist name 46 and the like corresponding to the music data D1 being reproduced now and easily check the play list PL1 or PL2 being used for the reproduction of the music data D1 on the basis of the display contents of the reproduction screen 121.

Each time reproduction of music data D1 is started at a characteristic position of the music data D1, the reproducing unit 113 once resets an internal timer and measures a reproduction time. When no notification is sent from the selecting unit 112 (that is, no request is made by the user) before the reproduction time of the reproduction of the music data D1 from the characteristic position reaches a predetermined time selected in advance (the predetermined time is shorter than a time necessary for reproduction from the characteristic position to a tail end position of the music data D1), the reproducing unit 113 notifies the display controlling unit 117 that the music data D1 has been reproduced for the predetermined time from the characteristic position at a point in time when the reproduction time has reached the predetermined time. When the display controlling unit 117 is notified by the reproducing unit 113 that the music data D1 has been reproduced for the predetermined time from the characteristic position, the display controlling unit 17 automatically changes the selection screen 120 displayed on the display unit 118 at this time to the reproduction screen 121.

When the display controlling unit 117 is supplied with data attribute information DAT together with a new play list PL1 or PL2 from the reproducing unit 113 in a state of the reproduction screen 121 being displayed on the display unit 118 (that is, when an instruction to change the selected channel is given by the user), the display controlling unit 117 generates selection screen data on the basis of the play list PL1 or PL2 and the data attribute information DAT to thereby display the selection screen 120 again in place of the reproduction screen 121 on the display unit 118. Further, when the display controlling unit 117 is supplied with new data attribute information DAT from the reproducing unit 113 in a state of the reproduction screen 121 being displayed on the display unit 118 (that is, when an instruction to change the reproduced music data D1 is given by the user), the display controlling unit 117 generates selection screen data on the basis of the data attribute information DAT. Thereby the display controlling unit 117 displays the selection screen 120 again in place of the reproduction screen 121 on the display unit 118.

Thus, as in the case described above with reference to FIG. 7, when the list use reproducing function is started, the display controlling unit 117 displays the selection screen 120 on the display unit 118. When in this state, the reproducing unit 113 reproduces music data D1 from a characteristic position of the music data D1 in response to a request by the user to change a channel or change music data D1, the display controlling unit 117 updates the display contents of the selection screen 120 according to the music data D1 reproduced from the characteristic position. When in a state of the selection screen 120 being displayed on the display unit 118, the display controlling unit 117 is notified by the reproducing unit 113 that the music data D1 has been reproduced for the predetermined time from the characteristic position of the music data D1, or is notified by the selecting unit 112 that the music data D1 being reproduced is selected and determined as desired music data D1, the display controlling unit 117 accordingly changes from the selection screen 120 to the reproduction screen 121 and displays the reproduction screen 121 on the display unit 118.

When the reproducing unit 113 reproduces music data D1 from a start position of the music data D1 in a state of the reproduction screen 121 being displayed on the display unit 118, the display controlling unit 117 updates the display contents of the reproduction screen 121 according to the music data D1 reproduced from the start position. When the reproducing unit 113 reproduces music data D1 from a characteristic position of the music data D1 in response to a request by the user to change the channel or change the music data D1 in the state of the reproduction screen 121 being displayed on the display unit 118, the display controlling unit 117 changes from the reproduction screen 121 to the selection screen 120 and displays the selection screen 120 on the display unit 118. Thus, in response to the changing of the channel and the music data D1 and the like, the display controlling unit 117 updates the display contents of the selection screen 120 and the reproduction screen 121 displayed on the display unit 118, and changes between the selection screen 120 and the reproduction screen 121 and then displays the selection screen 120 and the reproduction screen 121. The display controlling unit 117 can thereby notify the user of the selected channel, the selected play list PL1 or PL2, and the music data D1 being reproduced via the selection screen 120 and the reproduction screen 121.

Thus, as in the case described above with reference to FIG. 8, the selecting unit 112 allows the user to easily select a desired play list PL1 or PL2 by changing the channel as appropriate as if to select a radio broadcasting station by changing a channel during reception of a radio broadcast while the list use reproducing function is performed. While the channel is thus changed to select a desired play list PL1 or PL2, the reproducing unit 113 sequentially reproduces music data D1 from a characteristic position or a start position without an interruption so as to allow the user to listen to more music.

Incidentally, when the user consecutively presses the upward direction selecting button RM1F or the downward direction selecting button RM1G of the remote control RM2 relatively rapidly, the selecting unit 112 ignores selection of other channels between a channel selected when the consecutive pressing operation is started and a channel selected when the speed of the consecutive pressing operation is somewhat decreased. The selecting unit 112 thereby prevents the reproducing unit 113 from sequentially reproducing each of different pieces of music data D1 for a little time according to play lists PL1 and PL2 assigned to a large number of channels between a point in time when the consecutive pressing operation is started and a point in time when the speed of the consecutive pressing operation is somewhat decreased, so that different pieces of music are heard as if the different pieces of music were a noise of a number of sounds.

Figure 33:
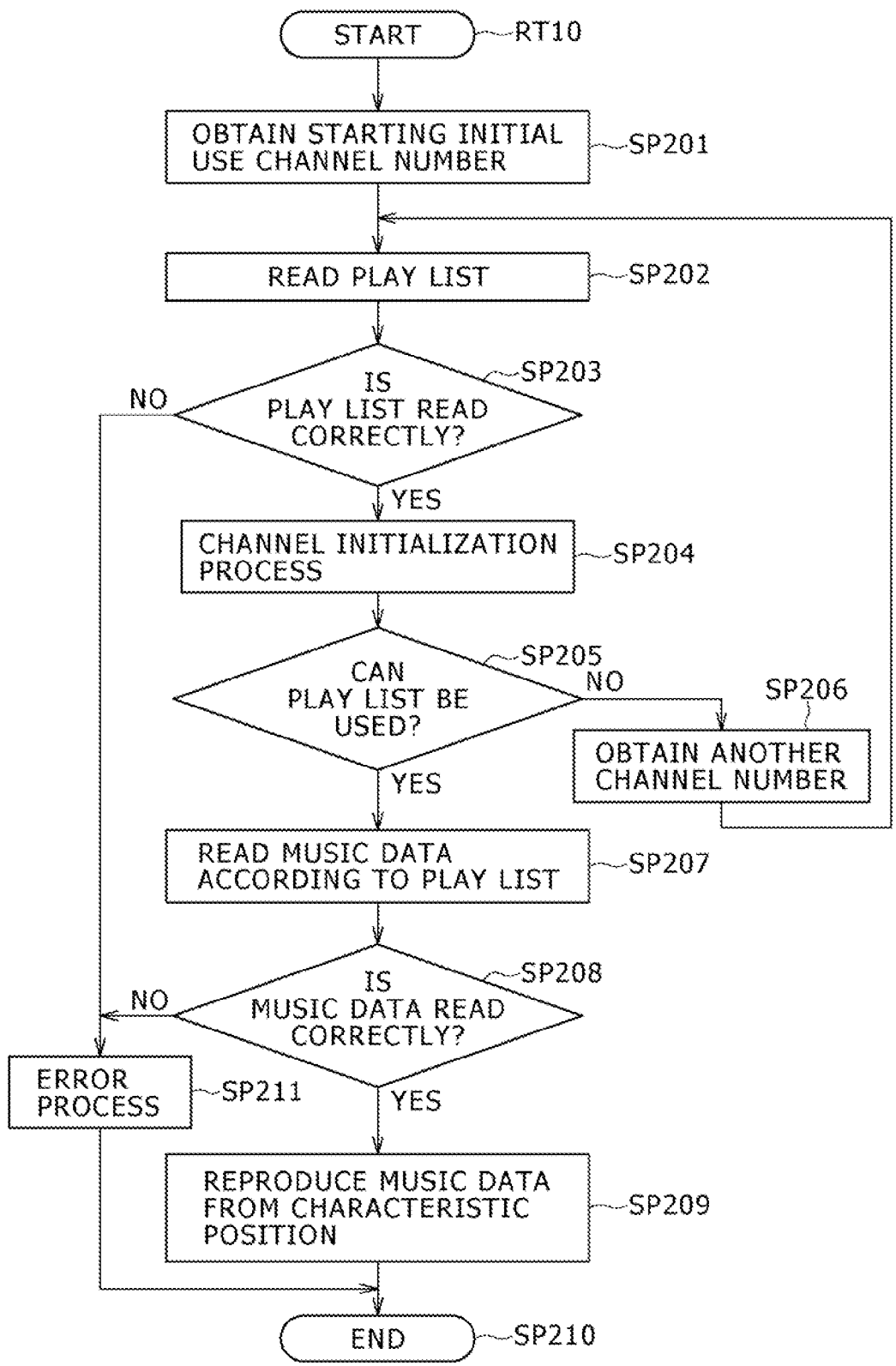
FIG. 33 is a flowchart of a list use reproducing function starting process procedure.

When the list use reproducing function is started in response to selection of the list use reproducing function by the user via the operating unit 111, the selecting unit 112 actually starts a list use reproducing function starting process procedure RT10 represented in FIG. 33. Starting the list use reproducing function starting process procedure RT10, the selecting unit 112 in step SP201 selects the channel of a starting initial use channel number, and notifies the selected channel to the reproducing unit 113. In step SP202, according to the notification from the selecting unit 112, the reproducing unit 113 reads a play list PL1 or PL2 assigned to the channel selected by the selecting unit 112 from the content data storage unit 114 or the external apparatus 116. The reproducing unit 113 then proceeds to step SP203.

In step SP203, the reproducing unit 113 determines whether the play list PL1 or PL2 has been read correctly. When a positive result is obtained in step SP203, it indicates that the data of the play list PL1 or PL2 is not corrupt, for example. Thus, when the reproducing unit 113 obtains the positive result, the reproducing unit 113 proceeds to next step SP204. Then, in step SP204, the reproducing unit 113 performs a channel initialization process using the play list PL1 or PL2. For example, when reproduction mode information PM included in the list attribute information LAT of the play list PL1 or PL2 indicates the shuffle reproduction mode, the reproducing unit 113 performs, as the channel initialization process, a process of changing the order of reproduction of music data D1 which order is defined in the play list PL1 or PL2 to another order obtained by randomly rearranging the music data D1. After performing such a channel initialization process, the reproducing unit 113 proceeds to next step SP205.

In step SP205, on the basis of reproduction use setting information LS included in the list attribute information LAT of the play list PL1 or PL2 after the channel initialization process, the reproducing unit 113 determines whether a setting is made to use the play list PL1 or PL2 for reproduction of the music data D1. When a negative result is obtained in step SP205, this indicates that the music data D1 are difficult to be reproduced using the play list PL1 or PL2. Thus, when the reproducing unit 113 obtains such a negative result, the reproducing unit 113 notifies this to the selecting unit 112.

Some channels among a plurality of channels are fixedly assigned, in advance, particular play lists PL1 and PL2 whose setting is made such that the play lists PL1 and PL2 are to be used for reproduction of the music data D1 and whose setting is not allowed to be changed. Thus, the selecting unit 112 in step SP206 selects a new channel to which one of the particular play lists PL1 and PL2 is assigned, and notifies the selected channel to the reproducing unit 113. When the selecting unit 112 notifies the newly selected channel to the reproducing unit 113, the reproducing unit 113 returns to step SP202 to read the particular play list PL1 or PL2 assigned to the channel newly selected by the selecting unit 112 from the content data storage unit 114 or the external apparatus 116. Then the same process as described above is performed again.

When a positive result is obtained in step SP205, this indicates that the music data D1 can be reproduced using the play list PL1 or PL2. Thus, when the reproducing unit 113 obtains such a positive result, the reproducing unit 113 proceeds to next step SP207. In step SP207, the reproducing unit 113 reads first music data D1 in the reproduction order according to the play list PL1 or PL2 from the content data storage unit 114 or the external apparatus 116. The reproducing unit 113 then proceeds to step SP208.

In step SP208, the reproducing unit 113 determines whether the music data D1 has been read correctly at this time. When a positive result is obtained in step SP208, this for example indicates that the music data D1 read at this time is not corrupt. Thus, when the reproducing unit 113 obtains such a positive result, the reproducing unit 113 proceeds to next step SP209. Then, in step SP209, the reproducing unit 113 makes the display controlling unit 117 display the selection screen 120 on the display unit 118, and starts reproducing the music data D1 from a characteristic position of the music data D1. The reproducing unit 113 then proceeds to next step SP210 to end the list use reproducing function starting process procedure RT10.

Incidentally, when a negative result is obtained in the above-described step SP203, this for example indicates that the data of the play list PL1 or PL2 is corrupt. Thus, when the reproducing unit 113 obtains such a negative result, the reproducing unit 113 proceeds to step SP211. In addition, when a negative result is obtained in step SP208, this for example indicates that the music data D1 is corrupt. Thus, also when the reproducing unit 113 obtains such a negative result, the reproducing unit 113 proceeds to step SP211. Then, in step SP211, as an error process, the reproducing unit 113 notifies the user that the music data D1 are difficult to be reproduced, for example. The reproducing unit 113 thereafter proceeds to step SP210.

Figure 34:
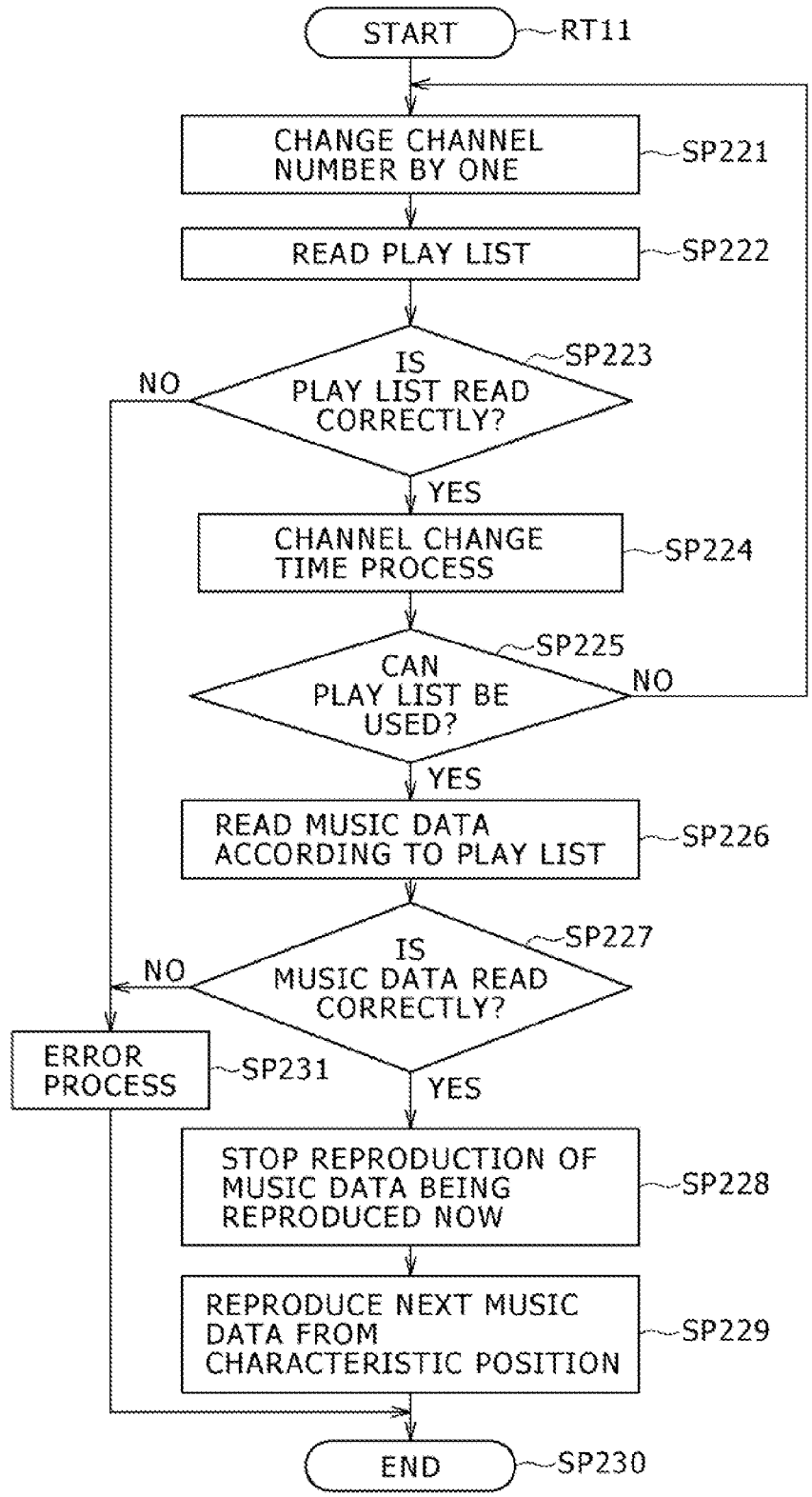
FIG. 34 is a flowchart of a channel changing process procedure.

A channel changing process during the performance of the list use reproducing function will next be described. When the selecting unit 112 is supplied with a channel changing instruction according to an operation of the operating unit 111 by the user while performing the list use reproducing function, the selecting unit 112 starts a channel changing process procedure RT11 represented in FIG. 34. Starting the channel changing process procedure RT11, the selecting unit 112 in step SP221 selects the channel of a channel number CN obtained by incrementing a channel number CN of a channel being selected now by one or a channel number CN obtained by decrementing the channel number CN of the channel being selected now by one according to the sequence of the channel numbers CN registered in the channel list CL and a changing direction in which to change the channel number CN, the changing direction being specified by the user. Then, the selecting unit 112 notifies the selected channel (that is, the channel number CN of the selected channel) to the reproducing unit 113. Thus, according to the notification from the selecting unit 112, the reproducing unit 113 in step SP222 reads a play list PL1 or PL2 assigned to the channel selected by the selecting unit 112 from the content data storage unit 114 or the external apparatus 116. The reproducing unit 113 then proceeds to next step SP223.

In step SP223, the reproducing unit 113 determines whether the play list PL1 or PL2 has been read correctly at this time. When a positive result is obtained in step SP223, this indicates that the data of the play list PL1 or PL2 is not corrupt, for example. Thus, when the reproducing unit 113 obtains such a positive result, the reproducing unit 113 proceeds to next step SP224. Then, in step SP324, the reproducing unit 114 performs a channel change time process.

For example, when reproduction mode information PM included in the list attribute information LAT of the play list PL1 or PL2 indicates the shuffle reproduction mode, the reproducing unit 113 in step SP224 performs, as the channel change time process, a process of changing the order of reproduction of music data D1 which order is defined in the play list PL1 or PL2 to another order obtained by randomly rearranging the music data D1. After performing such a channel change time process, the reproducing unit 113 proceeds to next step SP225.

In step SP225, on the basis of reproduction use setting information LS included in the list attribute information LAT of the play list PL1 or PL2 after the channel change time process, the reproducing unit 113 determines whether a setting is made to use the play list PL1 or PL2 for reproduction of the music data D1. When a negative result is obtained in step SP225, this indicates that the music data D1 are difficult to be reproduced using the play list PL1 or PL2. Thus, when the reproducing unit 113 obtains such a negative result, the reproducing unit 113 notifies this to the selecting unit 112. Thus, at this time, the selecting unit 112 returns to step SP221. The selecting unit 112 reselects the new channel of a channel number CN obtained by further incrementing the channel number CN of the channel corresponding to the play list PL1 or PL2 by one or a channel number CN obtained by further decrementing the channel number CN of the channel corresponding to the play list PL1 or PL2 by one. The selecting unit 112 notifies the reselected channel to the reproducing unit 113. Thus the reproducing unit 113 performs the same process as described above from step S222 on down again.

When a positive result is obtained in step SP225, this indicates that the music data D1 can be reproduced using the play list PL1 or PL2. Thus, when the reproducing unit 113 obtains such a positive result, the reproducing unit 113 proceeds to next step SP226. In step SP226, the reproducing unit 113 reads first music data D1 in the reproduction order according to the play list PL1 or PL2 assigned to the channel after the change from the content data storage unit 114 or the external apparatus 116. The reproducing unit 113 then proceeds to next step SP227. In step SP227, the reproducing unit 113 determines whether the music data D1 has been read correctly at this time. When a positive result is obtained in step SP227, this indicates that the music data D1 read at this time is not corrupt, for example. Thus, when the reproducing unit 113 obtains such a positive result, the reproducing unit 113 proceeds to next step SP228.

In step S228, the reproducing unit 113 stops the reproduction of music data D1 which reproduction has been performed according to the play list PL1 or PL2 assigned to the channel before the change. The reproducing unit 113 then proceeds to step SP229. Then, in step SP229, the reproducing unit 113 makes the display controlling unit 117 update the display contents of the selection screen 120 displayed on the display unit 118, and starts reproducing the music data D1 corresponding to the channel after the change from a characteristic position of the music data D1. The reproducing unit 113 then proceeds to next step SP230 to end the channel changing process procedure RT11.

Incidentally, when a negative result is obtained in the above-described step SP223, this indicates that the data of the play list PL1 or PL2 is corrupt, for example. Thus, when the reproducing unit 113 obtains such a negative result, the reproducing unit 113 proceeds to step SP231. In addition, when a negative result is obtained in step SP227, this indicates that the music data D1 is corrupt, for example. Thus, also when the reproducing unit 113 obtains such a negative result, the reproducing unit 113 proceeds to step SP231. Then, in step SP231, as an error process, the reproducing unit 113 notifies the user that the music data D1 are difficult to be reproduced, for example. The reproducing unit 113 thereafter proceeds to step SP230.

Figure 35:
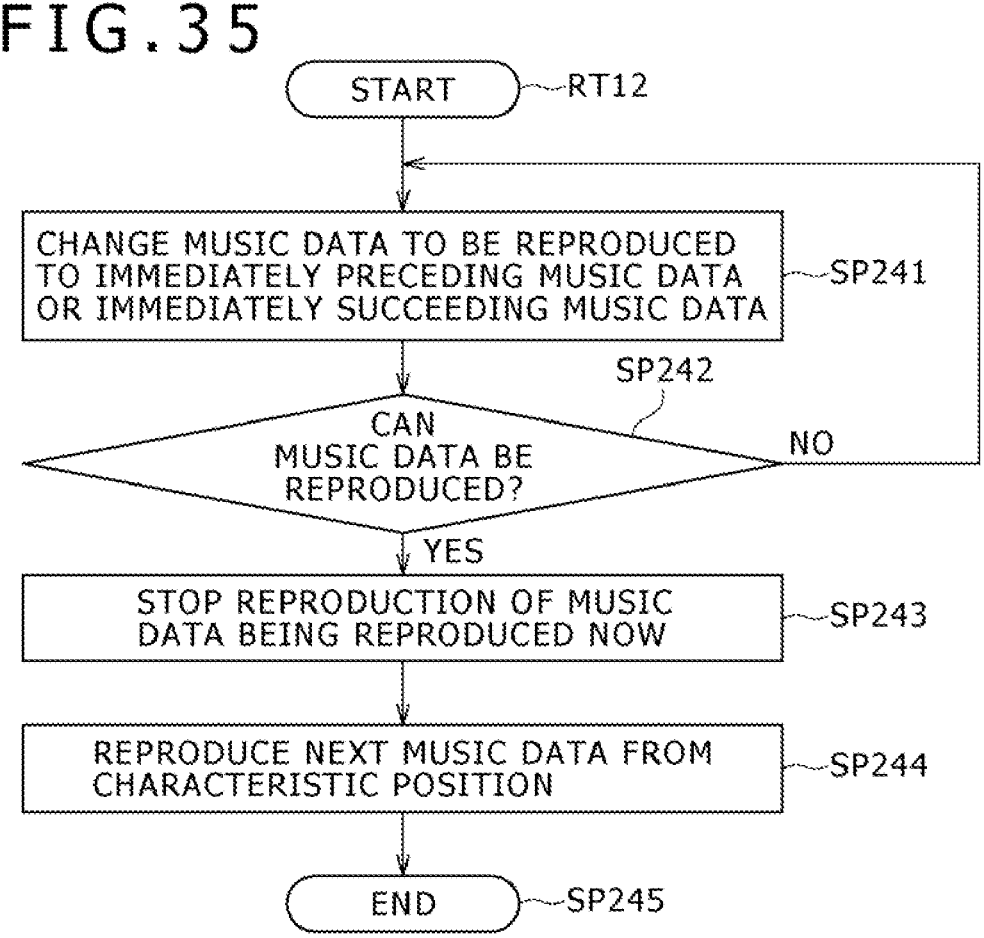
FIG. 35 is a flowchart of a reproduced music changing process procedure.

Description will next be made of a reproduced music changing process during the performance of the list use reproducing function. When the selecting unit 112 notifies the reproducing unit 113 to change music data D1 being reproduced and of a changing direction in which to change the music data D1 while the reproducing unit 113 is performing the list use reproducing function, the reproducing unit 113 starts a reproduced music changing process procedure RT12 represented in FIG. 35. Starting the reproduced music changing process procedure RT12, the reproducing unit 113 in step SP241 sets music data D1 for reproduction immediately preceding music data D1 being selected now or music data D1 for reproduction immediately succeeding the music data D1 being selected now as music data D1 after a change according to a list of content indicating information MID registered in a play list PL1 or PL2 being selected now (a list after a change when the shuffle reproduction mode is specified) and a changing direction in which to change the music data D1, the changing direction being notified by the selecting unit 112 (that is, specified by the user). The reproducing unit 113 reads the music data D1 after the change from the content data storage unit 114 or the external apparatus 116. The reproducing unit 113 then proceeds to next step SP242.

In step SP242, the reproducing unit 113 determines whether the music data D1 after the change can be reproduced. When a negative result is obtained in step SP242, this for example indicates that the music data D1 after the change is corrupt, or that the music data D1 are difficult to be reproduced as it is because reproduction setting information PS of music registration information TR corresponding to the music data D1 after the change indicates that the music data D1 is not to be reproduced. Thus, when the reproducing unit 113 obtains such a negative result, the reproducing unit 113 returns to step SP241. The reproducing unit 113 sets music data D1 for reproduction immediately preceding the music data D1 after the change or music data D1 for reproduction immediately succeeding the music data D1 after the change as new music data D1 after a change. The reproducing unit 113 then performs the same process as described above again.

When a positive result is obtained in step SP242, on the other hand, this for example indicates that the music data D1 after the change is not corrupt and that the music data D1 can be reproduced without any problem because the reproduction setting information PS of the music registration information TR corresponding to the music data D1 after the change indicates that the music data D1 can be reproduced. Thus, when the reproducing unit 113 obtains such a positive result, the reproducing unit 113 proceeds to next step SP243. In step SP243, the reproducing unit 113 stops the reproduction of the music data D1 being reproduced now. The reproducing unit 113 then proceeds to next step SP244. Then, in step SP244, the reproducing unit 113 makes the display controlling unit 117 update the display contents of the selection screen 120 displayed on the display unit 118, and starts reproducing the music data D1 after the change from a characteristic position of the music data D1. The reproducing unit 113 then proceeds to next step SP245 to end the reproduced music changing process procedure RT12. The reproducing unit 113 thus changes the music data D1 being reproduced according to a request of the user during the performance of the list use reproducing function.

In addition to such a configuration, the content data storage unit 114 in the reproducing apparatus 110 stores a play list PL1 generated by registering therein a plurality of pieces of music data D1 purchasable (that is, for pay) using the network NT, the play list PL1 being for introduction of the plurality of pieces of music data (this play list will hereinafter be referred to as an introduction play list). The content data storage unit 114 also stores a play list PL1 generated by registering therein a plurality of pieces of music data D1 allowing trial listening free of charge by streaming reproduction using the network NT (this play list will hereinafter be referred to as a streaming play list).

In this case, the introduction play list PL1 is formed by storing therein list attribute information LAT and a plurality of pieces of music registration information TR as in the case described above with reference to FIG. 4. However, because all of the plurality of pieces of music data D1 registered in the introduction play list PL1 are present on the network NT, the plurality of pieces of music registration information TR each include content indicating information MID indicating a storage position of the music data D1 on the network NT. The introduction play list PL1 is generated by the external apparatus 116, and includes version information indicating the version of the introduction play list PL1 itself, which version is upgraded when the external apparatus 116 updates the contents of the introduction play list PL1 (that is, changes the registered music data D1) as appropriate, in list detailed information LD, for example.

The streaming play list PL1 is also formed by storing therein list attribute information LAT and a plurality of pieces of music registration information TR as in the case described above with reference to FIG. 4. Because all of the plurality of pieces of music data D1 registered in the streaming play list PL1 are present on the network NT, the plurality of pieces of music registration information TR each include content indicating information MID indicating a storage position of the music data D1 on the network NT. The streaming play list PL1 is also generated by the external apparatus 116, and includes version information indicating the version of the streaming play list PL1 itself, which version is upgraded each time the external apparatus 116 updates the contents of the streaming play list PL1 (that is, changes the registered music data D1) as appropriate, in list detailed information LD, for example. The introduction play list PL1 and the streaming play list PL1 are assigned to different channels, and can be selected as channels by the user to be used for reproduction of music data D1.

Data-related information DRE corresponding to the plurality of pieces of music data D1 registered in the introduction play list PL1 and the streaming play list PL1 is stored in the content database CDB2 of a content data storage unit provided in the external apparatus 116, for example, together with the corresponding music data D1. The plurality of pieces of music data D1 registered in the introduction play list PL1 can each be purchased using the network NT. Thus, a plurality of pieces of data attribute information DAT corresponding to the plurality of pieces of music data D1 each include information related to purchase which information indicates a purchase price and the like of the corresponding music data D1.

In addition, the plurality of pieces of data attribute information DAT include reproduction limitation indicating information indicating that before purchase of the corresponding music data D1, reproduction of a section corresponding to a characteristic part referred to as a "bridge" of music based on the music data D1 (this section will hereinafter be referred to as a characteristic section) is allowed for trial listening and reproduction limitation is imposed to prevent the reproduction of the whole of the music data D1. That is, before purchasing each of a plurality of pieces of music data D1 that can be purchased using the network NT, the user is allowed to listen on trial to the characteristic part of the music, and the user is difficult to listen on trial to the whole of the one piece of music (that is, the whole of the music). Incidentally, such reproduction limitation indicating information includes the start position of a characteristic section (the start position is a characteristic position similar to that described above, and this start position will hereinafter be referred to specifically as a section start position) and the end position of the characteristic section (the end position is for example indicated by a time code or a reproduction passage time from the characteristic position, and this end position will hereinafter be referred to as a section end position).

On the other hand, each of the plurality of pieces of music data D1 registered in the streaming play list PL1 is reproduced by streaming reproduction using the network NT for trial listening, but is not stored in the reproducing apparatus 110 by the streaming reproduction. Thus, each of the plurality of pieces of data attribute information DAT corresponding to the plurality of pieces of music data D1 includes reproduction permitting information permitting the streaming reproduction of the whole of the corresponding music data D1. That is, the plurality of pieces of music data D1 that can be purchased using the network NT are reproduced by streaming reproduction so that the user can listen on trial to the whole of one piece of music. In addition, the plurality of pieces of data attribute information DAT each include information used when the corresponding music data D1 is downloaded rather than being reproduced by streaming reproduction. Thereby the plurality of pieces of music data D1 that can be purchased using the network NT can each be downloaded and stored in the reproducing apparatus 110.

When the selecting unit 112 selects a channel to which the introduction play list PL1 is assigned, the reproducing unit 113 accordingly reads the introduction play list PL1 from the content data storage unit 114. Then, the reproducing unit 113 sends version information stored in the introduction play list PL1 to the communication controlling unit 115. When the communication controlling unit 115 is supplied with the version information from the reproducing unit 113, the communication controlling unit 115 inquires of the external apparatus 116 about whether the introduction play list PL1 used now in the reproducing apparatus 110 is up to date. When it is confirmed as a result that the introduction play list PL1 is up to date, the communication controlling unit 115 notifies this to the reproducing unit 113.

When the introduction play list PL1 used now in the reproducing apparatus 110 is a play list before an update, the communication controlling unit 115 downloads a latest introduction play list PL1 from the external apparatus 116. The communication controlling unit 115 sends the latest introduction play list PL1 to the reproducing unit 113, and also sends the latest introduction play list PL1 to the content data storage unit 114. The content data storage unit 114 stores the latest introduction play list PL1 supplied from the communication controlling unit 115 by overwriting the introduction play list PL1 before the update, and thus changes the introduction play list PL1 to the latest introduction play list PL1.

The reproducing unit 113 sends content indicating information MID within one piece of music registration information TR stored in the latest introduction play list PL1 read from the content data storage unit 114 or supplied from the communication controlling unit 115 according to the latest introduction play list PL1. According to the content indicating information MID, the communication controlling unit 115 transmits download requesting information for making a request to download corresponding music data D1 for trial listening to the external apparatus 116 on the network NT.

In this case, receiving the download requesting information transmitted from the reproducing apparatus 110, the external apparatus 116 sets the music data D1 as music data for trial listening, a characteristic section of which can be reproduced, by adding additional information (that is, reproduction limitation setting information) that sets the characteristic section of the music data D1 reproducible for trial listening, for example, to the header of the music data D1 whose download is requested. Then, the external apparatus 116 returns the music data for trial listening to the reproducing apparatus 110 together with corresponding data-related information DRE in the first communication mode.

The communication controlling unit 115 downloads the music data for trial listening and the corresponding data-related information DRE transmitted from the external apparatus 116, and sends the music data for trial listening and the corresponding data-related information DRE to the reproducing unit 113. While temporarily storing the music data for trial listening and the corresponding data-related information DRE supplied from the communication controlling unit 115 in a buffer, the reproducing unit 113 starts reproducing the characteristic section of the music data for trial listening from a section start position on the basis of the added information added to the header of the music data for trial listening and reproduction limitation indicating information included in the data-related information DRE. The reproducing unit 113 thereby allows the user to listen on trial to the characteristic part of music based on the purchasable music data D1.

When the selecting unit 112 notifies the reproducing unit 113 to change the music data D1 being reproduced while the reproducing unit 113 is in the process of reproducing the characteristic section of the music data for trial listening, the reproducing unit 113 makes the communication controlling unit 115 download new music data for trial listening and corresponding data-related information DRE from the external apparatus 116 according to the introduction play list PL1 in the same manner as described above, and takes in the new music data for trial listening and the corresponding data-related information DRE to temporarily store the music data for trial listening and the corresponding data-related information DRE in the buffer. Then, the reproducing unit 113 stops reproducing the music data for trial listening at this point in time and starts reproducing the characteristic section of the new music data for trial listening from a section start position. The reproducing unit 113 discards the music data for trial listening that has been reproduced up to this point in time and the corresponding data-related information DRE from the buffer. Thus, the reproducing unit 113 changes the music data for trial listening being reproduced without storing the music data according to the introduction play list PL1 in response to a request from the user.

Further, when the reproducing unit 113 has completed the reproduction of the characteristic section of the music data for trial listening (that is, when the reproducing unit 113 has reproduced the characteristic section to a section end position), the reproducing unit 113 makes the communication controlling unit 115 download new music data for trial listening and corresponding data-related information DRE from the external apparatus 116 according to the introduction play list PL1 in the same manner as described above, and takes in the new music data for trial listening and the corresponding data-related information DRE to temporarily store the music data for trial listening and the corresponding data-related information DRE in the buffer. Then, the reproducing unit 113 starts reproducing the characteristic section of the new music data for trial listening from a section start position in place of the music data for trial listening having the characteristic section the reproduction of which has been completed at this point in time. The reproducing unit 113 discards the music data for trial listening having the characteristic section the reproduction of which has been completed at this point in time and the corresponding data-related information DRE from the buffer. Thus, also when the reproducing unit 113 has completed reproducing the characteristic section of the music data for trial listening, the reproducing unit 113 changes the music data for trial listening being reproduced without storing the music data according to the introduction play list PL1.

Further, when the user for example presses the decision button RM1J of the remote control RM2 to input a purchase decision instruction for deciding on purchasing original music data D1 (that is, music data D1 without reproduction limitation) corresponding to music data for trial listening being reproduced while the reproducing unit 113 is in the process of reproducing the characteristic section of the music data for trial listening, the selecting unit 112 notifies this to the communication controlling unit 115. When the selecting unit 112 notifies the decision to purchase the music data D1 to the communication controlling unit 115, the communication controlling unit 115 transmits purchase requesting information including purchase information necessary for a process of purchasing the original music data D1 corresponding to the music data for trial listening being reproduced to the external apparatus 116 on the network NT while making the reproducing unit 113 continue reproducing the music data for trial listening at this point in time.

When receiving the purchase requesting information transmitted from the reproducing apparatus 110, the external apparatus 116 performs the purchasing process for purchasing the music data D1 requested to be purchased by the reproducing apparatus 110 using the purchase information included in the purchase requesting information. When completing the purchasing process, the external apparatus 116 returns reproduction permitting information permitting the reproduction of the whole of the music data D1 requested to be purchased to the reproducing apparatus 110 together with a purchase completion notification.

The communication controlling unit 115 downloads the reproduction permitting information and the purchase completion notification transmitted from the external apparatus 116. The communication controlling unit 115 sends the reproduction permitting information to an added information updating unit 125, and sends the purchase completion notification to the display controlling unit 117. In addition, the communication controlling unit 115 sends content indicating information MID corresponding to the music data D1 purchased at this time (that is, content indicating information MID indicating a storage location on the network NT) to an indicating information changing unit 126. According to the reproduction permitting information supplied from the communication controlling unit 115, the added information updating unit 125 updates added information added to the header of the music data for trial listening being reproduced at this point in time in the reproducing unit 113 (that is, the music data for trial listening temporarily stored in the buffer) such that the whole of the music data for trial listening is set reproducible. The added information updating unit 125 thereby changes the music data for trial listening to the music data D1 whose reproduction limitation is lifted and the whole of which is allowed to be reproduced, so that the whole of the music data D1 can be reproduced freely.

When the purchasing process is completed and the reproduction limitation is lifted (that is, the added information is updated) while the reproducing unit 113 is in the process of reproducing the characteristic section of the music data for trial listening, and the user thereafter makes no request to change the music data D1 being reproduced, the reproducing unit 113 continues reproducing the music data for trial listening as the music data D1 past the section end position of the characteristic section. Thus, even when the music data for trial listening is requested to be purchased as original music data D1 and the purchasing process is actually performed while the reproducing unit 113 is in the process of reproducing the characteristic section of the music data for trial listening, the reproducing unit 113 can meanwhile continue reproducing the characteristic section of the music data for trial listening to allow the user to listen on trial to the characteristic part of the music. In addition, when the music data D1 is purchased during the reproduction, the reproducing unit 113 reproduces the music data for trial listening as the music data D1 past the section end position of the characteristic section to allow the user to continue listening to the music after the characteristic part.

When the reproducing unit 113 has reproduced the music data for trial listening as the music data D1 whose reproduction limitation is lifted to a tail end position and thus completed the reproduction, or stops the reproduction of the music data D1 in response to a notification to change the music data D1 being reproduced which notification is supplied from the selecting unit 112 while the reproducing unit 113 is in the process of reproducing the music data for trial listening as the music data D1 whose reproduction limitation is lifted, the reproducing unit 113 sends the music data D1 (that is, the music data D1 obtained by updating the added information of the music data for trial listening) and the corresponding data-related information DRE temporarily stored in the buffer from the buffer to the content data storage unit 114. The content data storage unit 114 stores and retains the music data D1 and the corresponding data-related information DRE supplied from the reproducing unit 113 in the content database CDB1.

Incidentally, when the reproducing unit 113 thus completes or stops the reproduction of the music data D1, the reproducing unit 113 starts reproducing the characteristic section of new music data for trial listening from a section start position while making the communication controlling unit 115 re-download the new music data for trial listening and corresponding data-related information DRE from the external apparatus 116 according to the introduction play list PL1 in the same manner as described above, and taking in the new music data for trial listening and the corresponding data-related information DRE to temporarily store the music data for trial listening and the corresponding data-related information DRE in the buffer.

When the content data storage unit 114 has completed storing the music data D1 and the corresponding data-related information DRE in the content database CDB1, the content data storage unit 114 sends new content indicating information indicating a storage location where the music data D1 is stored within the content data storage unit 114 to the indicating information changing unit 126. The indicating information changing unit 126 changes the content indicating information MID (this information indicates the storage location on the network NT and is the content indicating information MID supplied from the communication controlling unit 115) corresponding to the music data D1 purchased at this time within the music registration information TR included in the introduction play list PL1 within the content data storage unit 114 to the new content indicating information supplied from the content data storage unit 114.

Thus, when in a state of music data for trial listening being reproduced for trial listening according to the introduction play list PL1, corresponding original music data D1 is purchased, until the introduction play list PL1 is thereafter updated, the indicating information changing unit 126 makes unpurchased music data D1 downloaded as music data for trial listening from the external apparatus 116 and reproduced according to the introduction play list PL1. However, the indicating information changing unit 126 allows the purchased music data D1 to be read from the content data storage unit 114 and reproduced according to the introduction play list PL1 without the network NT being used.

Incidentally, when the selecting unit 112 notifies a newly selected channel to the reproducing unit 113 while the reproducing unit 113 is in the process of reproducing the characteristic section of music data for trial listening, the reproducing unit 113 reads a new play list PL1 or PL2 from the content data storage unit 114 or the external apparatus 116 in the same manner as described above according to the selected channel. Then, according to the new play list PL1 or PL2, the reproducing unit 113 reads music data D1 and data-related information DRE from the content data storage unit 114 or the external apparatus 116. The reproducing unit 113 stops reproducing the music data for trial listening at this point in time, and starts reproducing the read music data D1 from a characteristic position. Thus, the reproducing unit 113 ends the reproduction for trial listening of the characteristic part of music based on music data D1 that can be purchased using the introduction play list PL1.

The content data storage unit 114 stores, in advance, a purchase candidate registration list for registering purchasable music data D1 as purchase candidates. When the user presses the favorite button RM2A of the remote control RM2, for example, while the reproducing unit 113 is in the process of reproducing the characteristic section of music data for trial listening according to the introduction play list PL1, in order to input a purchase candidate registration requesting instruction to request original music data D1 corresponding to the music data for trial listening being reproduced at this point in time to be registered as a purchase candidate, the selecting unit 112 notifies this to the reproducing unit 113 and the display controlling unit 117.

When the selecting unit 112 notifies the reproducing unit 113 to register the music data D1 as a purchase candidate, the reproducing unit 113 reads the purchase candidate registration list from the content data storage unit 114. Then, when the selecting unit 112 further notifies the reproducing unit 113 of a decision to register the music data D1 as a purchase candidate, the reproducing unit 113 enters content indicating information MID, a music title and the like corresponding to the music data for trial listening being reproduced at this point in time in the purchase candidate registration list, and thereby registers the original music data D1 corresponding to the music data for trial listening as a purchase candidate. Thus, each time the reproducing unit 113 is requested to register original music data D1 corresponding to music data for trial listening as a purchase candidate during the reproduction of the music data for trial listening, the reproducing unit 113 registers the corresponding music data D1 as a purchase candidate in the purchase candidate registration list.

When the user operates the operating unit 111 to input a candidate purchasing instruction to purchase music data D1 registered as a purchase candidate at an arbitrary point in time while listening on trial to music using the introduction play list PL1 or while listening to music using another play list PL1, for example, the selecting unit 112 notifies this to the communication controlling unit 115. In this case, according to the notification from the selecting unit 112, the communication controlling unit 115 generates purchase requesting information (that is, purchase requesting information including purchase information necessary for a purchasing process) for requesting to purchase music data D1 that the user has finally decided on purchasing among pieces of music data D1 registered in the purchase candidate registration list. The communication controlling unit 115 transmits the generated purchase requesting information to the external apparatus 116 on the network NT.

At this time, receiving the purchase requesting information transmitted from the reproducing apparatus 110, the external apparatus 116 performs the purchasing process for purchasing the music data D1 requested to be purchased by the reproducing apparatus 110 using the purchase information included in the purchase requesting information. Consequently, when completing the purchasing process, the external apparatus 116 adds additional information (that is, reproduction permitting information) for setting the whole of the music data D1 reproducible to the header of the music data D1 requested to be purchased. Then the external apparatus 116 returns the music data D1 to which the additional information is added to the reproducing apparatus 110 together with corresponding data-related information DRE and a purchase completion notification.

The communication controlling unit 115 downloads the music data D1, the corresponding data-related information DRE, and the purchase completion notification returned from the external apparatus 116. Then, the communication controlling unit 115 sends the downloaded music data D1 and the corresponding data-related information DRE to the content data storage unit 114, and sends the purchase completion notification to the display controlling unit 117. In addition, the communication controlling unit 115 sends content indicating information MID corresponding to the music data D1 purchased at this time (that is, content indicating information MID indicating a storage location on the network NT) to the indicating information changing unit 126.

The content data storage unit 114 stores and retains the music data D1 and the corresponding data-related information DRE supplied from the communication controlling unit 115 in the content database CDB1. When the content data storage unit 114 has completed storing the music data D1 and the corresponding data-related information DRE in the content database CDB1, the content data storage unit 114 sends new content indicating information indicating a storage location where the music data D1 is stored within the content data storage unit 114 to the indicating information changing unit 126. As in the above, the indicating information changing unit 126 changes the content indicating information MID corresponding to the music data D1 purchased at this time within the music registration information TR included in the introduction play list PL1 within the content data storage unit 114 to the new content indicating information supplied from the content data storage unit 114.

Thus, also when the music data D1 registered as a purchase candidate in advance is purchased, the indicating information changing unit 126 accordingly changes the content indicating information MID within the introduction play list PL1. Thus, until the introduction play list PL1 is thereafter updated, the indicating information changing unit 126 allows the purchased music data D1 to be read from the content data storage unit 114 and reproduced according to the introduction play list PL1 without the network NT being used.

Incidentally, when the music data D1 is thus purchased, the communication controlling unit 115 notifies the purchased music data D1 to the reproducing unit 113. At this time, the reproducing unit 113 reads the purchase candidate registration list from the content data storage unit 114, and updates the purchase candidate registration list by canceling the registration of the purchased music data D1 among one or a plurality of pieces of music data D1 registered in the purchase candidate registration list. Then the reproducing unit 113 sends the thus updated purchase candidate registration list to the content data storage unit 114 to store the purchase candidate registration list in the content data storage unit 114. Thereby, the reproducing unit 113 prevents the purchase of the same music data D1 from being thereafter repeated using the purchase candidate registration list.

Figure 36:
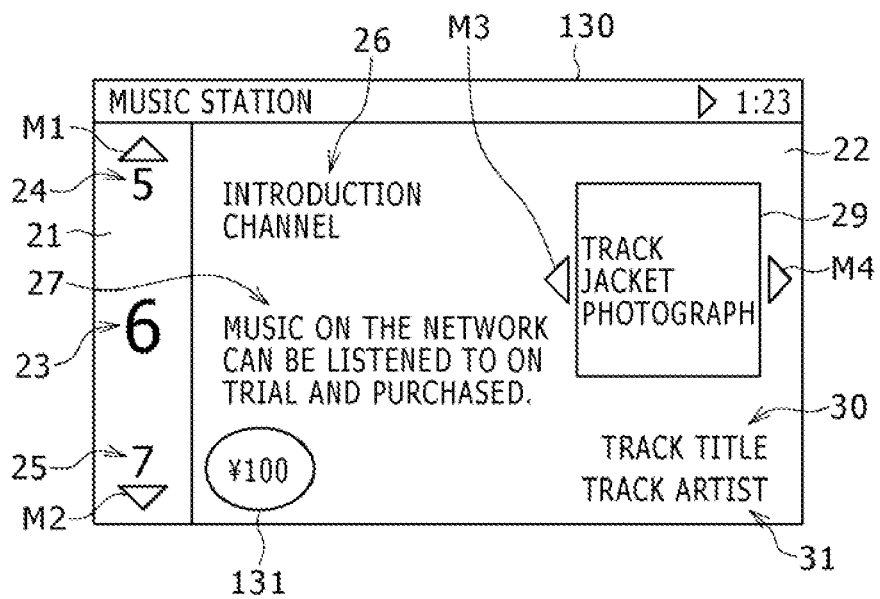
FIG. 36 is a schematic diagram showing a configuration of a selection screen when a channel to which an introduction play list is assigned is selected.

In addition, when the reproducing unit 113 supplies the display controlling unit 117 with the introduction play list PL1 and data attribute information DAT corresponding to music data D1 registered in the introduction play list PL1 in response to the selection by the selecting unit 112 of the channel to which the introduction play list PL1 is assigned, the display controlling unit 117 generates selection screen data on the basis of the introduction play list PL1 and the data attribute information DAT. The display controlling unit 117 then sends the selection screen data to the display unit 118 to thereby display a selection screen 130 as shown in FIG. 36, in which parts corresponding to those of FIG. 31 are identified by the same reference numerals, on the basis of the selection screen data on the display unit 118.

In this case, a selected channel notifying icon 23 for notifying the channel to which the introduction play list PL1 is assigned by channel number CN is displayed in a central part of a channel selecting area 21 of the selection screen 130, and a list name 26, a description 27 and the like corresponding to the introduction play list PL1 are displayed in a music selecting area 22 of the selection screen 130. In addition, because music data D1 reproduced for trial listening according to the introduction play list PL1 is purchasable, an icon 131 for notifying the purchase price of the music data D1 (this icon will hereinafter be referred to as a price notifying icon) is displayed on a lower side of the description 27 within the music selecting area 22, for example, on the selection screen 130 while the characteristic part of music based on the music data D1 is listened to on trial (that is, while the music data D1 not purchased yet is reproduced as music data for trial listening). Thereby, each time the music data D1 of music for trial listening is changed, the display controlling unit 117 can notify the user of the purchase price of the music data D1 of music that the user is listening to on trial by the price notifying icon 131 within the selection screen 130.

Figure 37:
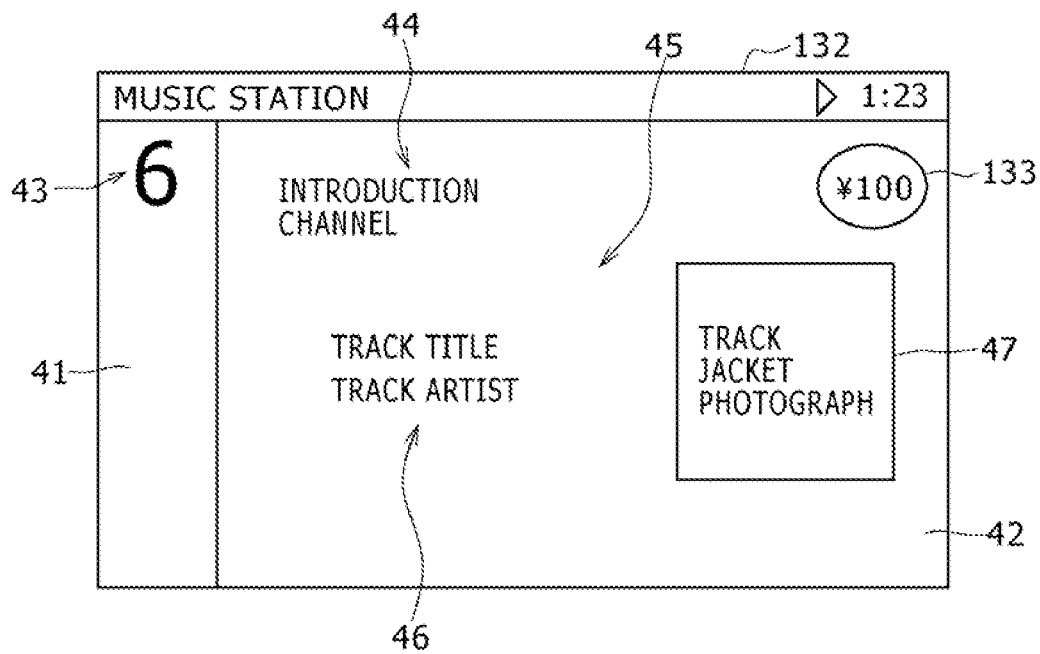
FIG. 37 is a schematic diagram showing a configuration of a reproduction screen when the channel to which the introduction play list is assigned is selected.

When the selecting unit 112 does not notify the reproducing unit 113 of a newly selected channel or to change music data D1 being reproduced for trial listening (that is, music data for trial listening) before the reproduction time of the reproduction of the characteristic section of the music data for trial listening from a section start position reaches a predetermined time (the predetermined time is shorter than a time necessary for reproduction from the section start position to a section end position), the reproducing unit 113 notifies the display controlling unit 117 that the music data for trial listening has been reproduced for the predetermined time from the section start position of the characteristic section at a point in time when the reproduction time has reached the predetermined time. In this case, the display controlling unit 117 generates reproduction screen data in the same manner as described above, and sends the reproduction screen data to the display unit 118 to thereby display a reproduction screen 132 as shown in FIG. 37, in which parts corresponding to those of FIG. 32 are identified by the same reference numerals, on the basis of the reproduction screen data on the display unit 118.

An price notifying icon 133 for notifying the purchase price of the music data D1 is displayed on an upper side of a jacket photograph image 47, for example, on the reproduction screen 132 while music based on the music data D1 is listened to on trial (that is, while the music data D1 not purchased yet is reproduced as music data for trial listening). Thereby, also in the case where the selection screen 130 displayed on the display unit 118 is changed to the reproduction screen 132, when the music based on the music data D1 not purchased yet is listened to on trial at this point in time, the display controlling unit 117 can notify the user of the purchase price of the music data D1 of the music that the user is listening to on trial by the price notifying icon 133 within the reproduction screen 132.

Figure 38:
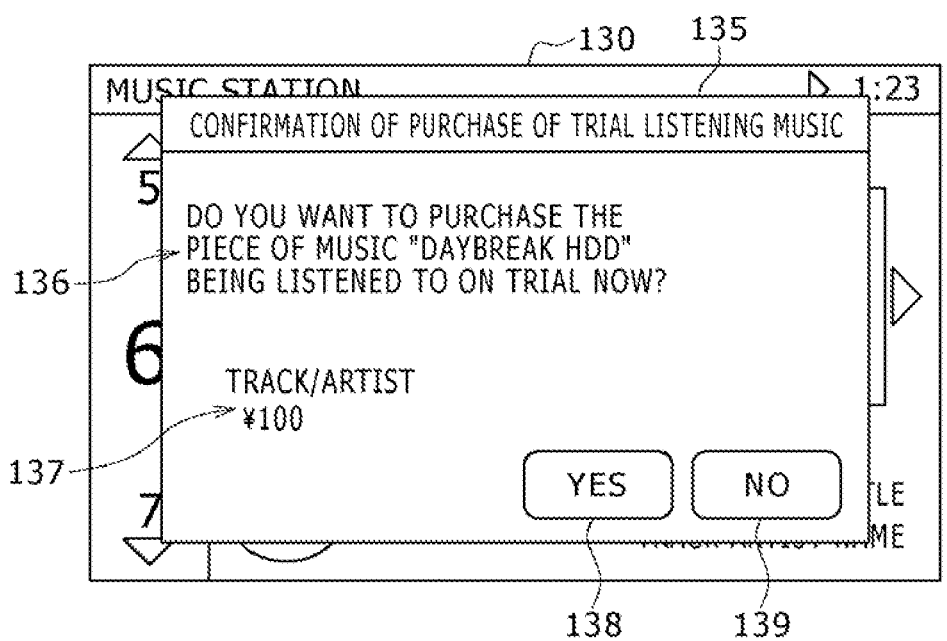
FIG. 38 is a schematic diagram showing a configuration of a purchase confirmation screen.

When while listening on trial to music based on music data D1 (that is, while the music data D1 not purchased yet is reproduced as music data for trial listening), the user once presses the decision button RM1J of the remote control RM2, for example, to input a purchase requesting instruction to request the purchase of the music data D1 of the music that the user is listening to on trial, the selecting unit 112 notifies this to the display controlling unit 117. In this case, according to the notification from the selecting unit 112, the display controlling unit 117 generates purchase confirmation screen data on the basis of data attribute information DAT corresponding to the music data D1 of the music that the user is listening to on trial at this point in time. The display controlling unit 117 then sends the purchase confirmation screen data to the display unit 118 to thereby display a purchase confirmation screen 135 as shown in FIG. 38, the purchase confirmation screen 135 being based on the purchase confirmation screen data, on for example the selection screen 130 (or the reproduction screen 132) in the display unit 118 such that the purchase confirmation screen 135 is superimposed on the selection screen 130 (or the reproduction screen 132).

In this case, purchase confirmation text 136 for confirming whether to purchase the music data D1 of the music now being listened to on trial is displayed on the purchase confirmation screen 135. In addition, music-related information 137 related to the music, such as a music title, an artist name, a purchase price and the like corresponding to the music data D1 of the music now being listened to on trial is displayed on the purchase confirmation screen 135. Further, a purchase decision button 138 for deciding on purchase and a purchase canceling button 139 for canceling the purchase are provided on the purchase confirmation screen 135. The display controlling unit 117 highlights one of the purchase decision button 138 and the purchase canceling button 139 on the purchase confirmation screen 135 in a predetermined display state such that one of the purchase decision button 138 and the purchase canceling button 139 is solely conspicuous within the purchase confirmation screen 135, for example.

In this state, when the user presses the left direction selecting button RM1H or the right direction selecting button RM1I of the remote control RM2 to input a left direction selecting instruction or a right direction selecting instruction, the selecting unit 112 notifies this to the display controlling unit 117. According to the notification from the selecting unit 112, the display controlling unit 117 alternately changes the highlight display state between the purchase decision button 138 and the purchase canceling button 139 on the purchase confirmation screen 135. The display controlling unit 117 thereby allows the user to select one of a decision to make the purchase and the cancellation of the purchase via the purchase decision button 138 or the purchase canceling button 139 on the purchase confirmation screen 135. Thus, through the purchase confirmation screen 135 displayed on the display unit 118, the display controlling unit 117 allows the user to confirm whether to actually purchase the music data D1 while notifying the user what music data the music data D1 that the user is going to purchase is.

When the user presses the decision button RM1J of the remote control RM2 again with the purchase decision button 138 selected on the purchase confirmation screen 135 displayed on the display unit 118, the selecting unit 112 recognizes an instruction input at this time as a purchase decision instruction, and notifies the communication controlling unit 115 that a decision to purchase the music data D1 is made. Thus, the selecting unit 112 allows the purchase of the music data D1 of the music being listened to on trial to be made as described above according to an operation of the operating unit 111 (that is, the remote control RM2) by the user.

Figure 39:
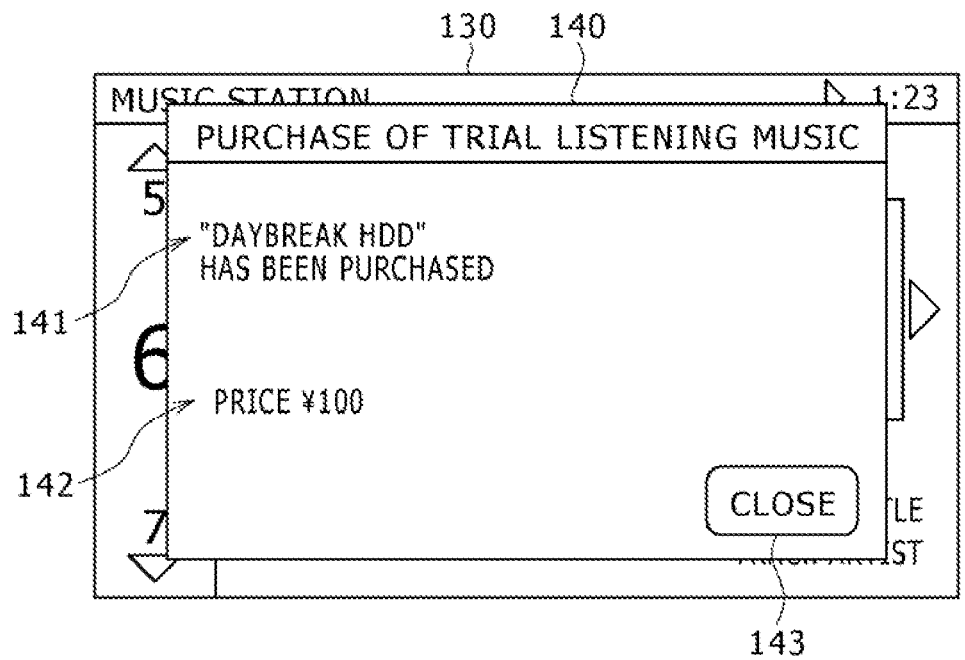
FIG. 39 is a schematic diagram showing a configuration of a purchase completion notifying screen.

When the purchase of the music data D1 of the music being listened to on trial has been made, and the display controlling unit 117 is consequently supplied with a purchase completion notification from the communication controlling unit 115, the display controlling unit 117 generates purchase completion notifying screen data on the basis of data attribute information DAT corresponding to the music data D1 of the music being listened to on trial at this point in time (that is, the music data D1 purchased at this time). Then, the display controlling unit 117 sends the purchase completion notifying screen data to the display unit 118. The display controlling unit 117 thereby displays a purchase completion notifying screen 140 as shown in FIG. 39, the purchase completion notifying screen 140 being based on the purchase completion notifying screen data, on for example the selection screen 130 (or the reproduction screen 132) in the display unit 118 such that the purchase completion notifying screen 140 is superimposed on the selection screen 130 (or the reproduction screen 132).

In this case, purchase completion notifying text 141 for notifying the completion of purchase of the music data D1 of the music being listened to on trial now is displayed on the purchase completion notifying screen 140. In addition, price information 142 indicating the purchase price of the music data D1 the purchase of which is completed is displayed on the purchase completion notifying screen 140. Further, a closing button 143 for closing the purchase completion notifying screen 140 is provided on the purchase completion notifying screen 140. Thus, through the purchase completion notifying screen 140 displayed on the display unit 118, the display controlling unit 117 can notify the user what music data D1 has been purchased.

Figure 40:
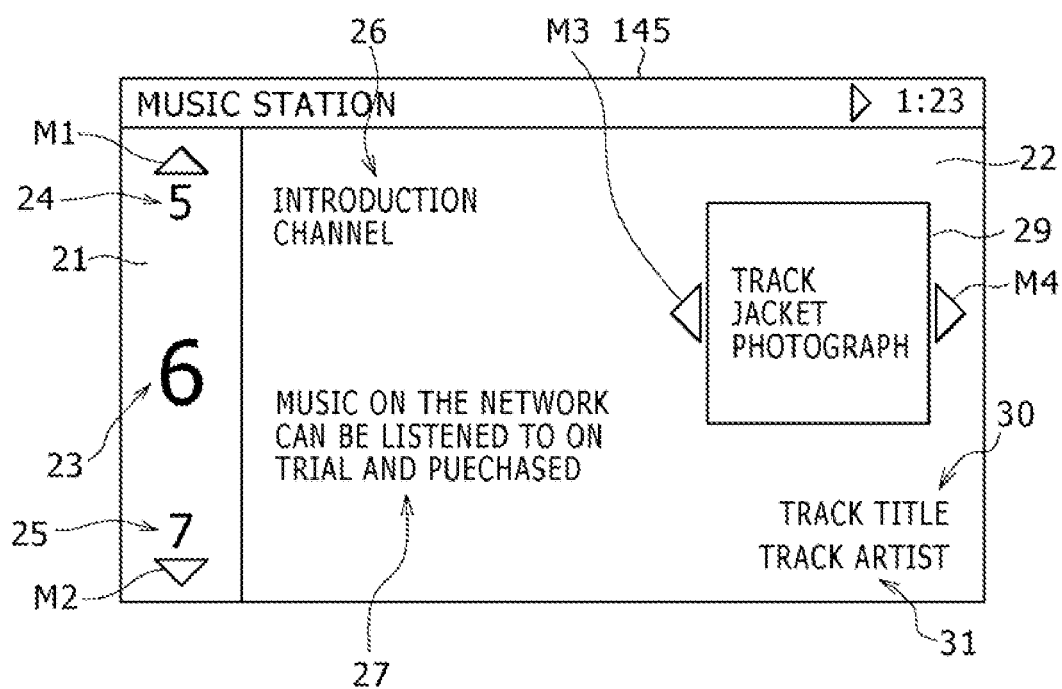
FIG. 40 is a schematic diagram showing a configuration of a selection screen when purchased music data is reproduced.
Figure 41:
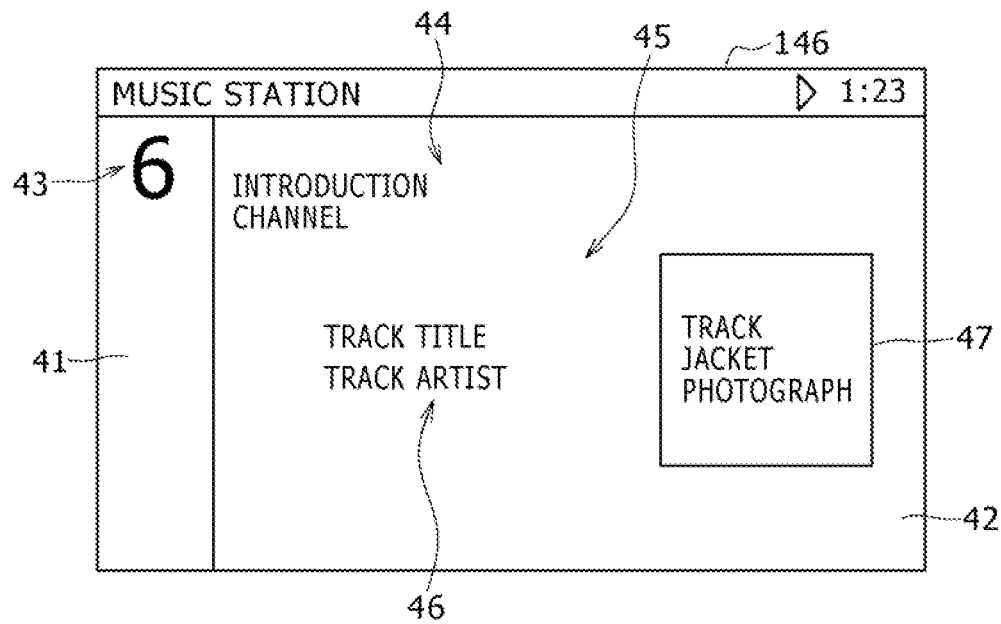
FIG. 41 is a schematic diagram showing a configuration of a reproduction screen when the purchased music data is reproduced.

When the user presses the decision button RM1J of the remote control RM2, for example, in a state of the purchase completion notifying screen 140 being displayed on the display unit 118 by the display controlling unit 117, the selecting unit 112 recognizes an instruction input at this time as a screen closing instruction to close the purchase completion notifying screen 140, and notifies the display controlling unit 117 that the closing of the purchase completion notifying screen 140 is requested. The display controlling unit 117 thus closes the purchase completion notifying screen 140 and displays a selection screen 145 as shown in FIG. 40 (or a reproduction screen 146 as shown in FIG. 41) on the display unit 118.

That is, while the purchasing process for purchasing the music data D1 of the music being listened to on trial is performed, the reproducing unit 113 reproduces the music data D1 as music data for trial listening, and therefore the display controlling unit 117 continues displaying the selection screen 130 (or the reproduction screen 132) on the display unit 118. When the purchase of the music data D1 is completed, the display controlling unit 117 updates a part of the display contents of the selection screen 130 (or the reproduction screen 132). Thus, when the reproduction of the music data D1 (that is, the music data D1 obtained by lifting the reproduction limitation on the music data for trial listening) is continued after the completion of the purchase of the music data D1, the display controlling unit 117 shows the selection screen 145 (or the reproduction screen 146) having display contents partly updated to the user to allow the user to check the music data D1 being reproduced by a music title 30, an artist name 31, and the like even after the purchase.

However, the price notifying icon 131 (or the price notifying icon 133) is erased from the selection screen 145 (or the reproduction screen 146) having the display contents partly updated according to the completion of the purchase. Thereby, through the selection screen 145 (or the reproduction screen 146) from which the price notifying icon 131 (or the price notifying icon 133) is erased, the display controlling unit 117 can also notify the user that the music data D1 being reproduced has been purchased.

The selection screen 120 when a channel to which a play list PL1 or PL2 other than the introduction play list PL1 is selected displays the network distribution notifying icon 28 when the music data D1 being reproduced is provided via the network NT. However, the selection screen 130 when the channel to which the introduction play list PL1 is assigned is selected and when music data D1 not purchased yet is reproduced for trial listening displays the price notifying icon 131 in place of the network distribution notifying icon 28 though the music data D1 is provided via the network NT.

That is, the price notifying icon 131 being displayed on the selection screen 130 indicates that the music data D1 being reproduced is not purchased yet and that the music data D1 being reproduced is not stored (that is, obtained) in the reproducing apparatus 110 and is consequently provided via the network NT. Therefore, while the music data D1 not purchased yet is reproduced for trial listening, the price notifying icon 131 also having a notifying function (that is, notifying contents) intended for the network distribution notifying icon 28 is displayed in place of the network distribution notifying icon 28 on the selection screen 130. The configuration of the selection screen 130 is thus simplified as much as possible. In addition, the price notifying icon 133 is displayed in place of the network distribution notifying icon 48 on the reproduction screen 132 for the same reason, and the configuration of the price notifying icon 133 is simplified as much as possible.

Figure 42:
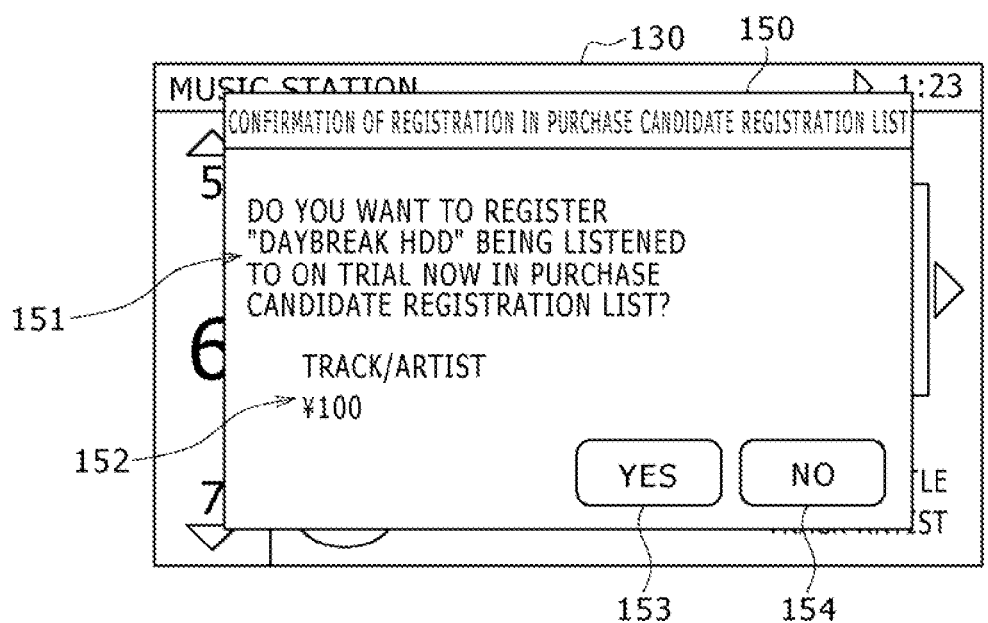
FIG. 42 is a schematic diagram showing a configuration of a purchase candidate registration confirming screen.

When the selecting unit 112 notifies the display controlling unit 117 that registration of music data D1 of music being listened to on trial as a purchase candidate is requested in response to the input of a purchase candidate registration requesting instruction, the display controlling unit 117 generates purchase candidate registration confirming screen data on the basis of data attribute information DAT corresponding to the music data D1 of the music being listened to on trial at this point in time. Then, the display controlling unit 117 sends the purchase candidate registration confirming screen data to the display unit 118. The display controlling unit 117 thereby displays a purchase candidate registration confirming screen 150 as shown in FIG. 42, the purchase candidate registration confirming screen 150 being based on the purchase candidate registration confirming screen data, on for example the selection screen 130 (or the reproduction screen 132) in the display unit 118 such that the purchase candidate registration confirming screen 150 is superimposed on the selection screen 130 (or the reproduction screen 132).

In this case, registration confirmation text 151 for confirming whether to register the music data D1 of the music being listened to on trial now in the purchase candidate registration list as a purchase candidate is displayed on the purchase candidate registration confirming screen 150. In addition, music-related information 152 such as a music title, an artist name, a purchase price and the like corresponding to the music data D1 of the music being listened to on trial now is displayed on the purchase candidate registration confirming screen 150. Further, a purchase candidate registering decision button 153 for deciding on registering the purchase candidate and a purchase candidate registration canceling button 154 for canceling the registration of the purchase candidate are provided on the purchase candidate registration confirming screen 150. The display controlling unit 117 highlights one of the purchase candidate registering decision button 153 and the purchase candidate registration canceling button 154 on the purchase candidate registration confirming screen 150 in a predetermined display state such that one of the purchase candidate registering decision button 153 and the purchase candidate registration canceling button 154 is solely conspicuous within the purchase candidate registration confirming screen 150, for example.

In this state, when the user presses the left direction selecting button RM1H or the right direction selecting button RM1I of the remote control RM2 to input a left direction selecting instruction or a right direction selecting instruction, the selecting unit 112 notifies this to the display controlling unit 117. According to the notification from the selecting unit 112, the display controlling unit 117 alternately changes the highlight display state between the purchase candidate registering decision button 153 and the purchase candidate registration canceling button 154 on the purchase candidate registration confirming screen 150. The display controlling unit 117 thereby allows the user to select one of a decision to register the purchase candidate and the cancellation of the registration of the purchase candidate via the purchase candidate registering decision button 153 and the purchase candidate registration canceling button 154 on the purchase candidate registration confirming screen 150. Thus, through the purchase candidate registration confirming screen 150 displayed on the display unit 118, the display controlling unit 117 allows the user to confirm whether to actually register the music data D1 as a purchase candidate while notifying the user what music data the music data D1 that the user is going to register as a purchase candidate is.

When the user presses the decision button RM1J of the remote control RM2 with the purchase candidate registering decision button 153 selected on the purchase candidate registration confirming screen 150 displayed on the display unit 118, the selecting unit 112 recognizes an instruction input at this time as a purchase candidate registering decision instruction, and notifies the reproducing unit 113 that a decision to register the music data D1 of the music being listened to on trial as a purchase candidate is made. Thus, the selecting unit 112 allows the music data D1 of the music being listened to on trial to be registered in the purchase candidate registration list as a purchase candidate according to an operation of the operating unit 111 (that is, the remote control RM2) by the user.

Figure 43:
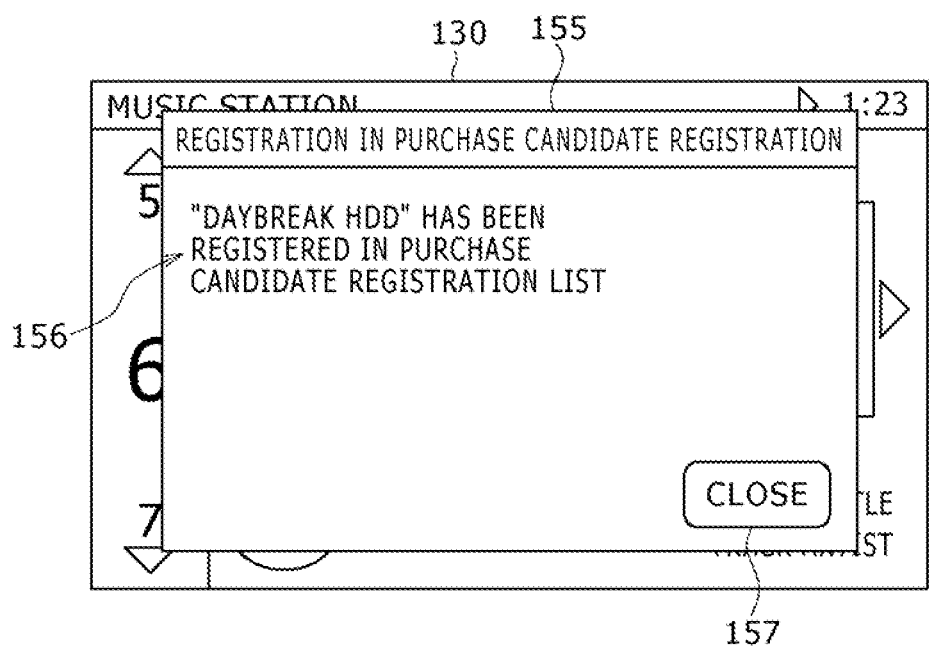
FIG. 43 is a schematic diagram showing a configuration of a purchase candidate registration completion notifying screen.

When the registration of the music data D1 of the music being listened to on trial as a purchase candidate in the purchase candidate registration list is completed, the reproducing unit 113 notifies this to the display controlling unit 117. When the reproducing unit 113 notifies the display controlling unit 117 that the registration of the music data D1 of the music being listened to on trial as a purchase candidate is completed, the display controlling unit 117 generates purchase candidate registration completion notifying screen data on the basis of data attribute information DAT corresponding to the music data D1 of the music being listened to on trial at this point in time (that is, the music data D1 registered as a purchase candidate at this time). Then, the display controlling unit 117 sends the purchase candidate registration completion notifying screen data to the display unit 118. The display controlling unit 117 thereby displays a purchase candidate registration completion notifying screen 155 as shown in FIG. 43, the purchase candidate registration completion notifying screen 155 being based on the purchase candidate registration completion notifying screen data, on for example the selection screen 130 (or the reproduction screen 132) in the display unit 118 such that the purchase candidate registration completion notifying screen 155 is superimposed on the selection screen 130 (or the reproduction screen 132).

In this case, purchase candidate registration completion notifying text 156 for notifying the completion of registration of the music data D1 of the music being listened to on trial now as a purchase candidate is displayed on the purchase candidate registration completion notifying screen 155. In addition, a closing button 157 for closing the purchase candidate registration completion notifying screen 155 is provided on the purchase candidate registration completion notifying screen 155. Thus, by displaying the purchase candidate registration completion notifying screen 155 on the display unit 118, the display controlling unit 117 can notify the user what music data D1 has been registered as a purchase candidate.

Figure 44:
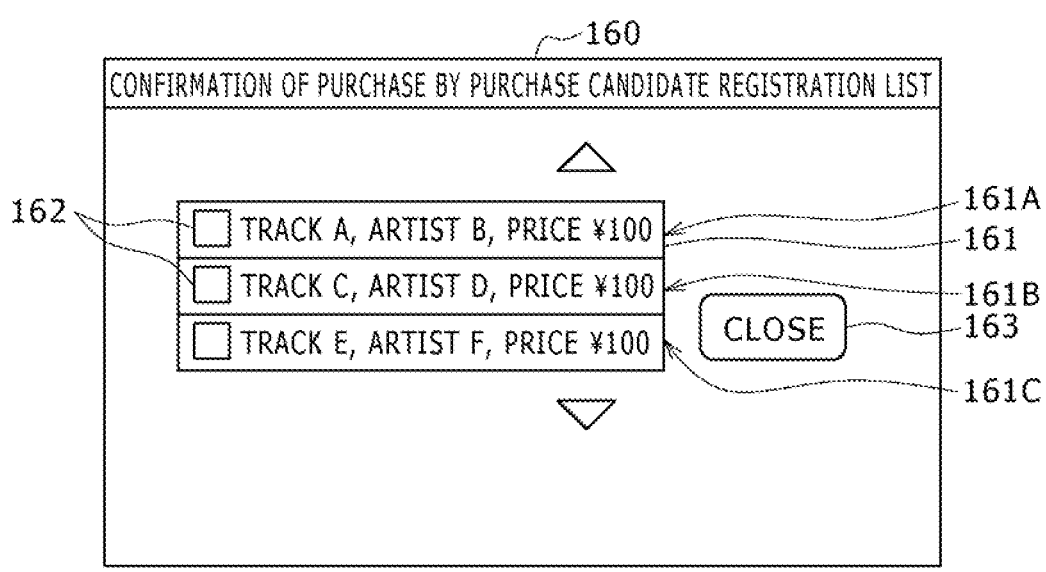
FIG. 44 is a schematic diagram showing a configuration of a candidate purchase confirmation screen.

In addition, when the user operates the operating unit 111 to input a candidate purchase requesting instruction to request the purchase of music data D1 registered as a purchase candidate at an arbitrary point in time, the selecting unit 112 notifies this to the reproducing unit 113. At this time, according to the notification from the selecting unit 112, the reproducing unit 113 reads the purchase candidate registration list from the content data storage unit 114, and then sends the purchase candidate registration list to the display controlling unit 117. The display controlling unit 117 generates candidate purchase confirmation screen data on the basis of the purchase candidate registration list. Then the display controlling unit 117 sends the candidate purchase confirmation screen data to the display unit 118 to thereby display a candidate purchase confirmation screen 160 as shown in FIG. 44, the candidate purchase confirmation screen 160 being based on the candidate purchase confirmation screen data, on the display unit 118.

In this case, the candidate purchase confirmation screen 160 has a purchase candidate presenting section 161 for displaying a list of presentation items 161A to 161C for presenting music data D1 registered as purchase candidates. Each of the presentation items 161A to 161C in the purchase candidate presenting section 161 shows a music title, an artist name, a purchase price and the like corresponding to one piece of music data D1 registered as a purchase candidate, and has a checkbox 162 for confirming whether to purchase the music data D1. Incidentally, when a checkmark is placed in the checkbox 162, it indicates that the purchase of the music data D1 presented by the corresponding presentation item 161A to 161C is decided on.

The candidate purchase confirmation screen 160 also has a candidate purchase decision button 163 for deciding on purchasing music data D1 registered as purchase candidates in the purchase candidate registration list and then closing the candidate purchase confirmation screen 160. Thereby, through the candidate purchase confirmation screen 160 displayed on the display unit 118, the display controlling unit 117 allows the user to confirm whether to actually purchase the music data D1 registered as purchase candidates while presenting the music data D1.

When for example the user presses the upward direction selecting button RM1F or the downward direction selecting button RM1G of the remote control RM2 to input a scroll instruction in a state of the candidate purchase confirmation screen 160 being displayed on the display unit 118 by the display controlling unit 117, the selecting unit 112 notifies this to the display controlling unit 117. At this time, according to the notification from the selecting unit 112, the display controlling unit 117 moves a cursor (not shown) indicating for example one of the presentation items 161A to 161C within the purchase candidate presenting section 161 of the candidate purchase confirmation screen 160 in an upward direction or a downward direction.

When the selecting unit 112 notifies the display controlling unit 117 to further move the cursor in the upward direction or the downward direction in a state of the cursor indicating an uppermost or lowermost presentation item 161A or 161C within the purchase candidate presenting section 161, the display controlling unit 117 scrolls each of the presentation items 161A to 161C in an opposite direction from the moving direction of the cursor without changing the position of the cursor, thereby displaying a new presentation item that has not been able to be displayed up to this time. The display controlling unit 117 thereby allows the music data D1 as purchase candidates to be selected as the presentation items 161A to 161C within the purchase candidate presenting section 161 one by one by the cursor on the candidate purchase confirmation screen 160.

When for example the user presses the decision button RM1J of the remote control RM2 in a state of the cursor indicating one of the presentation items 161A to 161C on the candidate purchase confirmation screen 160, the selecting unit 112 recognizes an instruction input at this time as a purchase selecting instruction, and notifies this to the display controlling unit 117. According to the notification from the selecting unit 112, the display controlling unit 117 displays a checkmark in the checkbox 162 of the presentation item 161A to 161C indicated by the cursor at this point in time in the purchase candidate presenting section 161 of the candidate purchase confirmation screen 160. Incidentally, when the selecting unit 112 notifies the display controlling unit 117 of the input of a purchase selecting instruction again with the cursor indicating the presentation item 161A to 161C having a checkmark displayed in the checkbox 162, the display controlling unit 117 removes the checkmark. Thus, by the checkmark displayed in the checkbox 162 within the candidate purchase confirmation screen 160, the display controlling unit 117 notifies the selection of the corresponding music data D1 as music data D1 to be actually purchased.

When for example the user presses the right direction selecting button RM1I of the remote control RM2 to input a right direction selecting instruction, the selecting unit 112 notifies this to the display controlling unit 117. At this time, according to the notification from the selecting unit 112, the display controlling unit 117 moves the cursor from the purchase candidate presenting section 161 to the candidate purchase decision button 163 on the candidate purchase confirmation screen 160. Incidentally, when for example the user presses the left direction selecting button RM1H of the remote control RM2 with the cursor placed on the candidate purchase decision button 163, and the selecting unit 112 notifies a left direction selecting instruction to the display controlling unit 117, the display controlling unit 117 moves the cursor from the candidate purchase decision button 163 to the purchase candidate presenting section 161 on the candidate purchase confirmation screen 160. Thereby the display controlling unit 117 allows the presentation item 161A to 161C to be indicated by the cursor again.

When for example the user presses the decision button RM1J of the remote control RM2 with the cursor placed on the candidate purchase decision button 163, the selecting unit 112 recognizes an instruction input at this time as a candidate purchasing instruction, and notifies this to the display controlling unit 117 and the communication controlling unit 115. According to the notification from the selecting unit 112, the display controlling unit 117 determines music data D1 that the user has decided on purchasing on the basis of display contents of the candidate purchase confirmation screen 160 at this point in time, notifies the determined music data D1 as music data D1 to be purchased to the communication controlling unit 115, and closes the candidate purchase confirmation screen 160.

The communication controlling unit 115 transmits purchase requesting information (that is, purchase requesting information including purchase information) for requesting the purchase of one or a plurality of pieces of music data D1 to be purchased, the music data D1 being notified by the display controlling unit 117, to the external apparatus 116 on the network NT. When the purchased music data D1, corresponding data-related information DRE, and a purchase completion notification are consequently transmitted from the external apparatus 116 in response to the completion of the purchasing process, the communication controlling unit 115 downloads the purchased music data D1, the corresponding data-related information DRE, and the purchase completion notification, and sends the purchase completion notification to the display controlling unit 117.

Figure 45:
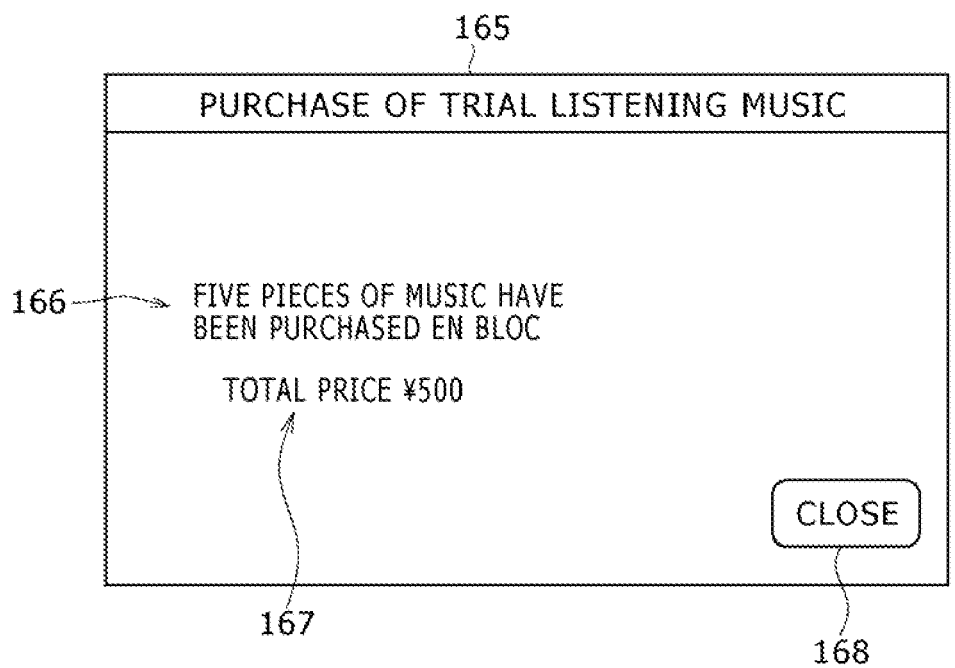
FIG. 45 is a schematic diagram showing a configuration of a candidate purchase completion notifying screen.

When supplied with the purchase completion notification from the communication controlling unit 115, the display controlling unit 117 for example generates candidate purchase completion notifying screen data on the basis of the purchase completion notification. Then, the display controlling unit 117 sends the candidate purchase completion notifying screen data to the display unit 118. The display controlling unit 117 thereby displays a candidate purchase completion notifying screen 165 as shown in FIG. 45, the candidate purchase completion notifying screen 165 being based on the candidate purchase completion notifying screen data, on the display unit 118.

In this case, purchase completion notifying text 166 notifying the completion of the purchase of the music data D1 using the purchase candidate registration list is displayed on the candidate purchase completion notifying screen 165. In addition, price information 167 indicating a sum of purchase prices of the purchased music data D1 is displayed on the candidate purchase completion notifying screen 165. Further, the candidate purchase completion notifying screen 165 has a closing button 168 for closing the candidate purchase completion notifying screen 165. Thus, through the candidate purchase completion notifying screen 165 displayed on the display unit 118, the display controlling unit 117 can notify the user that the purchase of the music data D1 using the purchase candidate registration list has been completed.

When the user presses the decision button RM1J of the remote control RM2, for example, with the candidate purchase completion notifying screen 165 displayed on the display unit 118 by the display controlling unit 117, the selecting unit 112 recognizes an instruction input at this time as a screen closing instruction to close the candidate purchase completion notifying screen 165, and notifies this to the display controlling unit 117. The display controlling unit 117 thereby closes the candidate purchase completion notifying screen 165 displayed on the display unit 118.

On the other hand, when the selecting unit 112 selects a channel to which the streaming play list PL1 is assigned, the reproducing unit 113 accordingly reads the streaming play list PL1 from the content data storage unit 114. Then, the reproducing unit 113 sends version information stored in the streaming play list PL1 to the communication controlling unit 115. When the communication controlling unit 115 is supplied with the version information from the reproducing unit 113, the communication controlling unit 115 inquires of the external apparatus 116 about whether the streaming play list PL1 used now in the reproducing apparatus 110 is up to date. When it is confirmed as a result that the streaming play list PL1 is up to date, the communication controlling unit 115 notifies this to the reproducing unit 113.

When the streaming play list PL1 used now in the reproducing apparatus 110 is a play list before an update, the communication controlling unit 115 downloads a latest streaming play list PL1 from the external apparatus 116. The communication controlling unit 115 sends the latest streaming play list PL1 to the reproducing unit 113, and also sends the latest streaming play list PL1 to the content data storage unit 114. The content data storage unit 114 stores the latest streaming play list PL1 supplied from the communication controlling unit 115 by overwriting the streaming play list PL1 before the update, and thus changes the streaming play list PL1 to the latest streaming play list PL1.

The reproducing unit 113 sends content indicating information MID within one piece of music registration information TR stored in the latest streaming play list PL1 read from the content data storage unit 114 or supplied from the communication controlling unit 115 according to the latest streaming play list PL1. According to the content indicating information MID, the communication controlling unit 115 transmits streaming distribution requesting information for making a request to distribute corresponding music data D1 for streaming reproduction (this distribution will hereinafter be referred to as streaming distribution) to the external apparatus 116 on the network NT.

In this case, receiving the streaming distribution requesting information transmitted from the reproducing apparatus 110, the external apparatus 116 sets the music data D1 whose streaming distribution is requested as music data for trial listening as it is. Then, the external apparatus 116 returns the music data for trial listening to the reproducing apparatus 110 together with corresponding data-related information DRE in the second communication mode. The communication controlling unit 115 sends the music data for trial listening and the corresponding data-related information DRE transmitted from the external apparatus 116 to the reproducing unit 113 while receiving the music data for trial listening and the corresponding data-related information DRE. The reproducing unit 113 starts streaming reproduction of the music data for trial listening supplied from the communication controlling unit 115 from a start position of the music data for trial listening. Thus the reproducing unit 113 allows the user to listen on trial to the whole of music based on the music data D1 that can be listened to on trial. Incidentally, the reproducing unit 113 sends data attribute information DAT included in the data-related information DRE supplied from the communication controlling unit 115 at this time to the display controlling unit 117.

When the selecting unit 112 notifies the reproducing unit 113 to change the music data D1 being reproduced while the reproducing unit 113 is in the process of performing the streaming reproduction of the whole of the music data for trial listening, the reproducing unit 113 takes in new music data for trial listening and corresponding data-related information DRE from the external apparatus 116 according to the streaming play list PL1 in the same manner as described above, while making the communication controlling unit 115 receive the new music data for trial listening and the corresponding data-related information DRE in the second communication mode. The reproducing unit 113 stops the streaming reproduction of the music data for trial listening at this point in time and starts the streaming reproduction of the new music data for trial listening from a start position. The reproducing unit 113 thus changes the music data for trial listening and performs the streaming reproduction of the music data for trial listening according to the streaming play list PL1 in response to a request from the user.

Further, when the reproducing unit 113 has completed the streaming reproduction of the whole of the music data for trial listening, the reproducing unit 113 takes in new music data for trial listening and corresponding data-related information DRE from the external apparatus 116 according to the streaming play list PL1 in the same manner as described above, while making the communication controlling unit 115 receive the new music data for trial listening and the corresponding data-related information DRE in the second communication mode. The reproducing unit 113 starts the streaming reproduction of the new music data for trial listening from a start position in place of the music data for trial listening the whole of which has been reproduced by streaming reproduction at this point in time. Thus, also when the reproducing unit 113 has completed reproducing the whole of the music data for trial listening, the reproducing unit 113 changes the music data for trial listening being reproduced by streaming reproduction and starts the streaming reproduction of the new music data for trial listening from the start position according to the streaming play list PL1.

Further, when the user presses the decision button RM1J of the remote control RM2, for example, to input a download decision instruction for deciding on downloading music data D1 corresponding to music data for trial listening being reproduced by streaming reproduction (that is, the same music data D1 as the music data for trial listening) while the reproducing unit 113 is in the process of performing the streaming reproduction of the music data for trial listening, the selecting unit 112 notifies this to the communication controlling unit 115. When the selecting unit 112 notifies the decision to download the music data D1 to the communication controlling unit 115, the communication controlling unit 115 transmits download requesting information requesting the downloading of the music data D1 corresponding to the music data for trial listening being reproduced by streaming reproduction to the external apparatus 116 on the network NT while making the reproducing unit 113 continue the streaming reproduction of the music data for trial listening at this point in time.

When receiving the download requesting information transmitted from the reproducing apparatus 110, the external apparatus 116 returns the music data D1 requested to be downloaded (that is, the same music data as the music data for trial listening being reproduced by streaming reproduction by the reproducing apparatus 110 at this point in time) to the reproducing apparatus 110 in the first communication mode together with corresponding data-related information DRE. The communication controlling unit 115 downloads the music data D1 and the corresponding data-related information DRE returned from the external apparatus 116. The communication controlling unit 115 then sends the music data D1 and the corresponding data-related information DRE to the content data storage unit 114. In addition, when completing the download, the communication controlling unit 115 notifies the completion of the download to the display controlling unit 117. Further, the communication controlling unit 115 sends content indicating information MID corresponding to the music data D1 downloaded at this time (that is, content indicating information MID indicating a storage location on the network NT) to the indicating information changing unit 126.

The content data storage unit 114 stores and retains the music data D1 and the corresponding data-related information DRE downloaded and supplied from the communication controlling unit 115 in the content database CDB1. Also at this time, when the content data storage unit 114 has completed storing the music data D1 and the corresponding data-related information DRE in the content database CDB1, the content data storage unit 114 sends new content indicating information indicating a storage location where the music data D1 is stored within the content data storage unit 114 to the indicating information changing unit 126. Thus, as in the above, the indicating information changing unit 126 changes the content indicating information MID (this information indicates the storage location on the network NT and is the content indicating information MID supplied from the communication controlling unit 115) corresponding to the music data D1 downloaded at this time within the music registration information TR included in the streaming play list PL1 within the content data storage unit 114 to the new content indicating information supplied from the content data storage unit 114.

Thus, when in a state of music data for trial listening being reproduced by streaming reproduction for trial listening according to the streaming play list PL1, corresponding music data D1 is downloaded, until the streaming play list PL1 is thereafter updated, the indicating information changing unit 126 makes music data D1 not downloaded yet received as music data for trial listening from the external apparatus 116 and reproduced by streaming reproduction according to the streaming play list PL1. However, the indicating information changing unit 126 allows the downloaded music data D1 to be read from the content data storage unit 114 and reproduced according to the streaming play list PL1 without the network NT being used.

Even when music data D1 corresponding to music data for trial listening is downloaded during the streaming reproduction of the music data for trial listening, the reproducing unit 113 continues the streaming reproduction of the music data for trial listening because the download is performed by the communication controlling unit 115. Thereby, even when music data D1 corresponding to music data for trial listening is requested to be downloaded and actually downloaded during the streaming reproduction of the music data for trial listening, the reproducing unit 113 meanwhile allows the user to continue listening on trial to music obtained by performing the streaming reproduction of the music data for trial listening.

After completion of the downloading of the music data D1 corresponding to the music data for trial listening being reproduced by streaming reproduction, when the streaming reproduction of the music data for trial listening is performed to a tail end position and is thus ended without the user making a request to change the music data D1 being reproduced by streaming reproduction, the reproducing unit 113 takes in new music data for trial listening and corresponding data-related information DRE from the external apparatus 116 again according to the streaming play list PL1 in the same manner as described above, while making the communication controlling unit 115 receive the new music data for trial listening and the corresponding data-related information DRE. Thus the reproducing unit 113 starts the streaming reproduction of the new music data for trial listening from a start position in place of the music data for trial listening the streaming reproduction of which has been performed to the tail end position and thus ended.

After completion of the downloading of the music data D1 corresponding to the music data for trial listening being reproduced by streaming reproduction, when the user makes a request to change the music data D1 being reproduced by streaming reproduction before the streaming reproduction of the music data for trial listening to the tail end position is completed, the reproducing unit 113 takes in new music data for trial listening and corresponding data-related information DRE from the external apparatus 116 again according to the streaming play list PL1 in the same manner as described above, while making the communication controlling unit 115 receive the new music data for trial listening and the corresponding data-related information DRE. Thus the reproducing unit 113 stops the streaming reproduction of the music data for trial listening at this point in time and starts the streaming reproduction of the new music data for trial listening from a start position.

Incidentally, when the selecting unit 112 notifies a newly selected channel to the reproducing unit 113 while the reproducing unit 113 is in the process of performing the streaming reproduction of music data for trial listening, the reproducing unit 113 reads a new play list PL1 or PL2 from the content data storage unit 114 or the external apparatus 116 in the same manner as described above according to the selected channel. Then, according to the new play list PL1 or PL2, the reproducing unit 113 reads music data D1 and data-related information DRE from the content data storage unit 114 or the external apparatus 116. The reproducing unit 113 stops the streaming reproduction of the music data for trial listening at this point in time, and starts reproducing the read music data D1 from a characteristic position. Thus, the reproducing unit 113 ends the reproduction for trial listening of music based on music data D1 that can be purchased using the streaming play list PL1.

The content data storage unit 114 stores, in advance, a download candidate registration list for registering music data D1 that can be listened to on trial as download candidates. When the user presses the favorite button RM2A of the remote control RM2, for example, while the reproducing unit 113 is in the process of performing the streaming reproduction of music data for trial listening according to the streaming play list PL1, in order to input a download candidate registration requesting instruction to request music data D1 corresponding to the music data for trial listening being reproduced by the streaming reproduction at this point in time to be registered as a download candidate, the selecting unit 112 notifies this to the reproducing unit 113.

When the selecting unit 112 notifies the reproducing unit 113 to register the music data D1 as a download candidate, the reproducing unit 113 reads the download candidate registration list from the content data storage unit 114. Then, when the selecting unit 112 further notifies the reproducing unit 113 of a decision to register the music data D1 as a download candidate, the reproducing unit 113 enters content indicating information MID, a music title and the like corresponding to the music data for trial listening being reproduced by the streaming reproduction at this point in time in the download candidate registration list, and thereby registers the music data D1 corresponding to the music data for trial listening as a download candidate. Thus, each time the reproducing unit 113 is requested to register music data D1 corresponding to music data for trial listening as a download candidate during the streaming reproduction of the music data for trial listening, the reproducing unit 113 registers the corresponding music data D1 as a download candidate in the download candidate registration list.

When the user operates the operating unit 111 to input a candidate downloading instruction to download music data D1 registered as a download candidate at an arbitrary point in time while listening on trial to music using the streaming play list PL1 or while listening to music using another play list PL1, for example, the selecting unit 112 notifies this to the communication controlling unit 115. In this case, according to the notification from the selecting unit 112, the communication controlling unit 115 transmits download requesting information for requesting to download music data D1 that the user has finally decided on downloading among pieces of music data D1 registered in the download candidate registration list to the external apparatus 116 on the network NT.

In this case, receiving the download requesting information transmitted from the reproducing apparatus 110, the external apparatus 116 returns the music data D1 requested to be downloaded to the reproducing apparatus 110 in the first communication mode together with corresponding data-related information DRE. The communication controlling unit 115 downloads the music data D1 and the corresponding data-related information DRE returned from the external apparatus 116, and then sends the music data D1 and the corresponding data-related information DRE to the content data storage unit 114. In addition, when completing downloading the music data D1 and the corresponding data-related information DRE, the communication controlling unit 115 notifies the completion of the download to the display controlling unit 117. Further, the communication controlling unit 115 sends content indicating information MID corresponding to the music data D1 downloaded at this time (that is, content indicating information MID indicating a storage location on the network NT) to the indicating information changing unit 126.

The content data storage unit 114 stores and retains the music data D1 and the corresponding data-related information DRE supplied from the communication controlling unit 115 in the content database CDB1. When the content data storage unit 114 has completed storing the music data D1 and the corresponding data-related information DRE in the content database CDB1, the content data storage unit 114 sends new content indicating information indicating a storage location where the music data D1 is stored within the content data storage unit 114 to the indicating information changing unit 126. As in the above, the indicating information changing unit 126 changes the content indicating information MID corresponding to the music data D1 downloaded at this time within the music registration information TR included in the streaming play list PL1 within the content data storage unit 114 to the new content indicating information supplied from the content data storage unit 114.

Thus, also when the music data D1 registered as a download candidate is downloaded, the indicating information changing unit 126 accordingly changes the content indicating information MID within the streaming play list PL1. Thus, until the streaming play list PL1 is thereafter updated, the indicating information changing unit 126 allows the downloaded music data D1 to be read from the content data storage unit 114 and reproduced according to the streaming play list PL1 without the network NT being used.

Incidentally, when the communication controlling unit 115 has thus downloaded the music data D1 and the corresponding data-related information DRE, the communication controlling unit 115 notifies the downloaded music data D1 to the reproducing unit 113. At this time, the reproducing unit 113 reads the download candidate registration list from the content data storage unit 114, and updates the download candidate registration list by canceling the registration of the downloaded music data D1 among one or a plurality of pieces of music data D1 registered in the download candidate registration list. Then the reproducing unit 113 sends the thus updated download candidate registration list to the content data storage unit 114 to store the download candidate registration list in the content data storage unit 114. Thereby, the reproducing unit 113 prevents the download of the same music data D1 from being thereafter repeated using the download candidate registration list.

Figure 46:
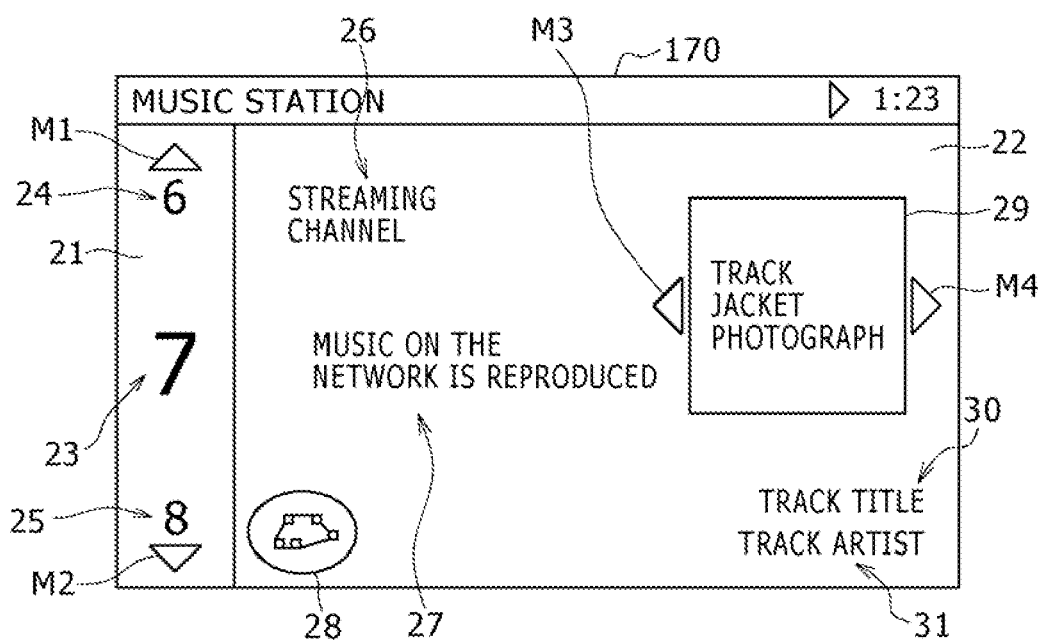
FIG. 46 is a schematic diagram showing a configuration of a selection screen when a channel to which a streaming play list is assigned is selected.

In addition, when the reproducing unit 113 supplies the display controlling unit 117 with the streaming play list PL1 and data attribute information DAT corresponding to music data D1 registered in the streaming play list PL1 in response to the selection by the selecting unit 112 of the channel to which the streaming play list PL1 is assigned, the display controlling unit 117 generates selection screen data on the basis of the streaming play list PL1 and the data attribute information DAT. The display controlling unit 117 then sends the selection screen data to the display unit 118 to thereby display a selection screen 170 as shown in FIG. 46, in which parts corresponding to those of FIG. 31 are identified by the same reference numerals, on the basis of the selection screen data on the display unit 118.

In this case, a selected channel notifying icon 23 for notifying the channel to which the streaming play list PL1 is assigned as a channel number CN is displayed in a central part of a channel selecting area 21 of the selection screen 170, and a list name 26, a description 27 and the like corresponding to the streaming play list PL1 are displayed in a music selecting area 22 of the selection screen 170. In addition, because music data D1 reproduced by streaming reproduction for trial listening according to the streaming play list PL1 is provided via the network NT, a network distribution notifying icon 28 is displayed on the selection screen 170.

Figure 47:
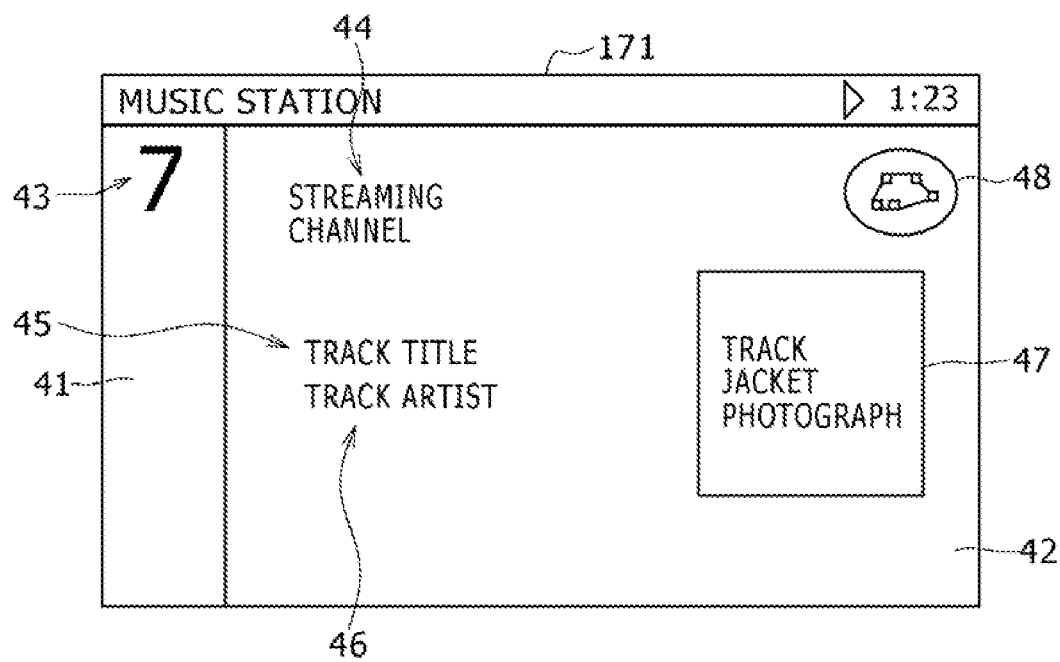
FIG. 47 is a schematic diagram showing a configuration of a reproduction screen when the channel to which the streaming play list is assigned is selected.

When the selecting unit 112 does not notify the reproducing unit 113 of a newly selected channel or to change music data D1 being reproduced for trial listening (that is, music data for trial listening) before the reproduction time of the streaming reproduction of the music data for trial listening from a start position reaches a predetermined time (the predetermined time is shorter than a time necessary for streaming reproduction from the start position to a tail end position), the reproducing unit 113 notifies the display controlling unit 117 that the music data for trial listening has been reproduced by streaming reproduction for the predetermined time from the start position at a point in time when the reproduction time has reached the predetermined time. In this case, the display controlling unit 117 generates reproduction screen data in the same manner as described above, and sends the reproduction screen data to the display unit 118 to thereby display a reproduction screen 171 as shown in FIG. 47, in which parts corresponding to those of FIG. 32 are identified by the same reference numerals, on the basis of the reproduction screen data on the display unit 118.

A network distribution notifying icon 48 is displayed on an upper side of a jacket photograph image 47, for example, on the reproduction screen 171 while music based on the music data D1 is listened to on trial (that is, while the music data D1 not downloaded yet is reproduced by streaming reproduction as music data for trial listening).

Figure 48:
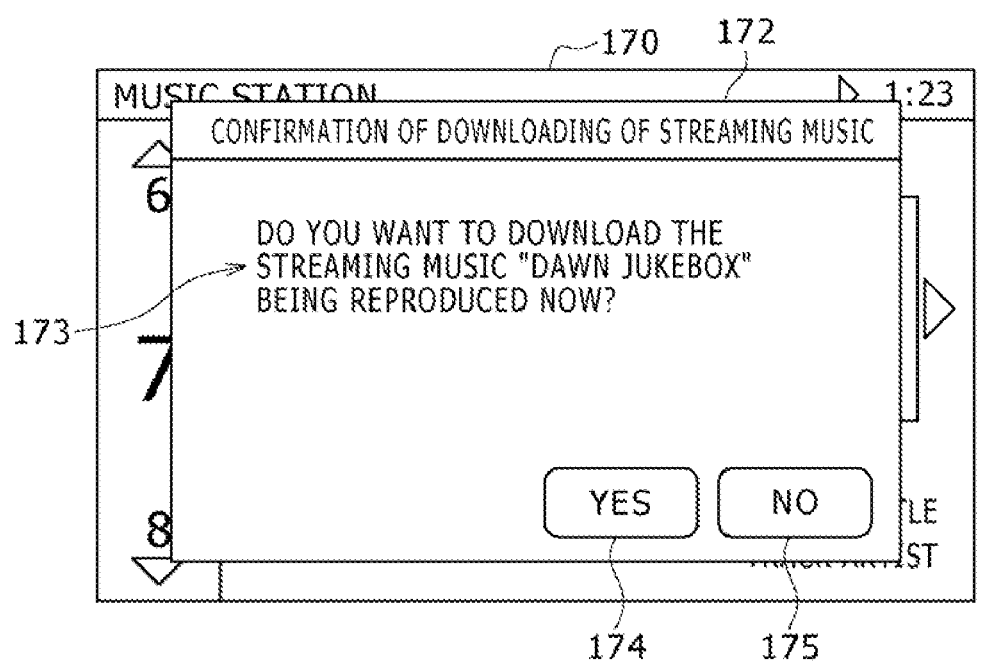
FIG. 48 is a schematic diagram showing a configuration of a download confirmation screen.

When while listening on trial to music based on music data D1 (that is, while the music data D1 not downloaded yet is reproduced by streaming reproduction as music data for trial listening), the user once presses the decision button RM1J of the remote control RM2, for example, to input a download requesting instruction to request the downloading of the music data D1 of the music that the user is listening to on trial, the selecting unit 112 notifies this to the display controlling unit 117. In this case, according to the notification from the selecting unit 112, the display controlling unit 117 generates download confirmation screen data on the basis of data attribute information DAT corresponding to the music data D1 of the music that the user is listening to on trial at this point in time. The display controlling unit 117 then sends the download confirmation screen data to the display unit 118 to thereby display a download confirmation screen 172 as shown in FIG. 48, the download confirmation screen 172 being based on the download confirmation screen data, on for example the selection screen 170 (or the reproduction screen 171) in the display unit 118 such that the download confirmation screen 172 is superimposed on the selection screen 170 (or the reproduction screen 171).

In this case, download confirmation text 173 for confirming whether to download the music data D1 of the music now being listened to on trial is displayed on the download confirmation screen 172. In addition, a download decision button 174 for deciding on the download and a download canceling button 175 for canceling the download are provided on the download confirmation screen 172. The display controlling unit 117 highlights one of the download decision button 174 and the download canceling button 175 on the download confirmation screen 172 in a predetermined display state such that one of the download decision button 174 and the download canceling button 175 is solely conspicuous within the download confirmation screen 172, for example.

In this state, when the user presses the left direction selecting button RM1H or the right direction selecting button RM1I of the remote control RM2 to input a left direction selecting instruction or a right direction selecting instruction, the selecting unit 112 notifies this to the display controlling unit 117. According to the notification from the selecting unit 112, the display controlling unit 117 alternately changes the highlight display state between the download decision button 174 and the download canceling button 175 on the download confirmation screen 172. The display controlling unit 117 thereby allows the user to select one of a decision to perform the download and the cancellation of the download via the download decision button 174 and the download canceling button 175 on the download confirmation screen 172. Thus, through the download confirmation screen 172 displayed on the display unit 118, the display controlling unit 117 allows the user to confirm whether to actually download the music data D1.

When the user presses the decision button RM1J of the remote control RM2 again with the download decision button 174 selected on the download confirmation screen 172 displayed on the display unit 118, the selecting unit 112 recognizes an instruction input at this time as a download decision instruction, and notifies the communication controlling unit 115 that a decision to download the music data D1 is made. Thus, the selecting unit 112 allows the music data D1 of the music being listened to on trial to be downloaded according to an operation of the operating unit 111 (that is, the remote control RM2) by the user.

Figure 49:
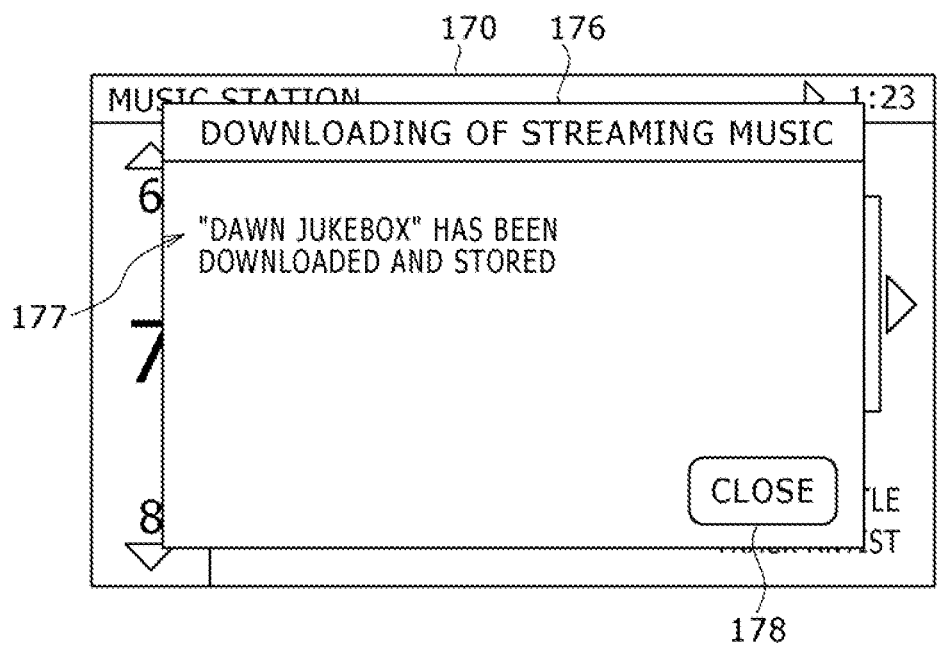
FIG. 49 is a schematic diagram showing a configuration of a download completion notifying screen.

When the music data D1 of the music being listened to on trial has been downloaded, and the display controlling unit 117 is consequently supplied with a download completion notification from the communication controlling unit 115, the display controlling unit 117 generates download completion notifying screen data on the basis of data attribute information DAT corresponding to the music data D1 of the music being listened to on trial at this point in time (that is, the music data D1 downloaded at this time). Then, the display controlling unit 117 sends the download completion notifying screen data to the display unit 118. The display controlling unit 117 thereby displays a download completion notifying screen 176 as shown in FIG. 49, the download completion notifying screen 176 being based on the download completion notifying screen data, on for example the selection screen 170 (or the reproduction screen 171) in the display unit 118 such that the download completion notifying screen 176 is superimposed on the selection screen 170 (or the reproduction screen 171).

In this case, download completion notifying text 177 for notifying the completion of downloading of the music data D1 of the music being listened to on trial now is displayed on the download completion notifying screen 176. In addition, a closing button 178 for closing the download completion notifying screen 176 is provided on the download completion notifying screen 176. Thus, through the download completion notifying screen 176 displayed on the display unit 118, the display controlling unit 117 can notify the user what music data D1 has been downloaded.

When the user presses the decision button RM1J of the remote control RM2, for example, in a state of the download completion notifying screen 176 being displayed on the display unit 118 by the display controlling unit 117, the selecting unit 112 recognizes an instruction input at this time as a screen closing instruction to close the download completion notifying screen 176, and notifies the display controlling unit 117 that the closing of the download completion notifying screen 176 is requested. The display controlling unit 117 thus closes the download completion notifying screen 176 and displays the selection screen 170 (or the reproduction screen 171) on the display unit 118.

That is, while the process of downloading the music data D1 of the music being listened to on trial is performed, the reproducing unit 113 performs the streaming reproduction of the music data D1 as music data for trial listening using the network NT, and therefore the display controlling unit 117 continues displaying the selection screen 170 (or the reproduction screen 171) on the display unit 118. Because the whole of the music data D1 that can be listened to on trial is reproduced by streaming reproduction as music data for trial listening, the display controlling unit 117 shows the selection screen 170 (or the reproduction screen 171) displayed on the display unit 118 to the user even after the completion of the downloading of the music data D1 to allow the user to check the music data D1 being reproduced by streaming reproduction by a music title 30, an artist name 31, and the like even after the download.

Figure 50:
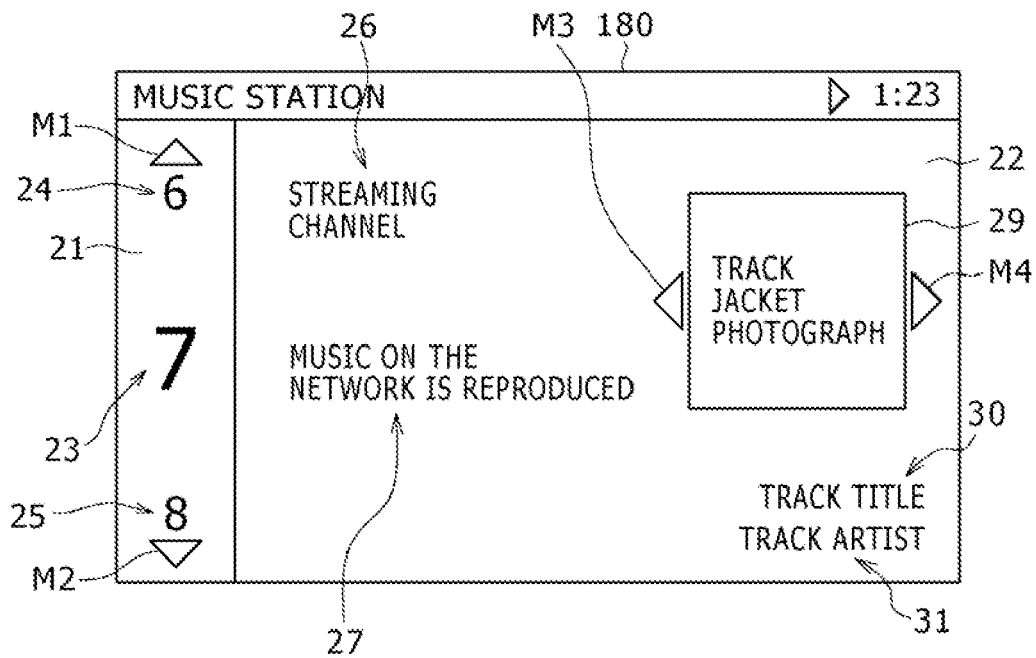
FIG. 50 is a schematic diagram showing a configuration of a selection screen when downloaded music data is reproduced.
Figure 51:
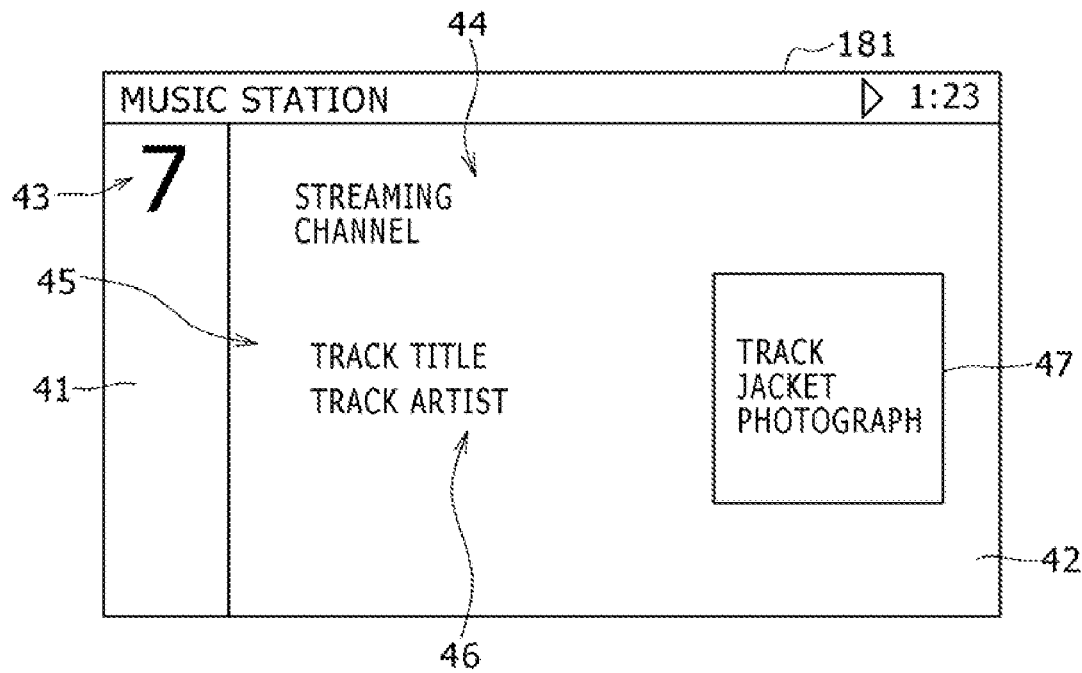
FIG. 51 is a schematic diagram showing a configuration of a reproduction screen when the downloaded music data is reproduced.

Incidentally, even after the downloading of music data D1 is completed while music based on the music data is listened to on trial, the reproducing unit 113 continues the streaming reproduction of the music data D1 as music data for trial listening. The display controlling unit 117 therefore continues displaying the network distribution notifying icon 28 (or the network distribution notifying icon 48) on the selection screen 170 (or the reproduction screen 171) displayed on the display unit 118. However, even though the reproducing unit 113 reproduces the music data D1 downloaded while the music is listened to on trial as music data for trial listening by streaming reproduction, when the reproduction of the same music is requested after the streaming reproduction is ended, the reproducing unit 113 reproduces the downloaded music data D1. Thus, at this time, the display controlling unit 117 displays a selection screen 180 from which the network distribution notifying icon 28 is erased as shown in FIG. 50 (or a reproduction screen 181 from which the network distribution notifying icon 48 is erased as shown in FIG. 51) on the display unit 118. Thereby, when reproducing the downloaded music data D1, the display controlling unit 117 allows the user to recognize that the music data D1 is already downloaded and stored in the reproducing apparatus 110 through the display contents of the selection screen 180 (or the reproduction screen 181).

Incidentally, a setting can be made in the reproducing apparatus 110 so that, for example, the display contents of the selection screen 170 (or the reproduction screen 171) are partly updated (that is, updated to the selection screen 180 (or the reproduction screen 181) from which the network distribution notifying icon 28 (or the network distribution notifying icon 48) is erased) at a point in time at which the downloading of the music data D1 is completed even when the music data D1 downloaded while the music is listened to on trial continues being reproduced by streaming reproduction as music data for trial listening. Thus, when such a setting is made in the reproducing apparatus 110, it is possible to substantially surely avoid a mistake of thinking that the downloaded music data D1 is not downloaded yet and making a request to download the music data D1 again even when the music data D1 downloaded while the music is listened to on trial continues being reproduced by streaming reproduction as music data for trial listening.

Figure 52:
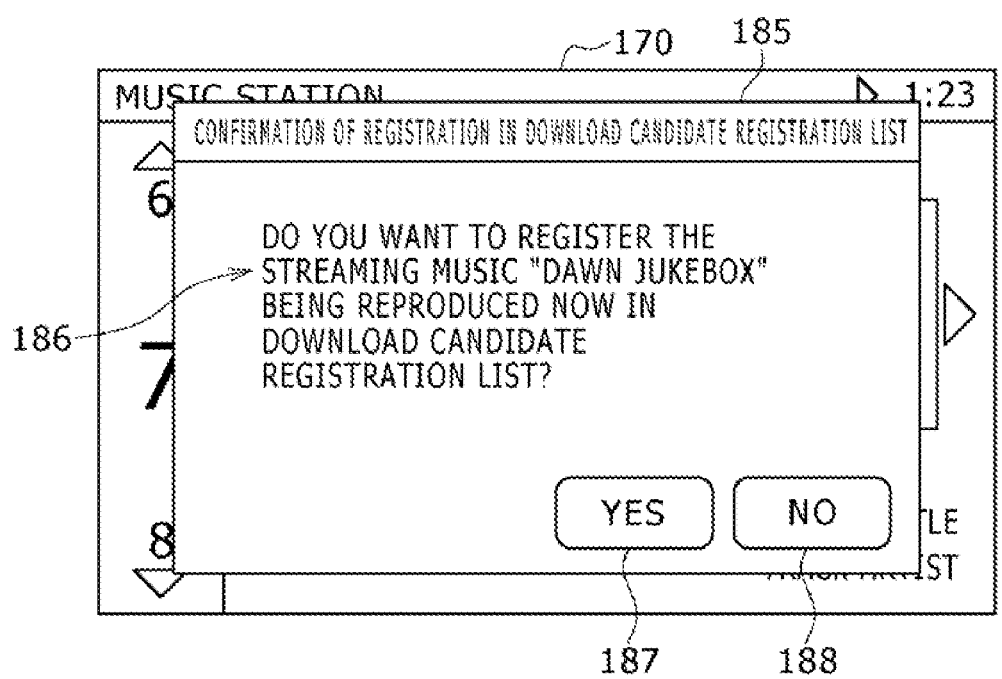
FIG. 52 is a schematic diagram showing a configuration of a download candidate registration confirming screen.

When the selecting unit 112 notifies the display controlling unit 117 that registration of music data D1 of music being listened to on trial as a download candidate is requested in response to the input of a download candidate registration requesting instruction, the display controlling unit 117 generates download candidate registration confirming screen data on the basis of data attribute information DAT corresponding to the music data D1 of the music being listened to on trial at this point in time. Then, the display controlling unit 117 sends the download candidate registration confirming screen data to the display unit 118. The display controlling unit 117 thereby displays a download candidate registration confirming screen 185 as shown in FIG. 52, the download candidate registration confirming screen 185 being based on the download candidate registration confirming screen data, on for example the selection screen 170 (or the reproduction screen 171) in the display unit 118 such that the download candidate registration confirming screen 185 is superimposed on the selection screen 170 (or the reproduction screen 171).

In this case, registration confirmation text 186 for confirming whether to register the music data D1 of the music being listened to on trial now in the download candidate registration list as a download candidate is displayed on the download candidate registration confirming screen 185. In addition, a download candidate registering decision button 187 for deciding on registering the download candidate and a download candidate registration canceling button 188 for canceling the registration of the download candidate are provided on the download candidate registration confirming screen 185. The display controlling unit 117 highlights one of the download candidate registering decision button 187 and the download candidate registration canceling button 188 on the download candidate registration confirming screen 185 in a predetermined display state such that one of the download candidate registering decision button 187 and the download candidate registration canceling button 188 is solely conspicuous within the download candidate registration confirming screen 185, for example.

In this state, when the user presses the left direction selecting button RM1H or the right direction selecting button RM1I of the remote control RM2 to input a left direction selecting instruction or a right direction selecting instruction, the selecting unit 112 notifies this to the display controlling unit 117. According to the notification from the selecting unit 112, the display controlling unit 117 alternately changes the highlight display state between the download candidate registering decision button 187 and the download candidate registration canceling button 188 on the download candidate registration confirming screen 185. The display controlling unit 117 thereby allows the user to select one of a decision to register the download candidate and the cancellation of the registration of the download candidate via the download candidate registering decision button 187 and the download candidate registration canceling button 188 on the download candidate registration confirming screen 185. Thus, through the download candidate registration confirming screen 185 displayed on the display unit 118, the display controlling unit 117 allows the user to confirm whether to actually register the music data D1 as a download candidate while notifying the user what music data the music data D1 that the user is going to register as a download candidate is.

When the user presses the decision button RM1J of the remote control RM2 with the download candidate registering decision button 187 selected on the download candidate registration confirming screen 185 displayed on the display unit 118, the selecting unit 112 recognizes an instruction input at this time as a download candidate registering decision instruction, and notifies the reproducing unit 113 that a decision to register the music data D1 of the music being listened to on trial as a download candidate is made. Thus, the selecting unit 112 allows the music data D1 of the music being listened to on trial to be registered in the download candidate registration list as a download candidate according to an operation of the operating unit 111 (that is, the remote control RM2) by the user.

Figure 53:
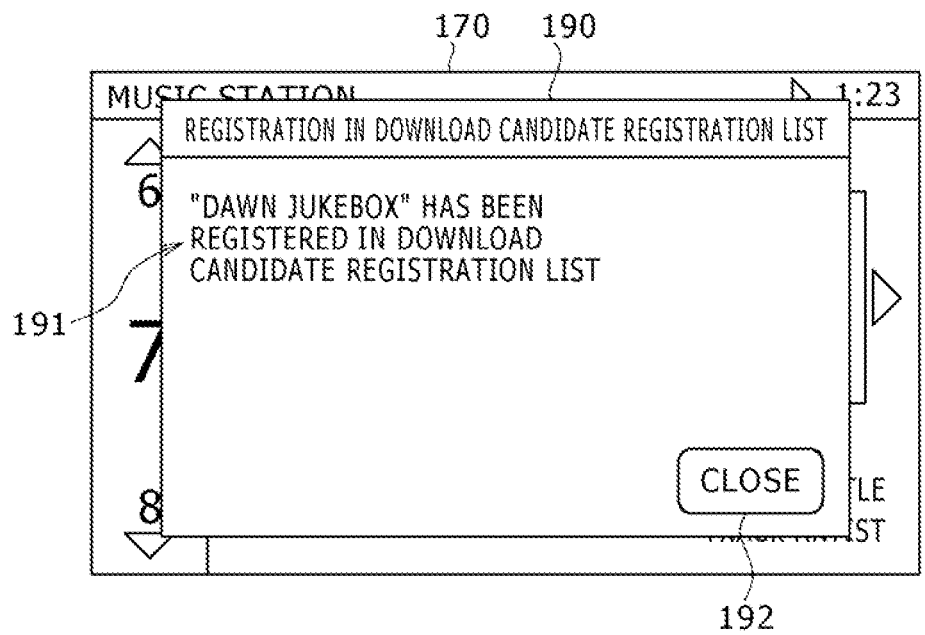
FIG. 53 is a schematic diagram showing a configuration of a download candidate registration completion notifying screen.

When the registration of the music data D1 of the music being listened to on trial as a download candidate in the download candidate registration list is completed, the reproducing unit 113 notifies this to the display controlling unit 117. When the reproducing unit 113 notifies the display controlling unit 117 that the registration of the music data D1 of the music being listened to on trial as a download candidate is completed, the display controlling unit 117 generates download candidate registration completion notifying screen data on the basis of data attribute information DAT corresponding to the music data D1 of the music being listened to on trial at this point in time (that is, the music data D1 registered as a download candidate at this time). Then, the display controlling unit 117 sends the download candidate registration completion notifying screen data to the display unit 118 to thereby display a download candidate registration completion notifying screen 190 as shown in FIG. 53, the download candidate registration completion notifying screen 190 being based on the download candidate registration completion notifying screen data, on for example the selection screen 170 (or the reproduction screen 171) in the display unit 118 such that the download candidate registration completion notifying screen 190 is superimposed on the selection screen 170 (or the reproduction screen 171).

In this case, download candidate registration completion notifying text 191 for notifying the completion of registration of the music data D1 of the music being listened to on trial now as a download candidate is displayed on the download candidate registration completion notifying screen 190. In addition, a closing button 192 for closing the download candidate registration completion notifying screen 190 is provided on the download candidate registration completion notifying screen 190. Thus, by the download candidate registration completion notifying screen 190 displayed on the display unit 118, the display controlling unit 117 can notify the user what music data D1 has been registered as a download candidate.

Figure 54:
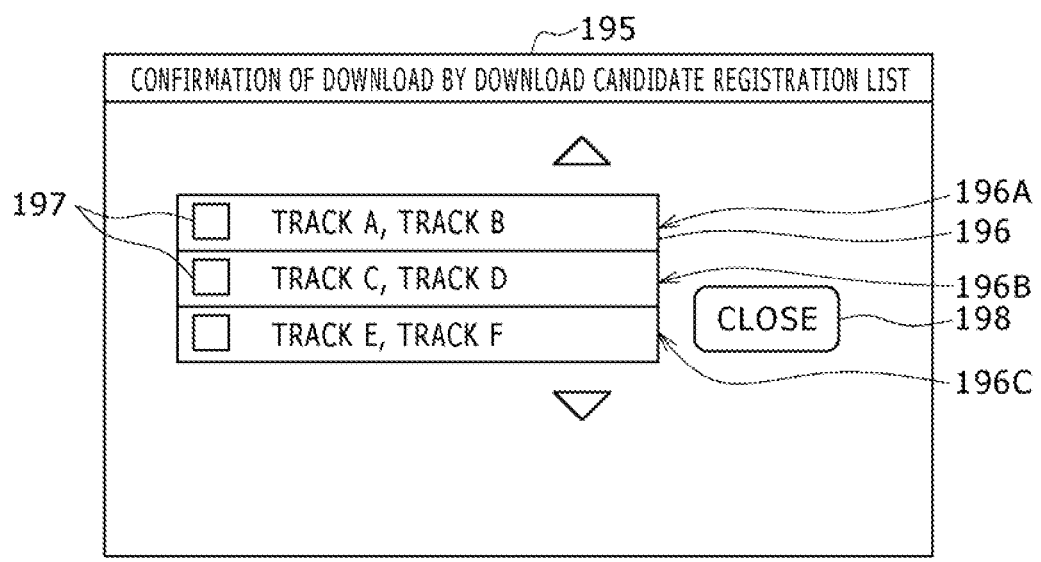
FIG. 54 is a schematic diagram showing a configuration of a candidate download confirmation screen.

In addition, when the user operates the operating unit 111 to input a candidate download requesting instruction to request the downloading of music data D1 registered as a download candidate at an arbitrary point in time, the selecting unit 112 notifies this to the reproducing unit 113. At this time, according to the notification from the selecting unit 112, the reproducing unit 113 reads the download candidate registration list from the content data storage unit 114, and then sends the download candidate registration list to the display controlling unit 117. The display controlling unit 117 generates candidate download confirmation screen data on the basis of the download candidate registration list. Then the display controlling unit 117 sends the candidate download confirmation screen data to the display unit 118 to thereby display a candidate download confirmation screen 195 as shown in FIG. 54, the candidate download confirmation screen 195 being based on the candidate download confirmation screen data, on the display unit 118.

In this case, the candidate download confirmation screen 195 has a download candidate presenting section 196 for displaying a list of presentation items 196A to 196C for presenting music data D1 registered as download candidates. Each of the presentation items 196A to 196C in the download candidate presenting section 196 shows a music title, an artist name and the like corresponding to one piece of music data D1 registered as a download candidate, and has a checkbox 197 for confirming whether to download the music data D1. Incidentally, when a checkmark is placed in the checkbox 197, it indicates that the downloading of the music data D1 presented by the corresponding presentation item 196A to 196C is decided on.

The candidate download confirmation screen 195 also has a candidate download decision button 198 for deciding on downloading music data D1 registered as download candidates in the download candidate registration list and then closing the candidate download confirmation screen 195. Thereby, through the candidate download confirmation screen 195 displayed on the display unit 118, the display controlling unit 117 allows the user to confirm whether to actually download the music data D1 registered as download candidates while presenting the music data D1.

When for example the user presses the upward direction selecting button RM1F or the downward direction selecting button RM1G of the remote control RM2 to input a scroll instruction in a state of the candidate download confirmation screen 195 being displayed on the display unit 118 by the display controlling unit 117, the selecting unit 112 notifies this to the display controlling unit 117. At this time, according to the notification from the selecting unit 112, the display controlling unit 117 moves a cursor (not shown) indicating for example one of the presentation items 196A to 196C within the download candidate presenting section 196 of the candidate download confirmation screen 195 in an upward direction or a downward direction.

When the selecting unit 112 notifies the display controlling unit 117 to further move the cursor in the upward direction or the downward direction in a state of the cursor indicating an uppermost or lowermost presentation item 196A or 196C within the download candidate presenting section 196, the display controlling unit 117 scrolls each of the presentation items 196A to 196C in an opposite direction from the moving direction of the cursor without changing the position of the cursor, thereby displaying a new presentation item that has not been able to be displayed up to this time. The display controlling unit 117 thereby allows the music data D1 as download candidates to be selected as the presentation items 196A to 196C within the download candidate presenting section 196 one by one by the cursor on the candidate download confirmation screen 195.

When for example the user presses the decision button RM1J of the remote control RM2 in a state of the cursor indicating one of the presentation items 196A to 196C on the candidate download confirmation screen 195, the selecting unit 112 recognizes an instruction input at this time as a download selecting instruction, and notifies this to the display controlling unit 117. According to the notification from the selecting unit 112, the display controlling unit 117 displays a checkmark in the checkbox 197 of the presentation item 196A to 196C indicated by the cursor at this point in time in the download candidate presenting section 196 of the candidate download confirmation screen 195. Incidentally, when the selecting unit 112 notifies the display controlling unit 117 of the input of a download selecting instruction again with the cursor indicating the presentation item 196A to 196C having a checkmark displayed in the checkbox 197, the display controlling unit 117 removes the checkmark. Thus, by the checkmark displayed in the checkbox 197 within the candidate download confirmation screen 195, the display controlling unit 117 notifies the selection of the corresponding music data D1 as music data D1 to be actually downloaded.

When for example the user presses the right direction selecting button RM1I of the remote control RM2 to input a right direction selecting instruction, the selecting unit 112 notifies this to the display controlling unit 117. At this time, according to the notification from the selecting unit 112, the display controlling unit 117 moves the cursor from the download candidate presenting section 196 to the candidate download decision button 198 on the candidate download confirmation screen 195. Incidentally, when for example the user presses the left direction selecting button RM1H of the remote control RM2 with the cursor placed on the candidate download decision button 198, and the selecting unit 112 notifies a left direction selecting instruction to the display controlling unit 117, the display controlling unit 117 moves the cursor from the candidate download decision button 198 to the download candidate presenting section 196 on the candidate download confirmation screen 195. Thereby the display controlling unit 117 allows the presentation item 196A to 196C to be indicated by the cursor again.

When for example the user presses the decision button RM1J of the remote control RM2 with the cursor placed on the candidate download decision button 198, the selecting unit 112 recognizes an instruction input at this time as a candidate downloading instruction, and notifies this to the display controlling unit 117 and the communication controlling unit 115. According to the notification from the selecting unit 112, the display controlling unit 117 determines music data D1 that the user has decided on downloading on the basis of display contents of the candidate download confirmation screen 195 at this point in time, notifies the determined music data D1 as music data D1 to be downloaded to the communication controlling unit 115, and closes the candidate download confirmation screen 195.

The communication controlling unit 115 transmits download requesting information for requesting the downloading of one or a plurality of pieces of music data D1 to be downloaded, the music data D1 being notified by the display controlling unit 117, to the external apparatus 116 on the network NT. When the external apparatus 116 consequently returns the music data D1 to be downloaded and corresponding data-related information DRE, the communication controlling unit 115 downloads the music data D1 and the corresponding data-related information DRE, and notifies the completion of the download to the display controlling unit 117.

Figure 55:
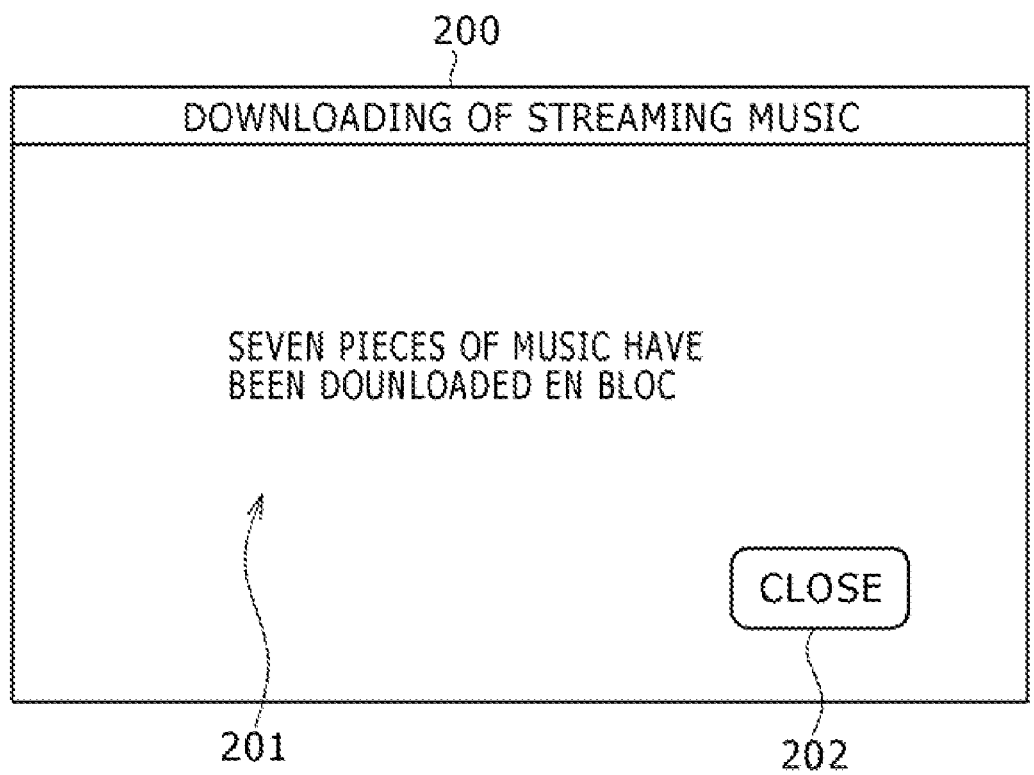
FIG. 55 is a schematic diagram showing a configuration of a candidate download completion notifying screen.

When the communication controlling unit 115 notifies the completion of the download to the display controlling unit 117, the display controlling unit 117 accordingly generates candidate download completion notifying screen data. Then, the display controlling unit 117 sends the candidate download completion notifying screen data to the display unit 118. The display controlling unit 117 thereby displays a candidate download completion notifying screen 200 as shown in FIG. 55, the candidate download completion notifying screen 200 being based on the candidate download completion notifying screen data, on the display unit 118.

In this case, download completion notifying text 201 notifying the completion of the downloading of the music data D1 using the download candidate registration list is displayed on the candidate download completion notifying screen 200. In addition, the candidate download completion notifying screen 200 has a closing button 202 for closing the candidate download completion notifying screen 200. Thus, through the candidate download completion notifying screen 200 displayed on the display unit 118, the display controlling unit 117 can notify the user that the downloading of the music data D1 using the download candidate registration list has been completed.

When the user presses the decision button RM1J of the remote control RM2, for example, with the candidate download completion notifying screen 200 displayed on the display unit 118 by the display controlling unit 117, the selecting unit 112 recognizes an instruction input at this time as a screen closing instruction to close the candidate download completion notifying screen 200, and notifies this to the display controlling unit 117. The display controlling unit 117 thereby closes the candidate download completion notifying screen 200 displayed on the display unit 118.

Figure 56:
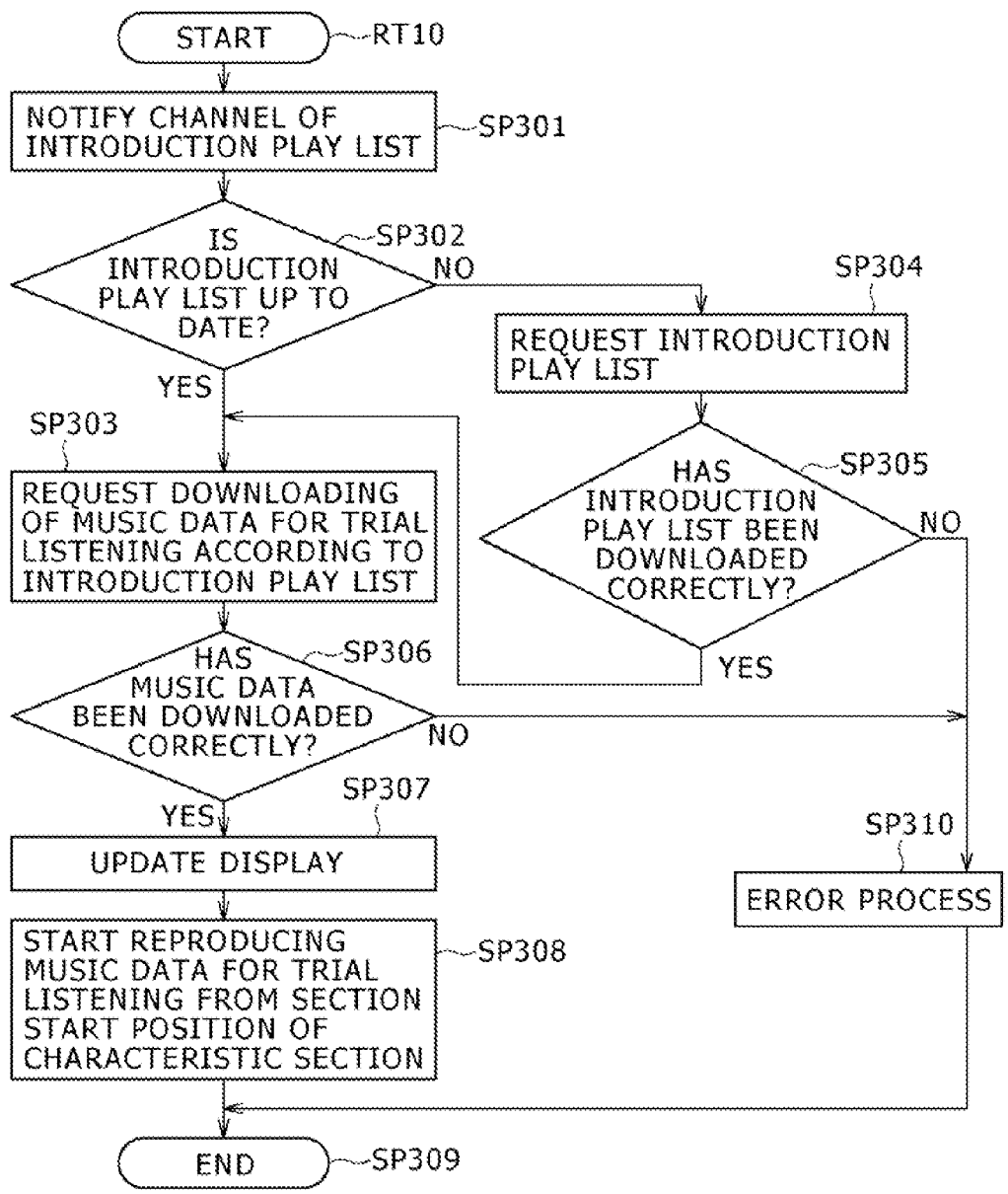
FIG. 56 is a flowchart of a first trial listening starting process procedure.

A trial listening starting process when the introduction play list PL1 is selected as a channel will be described. In this case, when the selecting unit 112 selects the channel to which the introduction play list PL1 is assigned according to an operation of the operating unit 111 by the user, the selecting unit 112 starts a first trial listening starting process procedure RT10 represented in FIG. 56. Starting the first trial listening starting process procedure RT10, the selecting unit 112 in step SP301 notifies the selected channel (that is, the channel to which the introduction play list PL1 is assigned) to the reproducing unit 113.

In step SP302, according to the notification from the selecting unit 112, the reproducing unit 113 sends version information of the introduction play list PL1 stored in the content data storage unit 114 to the communication controlling unit 115. On the basis of the version information, the communication controlling unit 115 determines whether the introduction play list PL1 now stored in the content data storage unit 114 is up to date. When a positive result is obtained in this step SP302, this indicates that as a result of the communication controlling unit 115 transmitting the version information to the external apparatus 116 on the network NT and inquiring of the external apparatus 116 about whether the introduction play list PL1 stored in the content data storage unit 114 is up to date, information indicating that the introduction play list PL1 stored in the content data storage unit 114 is up to date is returned from the external apparatus 116. Thus, when the communication controlling unit 115 obtains such a positive result, the communication controlling unit 115 proceeds to next step SP303.

When a negative result is obtained in step SP302, on the other hand, this indicates that as a result of the communication controlling unit 115 transmitting the version information to the external apparatus 116 on the network NT and inquiring of the external apparatus 116 about whether the introduction play list PL1 stored in the content data storage unit 114 is up to date, information indicating that the introduction play list PL1 stored in the content data storage unit 114 is a past play list is returned from the external apparatus 116. Thus, when the communication controlling unit 115 obtains such a negative result, the communication controlling unit 115 proceeds to step SP304.

In step SP304, the communication controlling unit 115 sends a request to download the latest introduction play list PL1 to the external apparatus 116. The communication controlling unit 115 then proceeds to next step SP305. As a result, the communication controlling unit 115 in step SP305 downloads the latest introduction play list PL1 returned from the external apparatus 116, and then determines whether the introduction play list PL1 has been downloaded correctly. When a positive result is obtained in step SP305, this for example indicates that the data of the introduction play list PL1 downloaded from the external apparatus 116 is not corrupt. Thus, when the communication controlling unit 115 obtains such a positive result, the communication controlling unit 115 proceeds to step SP303.

In step SP303, the communication controlling unit 115 notifies the reproducing unit 113 that the introduction play list PL1 is the latest introduction play list PL1, or sends the latest introduction play list PL1 to the reproducing unit 113. The reproducing unit 113 selects content indicating information MID of music data D1 to be reproduced first for trial listening according to the introduction play list PL1 from among a plurality of pieces of content indicating information MID stored in the latest introduction play list PL1. The reproducing unit 113 then sends the content indicating information MID to the communication controlling unit 115. According to the content indicating information MID, the communication controlling unit 115 transmits download requesting information for making a request to download the music data D1 to be reproduced for trial listening to the external apparatus 116 on the network NT. The communication controlling unit 115 then proceeds to next step SP306. The communication controlling unit 115 in step SP306 consequently downloads the music data for trial listening and corresponding data-related information DRE returned from the external apparatus 116 in response to the download requesting information, and determines whether the music data for trial listening has been downloaded correctly.

When a positive result is obtained in this step SP306, this for example indicates that the music data for trial listening downloaded from the external apparatus 116 is not corrupt. Thus, when the communication controlling unit 115 obtains such a positive result, the communication controlling unit 115 sends the music data for trial listening and the corresponding data-related information DRE to the reproducing unit 113. In step SP307, the reproducing unit 113 temporarily stores the music data for trial listening supplied from the communication controlling unit 115 in the buffer, and sends data attribute information DAT included in the data-related information DRE corresponding to the music data for trial listening to the display controlling unit 117 together with the introduction play list PL1. The display controlling unit 117 thereby updates the display contents of the selection screen 120, for example, displayed on the display unit 118 on the basis of the introduction play list PL1 and the data attribute information DAT (that is, updates the display contents of the selection screen 120 to the selection screen 130 described above with reference to FIG. 36).

Then, in step SP308, the reproducing unit 113 starts reproducing the music data for trial listening from a section start position of a characteristic section according to the reproduction limitation of the music data for trial listening. The reproducing unit 113 then proceeds to next step SP309 to end the first trial listening starting process procedure RT10. Thus, when the user selects the introduction play list PL1 as a channel, the reproducing apparatus 110 starts reproducing purchasable music data D1 for trial listening. When the reproducing apparatus 110 starts reproducing the purchasable music data D1 for trial listening, as described above, the reproducing apparatus 110 sequentially downloads music data for trial listening from the external apparatus 116 according to the introduction play list PL1 and temporarily stores the music data for trial listening in the buffer, and starts reproducing the music data for trial listening from a section start position of a characteristic section. Thus, the reproducing apparatus 110 can continuously reproduce characteristic parts of music based on a plurality of pieces of purchasable music data D1 registered in the introduction play list PL1.

Incidentally, when a negative result is obtained in the above-described step SP305, this for example indicates that the data of the introduction play list PL1 downloaded from the external apparatus 116 is corrupt. Thus, when the communication controlling unit 115 obtains such a negative result, the communication controlling unit 115 proceeds to step SP310. In addition, when a negative result is obtained in step SP306, this for example indicates that the music data for trial listening downloaded from the external apparatus 116 is corrupt. Thus, also when the communication controlling unit 115 obtains such a negative result, the communication controlling unit 115 proceeds to step SP310. In step SP310, the communication controlling unit 115 notifies the display controlling unit 117 that the introduction play list PL1 or the music data for trial listening has not been downloaded correctly. Thus, as an error process, the display controlling unit 117 for example notifies the user that it is not possible to listen on trial to the music based on the purchasable music data D1. The display controlling unit 117 thereafter proceeds to step SP309.

Figure 57:
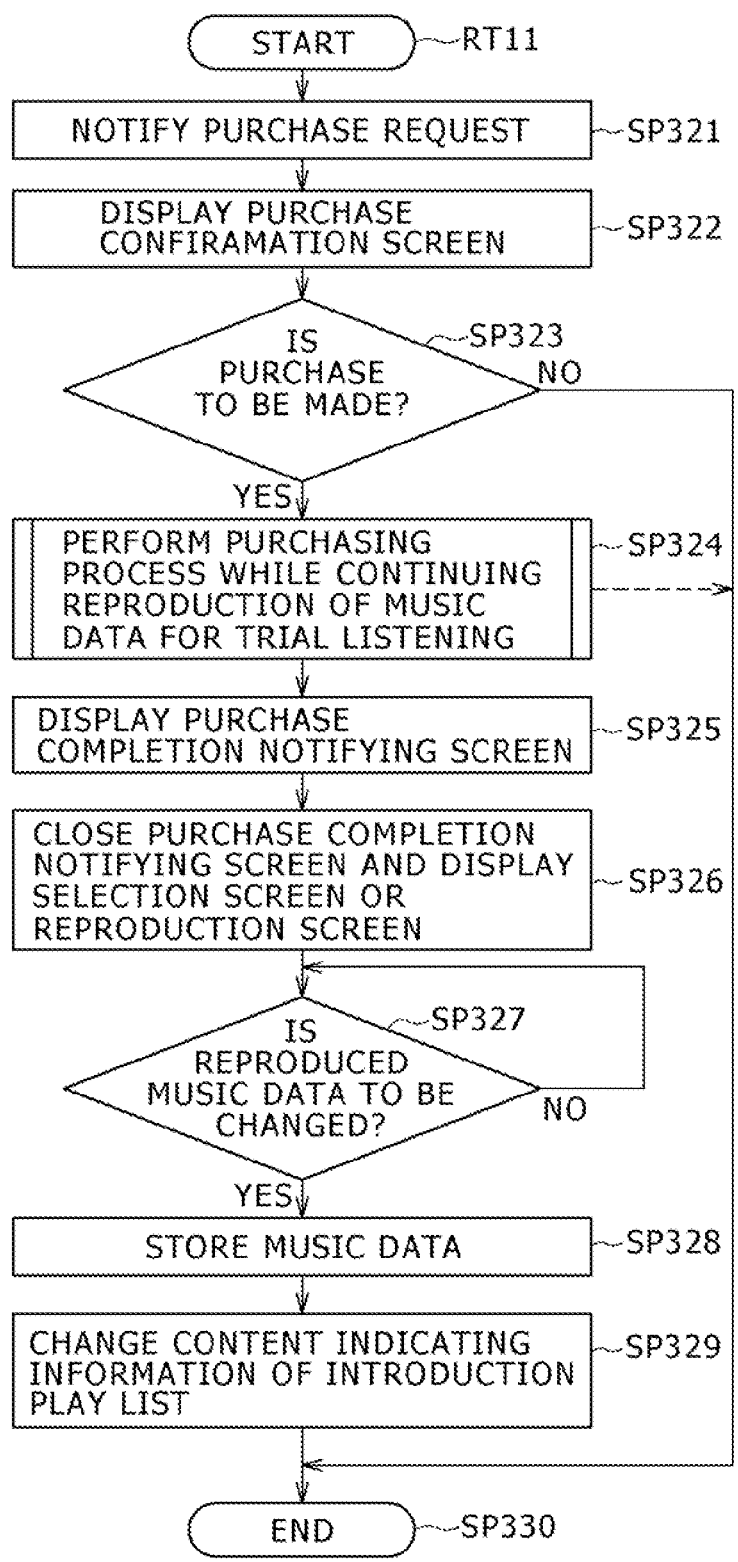
FIG. 57 is a flowchart of a music data purchasing process procedure.

Description will next be made of a music data purchasing process for purchasing music data D1 corresponding to music data for trial listening during the reproduction of the music data for trial listening using the introduction play list PL1. In this case, when the user makes a request to purchase music data D1 corresponding to music data for trial listening via the operating unit 111 while the reproducing unit 113 is in the process of reproducing the characteristic section of the music data for trial listening according to the introduction play list PL1, the selecting unit 112 starts a music data purchasing process procedure RT11 represented in FIG. 57. Starting the music data purchasing process procedure RT11, the selecting unit 112 in step SP321 notifies the display controlling unit 117 that the request to purchase the music data D1 has been made.

In step SP322, the display controlling unit 117 displays the purchase confirmation screen 135 on the display unit 118 such that the purchase confirmation screen 135 is superimposed on the selection screen 130 or the reproduction screen 132 that can notify the music data D1 being reproduced as music data for trial listening at this point in time. The display controlling unit 117 thereby makes the user confirm whether to actually purchase the music data D1 via the purchase confirmation screen 135. In step SP323, when the user consequently makes a decision to actually purchase the music data D1 via the operating unit 111, the selecting unit 112 notifies this to the communication controlling unit 115. Therefore, according to the notification from the selecting unit 112, the communication controlling unit 115 in step SP324 performs a purchasing process for purchasing original music data D1 corresponding to the music data for trial listening being reproduced at this point in time while making the reproducing unit 113 continue reproducing the music data for trial listening being reproduced. As a result, when the communication controlling unit 115 completes purchasing the music data D1, the communication controlling unit 115 notifies this to the display controlling unit 117.

Thus, in step SP325, the display controlling unit 117 updates the selection screen 130 or the reproduction screen 132 to the selection screen 145 or the reproduction screen 146 on the display unit 118 in response to the completion of purchase of the music data D1, and displays the purchase completion notifying screen 140 such that the purchase completion notifying screen 140 is superimposed on the selection screen 145 or the reproduction screen 146 so as to notify the user that the purchase of the music data D1 has been completed. Then, in step SP326, when the user confirms the purchased music data D1, the selecting unit 112 notifies this to the display controlling unit 117. Thus, according to the notification from the selecting unit 112, the display controlling unit 117 closes the purchase completion notifying screen 140 displayed on the display unit 118. The display controlling unit 117 thus displays and shows the selection screen 145 or the reproduction screen 146 that was under the purchase completion notifying screen 140 on the display unit 118, thereby notifying the music data D1 being reproduced at this point in time (that is, the music data D1 purchased at this time).

In this state, the reproducing unit 113 in step SP327 waits to change the music data D1 being reproduced. When the reproduction of the music data D1 to a tail end position is ended, or in response to a request to change the music data D1 being reproduced, the reproducing unit 113 stops the reproduction of the music data D1 being reproduced at this point in time. The reproducing unit 113 then proceeds to next step SP328. In step SP328, the reproducing unit 113 sends the music data D1 that has been temporarily stored in the buffer and reproduced up to this point in time (that is, the purchased music data D1) to the content data storage unit 114 together with corresponding data-related information DRE. The content data storage unit 114 thereby stores the purchased music data D1 together with the corresponding data-related information DRE, and sends content indicating information indicating a storage location of the music data D1 to the indicating information changing unit 126.

Thus, in step SP329, the indicating information changing unit 126 changes the content indicating information MID corresponding to the music data D1 purchased at this time among the plurality of pieces of content indicating information MID stored in the introduction play list PL1 to the new content indicating information supplied from the content data storage unit 114. The indicating information changing unit 126 then proceeds to next step SP330 to end the music data purchasing process procedure RT11. Incidentally, when the user makes a decision to cancel the purchase of the music data D1 via the operating unit 111 in step SP323, the selecting unit 112 proceeds to step SP330 to end the music data purchasing process procedure RT11.

Figure 58:
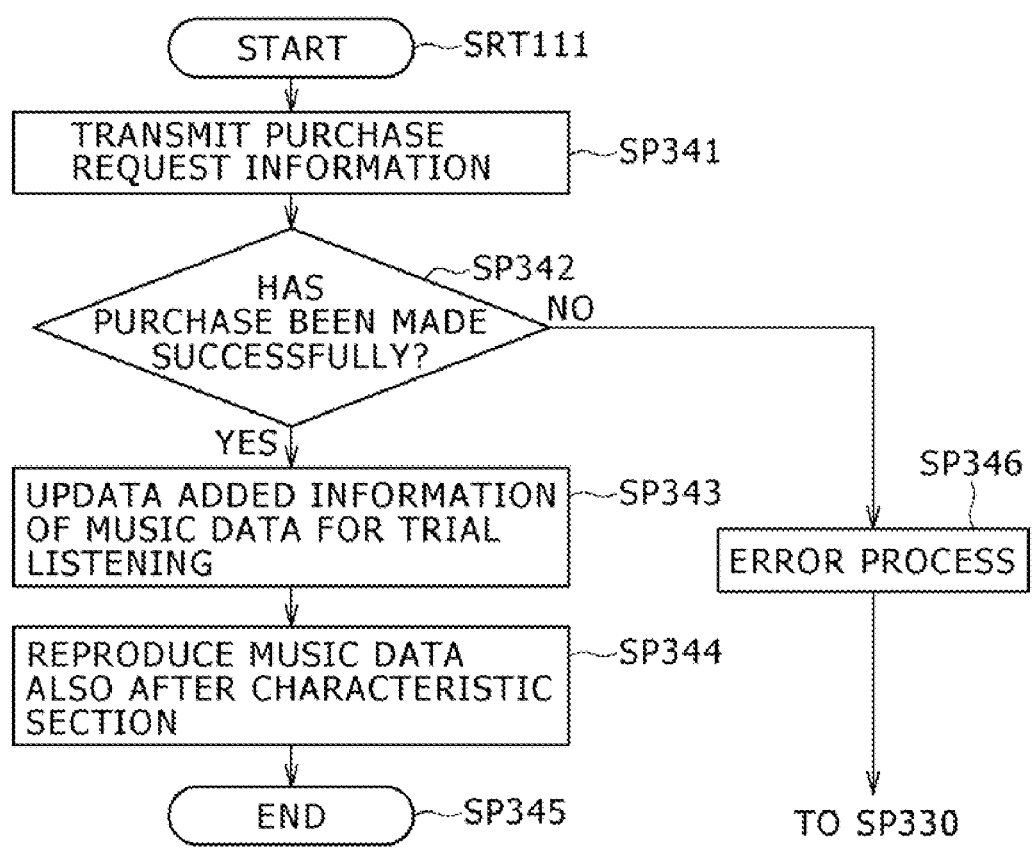
FIG. 58 is a flowchart of a subroutine of the purchasing process.

When the communication controlling unit 115 proceeds to step SP324, the communication controlling unit 115 actually starts a subroutine SRT111 of the music data purchasing process procedure RT11 which subroutine is represented in FIG. 58. Starting the subroutine SRT111, the communication controlling unit 115 in step SP341 transmits purchase requesting information including purchase information necessary for the process of purchasing the music data D1 to be purchased to the external apparatus 116 on the network NT. The communication controlling unit 115 then proceeds to next step SP342. In step SP342, the communication controlling unit 115 determines whether the process of purchasing the music data D1 to be purchased has been performed successfully. When a positive result is obtained in step SP342, this indicates that the process of purchasing the music data D1 to be purchased has been completed normally in the external apparatus 116, and that the communication controlling unit 115 has downloaded a purchase completion notification and reproduction permitting information returned accordingly. Thus, when the communication controlling unit 115 obtains such a positive result, the communication controlling unit 115 proceeds to next step SP343.

In step SP343, the communication controlling unit 115 notifies the completion of the purchase to the display controlling unit 117, and sends the reproduction permitting information downloaded from the external apparatus 116 to the added information updating unit 125. Thus, on the basis of the reproduction permitting information, the added information updating unit 125 updates the added information (that is, reproduction limitation setting information) added to the music data D1 for trial listening being reproduced at this point in time. Thus, in step SP344, the reproducing unit 113 treats the music data for trial listening limited in reproduction such that a characteristic section is reproduced according to the added information up to this point in time as music data D1 whose reproduction limitation is lifted and the whole of which can be reproduced according to the added information after the update. That is, when the reproducing unit 113 thereafter reproduces the music data D1 to a section end position of the characteristic section, the reproducing unit 113 does not automatically stop the reproduction at the section end position, but continues the reproduction past the section end position. The reproducing unit 113 proceeds to next step SP345. The reproducing unit 113 thereby ends the subroutine SRT111. Thus, the display controlling unit 117 proceeds to perform the process of step SP325 as described above.

Incidentally, when a negative result is obtained in step SP342, this indicates that the external apparatus 116 for example has not normally received the purchase requesting information, so that the process of purchasing the music data D1 to be purchased is difficult to be performed. Thus, when the communication controlling unit 115 obtains such a negative result, the communication controlling unit 115 proceeds to step SP346. In step SP346, the communication controlling unit 115 notifies for example the display controlling unit 117 that the process of purchasing the music data D1 to be purchased has been performed unsuccessfully. Thus the display controlling unit 117 notifies the user that the purchase of the music data D1 has been made unsuccessfully by the selection screen 130 or the reproduction screen 132 displayed on the display unit 118 at this point in time, for example. The display controlling unit 117 then exits the subroutine SRT111, and proceeds to step SP330 at this time to end the music data purchasing process procedure RT11. Thus, when a request to purchase purchasable music data D1 is made while the reproducing apparatus 110 is reproducing the music data for trial listening according to the introduction play list PL1 and the user is listening on trial to music based on the music data D1, the reproducing apparatus 110 purchases the music data D1 while continuing reproducing the music data for trial listening to keep the music listened to on trial.

Figure 59:
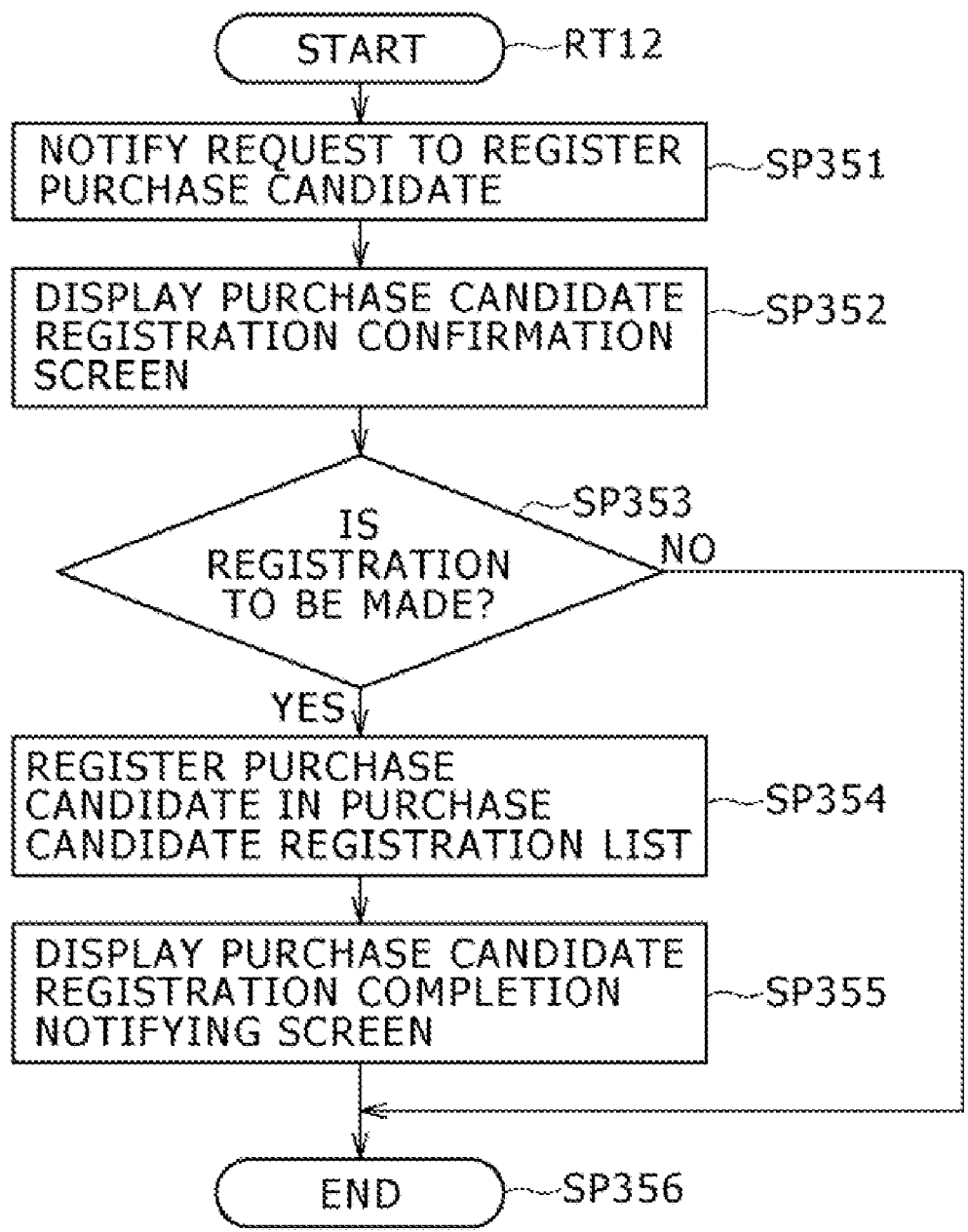
FIG. 59 is a flowchart of a purchase candidate registering process procedure.

Description will next be made of a purchase candidate registering process for registering music data D1 selected as a purchase candidate by the user in the purchase candidate registration list. In this case, when while the reproducing unit 113 is in the process of reproducing the characteristic section of music data for trial listening according to the introduction play list PL1, the user makes a request to register music data D1 corresponding to the music data for trial listening as a purchase candidate via the operating unit 111, the selecting unit 112 starts a purchase candidate registering process procedure RT12 represented in FIG. 59. Starting the purchase candidate registering process procedure RT12, the selecting unit 112 in step SP351 notifies the display controlling unit 117 of the request made to register the music data D1 corresponding to the music data for trial listening being reproduced at this point in time as a purchase candidate.

Thus, in step SP352, the display controlling unit 117 displays the purchase candidate registration confirming screen 150 such that the purchase candidate registration confirming screen 150 is superimposed on the selection screen 130 or the reproduction screen 132 on the display unit 118. The display controlling unit 117 thereby has the user confirm whether to actually register the music data D1 corresponding to the music data for trial listening being reproduced at this point in time as a purchase candidate via the purchase candidate registration confirming screen 150. As a result, when the user makes a decision to actually register the music data D1 as a purchase candidate via the operating unit 111, the selecting unit 112 in step SP353 notifies this to the reproducing unit 113. Accordingly, the reproducing unit 113 in step SP354 reads the purchase candidate registration list from the content data storage unit 114, and registers the music data D1 corresponding to the music data for trial listening being reproduced at this point in time in the purchase candidate registration list as a purchase candidate. Then, the reproducing unit 113 notifies the display controlling unit 117 that the registration of the music data D1 as a purchase candidate in the purchase candidate registration list has been completed.

Thus, in step SP355, the display controlling unit 117 displays the purchase candidate registration completion notifying screen 155 on the display unit 118 such that the purchase candidate registration completion notifying screen 155 is superimposed on the selection screen 130 or the reproduction screen 132. The display controlling unit 117 thus notifies the user by the purchase candidate registration completion notifying screen 155 that the registration of the music data D1 corresponding to the music data for trial listening being reproduced at this point in time as a purchase candidate has been completed. The display controlling unit 117 then proceeds to next step SP356. The display controlling unit 117 thereby ends the purchase candidate registering process procedure RT12. Incidentally, in step SP353, when the user makes a decision to cancel the registration of the music data D1 as a purchase candidate via the operating unit 111, the selecting unit 112 proceeds to step SP356 to end the purchase candidate registering process procedure RT12. Thus, when the request to register the music data D1 as a purchase candidate is made while the reproducing apparatus 110 is reproducing the music data for trial listening according to the introduction play list PL1 and the user is listening on trial to music based on the purchasable music data D1, the reproducing apparatus 110 registers the music data D1 as a purchase candidate while continuing reproducing the music data for trial listening to have the music listened to on trial.

Figure 60:
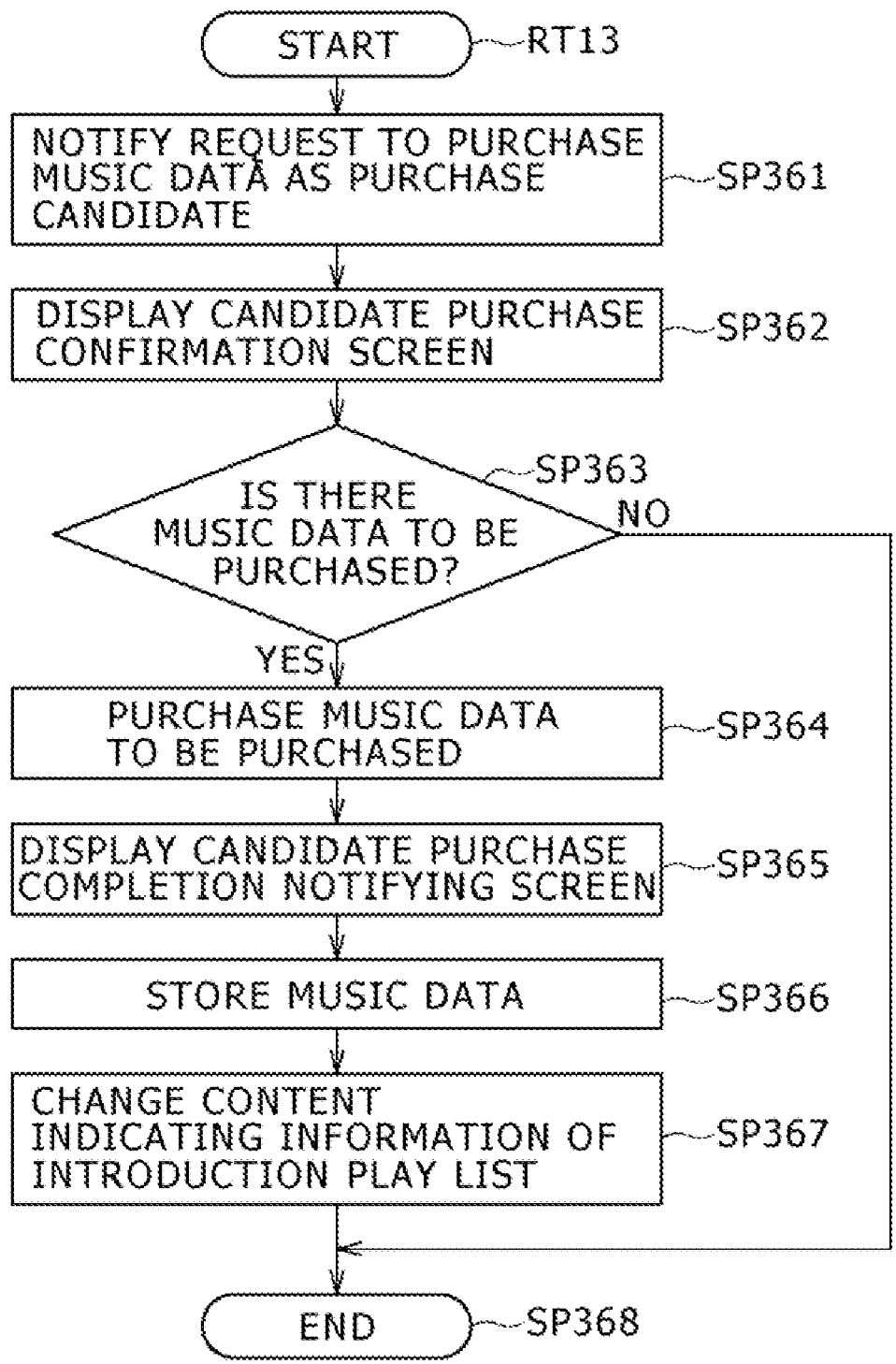
FIG. 60 is a flowchart of a candidate purchasing process procedure.

Description will next be made of a candidate purchasing process for purchasing music data D1 registered as a purchase candidate using the purchase candidate registration list. In this case, when the user makes a request to purchase music data D1 registered as a purchase candidate via the operating unit 111, the selecting unit 112 starts a candidate purchasing process procedure RT13 represented in FIG. 60. Starting the candidate purchasing process procedure RT13, the selecting unit 112 in step SP361 notifies the reproducing unit 113 of the request made to purchase the music data D1 registered as a purchase candidate.

Therefore, in step SP362, the reproducing unit 113 reads the purchase candidate registration list from the content data storage unit 114, and sends the purchase candidate registration list to the display controlling unit 117. At this time, the display controlling unit 117 displays the candidate purchase confirmation screen 160 corresponding to the contents of the purchase candidate registration list on the display unit 118. The display controlling unit 117 thereby has the user confirm whether to actually purchase the music data D1 registered as a purchase candidate via the candidate purchase confirmation screen 160. As a result, when the user makes a decision to actually purchase the music data D1 registered as a purchase candidate via the operating unit 111, the selecting unit 112 in step SP363 notifies this to the display controlling unit 117 and the communication controlling unit 115.

In step SP364, the display controlling unit 117 determines the music data D1 that the user has decided on purchasing as music data D1 to be purchased on the basis of the display contents of the candidate purchase confirmation screen 160 at this point in time, and then notifies the music data D1 to the communication controlling unit 115. Thus, as in the above-described step SP324, the communication controlling unit 115 performs a purchasing process for purchasing the music data D1 to be purchased. As a result, when the communication controlling unit 115 completes purchasing the music data D1 to be purchased, the communication controlling unit 115 notifies this to the display controlling unit 117.

Therefore, in step SP365, the display controlling unit 117 displays the candidate purchase completion notifying screen 165 on the display unit 118 according to the notification from the communication controlling unit 115. The display controlling unit 117 thereby notifies the user by the candidate purchase completion notifying screen 165 that the purchase of the music data D1 registered as a purchase candidate is completed. In step SP366, the reproducing unit 113 sends the purchased music data D1 to the content data storage unit 114. Thus, the content data storage unit 114 stores the purchased music data D1, and notifies the indicating information changing unit 126 of content indicating information indicating a storage location of the music data D1.

Therefore, in step SP367, the indicating information changing unit 126 changes the content indicating information MID corresponding to the music data D1 purchased at this time among the plurality of pieces of content indicating information MID stored in the introduction play list PL1 to the new content indicating information supplied from the content data storage unit 114. The indicating information changing unit 126 then proceeds to next step SP368 to end the candidate purchasing process procedure RT13. Incidentally, when the user makes a decision to cancel the purchase of the music data D1 registered as a purchase candidate via the operating unit 111 in step SP363, the selecting unit 112 proceeds to step SP368 to end the candidate purchasing process procedure RT13. The reproducing apparatus 110 can thus purchase the music data D1 registered as a purchase candidate in the purchase candidate registration list in response to a request from the user.

Figure 61:
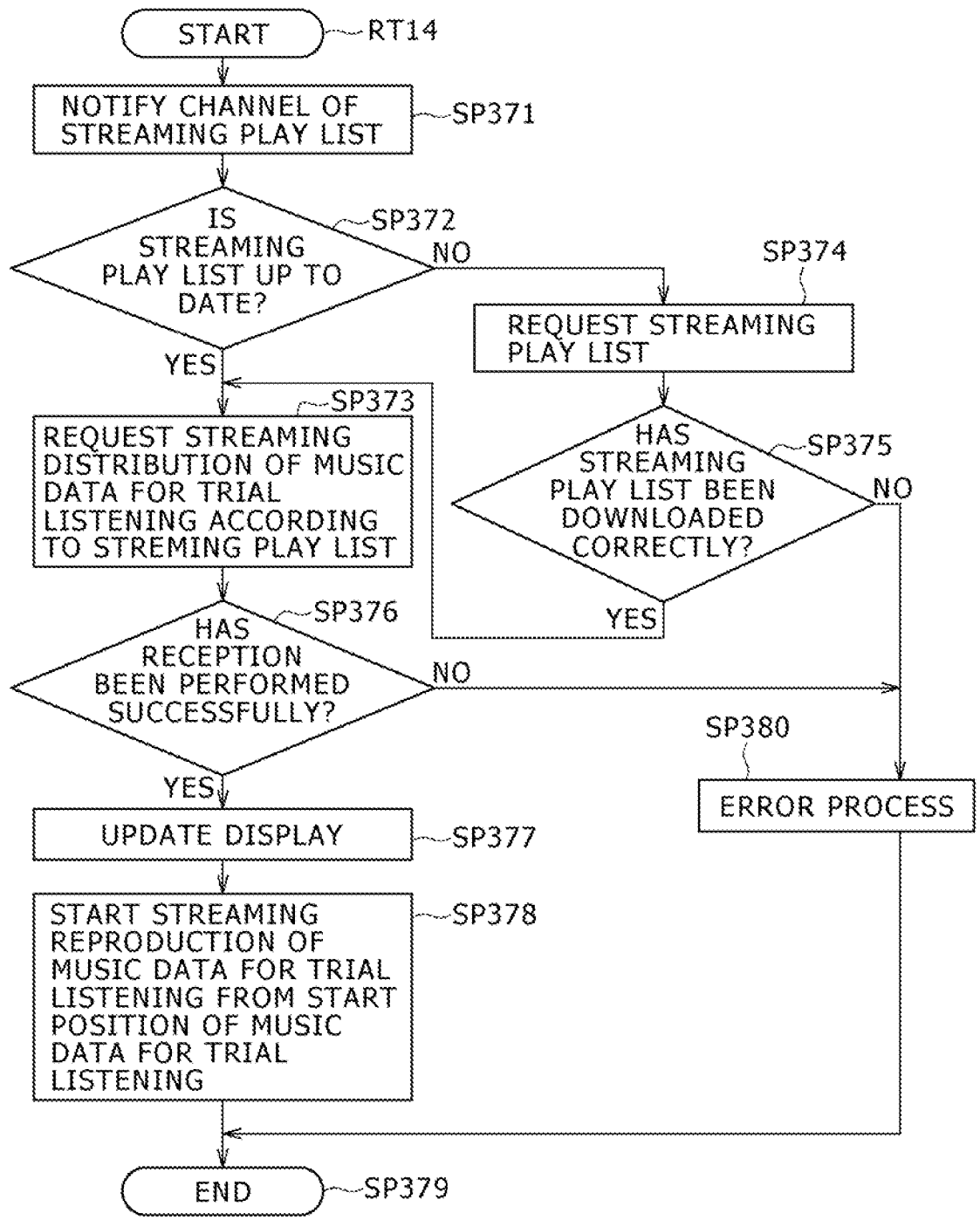
FIG. 61 is a flowchart of a second trial listening starting process procedure.

A trial listening starting process when the streaming play list PL1 is selected as a channel will be described. In this case, when the selecting unit 112 selects the channel to which the streaming play list PL1 is assigned according to an operation of the operating unit 111 by the user, the selecting unit 112 starts a second trial listening starting process procedure RT14 represented in FIG. 61. Starting the second trial listening starting process procedure RT14, the selecting unit 112 in step SP371 notifies the selected channel (that is, the channel to which the streaming play list PL1 is assigned) to the reproducing unit 113.

In step SP372, according to the notification from the selecting unit 112, the reproducing unit 113 sends version information of the streaming play list PL1 stored in the content data storage unit 114 to the communication controlling unit 115. On the basis of the version information, the communication controlling unit 115 determines whether the streaming play list PL1 now stored in the content data storage unit 114 is up to date. When a positive result is obtained in this step SP372, this indicates that as a result of the communication controlling unit 115 transmitting the version information to the external apparatus 116 on the network NT and inquiring of the external apparatus 116 about whether the streaming play list PL1 stored in the content data storage unit 114 is up to date, information indicating that the streaming play list PL1 stored in the content data storage unit 114 is up to date is returned from the external apparatus 116. Thus, when the communication controlling unit 115 obtains such a positive result, the communication controlling unit 115 proceeds to next step SP373.

When a negative result is obtained in step SP372, on the other hand, this indicates that as a result of the communication controlling unit 115 transmitting the version information to the external apparatus 116 on the network NT and inquiring of the external apparatus 116 about whether the streaming play list PL1 stored in the content data storage unit 114 is up to date, information indicating that the streaming play list PL1 stored in the content data storage unit 114 is a past play list is returned from the external apparatus 116. Thus, when the communication controlling unit 115 obtains such a negative result, the communication controlling unit 115 proceeds to step SP374.

In step SP374, the communication controlling unit 115 sends a request to download the latest streaming play list PL1 to the external apparatus 116. The communication controlling unit 115 then proceeds to next step SP375. As a result, the communication controlling unit 115 in step SP375 downloads the latest streaming play list PL1 returned from the external apparatus 116, and then determines whether the streaming play list PL1 has been downloaded correctly. When a positive result is obtained in step SP375, this for example indicates that the data of the streaming play list PL1 downloaded from the external apparatus 116 is not corrupt. Thus, when the communication controlling unit 115 obtains such a positive result, the communication controlling unit 115 proceeds to next step SP373.

In step SP373, the communication controlling unit 115 notifies the reproducing unit 113 that the streaming play list PL1 is the latest streaming play list PL1, or sends the latest streaming play list PL1 to the reproducing unit 113. The reproducing unit 113 selects content indicating information MID of music data D1 to be reproduced by streaming reproduction first for trial listening according to the streaming play list PL1 from among a plurality of pieces of content indicating information MID stored in the latest streaming play list PL1. The reproducing unit 113 then sends the content indicating information MID to the communication controlling unit 115. According to the content indicating information MID, the communication controlling unit 115 transmits streaming distribution requesting information for requesting streaming distribution of the music data D1 to be reproduced by streaming reproduction for trial listening to the external apparatus 116 on the network NT. The communication controlling unit 115 then proceeds to next step SP376. The communication controlling unit 115 in step SP376 consequently receives the music data for trial listening and corresponding data-related information DRE returned from the external apparatus 116 in response to the streaming distribution requesting information, and determines whether at least a part of the music data for trial listening has been able to be received.

When a positive result is obtained in this step SP376, this for example indicates that the music data for trial listening has been returned from the external apparatus 116 without any problem and that at least a part of the music data for trial listening has been able to be received. Thus, when the communication controlling unit 115 obtains such a positive result, the communication controlling unit 115 sends the music data for trial listening and the corresponding data-related information DRE to the reproducing unit 113. In step SP377, the reproducing unit 113 sends data attribute information DAT included in the data-related information DRE supplied from the communication controlling unit 115 to the display controlling unit 117 together with the streaming play list PL1. The display controlling unit 117 thereby updates the display contents of the selection screen 120, for example, displayed on the display unit 118 on the basis of the streaming play list PL1 and the data attribute information DAT (that is, to the selection screen 170 described above with reference to FIG. 46).

Then, in step SP378, the reproducing unit 113 starts the streaming reproduction of the music data for trial listening supplied from the communication controlling unit 115 while received by the communication controlling unit 115 from a start position of the music data for trial listening. The reproducing unit 113 then proceeds to next step SP379 to end the second trial listening starting process procedure RT14. Thus, when the user selects the streaming play list PL1 as a channel, the reproducing apparatus 110 starts the streaming reproduction for trial listening of music data D1 that can be listened to on trial. When the reproducing apparatus 110 starts the streaming reproduction for trial listening of the music data D1 that can be listened to on trial, as described above, the reproducing apparatus 110 starts the streaming reproduction from a start position while sequentially receiving the music data for trial listening from the external apparatus 116 according to the streaming play list PL1. Thus, the reproducing apparatus 110 can continuously perform the streaming reproduction of music based on a plurality of pieces of music data D1 that can be listened to on trial, the plurality of pieces of music data D1 being registered in the streaming play list PL1, from beginnings of the music.

Incidentally, when a negative result is obtained in the above-described step SP375, this for example indicates that the data of the streaming play list PL1 downloaded from the external apparatus 116 is corrupt. Thus, when the communication controlling unit 115 obtains such a negative result, the communication controlling unit 115 proceeds to step SP380. In addition, when a negative result is obtained in step SP376, this for example indicates that the transmission of the music data for trial listening from the external apparatus 116 is delayed and that therefore the music data for trial listening has not been able to be received. Thus, also when the communication controlling unit 115 obtains such a negative result, communication controlling unit 115 proceeds to step SP380. In step SP380, the communication controlling unit 115 notifies the display controlling unit 117 that the streaming play list PL1 has not been downloaded correctly, or that the music data for trial listening has not been able to be received. Thus, as an error process, the display controlling unit 117 for example notifies the user that it is not possible to listen on trial to the music based on the music data D1 that can be listened to on trial. The display controlling unit 117 thereafter proceeds to step SP379.

Figure 62:
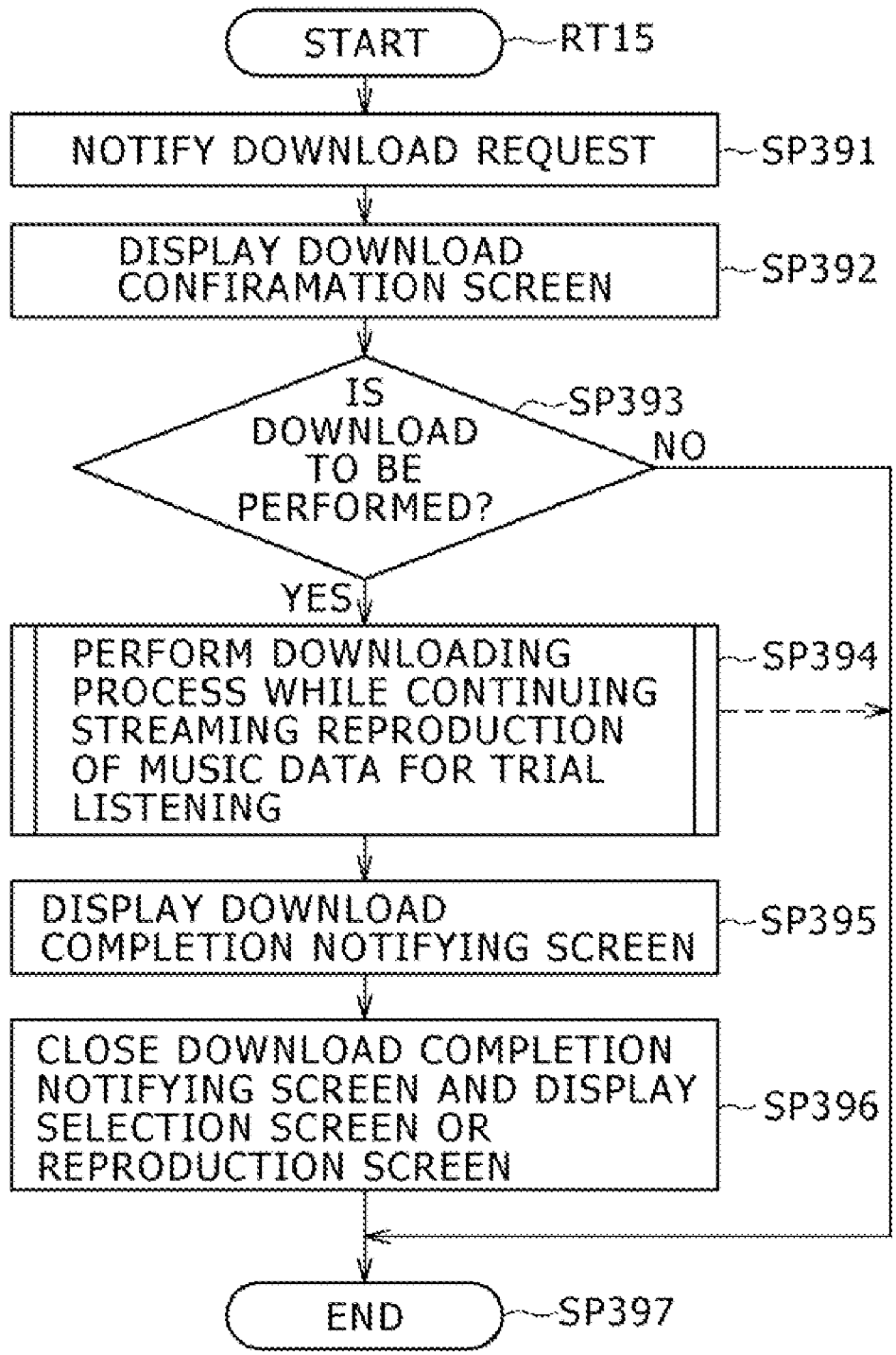
FIG. 62 is a flowchart of a music data downloading process procedure.

Description will next be made of a music data downloading process for downloading music data D1 corresponding to music data for trial listening during the streaming reproduction of the music data for trial listening using the streaming play list PL1. In this case, when the user makes a request to download music data D1 corresponding to music data for trial listening via the operating unit 111 while the reproducing unit 113 is in the process of performing the streaming reproduction of the music data for trial listening according to the streaming play list PL1, the selecting unit 112 starts a music data downloading process procedure RT15 represented in FIG. 62. Starting the music data downloading process procedure RT15, the selecting unit 112 in step SP391 notifies the display controlling unit 117 that the request to download the music data D1 has been made.

In step SP392, the display controlling unit 117 displays the download confirmation screen 172 on the display unit 118 such that the download confirmation screen 172 is superimposed on the selection screen 170 or the reproduction screen 171 that can notify the music data D1 being reproduced by streaming reproduction as music data for trial listening at this point in time. The display controlling unit 117 thereby makes the user confirm whether to actually download the music data D1 via the download confirmation screen 172. In step SP393, when the user consequently makes a decision to actually download the music data D1 via the operating unit 111, the selecting unit 112 notifies this to the communication controlling unit 115. Therefore, according to the notification from the selecting unit 112, the communication controlling unit 115 in step SP394 performs a downloading process for downloading the music data D1 corresponding to the music data for trial listening being reproduced by streaming reproduction at this point in time while making the reproducing unit 113 continue reproducing the music data for trial listening being reproduced by the streaming reproduction. As a result, when the communication controlling unit 115 completes downloading the music data D1 to be downloaded, the communication controlling unit 115 sends the downloaded music data D1 and corresponding data-related information DRE to the content data storage unit 114, and notifies the completion of the download to the display controlling unit 117.

Thus, in step SP395, the display controlling unit 117 displays the download completion notifying screen 176 on the display unit 118 such that the download completion notifying screen 176 is superimposed on the selection screen 170 or the reproduction screen 171 so as to notify the user that the downloading of the music data D1 has been completed. Then, in step SP396, when the user confirms the downloaded music data D1, the selecting unit 112 notifies this to the display controlling unit 117. Thus, according to the notification from the selecting unit 112, the display controlling unit 117 closes the download completion notifying screen 176 displayed on the display unit 118. The display controlling unit 117 thus displays and shows the selection screen 170 or the reproduction screen 171 that was under the download completion notifying screen 176 on the display unit 118, thereby notifying the music data for trial listening being reproduced by the streaming reproduction at this point in time (that is, the music data D1 downloaded at this time). The display controlling unit 117 proceeds to next step SP397 to end the music data downloading process procedure RT15. Incidentally, when the user makes a decision to cancel the downloading of the music data D1 via the operating unit 111 in step SP393, the selecting unit 112 proceeds to step SP397 to end the music data downloading process procedure RT15.

Figure 63:
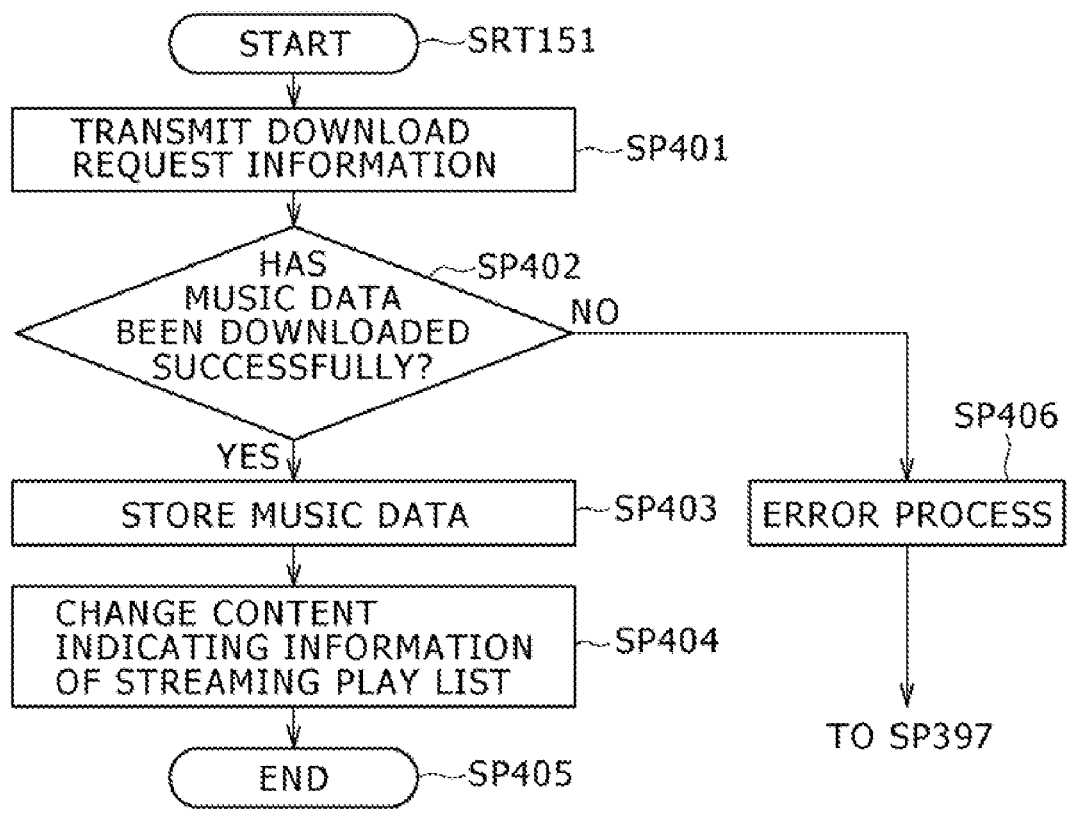
FIG. 63 is a flowchart of a subroutine of the downloading process.

When the communication controlling unit 115 proceeds to step SP394, the communication controlling unit 115 actually starts a subroutine SRT151 of the music data downloading process procedure RT15 which subroutine is represented in FIG. 63. Starting the subroutine SRT151, the communication controlling unit 115 in step SP401 transmits download requesting information for requesting the downloading of the music data D1 to be downloaded to the external apparatus 116 on the network NT. The communication controlling unit 115 then proceeds to next step SP402. In step SP402, the communication controlling unit 115 determines whether the music data D1 to be downloaded has been downloaded successfully. When a positive result is obtained in step SP402, this indicates that the music data D1 returned from the external apparatus 116 in response to the download requesting information is not corrupt. Thus, when the communication controlling unit 115 obtains such a positive result, the communication controlling unit 115 proceeds to next step SP403.

In step SP403, the communication controlling unit 115 notifies the completion of the download to the display controlling unit 117, and sends the music data D1 and corresponding data-related information DRE downloaded from the external apparatus 116 to the content data storage unit 114. Thus, the content data storage unit 114 stores the music data D1 and the corresponding data-related information DRE supplied from the communication controlling unit 115, and sends content indicating information indicating a storage location of the music data D1 to the indicating information changing unit 126.

Therefore, in step SP404, the indicating information changing unit 126 changes the content indicating information MID corresponding to the music data D1 downloaded at this time among the plurality of pieces of content indicating information MID stored in the streaming play list PL1 to the new content indicating information supplied from the content data storage unit 114. The indicating information changing unit 126 then proceeds to next step SP405. The indicating information changing unit 126 thereby ends the subroutine SRT151. Thus, the display controlling unit 117 proceeds to perform the process of step SP395 as described above.

Incidentally, when a negative result is obtained in step SP402, this for example indicates that the music data D1 downloaded from the external apparatus 116 is corrupt. Thus, when the communication controlling unit 115 obtains such a negative result, the communication controlling unit 115 proceeds to step SP406. In step SP406, the communication controlling unit 115 notifies for example the display controlling unit 117 that the process of downloading the music data D1 has been performed unsuccessfully. Thus the display controlling unit 117 notifies the user that the downloading of the music data D1 has been performed unsuccessfully by the selection screen 170 or the reproduction screen 171 displayed on the display unit 118 at this point in time, for example. The display controlling unit 117 then exits the subroutine SRT151, and proceeds to step SP397 at this time to end the music data downloading process procedure RT15. Thus, when a request to download music data D1 is made while the reproducing apparatus 110 is performing the streaming reproduction of the music data for trial listening according to the streaming play list PL1 and the user is listening on trial to music based on the music data D1 that can be listened to on trial, the reproducing apparatus 110 can download the music data D1 while continuing performing the streaming reproduction of the music data for trial listening to keep the music listened to on trial.

Figure 64:
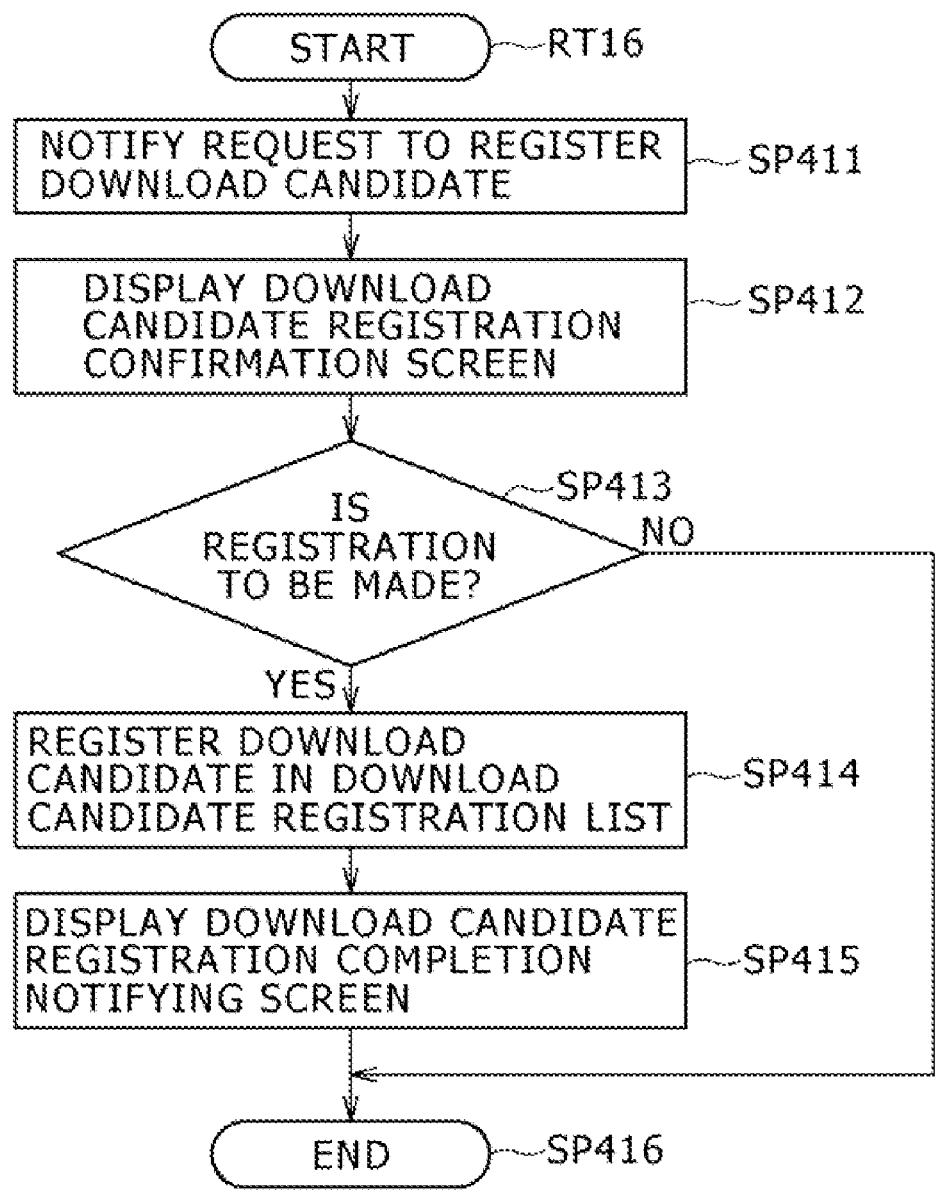
FIG. 64 is a flowchart of a download candidate registering process procedure.

Description will next be made of a download candidate registering process for registering music data D1 selected as a download candidate by the user in the download candidate registration list. In this case, when while the reproducing unit 113 is in the process of performing the streaming reproduction of music data for trial listening according to the streaming play list PL1, the user makes a request to register music data D1 corresponding to the music data for trial listening as a download candidate via the operating unit 111, the selecting unit 112 starts a download candidate registering process procedure RT16 represented in FIG. 64. Starting the download candidate registering process procedure RT16, the selecting unit 112 in step SP411 notifies the display controlling unit 117 of the request made to register the music data D1 corresponding to the music data for trial listening being reproduced by the streaming reproduction at this point in time as a download candidate.

Thus, in step SP412, the display controlling unit 117 displays the download candidate registration confirming screen 185 such that the download candidate registration confirming screen 185 is superimposed on the selection screen 170 or the reproduction screen 171 on the display unit 118. The display controlling unit 117 thereby has the user confirm whether to actually register the music data D1 corresponding to the music data for trial listening being reproduced by the streaming reproduction at this point in time as a download candidate via the download candidate registration confirming screen 185. As a result, when the user makes a decision to actually register the music data D1 as a download candidate via the operating unit 111, the selecting unit 112 in step SP413 notifies this to the reproducing unit 113. Accordingly, the reproducing unit 113 in step SP414 reads the download candidate registration list from the content data storage unit 114, and registers the music data D1 corresponding to the music data for trial listening being reproduced by the streaming reproduction at this point in time in the download candidate registration list as a download candidate. Then, the reproducing unit 113 notifies the display controlling unit 117 that the registration of the music data D1 as a download candidate in the download candidate registration list has been completed.

Thus, in step SP415, the display controlling unit 117 displays the download candidate registration completion notifying screen 190 on the display unit 118 such that the download candidate registration completion notifying screen 190 is superimposed on the selection screen 170 or the reproduction screen 171. The display controlling unit 117 thus notifies the user by the download candidate registration completion notifying screen 190 that the registration of the music data D1 corresponding to the music data for trial listening being reproduced by the streaming reproduction at this point in time as a download candidate has been completed. The display controlling unit 117 then proceeds to next step SP416. The display controlling unit 117 thereby ends the download candidate registering process procedure RT16. Incidentally, in step SP413, when the user makes a decision to cancel the registration of the music data D1 as a download candidate via the operating unit 111, the selecting unit 112 proceeds to step SP416 to end the download candidate registering process procedure RT16. Thus, when the request to register the music data D1 as a download candidate is made while the reproducing apparatus 110 is performing the streaming reproduction of the music data for trial listening according to the streaming play list PL1 and the user is listening on trial to music based on the music data D1 that can be listened to on trial, the reproducing apparatus 110 registers the music data D1 as a download candidate while continuing the streaming reproduction of the music data for trial listening to have the music listened to on trial.

Figure 65:
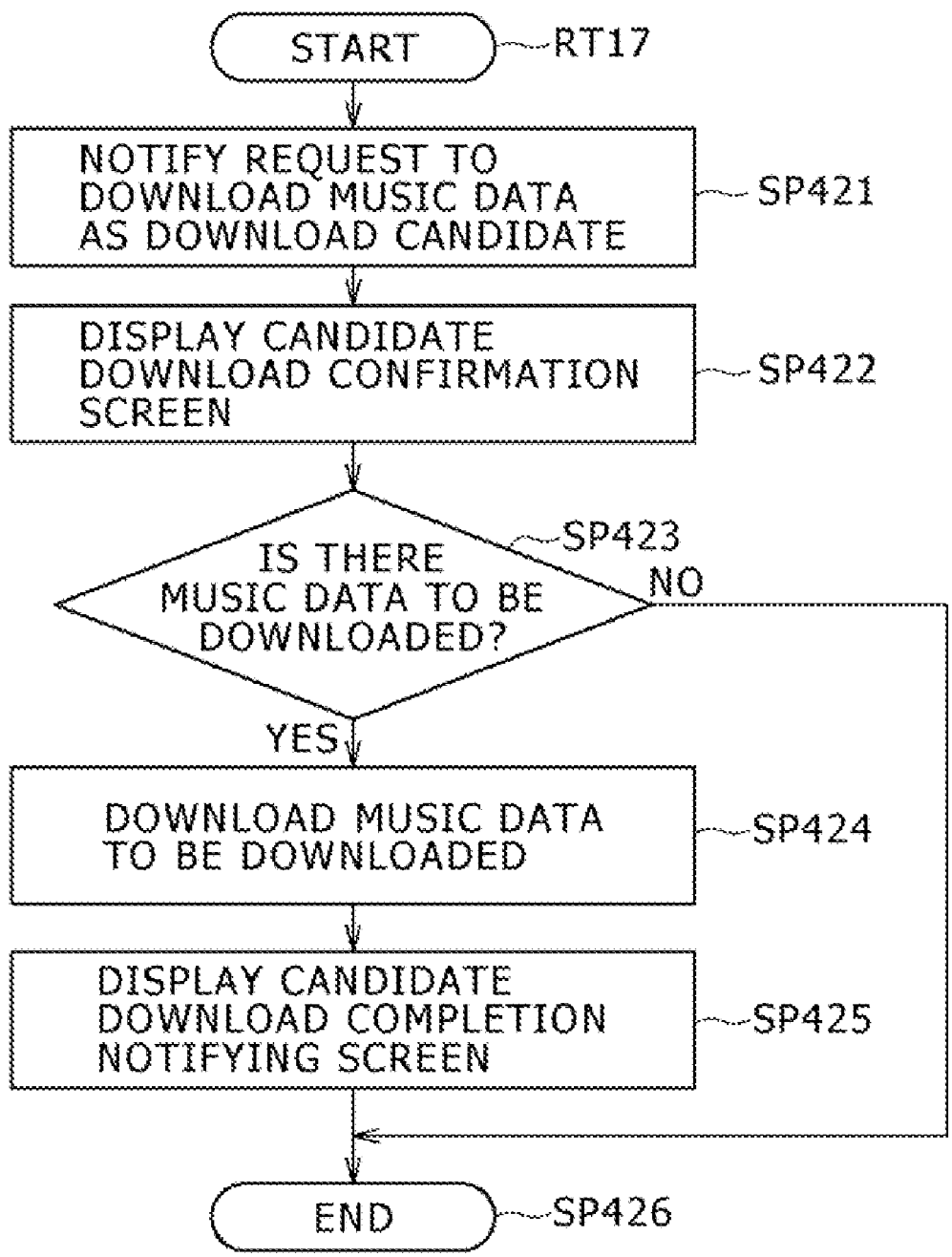
FIG. 65 is a flowchart of a candidate downloading process procedure.

Description will next be made of a candidate downloading process for downloading music data D1 registered as a download candidate using the download candidate registration list. In this case, when the user makes a request to download music data D1 registered as a download candidate via the operating unit 111, the selecting unit 112 starts a candidate downloading process procedure RT17 represented in FIG. 65. Starting the candidate downloading process procedure RT17, the selecting unit 112 in step SP421 notifies the reproducing unit 113 of the request made to download the music data D1 registered as a download candidate.

Therefore, in step SP422, the reproducing unit 113 reads the download candidate registration list from the content data storage unit 114, and sends the download candidate registration list to the display controlling unit 117. At this time, the display controlling unit 117 displays the candidate download confirmation screen 195 corresponding to the contents of the download candidate registration list on the display unit 118. The display controlling unit 117 thereby has the user confirm whether to actually download the music data D1 registered as a download candidate via the candidate download confirmation screen 195. As a result, when the user makes a decision to actually download the music data D1 registered as a download candidate via the operating unit 111, the selecting unit 112 in step SP423 notifies this to the display controlling unit 117 and the communication controlling unit 115.

In step SP424, the display controlling unit 117 determines the music data D1 that the user has decided on downloading as music data D1 to be downloaded on the basis of the display contents of the candidate download confirmation screen 195 at this point in time, and then notifies the music data D1 to the communication controlling unit 115. Thus, as in the above-described step SP394, the communication controlling unit 115 performs a downloading process for downloading the music data D1 to be downloaded. As a result, when the communication controlling unit 115 completes downloading the music data D1 to be downloaded, the communication controlling unit 115 notifies this to the display controlling unit 117.

Therefore, in step SP425, the display controlling unit 117 displays the candidate download completion notifying screen 200 on the display unit 118 according to the notification from the communication controlling unit 115. The display controlling unit 117 thereby notifies the user by the candidate download completion notifying screen 200 that the downloading of the music data D1 registered as a download candidate is completed. The display controlling unit 117 then proceeds to next step SP426 to end the candidate downloading process procedure RT17. Incidentally, when the user makes a decision to cancel the downloading of the music data D1 registered as a download candidate via the operating unit 111 in step SP423, the selecting unit 112 proceeds to step SP426 to end the candidate downloading process procedure RT17. The reproducing apparatus 110 can thus download the music data D1 registered as a download candidate in the download candidate registration list in response to a request from the user.

(2-3) Operation and Effect

In the above configuration, when music based on purchasable music data D1 is listened to on trial according to the introduction play list PL1, the reproducing apparatus 110 downloads the whole of the music data D1 to which added information formed by reproduction limitation setting information is added as music data for trial listening from the external apparatus 116, temporarily stores the music data for trial listening, and reproduces a characteristic section of the music data for trial listening according to the added information. The reproducing apparatus 110 thereby allows the user to listen on trial to the characteristic part of the music based on the purchasable music data D1. When thereafter completing reproducing the characteristic section of the music data for trial listening, the reproducing unit 113 discards the temporarily stored music data for trial listening.

When while listening to a characteristic part of music based on purchasable music data D1 (that is, while the characteristic section of music data for trial listening is being reproduced according to added information), the user gives an instruction to purchase the music data D1 (that is, the music data D1 the whole of which can be reproduced) corresponding to the music data for trial listening being reproduced at this point in time, the reproducing apparatus 110 transmits purchase requesting information including purchase information necessary for a process of purchasing the music data D1 to be purchased to the external apparatus 116 while continuing reproducing the music data for trial listening. As a result, when the purchasing process is performed in response to the purchase requesting information, and the reproducing apparatus 110 downloads reproduction permitting information returned from the external apparatus 116 on the completion of the purchasing process, the reproducing apparatus 110 updates the added information of the music data for trial listening the reproduction of which is continued during the purchasing process, on the basis of the reproduction permitting information.

The reproducing apparatus 110 thereby changes the music data for trial listening being reproduced to the music data D1 whose reproduction limitation is lifted and the whole of which can be reproduced in response to the completion of the purchasing process. Even after changing the music data for trial listening to the music data D1 during the reproduction, the reproducing apparatus 110 continues the reproduction, and continues to reproduce the music data D1 past a section end position of the characteristic section. When finishing reproducing the music data D1 the whole of which can be reproduced, the reproducing apparatus 110 changes the music data D1 from a state of temporary storage to a state of permanent storage in the content data storage unit 114, and stores the music data D1 in the content data storage unit 114. Thus, even when purchasing the music data D1 corresponding to the music data for trial listening while in the process of reproducing the characteristic section of the music data for trial listening, the reproducing apparatus 110 allows the user to continue listening on trial to music based on the music data for trial listening.

When music based on music data D1 that can be listened to on trial according to the streaming play list PL1 is listened to on trial, while the reproducing apparatus 110 receives the music data D1 that can be listened to on trial from the external apparatus 116 as music data for trial listening that is not to be stored at this time, the reproducing apparatus 110 performs the streaming reproduction of the whole of the music data for trial listening. The reproducing apparatus 110 thereby allows the user to listen on trial to the whole of the music based on the music data D1 that can be listened to on trial. When thereafter finishing reproducing the whole of the music data for trial listening, the reproducing apparatus 110 discards the music data for trial listening.

When while listening to music based on music data D1 that can be listened to on trial (that is, during the streaming reproduction of music data for trial listening), the user gives an instruction to download the music data D1 (that is, the music data D1 to be transmitted to be stored) corresponding to the music data for trial listening being reproduced by the streaming reproduction at this point in time, the reproducing apparatus 110 transmits download requesting information for making a request to download the music data D1 to the external apparatus 116 while continuing the streaming reproduction of the music data for trial listening. As a result, after downloading the music data D1 returned from the external apparatus 116 in response to the download requesting information, the reproducing apparatus 110 stores and retains the downloaded music data D1 in the content data storage unit 114, and further continues the streaming reproduction of the music data for trial listening at this point in time. Thus, also when purchasing the music data D1 corresponding to the music data for trial listening while in the process of performing the streaming reproduction of the whole of the music data for trial listening, the reproducing apparatus 110 allows the user to continue listening on trial to music based on the music data for trial listening.

According to the above configuration, when an obtainment request to obtain music data D1 corresponding to music data for trial listening such as a request to purchase the music data D1 or a request to downloaded the music data D1 is made during the reproduction of a characteristic section of the music data for trial listening or during the streaming reproduction of the music data for trial listening, obtainment requesting information for making a request to obtain the music data D1 according to the obtainment request is transmitted to the external apparatus 116 while the reproduction of the characteristic section of the music data for trial listening or the streaming reproduction of the music data for trial listening is continued, and returned information such as reproduction permitting information or the music data D1 from the external apparatus 116 in response to the obtainment requesting information is downloaded. Thereby, even when an obtainment request to obtain music data D1 corresponding to music data for trial listening is made during the reproduction of a characteristic section of the music data for trial listening or during the streaming reproduction of the music data for trial listening, the reproducing apparatus 110 allows the user to continue listening on trial to music based on the music data for trial listening, and thus allows the user to fully enjoy listening on trial to the music without keeping the user conscious of the obtainment of the music data D1.

When purchasing purchasable music data D1 while music based on the music data D1 is listened to on trial, the reproducing apparatus 110 downloads music data for trial listening limited in reproduction in advance, then additionally downloads reproduction permitting information, and lifts the reproduction limitation of the music data for trial listening on the basis of the reproduction permitting information to obtain the music data for trial listening as the music data D1. Therefore, when the reproducing apparatus 110 has purchased the music data D1 while the music based on the music data D1 is listened to on trial, the reproducing apparatus 110 continues reproducing the music data D1 beyond a characteristic section, and thus allows the user to listen to the music that the user is listening to on trial beyond a trial listening range.

Further, the reproducing apparatus 110 purchases and downloads music data D1 while music based on the music data D1 is listened to on trial, and displays the selection screens 145 and 170 or the reproduction screens 146 and 171 on the display unit 118 while the reproduction of the music data D1 is continued after the completion of the purchasing and the downloading of the music data D1. Thus, the reproducing apparatus 110 can notify the music data D1 being reproduced by the selection screens 145 and 170 or the reproduction screens 146 and 171 on the display unit 118 while the reproduction of the music data D1 is continued after the completion of the purchasing and the downloading of the music data D1.

Further, when the reproducing apparatus 110 has purchased and downloaded music data D1, the reproducing apparatus 110 changes content indicating information MID corresponding to the music data D1 purchased and downloaded at this time among a plurality of pieces of content indicating information MID included in the introduction play list PL1 and the streaming play list PL1 to new content indicating information indicating the music data D1 within the content data storage unit 114. Therefore, when the reproducing apparatus 110 thereafter reproduces the music data D1 according to the introduction play list PL1 and the streaming play list PL1, the reproducing apparatus 110 can quickly read the music data D1 from the content data storage unit 114 within the reproducing apparatus 110 without taking the trouble to obtain the music data D1 already obtained from the external apparatus 116 and stored in the content data storage unit 114 from the external apparatus 116.

(2-4) Other Embodiments

Incidentally, in the foregoing second embodiment, when music data D1 has been purchased, the music data D1 continues being reproduced past a section end position of a characteristic section. However, the embodiment of the present invention is not limited to this. When the music data D1 has been purchased, the music data D1 may be reproduced again from a start position at a time of the completion of the purchase being notified, a time of completing the reproduction of the characteristic section (that is, performing the reproduction to the section end position), or the like. Thus, when the music data D1 has been purchased while music is listened to on trial, the whole of the music can be listened to on trial immediately after completing the purchase of the music data D1.

In addition, in the foregoing second embodiment, when music data D1 has been downloaded, music data for trial listening is reproduced by streaming reproduction to a tail end position. However, the embodiment of the present invention is not limited to this. When the music data D1 has been downloaded, the streaming reproduction of the music data for trial listening may be stopped and the music data D1 may be reproduced from a start position at a time of completion of the download, for example. Thus, when the music data D1 has been downloaded while music is listened to on trial, the whole of the music can be listened to on trial immediately after completing the downloading of the music data D1.

Further, in the foregoing second embodiment, when music based on purchasable music data D1 is listened to on trial, music data for trial listening limited in reproduction is downloaded and temporarily stored, and a characteristic section is reproduced. When the music data D1 corresponding to the music data for trial listening is purchased, reproduction permitting information is downloaded. However, the embodiment of the present invention is not limited to this. When the music based on the purchasable music data D1 is listened to on trial, the characteristic section of the music data for trial listening limited in reproduction may be reproduced by streaming reproduction, and when the music data D1 corresponding to the music data for trial listening is purchased, the whole of the music data D1 may be downloaded.

Then, when the music data D1 is thus downloaded in response to a purchase request and the downloaded music data D1 is stored in the content data storage unit 114, the music data to be reproduced may be changed while continuing reproduction by stopping the streaming reproduction of the music data for trial listening and starting reproduction of the music data D1 from a midpoint part of the music data D1 which midpoint part corresponds to a part of the music data for trial listening at which part the streaming reproduction is stopped. The reproducing apparatus 110 thereby allows the user to listen to the music normally without an interruption at the midpoint between one part for trial listening of the music and another part to be connected to the one part as if one piece of music data D1 were reproduced from a beginning.

Further, in the foregoing second embodiment, when music based on music data D1 that can be listened to on trial is listened to on trial, the whole of music data for trial listening is reproduced by streaming reproduction, and when there is a download request during the trial listening, the whole of the music data D1 corresponding to the music data for trial listening is downloaded. However, the embodiment of the present invention is not limited to this. When music based on music data D1 that can be listened to on trial is listened to on trial, a part of music data for trial listening may be reproduced by streaming reproduction to allow a part of music to be listened to on trial, and when there is a download request during the trial listening, the whole of the music data D1 corresponding to the music data for trial listening may be downloaded.

Further, in the foregoing second embodiment, when music based on purchasable music data D1 is listened to on trial, music data for trial listening limited in reproduction is downloaded and temporarily stored, and a characteristic section is reproduced, and when the music data D1 corresponding to the music data for trial listening is purchased, reproduction permitting information is downloaded. However, the embodiment of the present invention is not limited to this. Also when music based on music data D1 that can be listened to on trial is listened to on trial, music data for trial listening limited in reproduction may be downloaded and temporarily stored, and a characteristic section may be reproduced, and when the music data D1 corresponding to the music data for trial listening is downloaded, reproduction permitting information may be downloaded.

Further, in the foregoing second embodiment, music data D1 is reproduced from a characteristic position to a tail end position of the music data D1 according to a play list PL1 or PL2 in response to a request by the user to change a channel or music data D1. However, the embodiment of the present invention is not limited to this. For example, information indicating a section corresponding to a characteristic part of music corresponding to music data D1 may be retained, and the music data D1 may be reproduced from a characteristic position to an end position of the section corresponding to the characteristic part according to a play list PL1 or PL2 in response to a request by the user to change a channel or music data D1.

(3) Third Embodiment

FIG. 66 shows a hardware circuit configuration based on hardware circuit blocks of a reproducing apparatus 300 according to a third embodiment. In the reproducing apparatus 300, when a user operates an operating input unit 301 formed by various operating buttons provided on the surface of a casing of the reproducing apparatus 300 or a remote control (not shown), the operating input unit 301 recognizes this operation, and sends an operation input signal corresponding to the operation to an input processing unit 302. The input processing unit 302 converts the supplied operation input signal into an operation command by subjecting the operation input signal to a predetermined process, and then sends the operation command to a central processing unit (CPU) 304 via a bus 303.

The central processing unit 304 outputs various programs such as basic programs, application programs and the like stored in advance in a ROM (Read Only Memory) 305 or a hard disk drive 306 to a RAM (Random Access Memory) 307 via the bus 303. The central processing unit 304 controls the whole of the reproducing apparatus 300, performs predetermined operation processes, and performs various processes in response to operation commands supplied from the input processing unit 302, according to the various programs expanded in the RAM 307.

The central processing unit 304 can be connected to a network NT via a communication processing unit 308 and a network interface 309 in this order to access a music providing server 310 on the network NT. In this case, the music providing server 310 stores a large number of pieces of music data in a predetermined format.

Therefore, when the user inputs an operation input signal to request the downloading of desired music data via the operating input unit 301, the central processing unit 304 accordingly accesses the music providing server 310 to make a request to download the desired music data. As a result, the central processing unit 304 downloads the desired music data returned from the music providing server 310 via the network interface 309 and the communication processing unit 308 in this order. The central processing unit 304 sends the music data to the hard disk drive 306 to store the music data on a hard disk.

When the user inputs an operation input signal to record music data recorded on a recording medium such as a CD or the like via the operating input unit 301, the central processing unit 304 reads the music data from the recording medium by a media drive 311, and sends the read music data to a data processing circuit 312. The data processing circuit 312 compression-codes the music data supplied from the media drive 311, and then sends the resulting music data to the hard disk drive 306 to store the music data on the hard disk.

When the user specifies music data within the hard disk drive 306 and inputs an operation input signal to request the reproduction of the specified music data via the operating input unit 301, the central processing unit 304 accordingly reads the specified music data from the hard disk drive 306, and then sends the music data to the data processing circuit 312. At this time, the data processing circuit 312 decodes the music data, then subjects the music data to audio processing such as digital-to-analog conversion, amplification and the like, and sends a resulting music signal to a speaker 313. The central processing unit 304 thereby outputs music based on the music signal from the speaker 313 to allow the user to listen to the music.

The hard disk drive 306 further stores a plurality of kinds of play lists on the hard disk. When the user specifies a play list to be used for reproduction of music data and inputs an operation input signal to request the reproduction of music data according to the play list via the operating input unit 301, the central processing unit 304 accordingly reads the specified play list from the hard disk drive 306. In addition, the central processing unit 304 sequentially reads a plurality of pieces of music data registered in the play list from the hard disk drive 306 according to the play list, and sends the plurality of pieces of music data to the data processing circuit 312. Therefore, at this time, each time music data is supplied from the central processing unit 304, the data processing circuit 312 decodes the music data, then subjects the music data to audio processing such as digital-to-analog conversion, amplification and the like, and sends a resulting music signal to the speaker 313. The central processing unit 304 thereby sequentially outputs music based on the music signal from the speaker 313 to allow the user to listen continuously to a plurality of pieces of music.

Further, the central processing unit 304 generates data for display corresponding to results of executing various programs (for example obtainment, recording, reproduction and the like of music data), and then sends the data for display to a display processing unit 314. The display processing unit 314 displays a screen based on the data for display supplied from the central processing unit 304 on a display 315. The central processing unit 304 thereby allows the user to visually check various screens related to the obtainment, recording, reproduction and the like of music data via the display 315.

In the reproducing apparatus 300, as described above, the central processing unit 304 basically performs various processes and controls each piece of hardware according to the various programs stored in the ROM 305 or the hard disk drive 306. Thus, in the reproducing apparatus 300, the central processing unit 304, the media drive 311, the data processing circuit 312, and the speaker 313 can be made to function in the same manner as the above-described reproducing unit 11 (FIG. 2) by selecting the various programs stored in the ROM 305 or the hard disk drive 306 appropriately according to the functions of the reproducing apparatus 10 of the hardware configuration based on the functional circuit blocks described above with reference to FIG. 2. Also, in the reproducing apparatus 300, the operating input unit 301 and the input processing unit 302 can be made to function in the same manner as the above-described operating unit 12 (FIG. 2), and the central processing unit 304 and the hard disk drive 306 can be made to function in the same manner as the content data storage unit 13 and the play list storage unit 16 described above (FIG. 2).

Further, in the reproducing apparatus 300, the central processing unit 304, the communication processing unit 308, and the network interface 309 can be made to function in the same manner as the above-described communicating unit 14 (FIG. 2), and the central processing unit 304 and the display processing unit 314 can be made to function in the same manner as the display controlling unit 17 described above (FIG. 2). Further, in the reproducing apparatus 300, the central processing unit 304 can be made to function in the same manner as each of the play list reconstructing unit 50 (FIG. 2), the clocking unit 51 (FIG. 2), the request information generating unit 52 (FIG. 2), the data reproduction history obtaining unit 70 (FIG. 2), the data attribute weighting unit 71 (FIG. 2), the list use history obtaining unit 77 (FIG. 2), and the list attribute updating unit 78 (FIG. 2) described above.

Figure 2:
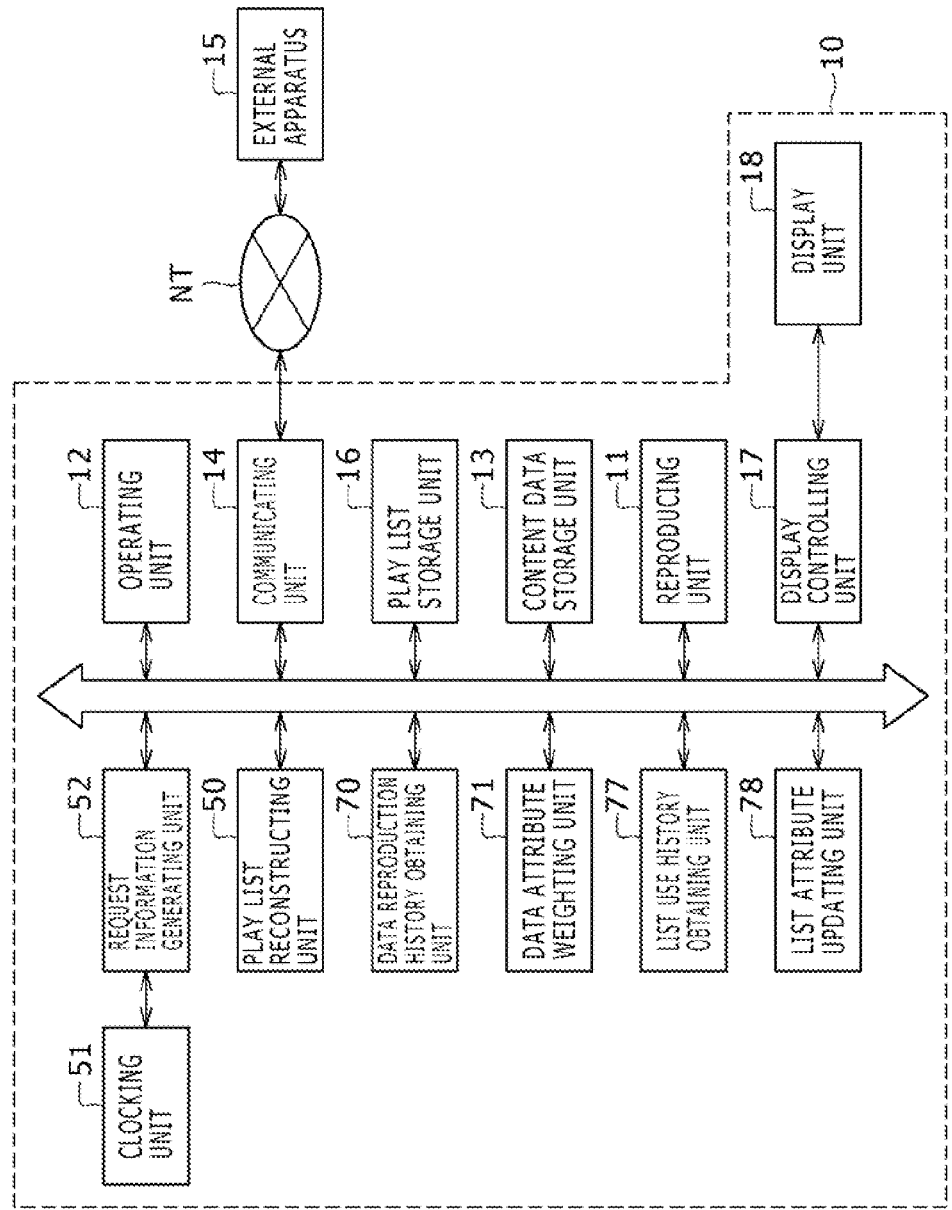
FIG. 2 is a block diagram showing a detailed configuration of the reproducing apparatus according to the first embodiment.

The display 315 corresponds to the above-described display unit 18 (FIG. 2). The music providing server 310 corresponds to the above-described external apparatus 15 (FIG. 2). Hence, by selecting the various programs stored in the ROM 305 or the hard disk drive 306 appropriately according to the functions of the reproducing apparatus 10, the reproducing apparatus 300 can perform similar processes to the above-described processes of the reproducing apparatus 10, and thus provide similar effects to those of the foregoing first embodiment.

On the other hand, in the reproducing apparatus 300, by selecting the various programs stored in the ROM 305 or the hard disk drive 306 appropriately according to the functions of the reproducing apparatus 110 of the hardware configuration based on the functional circuit blocks described above with reference to FIG. 29, the operating input unit 301 and the input processing unit 302 can be made to function in the same manner as the above-described operating unit 111 (FIG. 29), and the central processing unit 304 can be made to function in the same manner as the above-described selecting unit 112 (FIG. 29). In addition, in the reproducing apparatus 300, the central processing unit 304, the media drive 311, the data processing circuit 312, and the speaker 313 can be made to function in the same manner as the above-described reproducing unit 113 (FIG. 29), and the central processing unit 304 and the hard disk drive 306 can be made to function in the same manner as the above-described content data storage unit 114 (FIG. 29).

Figure 29:
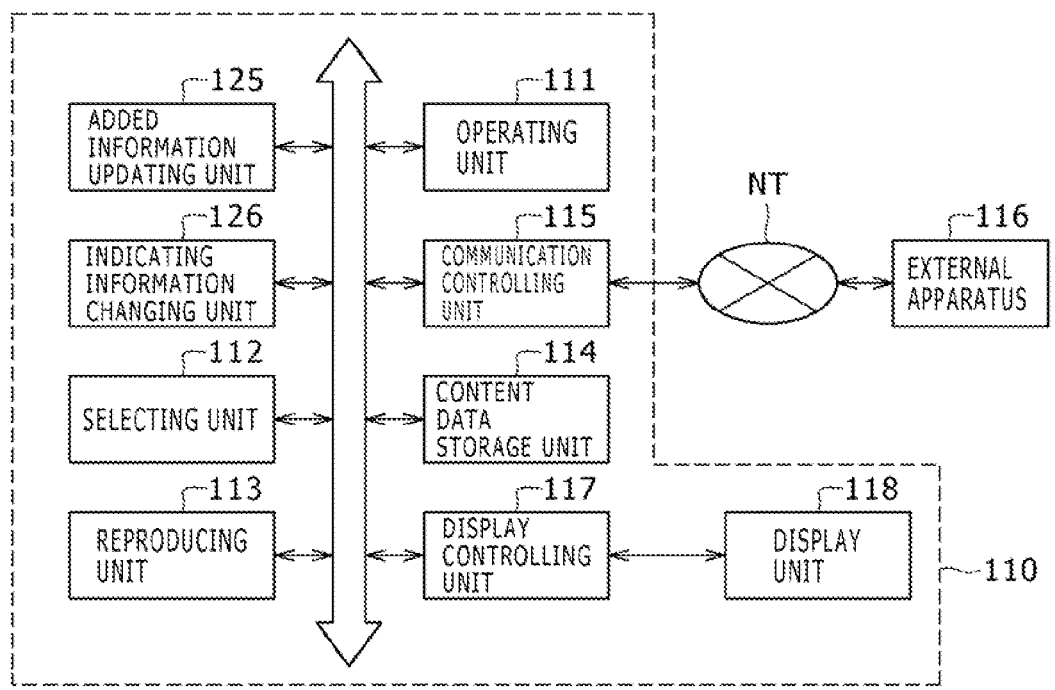
FIG. 29 is a block diagram showing a detailed configuration of the reproducing apparatus according to the second embodiment.
Figure 30:
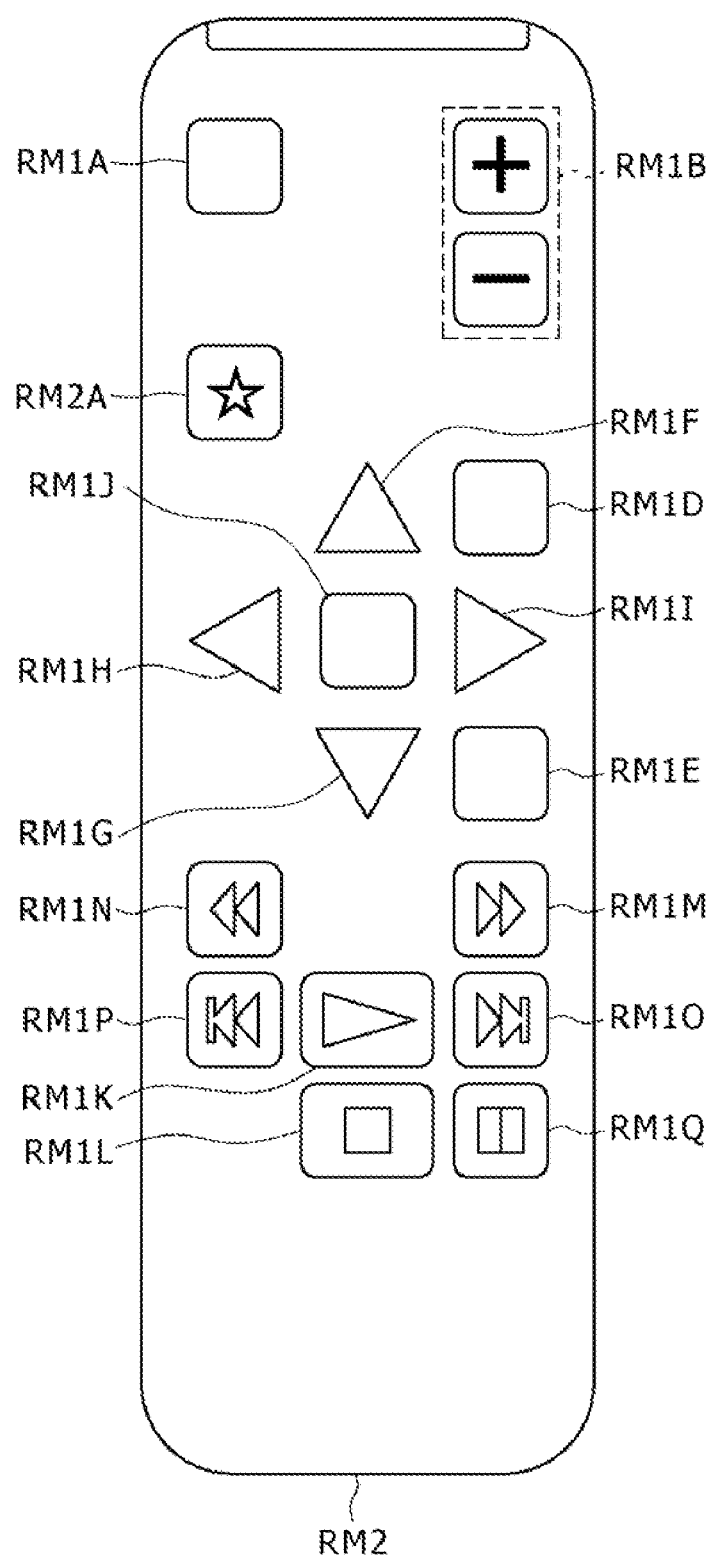
FIG. 30 is a schematic diagram showing a configuration of a remote control.

Further, in the reproducing apparatus 300, the central processing unit 304, the communication processing unit 308, and the network interface 309 can be made to function in the same manner as the above-described communication controlling unit 115 (FIG. 29), and the central processing unit 304 and the display processing unit 314 can be made to function in the same manner as the above-described display controlling unit 117 (FIG. 29). Further, in the reproducing apparatus 300, the central processing unit 304 can be made to function in the same manner as each of the added information updating unit 125 (FIG. 29) and the indicating information changing unit 126 (FIG. 29) described above.

The display 315 corresponds to the above-described display unit 118 (FIG. 29). The music providing server 310 corresponds to the above-described external apparatus 116 (FIG. 29). Hence, by selecting the various programs stored in the ROM 305 or the hard disk drive 306 appropriately according to the functions of the reproducing apparatus 110, the reproducing apparatus 300 can perform similar processes to the above-described processes of the reproducing apparatus 110, and thus provide similar effects to those of the foregoing second embodiment.

(4) Other Embodiments

In the first to third embodiments described above, music data as described above with reference to FIGS. 1 to 66 is applied as content data whose reproduction order is defined by a play list. However, the embodiment of the present invention is not limited to this. Various other content data, such as program data broadcast by television broadcasting and radio broadcasting, image data of movies, and the like, can be widely applied.

In addition, in the first to third embodiments described above, a reproducing apparatus according to the embodiment of the present invention is applied to the reproducing apparatuses 1, 10, and 300 described above with reference to FIGS. 1 to 27 and FIG. 66. However, the embodiment of the present invention is not limited to this. The embodiment of the present invention is widely applicable to reproducing apparatuses of various other configurations, including for example information processing apparatus such as personal computers, portable telephones, PDAs (Personal Digital Assistants) and the like, reproducing apparatus such as portable type music reproducing apparatus, stationary type music reproducing apparatus, and the like, and recording and reproducing apparatus such as DVD (Digital Versatile Disk) recorders, hard disk recorders and the like.

The embodiment of the present invention is applicable to reproducing apparatus such for example as music reproducing apparatus that reproduce music data according to a play list.

It should be understood by those skilled in the art that various modifications, combinations, sub-combinations and alterations may occur depending on design requirements and other factors insofar as they are within the scope of the appended claims or the equivalents thereof.

What is claimed is:

1. A reproducing apparatus for reproducing a plurality of pieces of content data stored in a content data storage unit according to a play list defining reproduction order of the content data, the reproducing apparatus comprising:
   a play list storage unit configured to store the play list including a play list generating rule and identifying information for identifying the content data matching the play list generating rule;
   a request information generating unit configured to generate reconstruction requesting information for requesting reconstruction of the play list;
   a play list reconstructing unit configured to update the identifying information included in the play list and stored in the play list storage unit by applying the play list generating rule to the content data in response to the reconstruction requesting information generated by the request information generating unit;
   a communicating unit configured to communicate with an external apparatus;
   a list use history obtaining unit configured to obtain a list use history of use of the play list in reproducing the content data; and
   a list attribute updating unit configured to update list attribute information of the play list according to the list use history, wherein
   the request information generating unit generates the reconstruction requesting information when receiving a request to reconstruct the play list from the external apparatus via the communicating unit,
   the play list reconstructing unit updates the identifying information included in the play list and stored in the play list storage unit based on the play list generating rule corresponding to an apparatus use condition in response to the reconstruction requesting information, and
   upon user instruction, the play list reconstructing unit updates the identifying information included in the play list and stored in the play list storage unit based on the play list generating rule and the list attribute information updated by the list attribute updating unit in response to the reconstruction requesting information.

2. The reproducing apparatus according to claim 1, further comprising a clocking unit,
   wherein the request information generating unit generates the reconstruction requesting information when a change from a first season to a second season is detected on a basis of clocking by the clocking unit, and
   the play list reconstructing unit updates the play list having a play list generating rule related to the first season, the play list being stored in the play list storage unit, based on a play list generating rule related to the second season in response to the reconstruction requesting information.

3. The reproducing apparatus according to claim 1, further comprising an operating unit,
   wherein the request information generating unit generates the reconstruction requesting information when detecting an operation of the operating unit, and
   the play list reconstructing unit updates the identifying information included in the play list and stored in the play list storage unit based on a play list generating rule corresponding to an apparatus use condition in response to the reconstruction requesting information.

4. The reproducing apparatus according to claim 3, further comprising:
   a data reproduction history obtaining unit configured to obtain a data reproduction history of a unit of the content data of the plurality of pieces of content data; and
   a data attribute weighting unit configured to weight data attribute information of the content data according to the data reproduction history;
   wherein the play list reconstructing unit updates the identifying information included in the play list and stored in the play list storage unit based on the play list generating rule and the data attribute information weighted by the data attribute weighting unit in response to the reconstruction requesting information.

5. The reproducing apparatus according to claim 1, further comprising:
   a data reproduction history obtaining unit configured to obtain a data reproduction history of a unit of the content data of the plurality of pieces of the content data; and
   a data attribute weighting unit configured to weight data attribute information of the content data according to the data reproduction history;
   wherein the play list reconstructing unit updates the identifying information included in the play list and stored in the play list storage unit based on the play list generating rule and the data attribute information weighted by the data attribute weighting unit in response to the reconstruction requesting information.

6. The reproducing apparatus according to claim 1, wherein the communicating unit receives the play list having the play list generating rule and the identifying information for identifying the content data matching the play list generating rule from the external apparatus, and
   when the play list received by the communicating unit has a play list generating rule corresponding to the apparatus use condition, the play list reconstructing unit stores the received play list in the play list storage unit in response to the reconstruction requesting information.

7. The reproducing apparatus according to claim 5,
   wherein the communicating unit receives a content list having the data attribute information of the content data and the identifying information of the content data from the external apparatus, and
   in response to the reconstruction requesting information, using the content list received by the communicating unit, the play list reconstructing unit detects the identifying information of the content data having the data attribute information matching the play list generating rule corresponding to the apparatus use condition, and stores the play list including the detected identifying information in the play list storage unit.

8. The reproducing apparatus according to claim 1,
   wherein the play list reconstructing unit further stores the updated play list having the play list generating rule corresponding to the apparatus use condition in the play list storage unit in response to the reconstruction requesting information.

9. The reproducing apparatus according to claim 1,
   wherein the play list reconstructing unit updates the play list generating rules of the play lists stored in the play list storage unit according to the apparatus use condition in response to the reconstruction requesting information.

10. The reproducing apparatus according to claim 1,
    wherein the request information generating unit generates the reconstruction requesting information when detecting that an apparatus use place has changed from a first apparatus use place to a second apparatus use place, and the play list reconstructing unit updates the play list having a play list generating rule related to the first apparatus use place, the play list being stored in the play list storage unit, based on a play list generating rule related to the second apparatus use place in response to the reconstruction requesting information.

11. The reproducing apparatus according to claim 1, wherein the request information generating unit detects the apparatus use condition each time one piece of the content data is reproduced according to the play list having the play list generating rule related to a first apparatus use condition, and generates the reconstruction requesting information when detecting that the apparatus use condition has changed from the first apparatus use condition to a second apparatus use condition, and the play list reconstructing unit updates the play list having a play list generating rule related to the first apparatus use condition based on a play list generating rule related to the second apparatus use condition in response to the reconstruction requesting information.

12. A reproducing method comprising:

generating reconstruction requesting information for requesting reconstruction of a play list defining reproduction order of a plurality of pieces of content data, the play list including a play list generating rule and identifying information for identifying the content data matching the play list generating rule; and updating the identifying information by applying the play list generating rule to the content data in response to the reconstruction requesting information;

obtaining a list use history of use of the play list in reproducing the content data; and updating list attribute information of the play list according to the list use history, wherein in the generating, the reconstruction requesting information is generated when a request to reconstruct the play list from an external apparatus is received, and in the updating, the identifying information included in the play list and stored in a play list storage unit is updated based on the play list generating rule corresponding to an apparatus use condition in response to the reconstruction requesting information, and in the updating, upon user instruction, the identifying information included in the play list and stored in the play list storage unit is updated based on the play list generating rule and the updated list attribute information in response to the reconstruction requesting information.

13. The reproducing method according to claim 12, wherein in the generating, the reconstruction requesting information is generated when a change from a first season to a second season is detected on a basis of clocking by a clocking unit, and in the updating, the play list having the play list generating rule related to the first season is updated, the play list being stored in a play list storage unit, based on a play list generating rule related to the second season in response to the reconstruction requesting information.

14. The reproducing method according to claim 12, wherein in the generating, the reconstruction requesting information is generated when an operation of an operating unit is detected, and in the updating, the identifying information included in the play list and stored in a play list storage unit is updated based on a play list generating rule corresponding to an apparatus use condition in response to the reconstruction requesting information.

15. The reproducing method according to claim 14, further comprising:

obtaining a data reproduction history of a unit of the content data of the plurality of pieces of the content data; and weighting data attribute information of the content data according to the data reproduction history;

wherein in the updating, the identifying information included in the play list and stored in the play list storage unit is updated based on the play list generating rule and the weighted data attribute information in response to the reconstruction requesting information.

16. The reproducing method according to claim 12, further comprising:

obtaining a data reproduction history of a unit of the content data of the plurality of pieces of the content data; and weighting data attribute information of the content data according to the data reproduction history;

wherein in the updating, the identifying information included in the play list and stored in the play list storage unit is updated based on the play list generating rule and the weighted data attribute information in response to the reconstruction requesting information.

17. The reproducing method according to claim 12, wherein the play list having the play list generating rule and the identifying information for identifying the content data matching the play list generating rule is received from the external apparatus, and when the received play list has a play list generating rule corresponding to the apparatus use condition, the updating includes storing the received play list in the play list storage unit in response to the reconstruction requesting information.

18. The reproducing method according to claim 16, wherein a content list having the data attribute information of the content data and the identifying information of the content data is received from the external apparatus, and in response to the reconstruction requesting information, using the received content list, the updating includes detecting the identifying information of the content data having the data attribute information matching the play list generating rule corresponding to the apparatus use condition, and storing the play list including the detected identifying information in the play list storage unit.

19. The reproducing method according to claim 12, wherein in the updating, the play list having the play list generating rule corresponding to the apparatus use condition is stored in a play list storage unit in response to the reconstruction requesting information.

20. The reproducing method according to claim 12, wherein in the updating, the play list generating rules included in a plurality of the play lists stored in a play list storage unit are updated according to the apparatus use condition in response to the reconstruction requesting information.

21. The reproducing method according to claim 12, wherein in the generating, the reconstruction requesting information is generated when an apparatus use place has changed from a first apparatus use place to a second apparatus use place, and in the updating, the play list having the play list generating rule related to the first apparatus use place, the play list being stored in a play list storage unit, is updated based on a play list generating rule related to the second apparatus use place in response to the reconstruction requesting information.

22. The reproducing method according to claim 12, wherein in the generating, the apparatus use condition is detected each time one piece of the content data is reproduced according to the play list having the play list generating rule related to a first apparatus use condition, and the reconstruction requesting information is generated when the apparatus use condition has changed from the first apparatus use condition to a second apparatus use condition, and in the updating, the play list having the play list generating rule related to the first apparatus use condition is updated based on a play list generating rule related to the second apparatus use condition in response to the reconstruction requesting information.

23. A non-transitory computer readable storage medium storing computer readable instructions thereon, which, when executed by a computer, cause the computer to perform a method comprising:

generating reconstruction requesting information for requesting reconstruction of a play list defining reproduction order of a plurality of pieces of content data, the play list including a play list generating rule and identifying information for identifying the content data matching the play list generating rule; and updating the identifying information by applying the play list generating rule to the content data in response to the reconstruction requesting information;

obtaining a list use history of use of the play list in reproducing the content data; and updating list attribute information of the play list according to the list use history, wherein in the generating, the reconstruction requesting information is generated when a request to reconstruct the play list from an external apparatus is received, and in the updating, the identifying information included in the play list and stored in a play list storage unit is updated based on the play list generating rule corresponding to an apparatus use condition in response to the reconstruction requesting information, and in the updating, upon user instruction, the identifying information included in the play list and stored in the play list storage unit is updated based on the play list generating rule and the updated list attribute information in response to the reconstruction requesting information.

* * * * *